United States Patent
Aoki et al.

(10) Patent No.: US 6,253,218 B1
(45) Date of Patent: Jun. 26, 2001

(54) THREE DIMENSIONAL DATA DISPLAY METHOD UTILIZING VIEW POINT TRACING AND REDUCED DOCUMENT IMAGES

(76) Inventors: Atsushi Aoki, 422, Kamada, Kashiba-shi Nara 639-02; Satoshi Suzuki, 3-17, 1-chome Sakyo, Nara-shi Nara 631; Yasuhiro Aitani, 492-435, Minosho-cho; Atsushi Ono, 492-128, Minosho-cho, both of Yamatokoriyama-shi Nara 639-11; Yasuji Obuchi, 3-4-22, Myojin Oji-cho, Kitakatsuragi-gun Nara 636; Yoshimasa Nakamura, 492-201, Minosho-cho, Yamatokoriyama-shi Nara 639-11, all of (JP)

( * ) Notice: Subject to any disclaimer, the term of this patent is extended or adjusted under 35 U.S.C. 154(b) by 0 days.

(21) Appl. No.: 08/997,614

(22) Filed: Dec. 23, 1997

(30) Foreign Application Priority Data

Dec. 26, 1996 (JP) .................................................. 8-347050
May 9, 1997 (JP) .................................................. 9-119986

(51) Int. Cl.[7] ................................. G06F 7/10; G06F 3/00
(52) U.S. Cl. ................................. 707/526; 707/7; 345/355
(58) Field of Search ................................. 345/355, 348, 345/420; 367/38; 382/113; 707/512, 526, 7

(56) References Cited

U.S. PATENT DOCUMENTS

| | | | |
|---|---|---|---|
| 4,616,336 | * 10/1986 | Robertson et al. | 707/512 |
| 5,513,271 | * 4/1996 | Rao et al. | 382/113 |
| 5,671,381 | * 9/1997 | Strasnick et al. | 345/355 |
| 5,754,493 | * 5/1998 | Al-Chalabi | 367/38 |
| 5,847,707 | * 12/1998 | Hayashida | 345/348 |
| 6,006,227 | * 12/1999 | Freeman et al. | 707/7 |
| 6,012,072 | * 1/2000 | Lucas et al. | 707/526 |

FOREIGN PATENT DOCUMENTS 7-129448   5/1995   (JP) .
8-063324   3/1996   (JP) .

OTHER PUBLICATIONS

Robertson, George G. et al., Cone Trees: animated 3D visualizations of hierarchical information, ACM Conference on Human Factors and Computing Systems, pp. 189–194, May, 1991.*

* cited by examiner

Primary Examiner—Heather R. Herndon
Assistant Examiner—William L. Bashore

(57) ABSTRACT

When the user directs to change the view point within a virtual 3-D coordinate space having thereon displayed reduced images as a list of data by successively inputting a view point moving in an arbitrary direction, a trace of the movement of the view point is displayed within the screen. Thus, it has become possible to visualize individual data files in the database and the relationship among each item of the data. Consequently, the user can readily manage the data and retrieve the information he needs.

9 Claims, 128 Drawing Sheets

FIG. 6

| PERIOD SERIAL NO. | START DATE | START COORDINATE | END DATE | END COORDINATE |
|---|---|---|---|---|
| PERIOD 1 | 1995.4.1 0:00 | (Xs, Ys, Zs) | 1996.3.31 23:59 | (Xe, Ye, Ze) |
| PERIOD 2 | 1996.4.1 0:00 | (Xs', Ys', Zs') | 1997.3.31 23:59 | (Xe', Ye', Ze') |
| | | | | |

F I G. 7

| CATEGORY ORDER | CATEGORY IDENTIFIER | DATA PARTITION | CATEGORY MODEL POSITION COORDINATE |
|---|---|---|---|
| 1 | CATEGORY A | DOCUMENT | (Xc, Yc, Zc) |
| 2 | CATEGORY C | IMAGE | (Xc', Yc', Zc') |
| 3 | CATEGORY D | PLAN MEETING | (Xc'', Yc'', Zc'') |
| | | | |

FIG. 8

| DATA IDENTIFIER | START DATE | THICKNESS MAGNIFICATION | DATA FORMAT | POINTER TO REDUCED IMAGE DATA |
|---|---|---|---|---|
| DATA A | 1996.1.4 2:10 | 1.5 | PICTURE | Pointer1 |
| DATA B | 1995.9.6 7:31 | 3.0 | TEXT | Pointer2 |
| DATA C | | | | |

| CATEGORY IDENTIFIER | POSITION COORDINATE | POINTER TO APPLICATION PROCESSING SECTION |
|---|---|---|
| CATEGORY A   CATEGORY D | (Xd, Yd, Zd) | App1 |
| CATEGORY C   CATEGORY D | (Xd', Yd', Zd') | App2 |

FIG. 15

| FILE TITLE | ATTRIBUTES | | |
|---|---|---|---|
| | DATE OF CREATION | DATA FORMAT | SIZE |
| PROCEEDING.doc | 96/10/15 | TEXT | 1kByte |
| LANDSCAPE PAINTING.gif | 6/9/16 | IMAGE | 300kByte |
| ××××.html | 97/1/1 | URL | 500kByte |
| BUSINESS TRIP REPORT.txt | 96/7/31 | TEXT | 50kByte |
| · | | · | · |
| · | | · | · |
| · | | · | · |

FIG. 17

| FILE TITLE | COORDINATE | | |
|---|---|---|---|
| | x | y | z |
| PROCEEDING.doc | 100 | 0 | 100 |
| LANDSCAPE PAINTING.gif | 200 | 0 | 150 |
| ××××.html | 300 | 0 | 50 |
| BUSINESS TRIP REPORT.txt | 100 | 0 | 200 |
| ⋅ | ⋅ | ⋅ | ⋅ |
| ⋅ | ⋅ | ⋅ | ⋅ |
| ⋅ | ⋅ | ⋅ | ⋅ |

TEXT   IMAGE   URL

FIG. 55

SPACE DISPLAY INFORMATION TABLE

| START DATE | END DATE | CATEGORY IDENTIFIER |
|---|---|---|
| 1995/12/12 | 1996/10/10 | CATEGORY A<br>CATEGORY B |

DATA DISPLAY INFORMATION TABLE

| DATA IDENTIFIER | DATE OF CREATION | DATA SIZE | DATA FORMAT | CATEGORY IDENTIFIER |
|---|---|---|---|---|
| DATA A | 1996/10/10 10:00 | 45KB | PICTURE | CATEGORY A CATEGORY B |
| DATA B | 1997/01/01 13:00 | 185KB 15 PAGES | TEXT | CATEGORY A CATEGORY B |
|  |  |  |  |  |

VIEW POINT INFORMATION TABLE

FIG. 64

DATA DISPLAY INFORMATION TABLE

| DATA IDENTIFIER | DATE OF CREATION | DATA SIZE | DATA FORMAT | CATEGORY IDENTIFIER |
|---|---|---|---|---|
| DATA A | 1996/10/10 10:00 | 45KB | PICTURE | CATEGORY A CATEGORY B |
| DATA B | 1997/01/01 13:00 | 185KB 15 PAGES | TEXT | CATEGORY A CATEGORY B |
| | | | | |

| KEY WORD | RETRIEVAL FLAG |
|---|---|
| KEY WORD 1 KEY WORD 2 | TRUE |
| KEY WORD 2 | FALSE |
| | |

F I G. 84

| CATEGORY ORDER | CATEGORY IDENTIFIER | CREATOR | CATEGORY MODEL POSITION COORDINATE | POINTER TO FACE IMAGE DATA |
|---|---|---|---|---|
| 1 | CATEGORY A | ANDO | (Xc, Yc, Zc) | Pointer1 |
| 2 | CATEGORY B | SAKAI | (Xc', Yc', Zc') | Pointer2 |
| 3 | CATEGORY C | NAKAYAMA | (Xc'', Yc'', Zc'') | Pointer3 |
| | | | | |

F I G. 8 5

| DATA IDENTIFIER | START DATE | THICKNESS MAGNIFICATION | DATA FORMAT | POINTER TO REDUCED IMAGE DATA |
|---|---|---|---|---|
| DATA A | 1996.1.4 2:10 | 1.5 | PICTURE | Pointer1 |
| DATA B | 1995.9.6 7:31 | 3.0 | TEXT | Pointer2 |
| DATA C | | | | |

| CATEGORY IDENTIFIER | POSITION COORDINATE | POINTER TO APPLICATION PROCESSING SECTION | POINTER TO REDUCED IMAGE DATA |
|---|---|---|---|
| CATEGORY A | (Xd, Yd, Zd) | | POINTER TO REDUCED IMAGE DATA |
| CATEGORY C | (Xd', Yd', Zd') | | POINTER TO REDUCED IMAGE DATA |

FIG. 87

| MODEL | POINTER TO PROCESSING ROUTINE |
|---|---|
| DATA MODEL | Pointer1 |
| CATEGORY MODEL | Pointer2 |
| CALENDAR MODEL | Pointer3 |

F I G. 89

| POINTER Pd TO DATA MODEL | BRANCHING POINTER P00 | BRANCHING POINTER P01 | BRANCHING POINTER P10 | BRANCHING POINTER P11 |
|---|---|---|---|---|
| Pointer1 | Pointer2 | Pointer3 | Pointer4 | Pointer5 |
| | | | | |

FIG.105

PREDICT TABLE

TABLE OF PREDICTED DEMAND

|      | type1 | type2 |
|------|-------|-------|
| 1992 | 99    | 0     |
| 1993 | 156   | 13    |
| 1994 | 177   | 15    |
| 1995 | 250   | 30    |
| 2000 | 445   | 107   |
| 2010 | 544   | 283   |

PREDICT TABLE

FIG.112
| MOTIF NO. | MOTIF | CREATOR |
|---|---|---|
| 1 |  | MYSELF |
| 2 |  | TARO YAMADA |
| 3 |  | SATO |
| 4 |  | SUZUKI |
| 5 |  | OTHERS |

FIG.114

PREDICTED DEMAND
OF PERSONAL
COMPUTER IN 1995

1. INTRODUCTION
2. PRESENT SITUATION
3. PREDICTED DEMAND
4. APPENDIX 1

FIG.115

TYPE:TEXT

CREATOR:TARO YAMADA

DATE OF CREATION:1993.3.20

DATE OF UPDATE:1996.4.11

VERSION : 1.2

SIZE : 216,872 BYTES

PAGES : 12

FIG. 120

DATA DISPLAY TABLE

| DATA IDENTIFIER | START DATE | THICKNESS MAGNIFICATION | DATA FORMAT | POINTER TO REDUCED IMAGE DATA |
|---|---|---|---|---|
| DATA A | 1996.1.4 2:10 | 1.5 | PICTURE | Pointer1 |
| DATA B | 1995.9.6 7:31 | 3.0 | TEXT | Pointer2 |

| CATEGORY IDENTIFIER | POSITION COORDINATE | POINTER TO APPLICATION PROCESSING SECTION | TITLE |
|---|---|---|---|
| CATEGORY A  CATEGORY D | (Xd, Yd, Zd) | App1 | Mt. FUJI 1 |
| CATEGORY C  CATEGORY D | (Xd', Yd', Zd') | App2 | REPORT 1 |

| PAGE PRINT INFORMATION | NAME OF CREATOR | ADDITIONAL INFORMATION | SELECTION FLAG |
|---|---|---|---|
| PORTRAIT | SUZUKI | FROM EAST SIDE | SELECTED |
| LANDSCAPE | SATO | TO BE REVISED May 10 | NOT SELECTED |

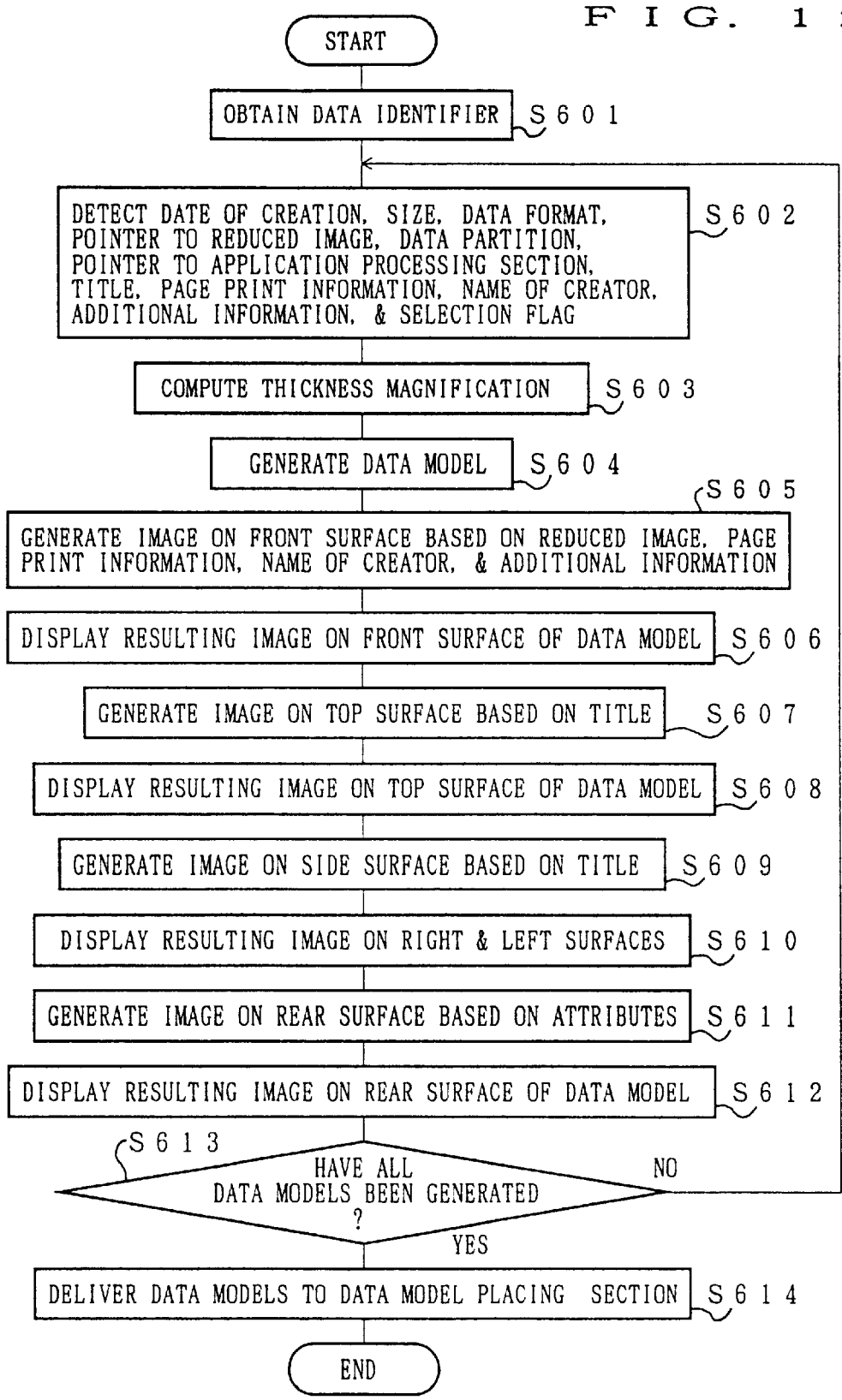

THREE DIMENSIONAL DATA DISPLAY METHOD UTILIZING VIEW POINT TRACING AND REDUCED DOCUMENT IMAGES

FIELD OF THE INVENTION

The present invention relates to a data display method, particularly to a data display method for displaying data stored as a database on a display device.

BACKGROUND OF THE INVENTION

A conventional display method of file data disclosed in, for example, Japanese Laid-open Patent Application No. 129448/1995 (Tokukaihei No. 7-129448), is a method of displaying a list of the files. The attributes, such as the owner, size, and type of the files, are also displayed along the file titles. Since more than a screenful of data can not be displayed at one time, the user tries to find the necessary data by scrolling the screen.

Further, this method is often combined with another method of classifying and arranging the files using a directory or a folder as a managing system of a plurality of files, so that the data can be managed hierarchically.

In the case of an image database, a reduced image (thumbnail) is displayed to present a screen content as a data list display method. When a data volume exceeds a screenful of data, the user tries to find the necessary data by scrolling the screen like he does with the list of the files.

In the above data display methods, if the data are retrieved based on retrieval information inputted through an information input device, such as a keyboard and icons, a cursor moves to the extracted data (moving of view fixed point), or the extracted data are displayed in reverse or in another window.

In the conventional display method with hierarchal management, if the user wishes to display the data of a specific file, he can not know the data content in the files until he accesses the directory and checks the list of the files on the display. Thus, if the files are divided into many categories or managed in a deep hierarchy, the user has to access the directory more often and it takes a time to obtain the necessary information.

In the case of the list of reduced images of the image database, the user can readily understand the image content. However, as a volume of the data increases and exceeds a screenful of data, it becomes impossible to obtain the image content simultaneously with the information as to which images were created earlier than which.

In addition, neither the file titles nor attributes of the images in the files can be displayed simultaneously with the image contents. Thus, the corresponding data must be displayed separately for selected images alone, or a list of the file titles must be displayed separately with the attributes, such as the owner, size, or type of the files. In other words, to obtain accurate information, the above image display method must be combined with another data display method, and therefore, demands extra works, such as screen switching.

Further, the data containing both an image and a text can be handled only in the level of files. Thus, it is difficult for the user to handle the data of different formats while understanding the content thereof.

As has been explained, the conventional data display methods have a problem in that the user can not understand the characteristics of each item of the data at a glance while understanding a relationship among the data, such as positions in terms of time and categories, in a straightforward manner, thereby making it difficult for the user to manage the data or recognize the information he needs.

SUMMARY OF THE INVENTION

It is therefore an object of the present invention to provide a data display method for, when the user retrieves the data as occasion demands through visualized relationship between individual data files in the database and each item of the data, enabling the user to understand the content of each item of the data at a glance. Further, the user can understand the position of the data in terms of time, categories or the like in a straightforward manner, thereby making it easy for the user to manage the data or retrieve the information he needs.

To fulfill the above object, a first data display method of the present invention is characterized by being furnished with:

storage means for storing more than one item of data each having both time information and category information;

coordinate space generating means for generating a time coordinate on a wall plane in a depth direction with respect to a screen and a category coordinate on a floor plane in a width direction with respect to the screen; and figure generating means for generating a figure representing a content of the data, wherein the above figure is displayed on a coordinate space composed of the wall plane and floor plane based on the time information and category information of the data.

Therefore, when the user retrieves the data as occasion demands, he can understand the content of each item of the data at a glance while understanding the position of the data in terms of time, categories, etc. in a straightforward manner. Consequently, the user can readily manage the data and retrieve the information he needs.

Also, a second data display method of the present invention is a data display method in a virtual 3-D coordinate space having an X axis in a lateral direction of a 2-D screen, a Y axis in a longitudinal direction of the 2-D screen, and a Z axis in a virtual depth direction with respect to the 2-D screen, characterized in that:

a content of data is generated as a reduced image;

an attribute of each item of the data is set to each of the X axis and Z axis within the space;

a list of the content of each item of the data is displayed on the screen by displaying the reduced image at a position having an X coordinate and a Z coordinate corresponding to a value of the attribute of each item of the data; and a trace of view points, inputted in the space successively and each indicating of which part of the space should be displayed at which angle as an image, is superimposed on the reduced image within the screen.

Therefore, when the user retrieves the data as occasion demands, he can understand the content of each item of the data at a glance while understanding the position of the data in terms of time, categories, etc. in a straightforward manner. Consequently, the user can readily manage the data and retrieve the information he needs.

A third data display method of the present invention is a data display method in a virtual 3-D coordinate space having an X axis in a lateral direction of a 2-D screen, a Y axis in a longitudinal direction of the 2-D screen, and a Z axis in a virtual depth direction with respect to the 2-D screen, characterized in that:

a content of data is generated as a reduced image;

an attribute of each item of the data is set to each of the X axis and Z axis within the space;

a list of the content of each item of the data is displayed on the screen by displaying the reduced image at a position having an X coordinate and a Z coordinate corresponding to a value of the attribute of each item of the data; and a display pattern of each item of the data is changed depending whether being suitable for retrieval or not so as to be distinguished visually in a clear manner.

Therefore, when the user retrieves the data as occasion demands, he can understand the content of each item of the data at a glance while understanding the position of the data in terms of time, categories, etc. in a straightforward manner. Consequently, the user can readily manage the data and retrieve the information he needs.

A fourth data display method of the present invention is a data display method in a virtual 3-D coordinate space having an X axis in a lateral direction, of a 2-D screen, a Y axis in a longitudinal direction of the 2-D screen, and a Z axis in a virtual depth direction with respect to the 2-D screen, characterized in that:

a content of data is generated as a reduced image;

an attribute of each item of the data is set to each of the X axis and Z axis within the space;

when there is not more than one item of the data having the same values of two attributes represented by the X axis and Z axis, the reduced image is displayed at a position having the X coordinate and Z coordinate corresponding to the values of the two attributes of the data; and when there is more than one item of the data having the same values of the two attributes represented by the X axis and Z axis, a figure indicating that there is more than one item of the data is displayed at the position having the X coordinate and Z coordinate values of the two attributes of the data.

Therefore, when the user retrieves the data as occasion demands, he can understand the content of each item of the data at a glance while understanding the position of the data in terms of time, categories, etc. in a straightforward manner. Consequently, the user can readily manage the data and retrieve the information he needs.

A fifth data display method of the present invention is a data display method in a virtual 3-D coordinate space having an X axis in a lateral direction of a 2-D screen, a Y axis in a longitudinal direction of the 2-D screen, and a Z axis in a virtual depth direction with respect to the 2-D screen, characterized in that:

an attribute of each item of data is set to each of the X axis and Z axis within the space;

polyhedrons are generated within the space, each of which having a front surface parallel to an XY plane and an attribute information display surface which is different from the front surface;

a content of each item of the data is displayed as a reduced image on the front surface of each polyhedron;

a corresponding polyhedron is placed at a position having an X coordinate and a Z coordinate corresponding to a value of the attribute of each item of the data to display a list of the content of each item of the data on the screen; and a value of an attribute, which is different from the above two attributes, is displayed as attribute information of each item of the data on the attribute information display surface of each polyhedron.

Therefore, when the user retrieves the data as occasion demands, he can understand the content of each item of the data at a glance while understanding the position of the data in terms of time, categories, etc. in a straightforward manner. Consequently, the user can readily manage the data and retrieve the information he needs.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

For a fuller understanding of the nature and advantages of the invention, reference should be made to the ensuing detailed description taken in conjunction with the accompanying drawings, wherein like reference numerals represent like elements.

BRIEF DESCRIPTION OF THE DRAWINGS

FIG. 6 is a view explaining screen information for displaying data models;

FIG. 7 is a view explaining the screen information for displaying the data models;

FIG. 8 is a view explaining the screen information for displaying the data models;

FIG. 15 is a view explaining a data structure;

FIG. 17 is a view explaining a data structure;

FIG. 55 is a view explaining a space display information table;

FIG. 64 is a view explaining another example data display information table of the display device for the data display method of the present invention;

FIG. 84 is a view explaining an arrangement of information for displaying the category models;

FIG. 85 is a view explaining an arrangement of information for displaying the data models;

FIG. 87 is a view explaining a model generation processing table;

FIG. 89 is a view explaining a data structure for judging whether more than one data model is placed at the same coordinate or not;

FIG. 105 is a view explaining an example data model;
FIG. 112 is a view explaining a structure of display information for displaying a data model;
FIG. 114 is a view explaining an example data model;
FIG. 115 is a view explaining an example data model;
FIG. 120 is a view explaining screen information for displaying data models;

FIG. 121 is a flowchart detailing generation processing of the data models;

DETAILED DESCRIPTION OF THE PREFERRED EMBODIMENTS

Embodiment 1

Referring to FIGS. 1 through 13, the following description will describe an example embodiment of the present invention.

A display device for carrying out a data display method of the present invention creates a virtual 3-D coordinate space on a 2-D screen and displays three-dimensional data of different kinds thereon. In the above space, each of XYZ axes is set in the left-handed system. More specifically, the X axis is oriented to the right in the lateral (horizontal) direction with respect to the screen, and the Y axis is oriented upward in the longitudinal (vertical) direction with respect to the screen, while the Z axis is oriented in a virtual depth direction with respect to the screen.

Figure 1:
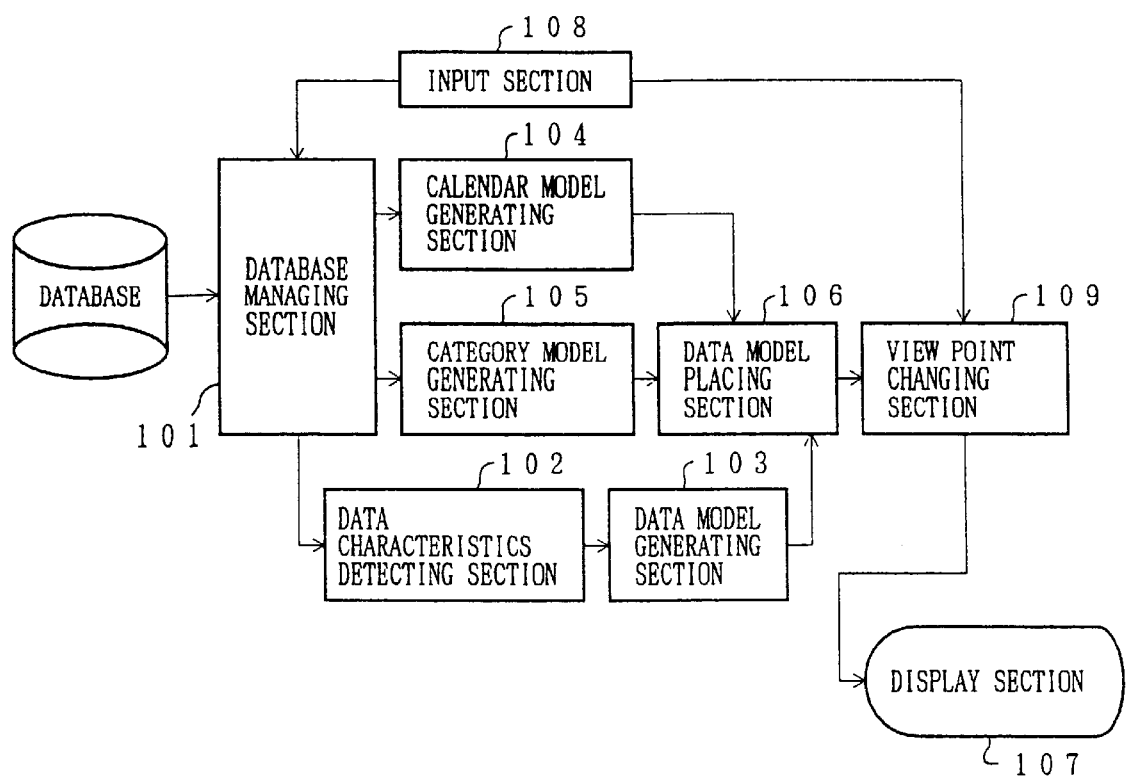
FIG. 1 is a block diagram schematically showing an example arrangement of a display device for a data display method of the present invention.

As shown in FIG. 1, the display device includes a database managing section 101, a data characteristics detecting section 102, a data model (object) generating section 103, a calendar model generating section 104, a category model generating section 105, a data model placing section 106, a display section 107, an input section 108, and a view point changing section 109.

The database managing section 101, data characteristics detecting section 102, data model generating section 103, calendar model generating section 104, category model generating section 105, data model placing section 106, and view point changing section 109 are a function module realized by a CPU (Central Processing Unit) of an unillustrated computer, a computer program run on the CPU, a recording medium for storing the computer program, such as a hard disk, and a memory composed of semiconductor or the like for storing the computer program or subject data during the operation. The display section 107 can be realized by, for example, a CRT (Cathode Ray Tube) or an LCD (Liquid Crystal Display). The input section 108 can be realized by, for example, a keyboard, and pointing devices, such as a mouse, a pad, a touch panel, and a track ball.

The database managing section 101 manages databases. The data characteristics detecting section 102 takes in a data identifier from the database managing section 101 as per user's command to detect the attributes, such as the date of creation of the data, size, data format, and data partition, reduced images and the contents. The data model generating section 103 generates a 3-D data model whose display pattern is determined based on the data identifier, size, data format, reduced image and the content obtained by the data characteristics detecting section 102. The calendar model generating section 104 generates a 3-D calendar model whose display pattern is determined based on a period during which the data are displayed. The category model generating section 105 generates a 3-D category model based on the category in which the data are displayed. The data model placing section 106 places the data model obtained by the data model generating section 103 on the 3-D coordinate space defined by the calendar model and category model in accordance with the date of creation and a category to which the data partition belongs as one of the attributes of the data to determine the 3-D coordinate value of the data model. The display section 107 displays and outputs the placing result by the data model placing section 106. The input section 108 receives a user's command as to the display content, a data display period, and a data partition as a category. The view point changing section 109 changes the user's view point in a manner described below.

In the following, a display pattern of the data display method of the present invention will be explained.

Figure 2:
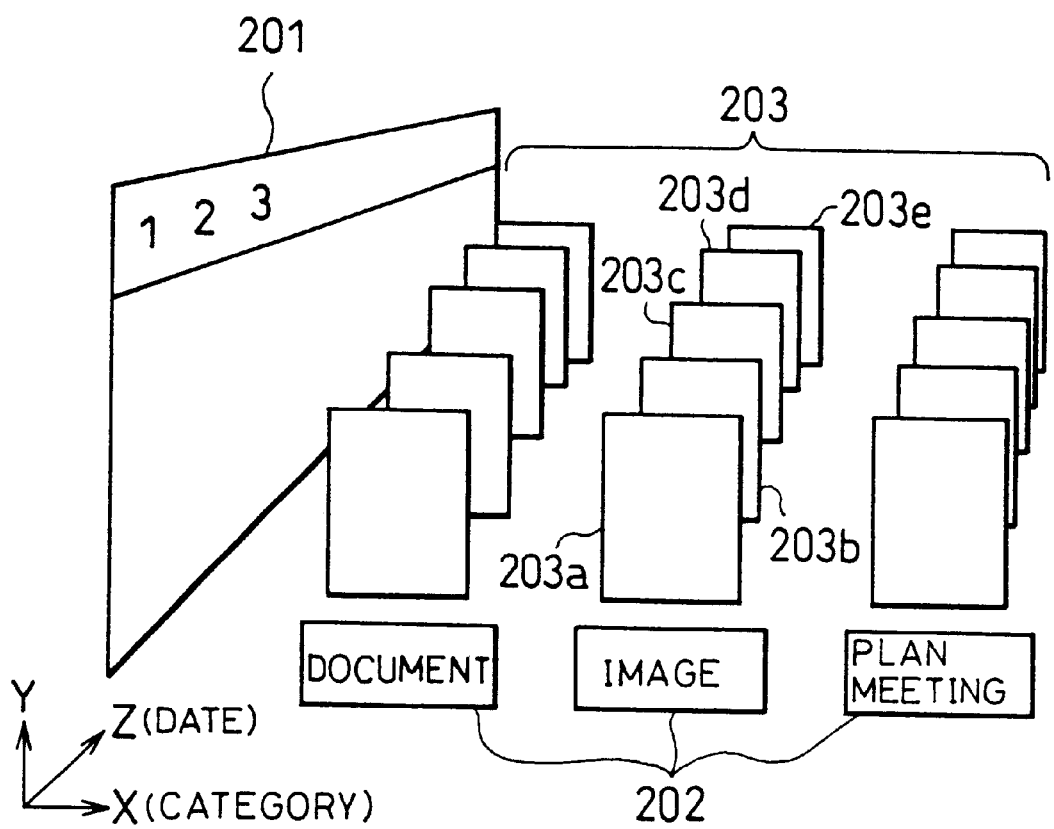
FIG. 2 is a view explaining a 3-D coordinate space displayed on the display device.

As shown in FIG. 2, the Z axis direction represents the dates. A calendar model 201 corresponding to the dates is illustrated as a rectangular parallelopiped, which is placed on the Z axis of the 3-D coordinate space to indicate a certain period. Although it is illustrated only partially in the drawing, all the dates are written on the calendar model 201 at certain intervals.

The X axis direction represents the categories. Each category model 202 corresponds to one category and is illustrated as a rectangular parallelopiped with its category being written thereon. The category models 202 are placed on the X axis of the 3-D coordinate space at certain intervals.

Data models 203 are placed in a matrix, which is determined by the calendar model 201 and category models 202, according to their respective dates of creation and categories. Each data model 203 is illustrated as a rectangular parallelopiped, and placed in parallel to a plane which intersects with the Z axis at right angles, that is, an XY plane. Although it is not illustrated in the drawing, a reduced image (thumbnail) of the data is displayed on the front surface of each data model 203.

In the drawing, the calendar model, category models, and data models are illustrated as rectangles. Polyhedrons other than the rectangular parallelopiped can be used as well.

Next, the information arrangement to display each model will be explained with reference to FIGS. 6 through 8.

A calendar display table shown in FIG. 6 is used to display the calendar model, into which information as to a period for displaying the data by the calendar model generating section 104 is stored. The calendar display table is composed of a period serial number, the start date and end date of the period, and the start coordinate and end coordinate in the 3-D coordinate space of a corresponding calendar model.

A category display table shown in FIG. 7 is used to display the category models, into which information as to categories where the data are classified and displayed by the category model generating section 105 is stored. The category display table is composed of a category order according to which the category models are placed, a category identifier, a data partition used as a category title written on each category model, and a category model position coordinate indicating a center position of the category models in the 3-D coordinate space.

A data display table shown in FIG. 8 is used to display the data models, into which information as to all the data used by the data model generating section 103 is stored. The data display table is composed of a data identifier, a date of creation of the data, a thickness magnification of the model representing a data size, a data format representing a type of the data, such as a text or a picture, a pointer to reduced image data representing the data content, at least one category identifier for the data partition, such as "DOCUMENT", "IMAGE" and "PLAN MEETING", used as the categories herein and to which the data in question belong, a position coordinate at the center of the data models in the 3-D coordinate space, and a pointer to an application processing section to display and edit the data using a computer program.

Next, a display operation in accordance with the present embodiment will be detailed with reference to the flowcharts in FIGS. 9 through 13.

To begin with, a calendar model generation processing will be explained with reference to FIG. 9.

A period subject to processing and data partitions selected as categories from a various kinds of attributes are obtained from the input section 108 to start the processing. If the user has not inputted the period and category, the processing starts for a predetermined period with predetermined attributes defined as a default for classification.

Figure 9:
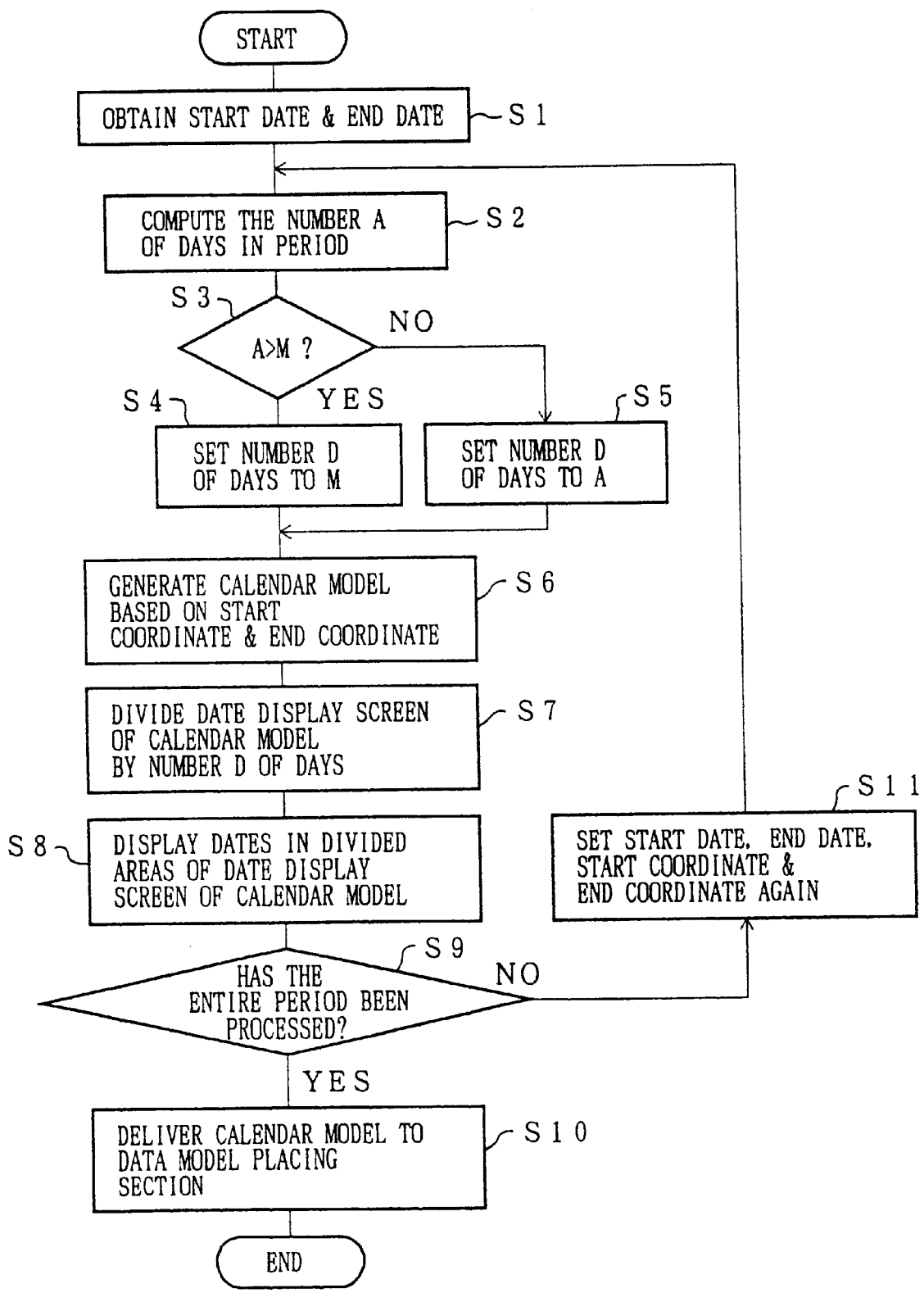
FIG. 9 is a flowchart detailing generation processing of a calendar model.

As shown in FIG. 9, a specified period is obtained from the database managing section 101 and inputted into the calendar model generating section 104 (S1). The number A of all days in the specified period is computed (S2). Whether the number A of all days is greater than a predetermined threshold M or not is checked (S3). When A>M, the threshold M is set as the number D of the days in the specified period (S4). For example, M=100. When A≦M, the number A of all days is set as the number D of days in the specified period (S5). Then, a rectangular calendar model is generated (S6). A date display screen of the calendar model is divided by the number D of days (S7), and the dates are written in the divided areas, respectively (S8). Whether the calendar model for the entire first specified period has been generated or not is checked (S9). Further, when the calendar model for the entire period has been generated, the calendar model is inputted into the data model placing section 106 (S10) to end the processing. When the calendar model for the entire period has not been generated yet, the start date, end date, start coordinate, and end coordinate are set again to repeat the calendar model generation processing (S11).

In the above example, the calendar model is divided by the number of days in the period. However, the number N of data corresponding to the specified period may be used. When the number N is greater than the predetermined threshold M, the period is divided. For example, given M=100, then the number M can be set as an appropriate number of the data to display the data models at once.

Next, category model generation processing will be explained with reference to FIG. 10.

The category (data partition, herein) specified by the database managing section 101 and the category identifier identifying the above category are obtained (S21), and inputted into the category model generating section 105. If there exist no data corresponding to the specified category, the display may be omitted for this particular category. Then, the category model generating section 105 computes the coordinate at the center of the category models, so that the category models are placed on the X axis at certain intervals in a placing order of the category models (S22). Then, rectangular category models are generated based on the computed coordinate (S23), and the titles of the categories (data partition, herein) are written on the generated category models, respectively (S24). Whether all the specified category models have been generated or not is checked (S25). When all the specified category models have been generated, the category models are inputted into the data model placing section 106 (S26). When all the specified category models have not been generated, the processing is repeated.

Figure 11:
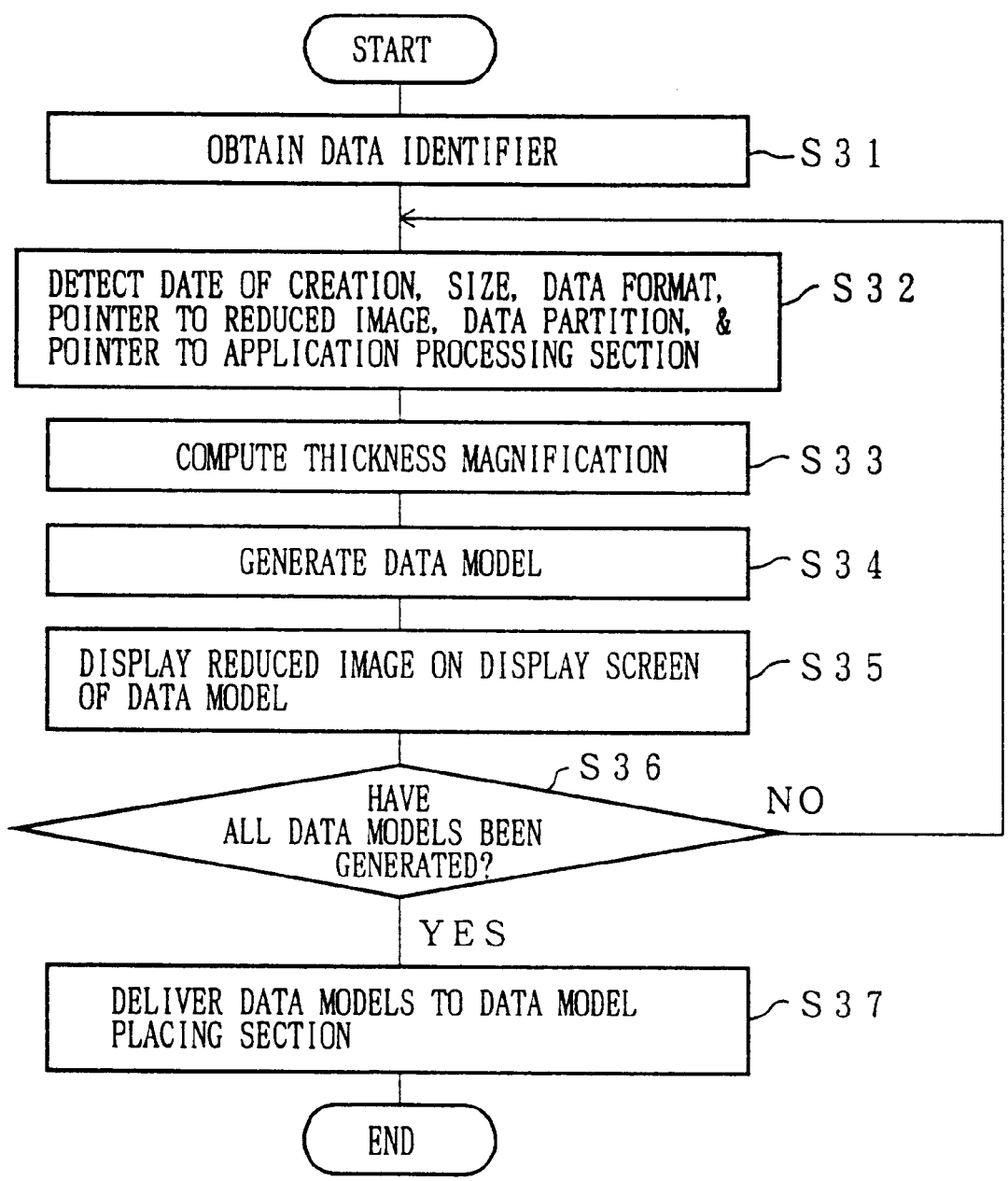
FIG. 11 is a flowchart detailing generation processing of the data models.

Next, data model generation processing will be explained with reference to FIG. 11.

An identifier of the data corresponding to the specified period and category is taken in from the database managing section 101 and inputted into the data characteristics detecting section 102 (S31). The data characteristics detecting section 102 detects the date of creation of the data, size of the data, data format, pointer to the reduced image, data partition, and pointer to the application processing section from the obtained data identifier (S32) and inputs the same into the data model generating section 103. The data model generating section 103 computes a thickness magnification corresponding to the data format based on the data size (S33). For example, in case of text data, the thickness magnification is computed based on the number of pages. Then, a data model of a rectangular parallelopiped is generated (S34), and a reduced image is drawn on the front surface of the rectangular parallelopiped by, for example, the texture mapping technique (S35). Whether the data models have been generated from all the obtained data model identifiers or not is checked (S36), and the 3-D display data of the generated data models are inputted into the data model placing section 106 (S37).

Figure 12:
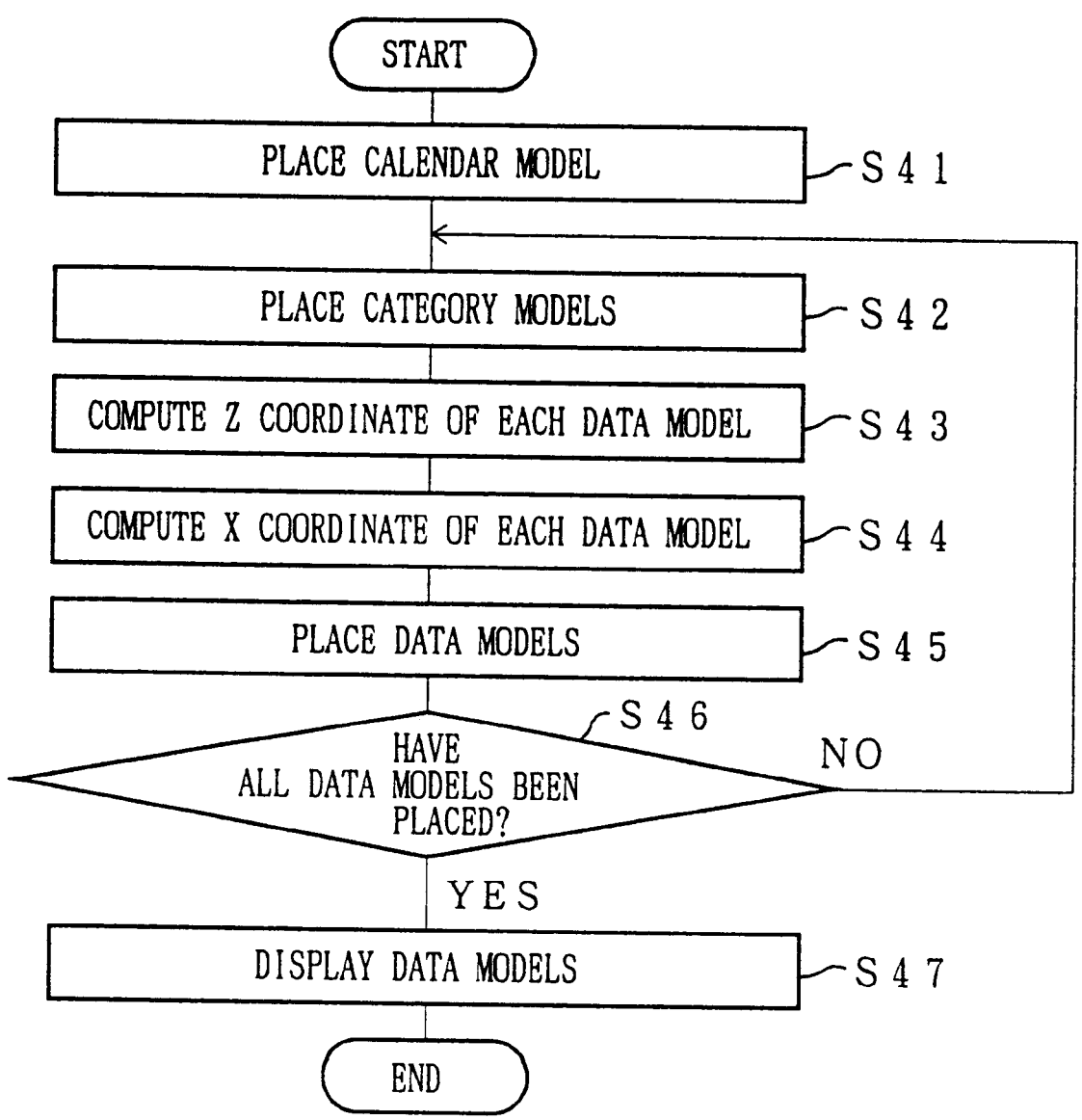
FIG. 12 is a flowchart detailing placement processing of the data models.

Next, data model placement processing will be explained with reference to FIG. 12.

The data model placing section 106 places the calendar model at the computed position in the 3-D coordinate (S41), and subsequently places the category models (S42). Then, a coordinate of the Z axis is computed from the dates of creation of the data models whose dates of creation fall in the placed calendar model period (S43). Further, a coordinate of the X axis is computed from the category identifier, to which each data model belongs (S44). The data models are placed in a matrix defined by the calendar model and category models based on the above coordinate values (S45). There may be more than one category identifier to which the specific data belong, and in such a case, the same data model is placed at more than one position. Then, whether all the data models that fall in the calendar model are placed or not is checked (S46). When there remain unprocessed data models, the placement processing is repeated. When the placement processing has ended, a view point is set at a position predetermined by the view point changing section 109, from which the models are seen as are illustrated in FIG. 2, for example, and the view point thus set is conveyed to the display section 107. The display section 107 displays a 3-D coordinate space having placed thereon all the models (S47), and ends the processing.

If the calendar model is divided and there is more than one calendar model, the data model placement processing may be carried out in the first period alone. In this case, the view point changing section 109 sets a view point at a position from which the models in the first period are seen as are illustrated in FIG. 2, so that the 3-D coordinate space seen from the view point thus set is displayed.

Here, a method of accessing the data by moving the view point, in other words, a method of displaying the data seen from a different position, in the present embodiment will be explained.

The input section 108 receives a user's command to change the view point, which is inputted into the view point changing section 109. Accordingly, the view point changing section 109 changes the position of the view point in the 3-D coordinate space, which is outputted from and displayed on the display section 107.

Figure 3:
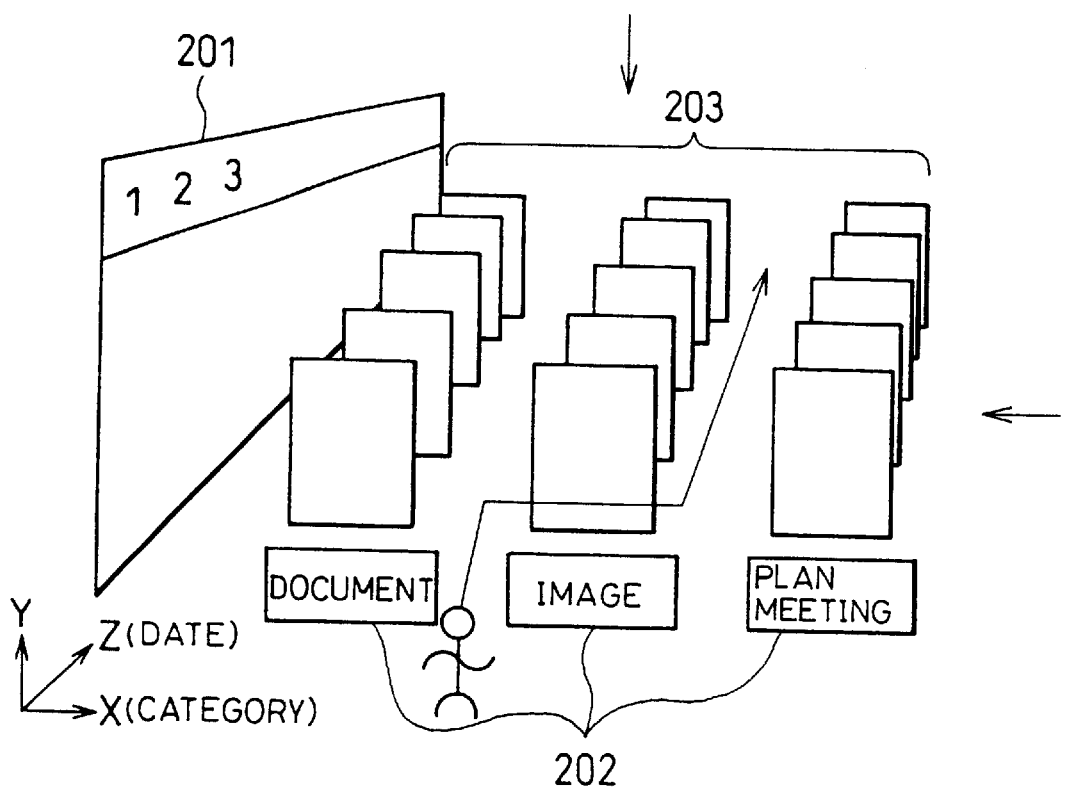
FIG. 3 is a view explaining a display state when a view point of the user is moved within the space.

FIG. 3 shows a state where the user's view point is moved in the 3-D coordinate space displayed on the display device of the present embodiment. An arrow indicates a direction in which the view point is moved. By moving forward, that is, moving in the depth direction along the Z axis as shown in the drawing, the user can successively confirm the data contents. Also, the data content is zoomed up as the view point approaches to the data model. Thus, the content only understood roughly from the distance can be displayed precisely. If a viewing angle is changed, for example, to look down from above in a slanting direction, the contents of the data models which were hidden behind a part of the other data models when seen from the front can be now confirmed.

Figure 4:
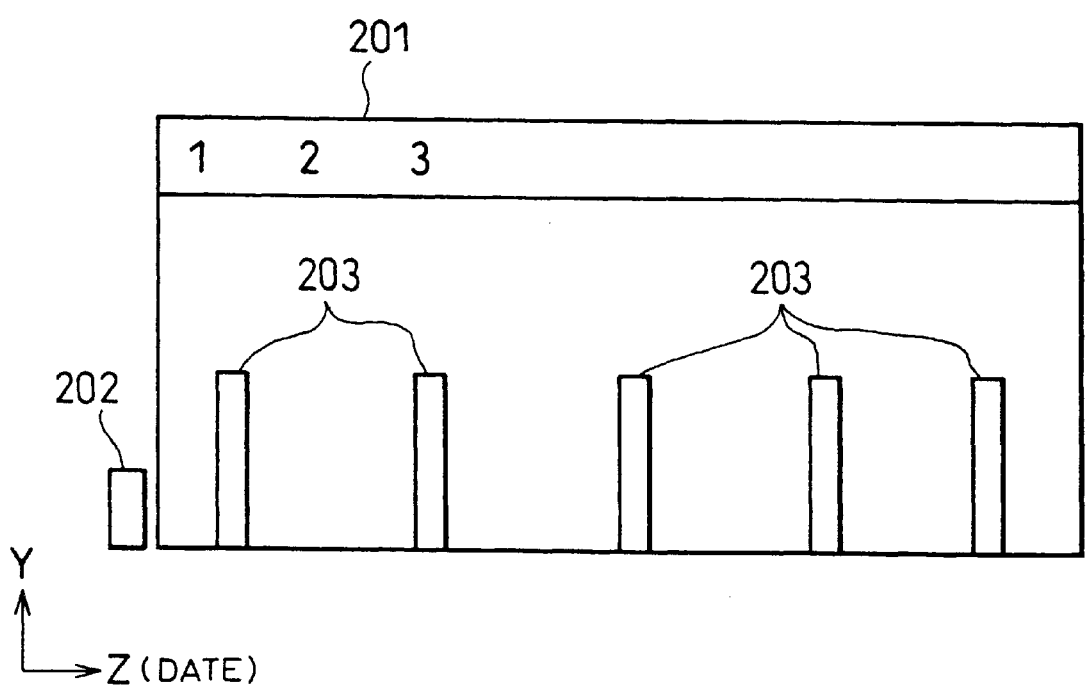
FIG. 4 is a view explaining the display state when the state of FIG. 3 is seen from the side surface.
Figure 5:
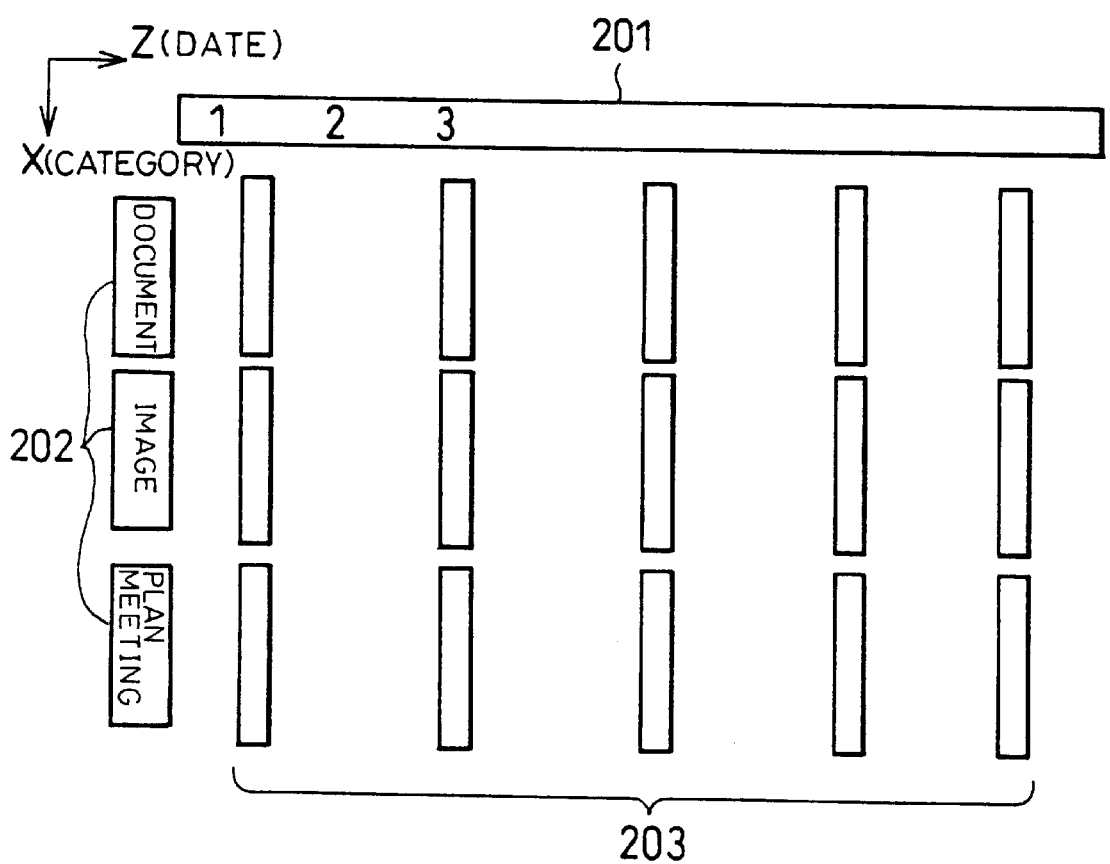
FIG. 5 is a view explaining the display state when the state of FIG. 3 is seen from above.

FIG. 4 is an example display seen from the side, and the data created in a specific date can be retrieved. FIG. 5 is another example display seen from above, and the time series distribution in each category can be revealed.

Figure 13:
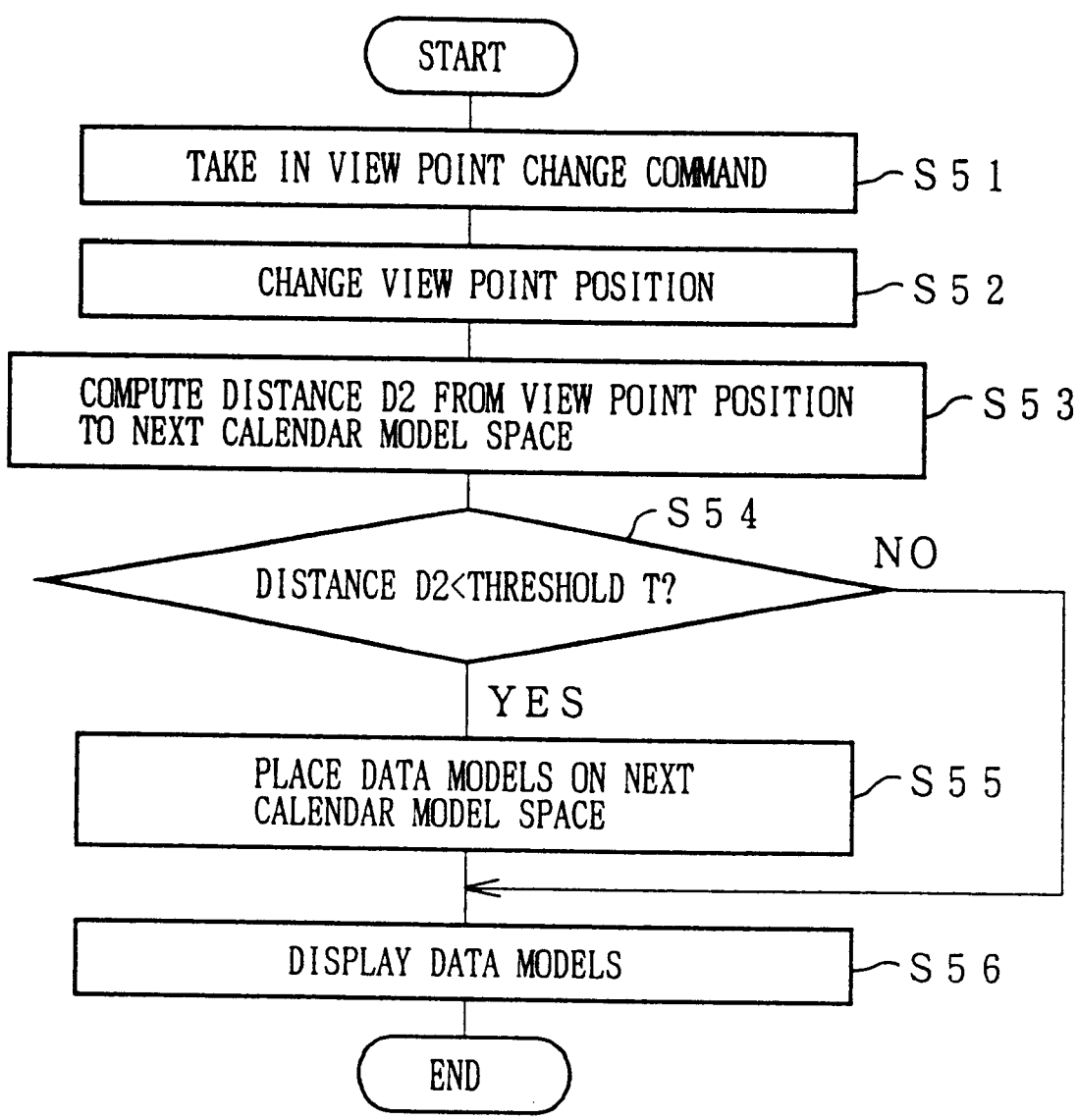
FIG. 13 is a flowchart detailing data access processing.

Next, an operation of accessing the data by moving the view point in the present embodiment will be explained with reference to FIG. 13.

In the first place, when the input section 108 receives a user's command to change the view point, the command is inputted into the view point changing section 109. The view point changing section 109 takes in the command to change the view point (S51) and changes the view point from the current position $(X_i, Y_i, Z_i)$ to a new position $(X_i', Y_i', Z_i')$, for example (S52).

At the same time, information as to the angle in which the data models should be displayed is inputted into the view point changing section 109. For example, an arbitrary view fixed point is specified together with the view point, so that the view point (line of sight) is oriented in a direction from the view point to the view fixed point. Alternatively, vector data indicating the orientation of the view point can be inputted together with the view point.

When there is more than one calendar model, whether or not all the calendar models are within the field of view after changing the view point is checked.

Here, a part of the 3-D coordinate space determined by the calendar model and category models is referred to as a calendar model space. A distance D2 from the center position of the calendar model space, namely, the middle point in the length of the calendar model along the Z axis direction, to the view point position is computed (S53), and the distance D2 is compared with a predetermined threshold T (S54). When the distance D2 is smaller than the threshold T, the calendar model is within the field of view. Thus, the data model placement processing explained with reference to FIG. 12 is carried out (S55). Then, the display section 107 displays the 3-D coordinate space having thereon placed all the data models (S56), and ends the processing.

In this manner, the data can be displayed in various angles and retrieved. Further, if the subject data model is specified directly by, for example, clicking a pointing device, such as a mouse, the user can access the original data in the table shown in FIG. 8 using the data identifier. Also, the user can immediately activate a corresponding application program from the display screen using the pointer to the application processing section to display or edit the original data.

When the view point is changed, for example, when a display seen from the side is changed to a display seen from above, the display may not be changed abruptly to the display seen from the changed view point; instead, a screen that changes along with the movement of the view point may be displayed in animation so as to indicate that the view point is changing to the user.

As has been explained, according to the data display method of the present embodiment, the data stored in the database are displayed after being placed on the 3-D coordinate space having two axes: the date of creation and the category of the data; moreover, the content of each item of the data is displayed as a reduced image. Thus, the user can understand each item of the data classified into their own categories at a glance, and the time series relationship relative to the other data, or more generally, the relationship among the data in terms of the attribute indicated by the Z axis, in a straightforward manner.

Embodiment 2

Referring to FIGS. 14 through 18, the following description will describe another example embodiment of the present invention. Hereinafter, like components are labeled with like reference numerals with respect to Embodiment 1 and the description of these components is not repeated for the explanation's convenience.

A display of a trace of the view point will be explained.

Herein, assume that, as shown in FIG. 15, each item of the data has the date of creation, data format, and size as the attributes. Of all these attributes, the date and data format are used, and the explanation will be given on the assumption that the date of creation is matched with the depth direction (Z axis) and data format is matched with the horizontal direction (X axis) with respect to the screen. Also, assume that the display figures are same as the print images obtained by outputting the data through a printer.

Figure 14:
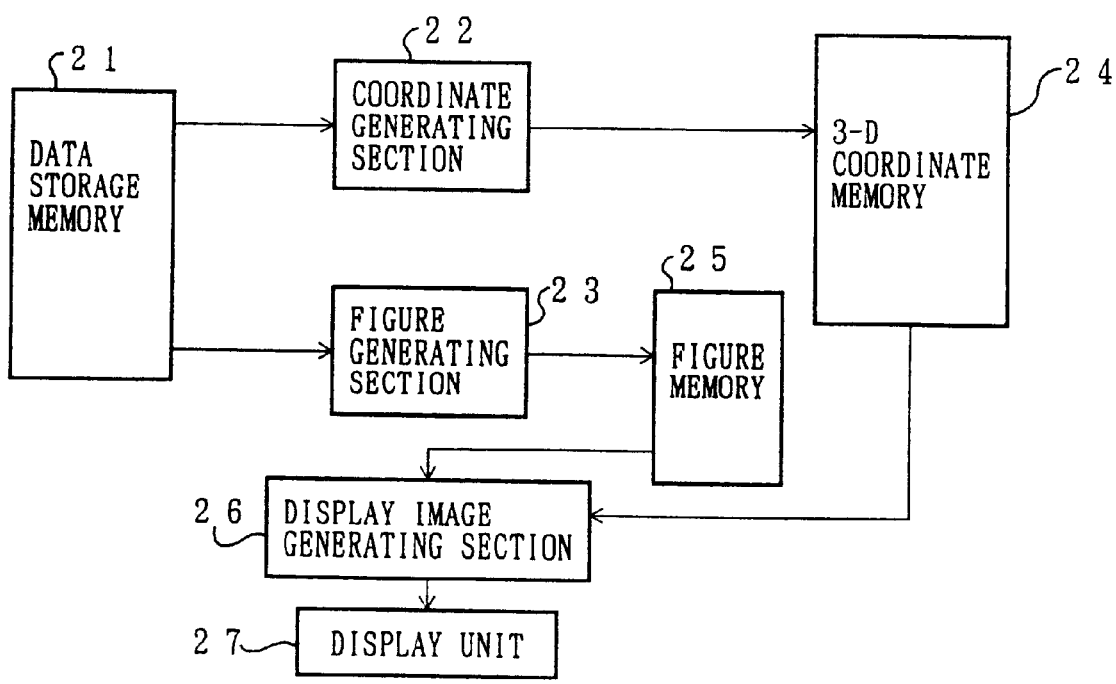
FIG. 14 is a block diagram schematically showing another example arrangement of the display device for the data display method of the present invention.

As shown in FIG. 14, the display device includes a data storage memory 21, a coordinate generating section 22, a figure generating section 23, a 3-D coordinate memory 24, a figure memory 25, a display image generating section 26, and a display unit 27.

The data storage memory 21 stores the data and the attributes thereof. The coordinate generating section 22 computes a coordinate in the 3-D coordinate space from the attributes stored in the data storage memory 21. The figure generating section 23 generates a figure representing the data content stored in the data storage memory 21. The 3-D coordinate memory 24 stores the coordinate computed by the coordinate generating section 22. The figure memory 25 stores the figure generated by the figure generating section 23. The display image generating section 26 converts the 3-D coordinate space constructed by the figure generated by the figure generating section 23 and the coordinate computed by the coordinate generating section 22 into an image which can be displayed on the display unit 27. The display unit 27 displays a display screen generated by the display image generating section 26.

The coordinate generating section 22, figure generating section 23, and display image generating section 26 are a function module realized by a CPU of an unillustrated computer, a computer program run on the CPU, a recording medium for storing the computer program, such as a hard disk, and a memory composed of semiconductor or the like for storing the computer program or subject data during the operation. The display unit 27 can be realized by, for example, a CRT or an LCD.

Figure 16:
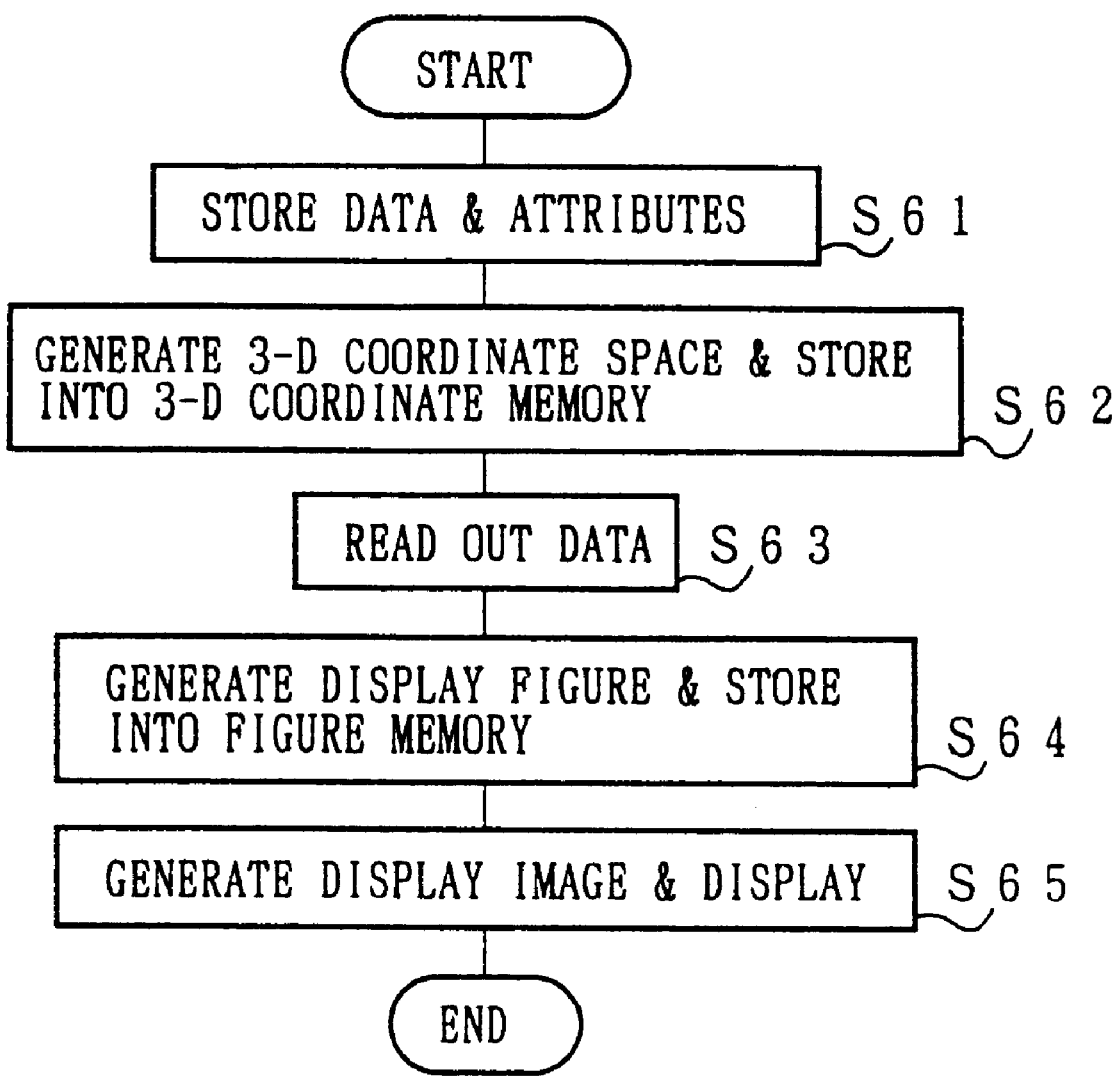
FIG. 16 is a flowchart detailing data display processing.

A display operation by the above arrangement will be explained with reference to FIG. 16.

Figure 18:
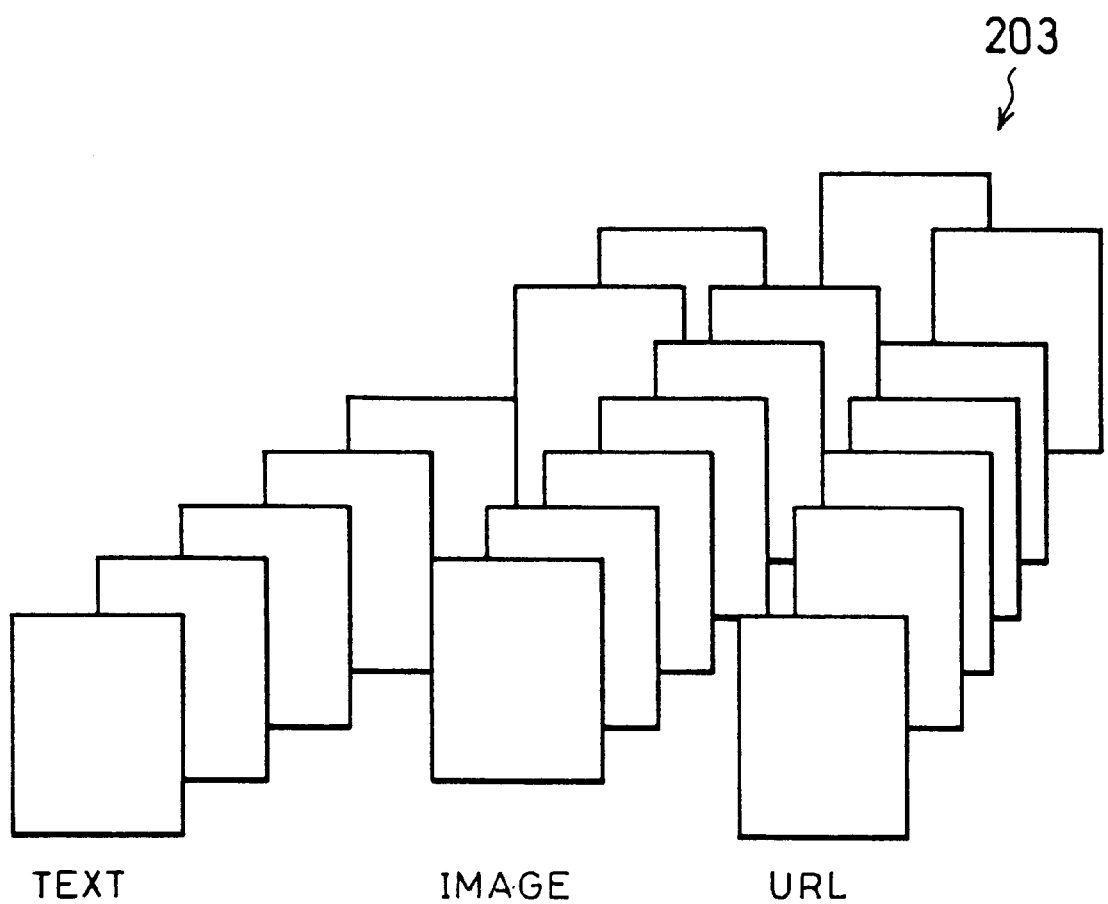
FIG. 18 is a view explaining a 3-D coordinate space displayed on the display device.

To begin with, the data and attributes are stored into the data storage memory 21 (S61). The attributes are read out from the data storage memory 21 to generate a 3-D coordinate, which is stored into the 3-D coordinate memory 24 (S62). Accordingly, 3-D coordinate values like those set forth in FIG. 17 are generated. Then, the data stored in the data storage memory 21 are read out (S63) to generate a display figure representing the data, which is stored into the figure memory 25 (S64). Then, a display image is generated based on the data stored in the 3-D coordinate memory 24 and figure memory 25, and displayed on the display unit 27 (S65). An example display screen obtained in the above manner is illustrated in FIG. 18.

Embodiment 3

Figure 19:
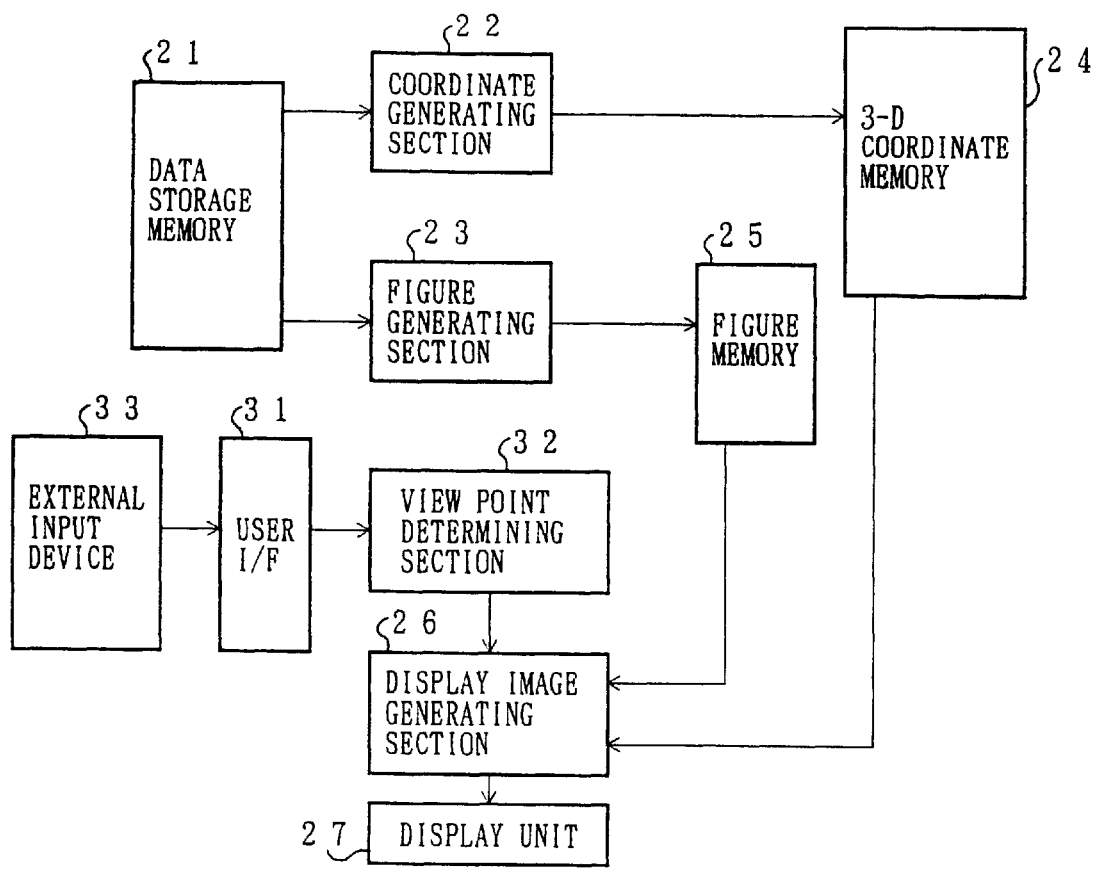
FIG. 19 is a block diagram schematically showing still another example arrangement of the display device for the data display method of the present invention.
Figure 20:
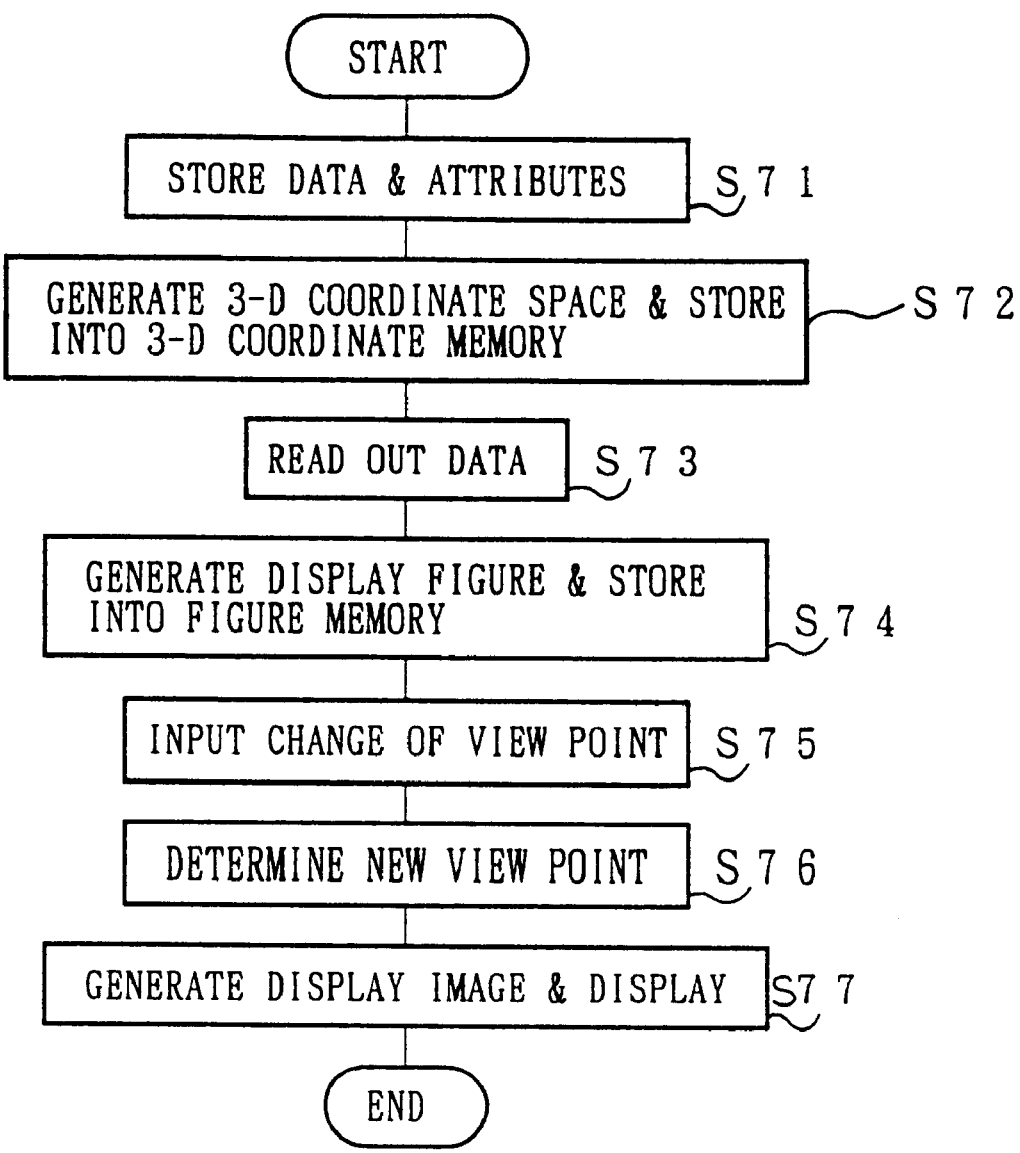
FIG. 20 is a flowchart detailing data display processing.

Referring to FIGS. 19 and 20, the following description will describe still another example embodiment of the present invention. Hereinafter, like components are labeled with like reference numerals with respect to above Embodiments, and the description of these components is not repeated for the explanation's convenience.

As shown in FIG. 19, a display device of the present embodiment includes a user I/F (interface) 31, a view point determining section 32, and an external input device 33 in addition to the above-mentioned data storage memory 21, coordinate generating section 22, figure generating section 23, 3-D coordinate memory 24, figure memory 25, display image generating section 26, and display unit 27. The external input device 33 receives an input from the user. The user I/F 31 conveys an input content from the external input device 33. The view point determining section 32 determines a view point by analyzing the input from the user I/F 31. Also, the display image generating section 26 generates a display screen, on which the 3-D coordinate space constructed by the coordinate generating section 22 and figure generating section 23 is seen from the view point determined by the view point determining section 32.

The view point determining section 32 is a function module realized by a CPU of an unillustrated computer, a computer program run on the CPU, a recording medium for storing the computer program, such as a hard disk, and a memory composed of semiconductor or the like for storing the computer program or subject data during the operation. The external input device 33 can be realized by a pointing device, a keyboard or the like.

A display operation by the above arrangement will be explained with reference to FIG. 20.

To begin with, the data and attributes are stored into the data storage memory 21 (S71).

The attributes are read out from the data storage memory 21 to generate a 3-D coordinate, which is stored into the 3-D coordinate memory 24 (S72). Then, the data stored in the data storage memory 21 are read out (S73) to generate a display figure representing the data, which is stored into the figure memory 25 (S74).

Then, the user inputs a command to change the view point from the external input device 33, such as a pointing device and a keyboard, through the user I/F 31 (S75). The input from the external input device 33 is analyzed and a new view point is determined (S76).

Then, a display image is generated based on the new view point thus determined and the data stored in the 3-D coordinate memory 24 and figure memory 25, and displayed on the display unit 27 (S77).

Embodiment 4

Figure 21:
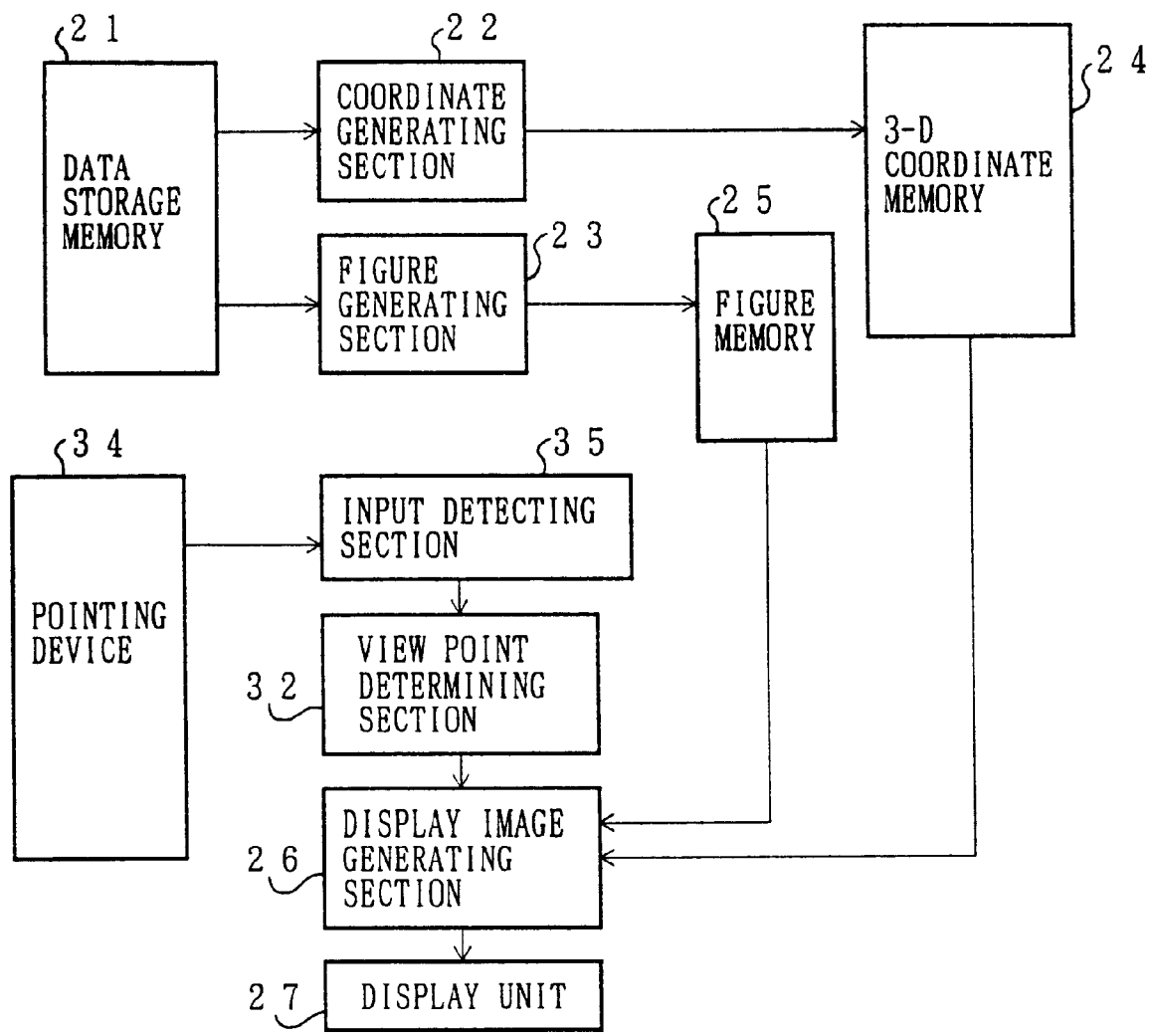
FIG. 21 is a block diagram schematically showing still another example arrangement of the display device for the data display method of the present invention.
Figure 22:
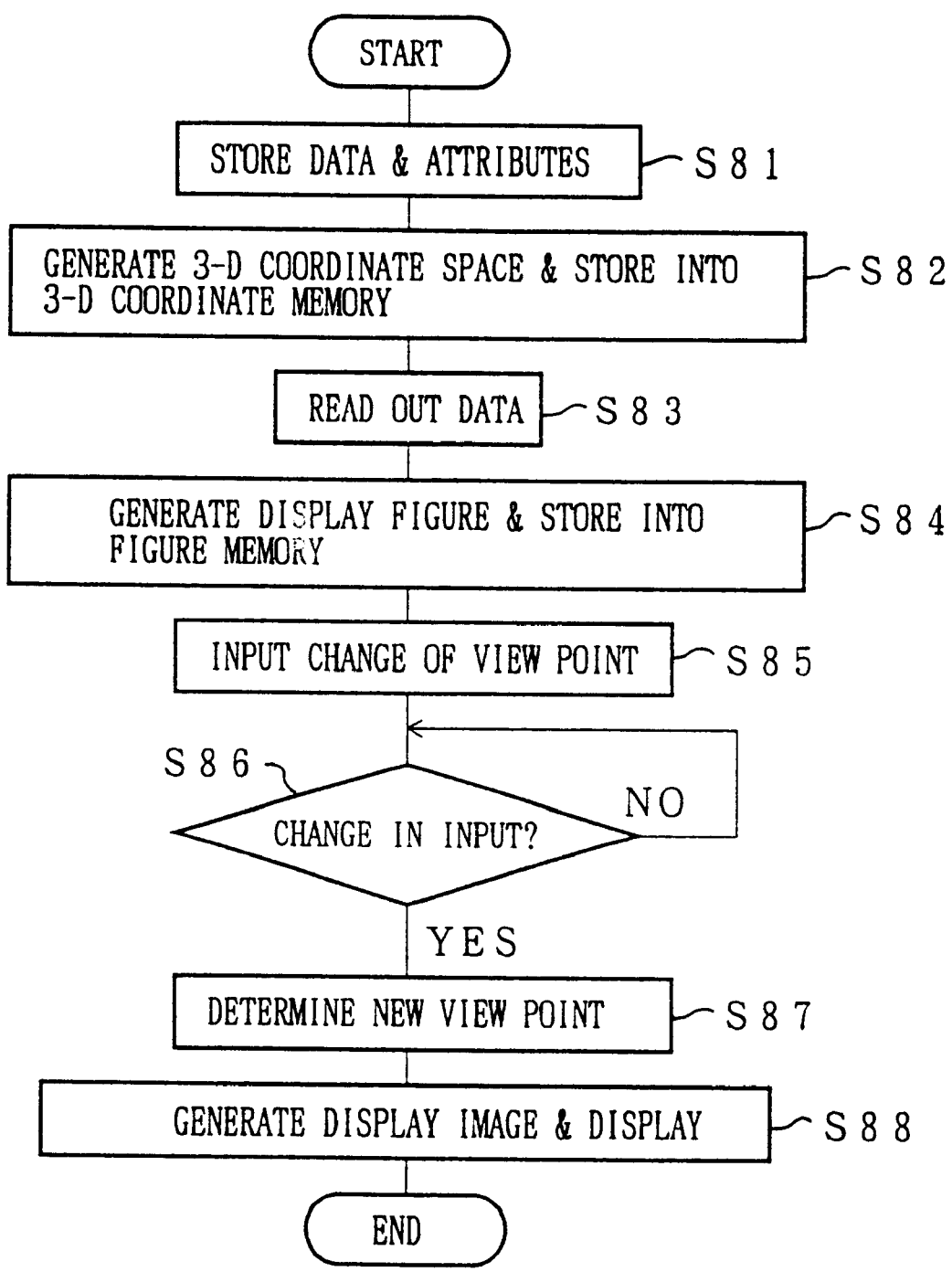
FIG. 22 is a flowchart detailing data display processing.

Referring to FIGS. 21 and 22, the following description will describe still another example embodiment of the present invention. Hereinafter, like components are labeled with like reference numerals with respect to above Embodiments, and the description of these components is not repeated for the explanation's convenience.

As shown in FIG. 21, a display device of the present embodiment includes an input detecting section 35 and a pointing device 34 in addition to the above-mentioned data storage memory 21, coordinate generating section 22, figure generating section 23, 3-D coordinate memory 24, figure memory 25, display image generating section 26, display unit 27, and view point determining section 32. The pointing device 34 receives a graphical input from the user, and the input detecting section 35 detects a change in input from the pointing device 34. When the input detecting section 35 detects a change in input, the view point determining section 32 receives the input from the pointing device 34 and analyzes the same to determine a new view point.

The input detecting section 35 is a function module realized by a CPU of an unillustrated computer, a computer program run on the CPU, a recording medium for storing the computer program, such as a hard disk, and a memory composed of semiconductor or the like for storing the computer program or subject data during the operation.

A display operation by the above arrangement will be explained with reference to FIG. 22.

To begin with, the data and attributes are stored into the data storage memory 21 (S81).

The attributes are read out from the data storage memory 21 to generate a 3-D coordinate, which is stored into the 3-D coordinate memory 24 (S82). Then, the data stored in the data storage memory 21 are read out (S83) to generate a display figure representing the data, which is stored into the figure memory 25 (S84).

Then, the user inputs a command to change the view point using the pointing device 34 (S85). The input detecting section 35 monitors an input from the pointing device 34 all the time (S86), and outputs the input from the pointing device 34 only when there is a change in input. The input from the pointing device 34 is analyzed and a new view point is determined (S87).

Then, a display image is generated based on the new view point thus determined and the data stored in the 3-D coordinate memory 24 and figure memory 25, and displayed on the display unit 27 (S88). After the image is displayed, the flow returns to S86, so that change in input from the pointing device 34 is monitored to change the view point dynamically in accordance with the movement of the pointing device 34.

Embodiment 5

Referring to FIGS. 23 through 28, the following description will describe still another example embodiment of the present invention. Hereinafter, like components are labeled with like reference numerals with respect to above Embodiments, and the description of these components is not repeated for the explanation's convenience.

Figure 23:
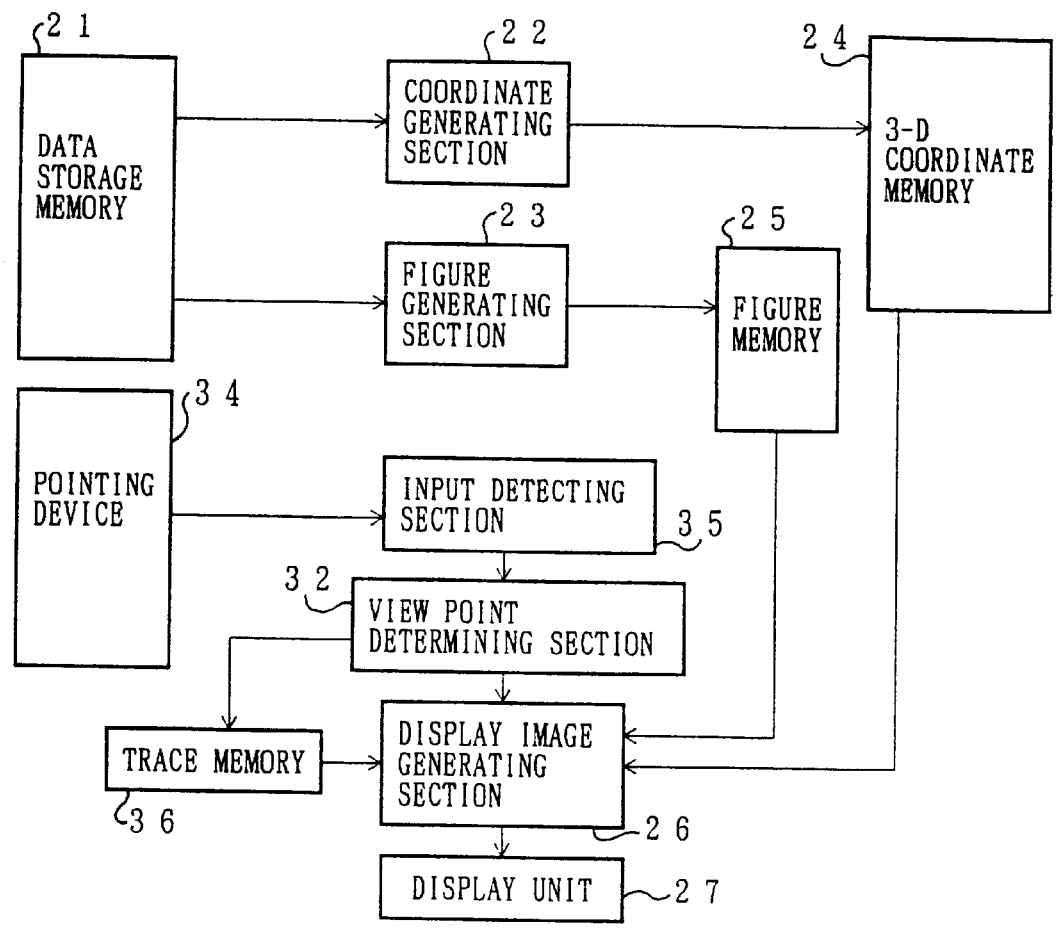
FIG. 23 is a block diagram schematically showing still another example arrangement of the display device for the data display method of the present invention.

As shown FIG. 23, a display device of the present embodiment includes a trace memory 36 in addition to the above-mentioned data storage memory 21, coordinate generating section 22, figure generating section 23, 3-D coordinate memory 24, figure memory 25, display image generating section 26, display unit 27, view point determining section 32, pointing device 34, and input detecting section 35. The trace memory 36 stores the change of the view point determined by the view point determining section 32 in time series. The trace memory 36 is realized by an unillustrated memory composed of semiconductor or the like.

Figure 24:
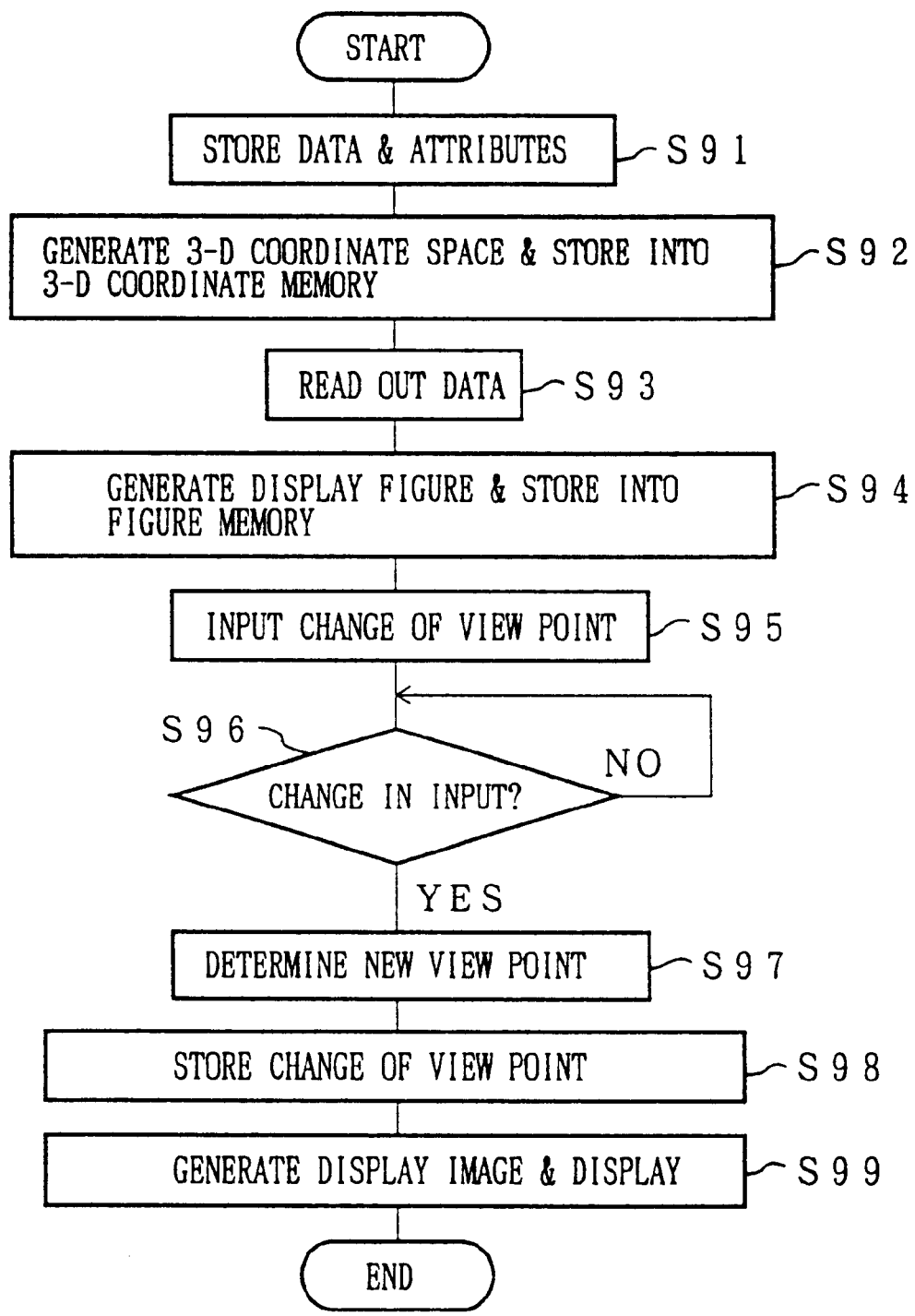
FIG. 24 is a flowchart detailing data display processing.

A display operation by the above arrangement will be explained with reference to FIG. 24.

To begin with, the data and attributes are stored into the data storage memory 21 (S91). The attributes are read out from the data storage memory 21 to generate a 3-D coordinate, which is stored into the 3-D coordinate memory 24 (S92). Then, the data stored in the data storage memory 21 are read out (S93) to generate a display figure representing the data, which is stored into the figure memory 25 (S94).

Then, the user inputs a command to change the view point using the pointing device 34 (S95). The input detecting section 35 monitors an input from the pointing device 34 all the time (S96), and outputs the input from the pointing device 34 only when there is a change in input. The input from the pointing device 34 is analyzed and a new view point is determined (S97). Then, the new view point thus determined is stored into the trace memory 36 in time series (S98).

Then, a display image is generated based on the new view point thus determined, and the data stored in the 3-D coordinate memory 24, figure memory 25, and trace memory 36, and displayed on the display unit 27 (S99).

The trace mentioned above is illustrated in FIGS. 25 and 26. A trace 204 indicating the movement of the view point is superimposed on the display screen.

Figure 25:
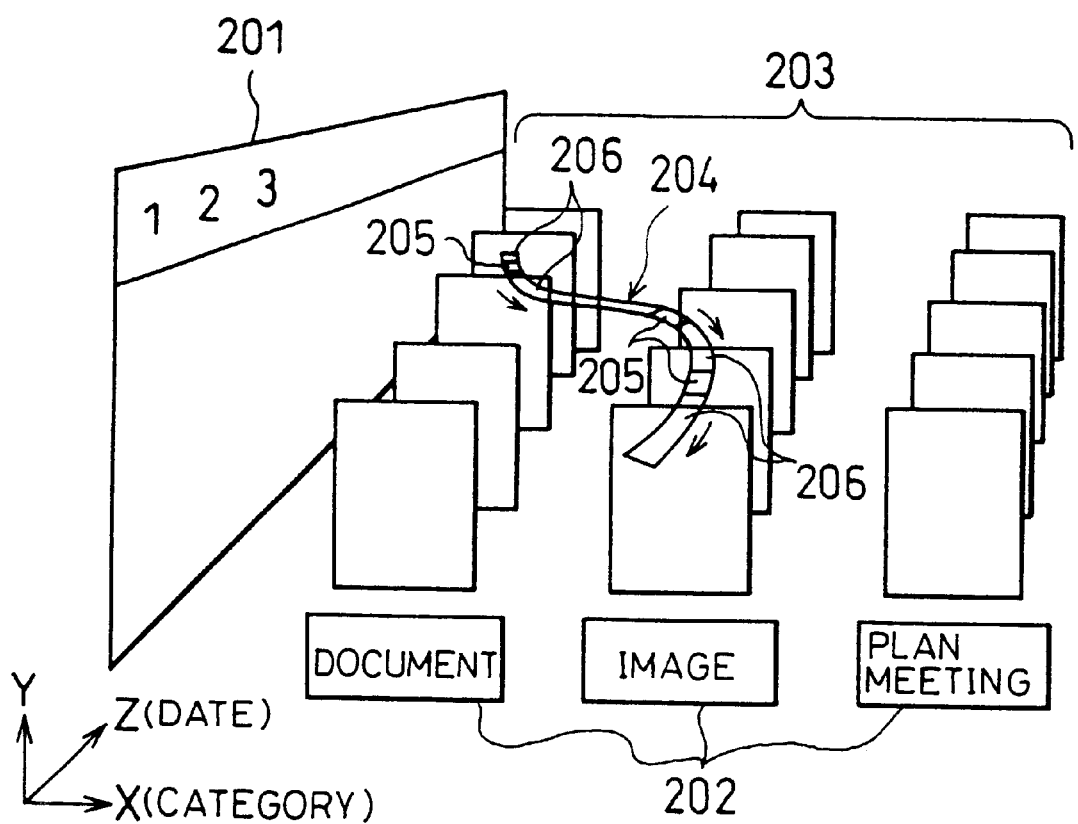
FIG. 25 is a view explaining a trace of the view point seen from the front.
Figure 26:
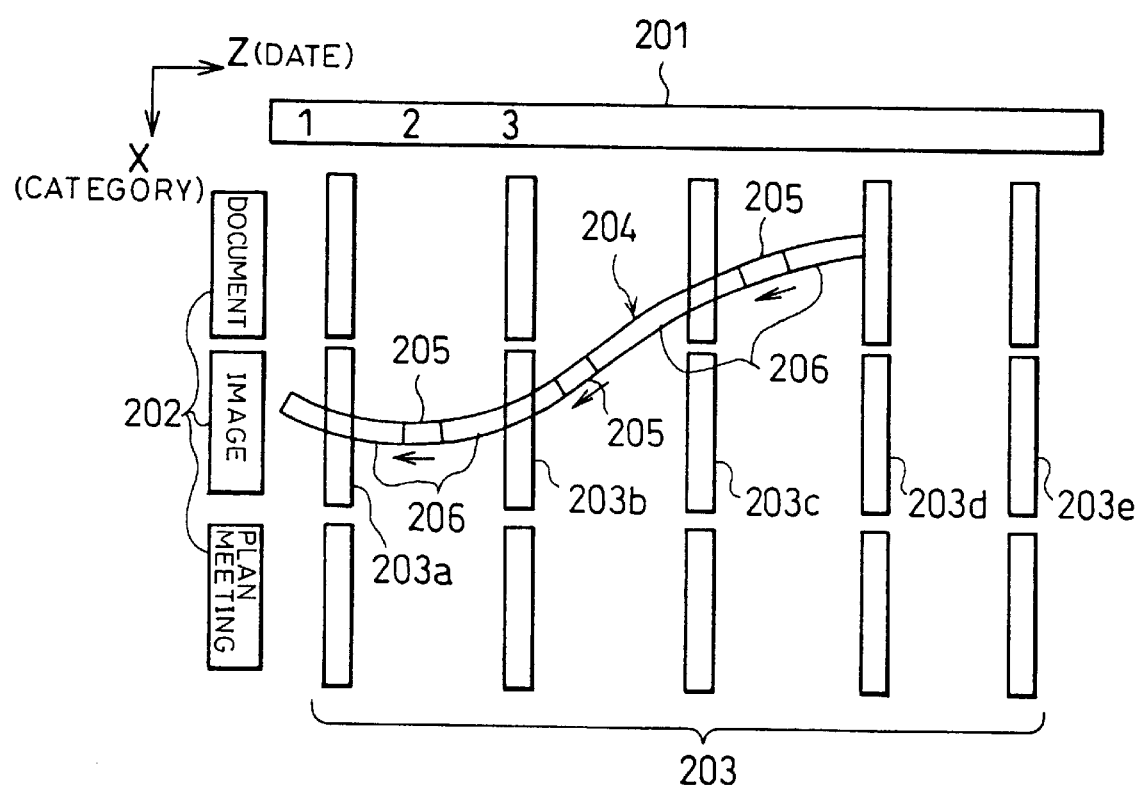
FIG. 26 is a view explaining a trace of the view point seen from above.

Here, as shown in FIGS. 25 and 26, a dark portion 206 and a bright portion 205 which is brighter than the dark portion 206 may be provided in the trace 204, so that the bright portion 205 moves in a direction in which the view point moves from the latest one to the older ones, that is, a direction indicated by an arrow. Accordingly, the flow in time series in the trace can be readily understood.

Also, as shown in FIG. 26, the data model positioned in front of and closest to the view point is a data model 203a in the beginning, which is sequentially replaced by data models 203b, 203c, and 203d over time.

Figure 27:
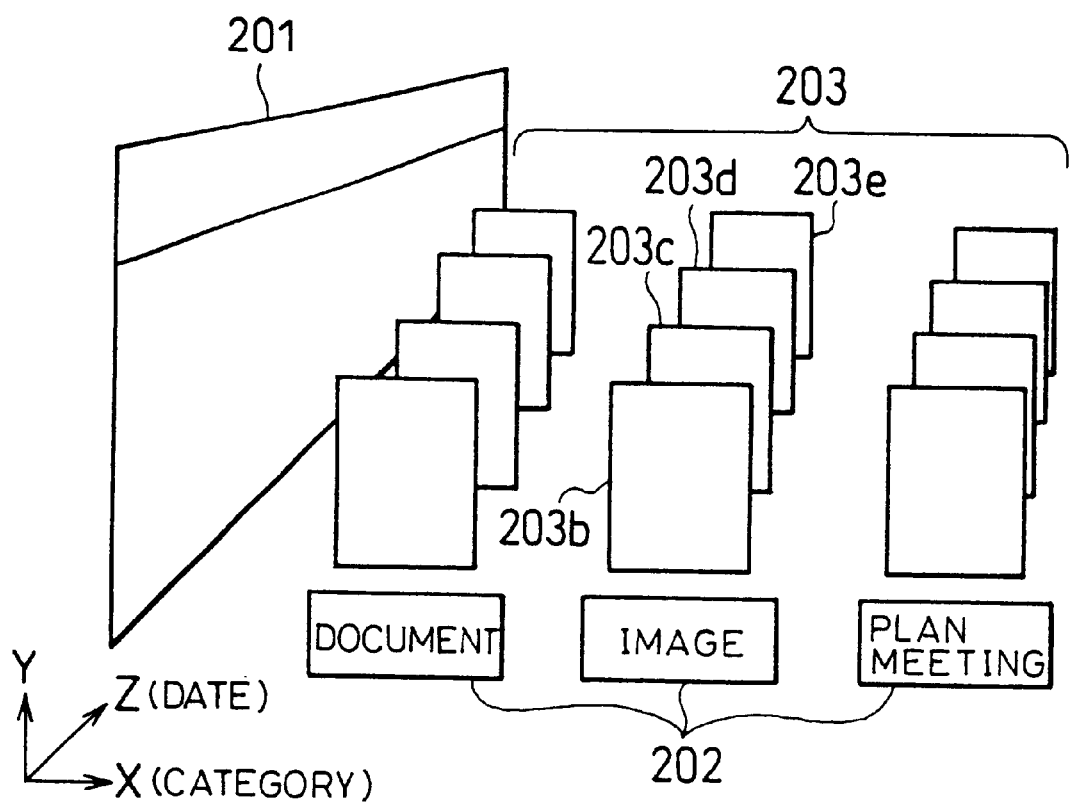
FIG. 27 is a view explaining a display screen changed along the movement of the view point.

As the view point moves from the latest one to the older ones, the display in FIG. 27, in which the data model positioned in front is the data model 203b, changes to the display in FIG. 2, in which the data model positioned in front is replaced by the data model 203a.

Figure 28:
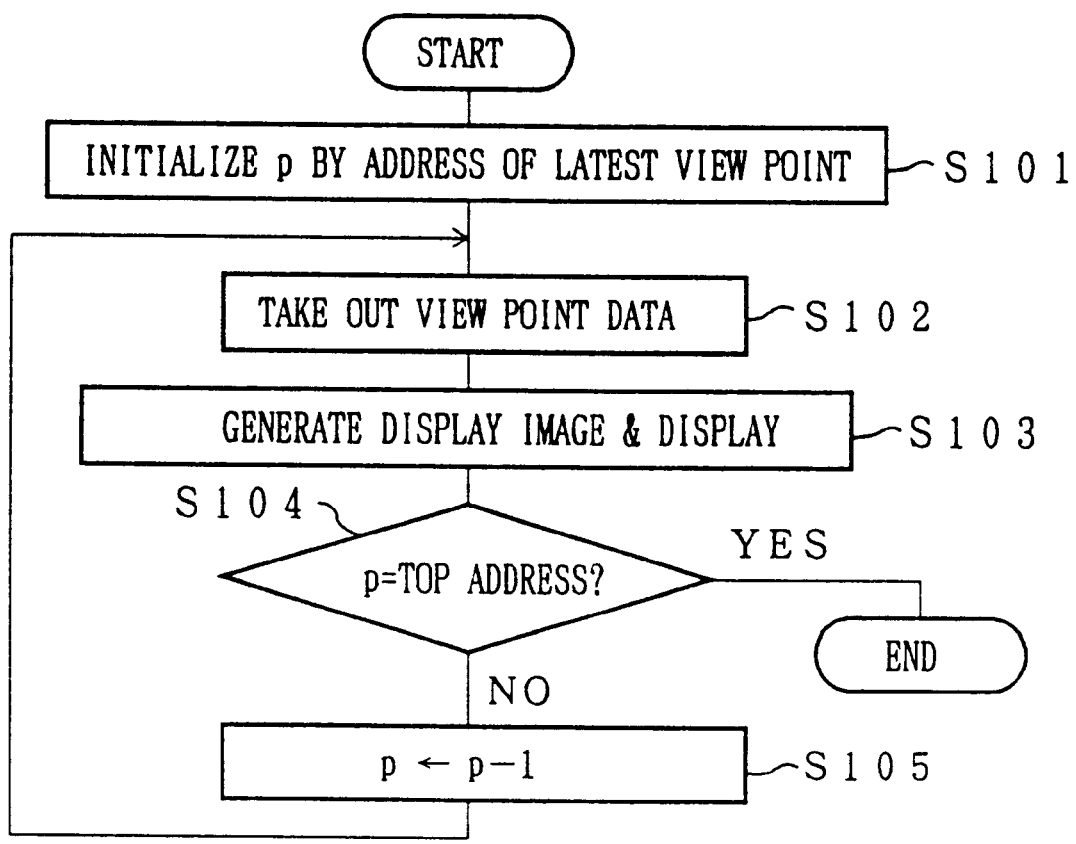
FIG. 28 is a flowchart detailing data display processing.

A display operation in the above case will be explained with reference to FIG. 28.

Assume that the trace memory 36 stores the view points from the oldest one to the latest one in time series from the top address.

To begin with, a pointer p representing the address of the trace memory 36 is initialized by the address of the latest view point (S101). Then, the display image generating section 26 takes out the view point data stored at the address p from the trace memory 36 (S102).

Then, a display image is generated based on the taken out view point, and the data stored in the 3-D coordinate memory 24 and figure memory 25, and displayed on the display unit 27 (S103).

Then, p and the top address of the trace memory 36 are compared (S104). If p does not match with the top address, p is decremented and updated (S105) to return to S102, and S102-S105 are repeated. In this manner, the view point data are taken out sequentially from the latest one in time series from the trace memory 36.

Embodiment 6

Figure 29:
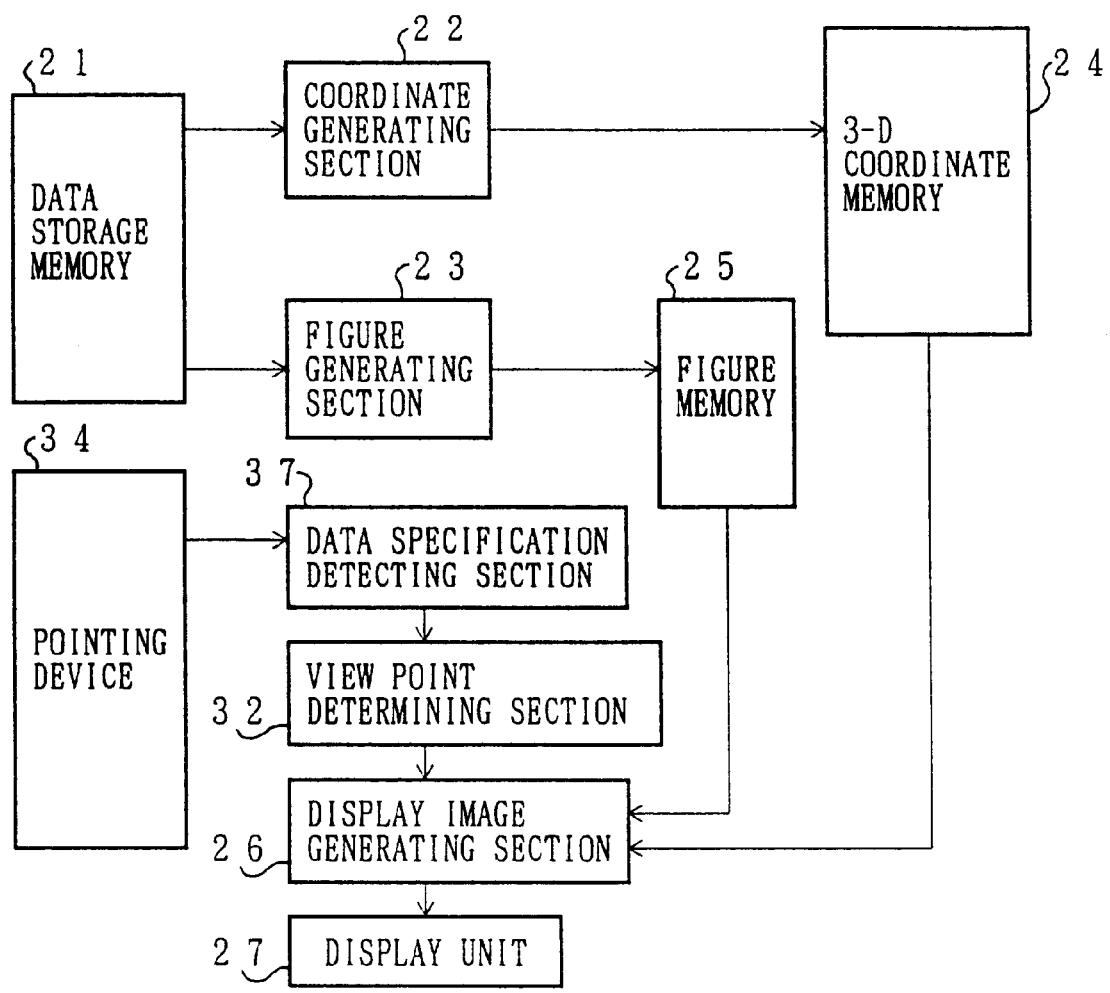
FIG. 29 is a block diagram schematically showing still another example arrangement of the display device for the data display method of the present invention.
Figure 30:
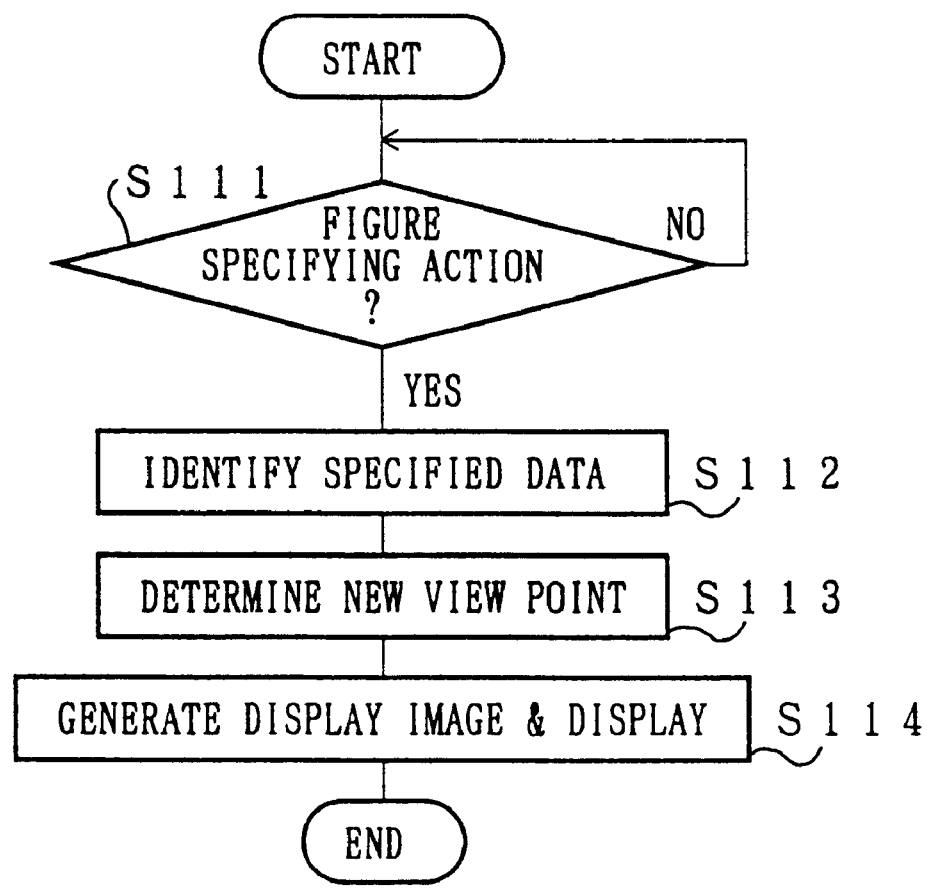
FIG. 30 is a flowchart detailing data display processing.

Referring to FIGS. 29 and 30, the following description will describe still another example embodiment of the present invention. Hereinafter, like components are labeled with like reference numerals with respect to above Embodiments, and the description of these components is not repeated for the explanation's convenience.

As shown in FIG. 29, a display device of the present embodiment includes a data specification detecting section 37 in addition to the above-mentioned data storage memory 21, coordinate generating section 22, figure generating section 23, 3-D coordinate memory 24, figure memory 25, display image generating section 26, display unit 27, view point determining section 32, and pointing device 34. The data specification detecting section 37 detects the user's action to specify a figure using the pointing device 34.

The data specification detecting section 37 is a function module realized by a CPU of an unillustrated computer, a computer program run on the CPU, a recording medium for storing the computer program, such as a hard disk, and a memory composed of semiconductor or the like for storing the computer program or subject data during the operation.

A display operation by the above arrangement will be explained with reference to FIG. 30.

To begin with, the user specifies a figure to represent the data he wishes to see using the pointing device 34 (S111). The data specification detecting section 37 monitors an input from the pointing device 34 all the time, and outputs the input from the pointing device 34 only when it detects a specifying action, such as a click on a figure. The specified data are identified based on the input data and the coordinates of the figures stored in the 3-D coordinate memory 24 (S112). Then, a view point such that brings the identified figure in front on the display screen is determined (S113). "Front" referred herein means the center of the display screen in the lateral direction, and it is a critical point from which the figure is no longer displayed when the view point approaches to the figure too close.

Then, a display image is generated based on the view point thus determined, and the data stored in the 3-D coordinate memory 24 and figure memory 25, and displayed on the display unit 27 (S114). Consequently, the specified figure is displayed at the optimal display position, from which the user can obtain the best view of the figure.

Embodiment 7

Referring to FIGS. 31 through 36, the following description will describe still another example embodiment of the present invention. Hereinafter, like components are labeled with like reference numerals with respect to above Embodiments, and the description of these components is not repeated for the explanation's convenience.

Figure 31:
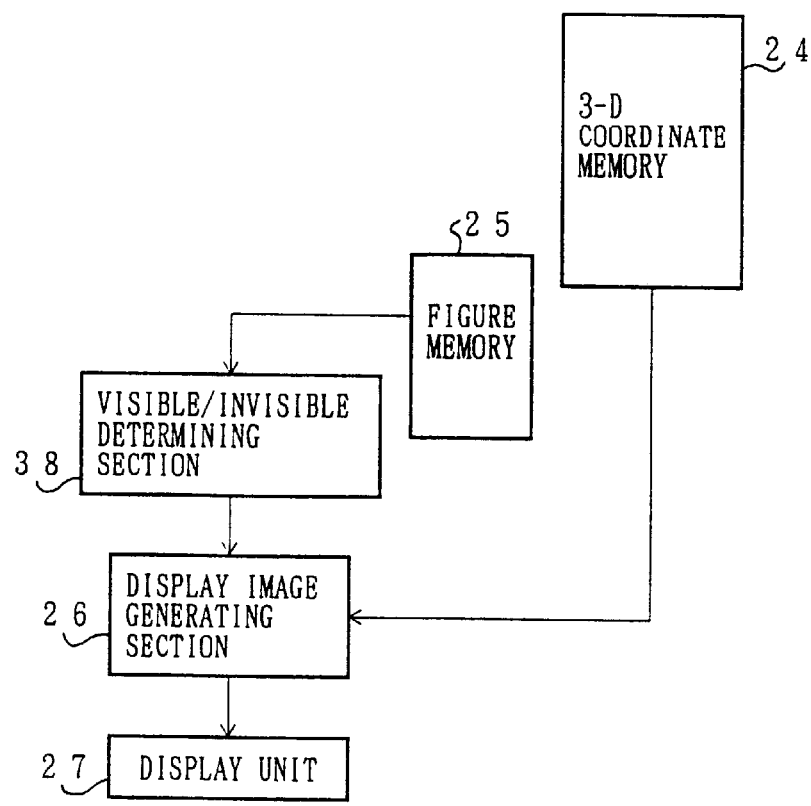
FIG. 31 is a block diagram schematically showing still another example arrangement of the display device for the data display method of the present invention.

As shown in FIG. 31, a display device of the present invention is of any arrangement of Embodiments 1 through 6 except that it additionally includes a visible/invisible determining section 38. The visible/invisible determining section 38 compares the view point with each of the coordinates stored in the 3-D coordinate memory 24, and inhibits the display of the figure in question when a distance between the view point and coordinate is not greater than a certain value.

The visible/invisible determining section 38 is a function module realized by a CPU of an unillustrated computer, a computer program run on the CPU, a recording medium for storing the computer program, such as a hard disk, and a memory composed of semiconductor or the like for storing the computer program or subject data during the operation.

Figure 32:
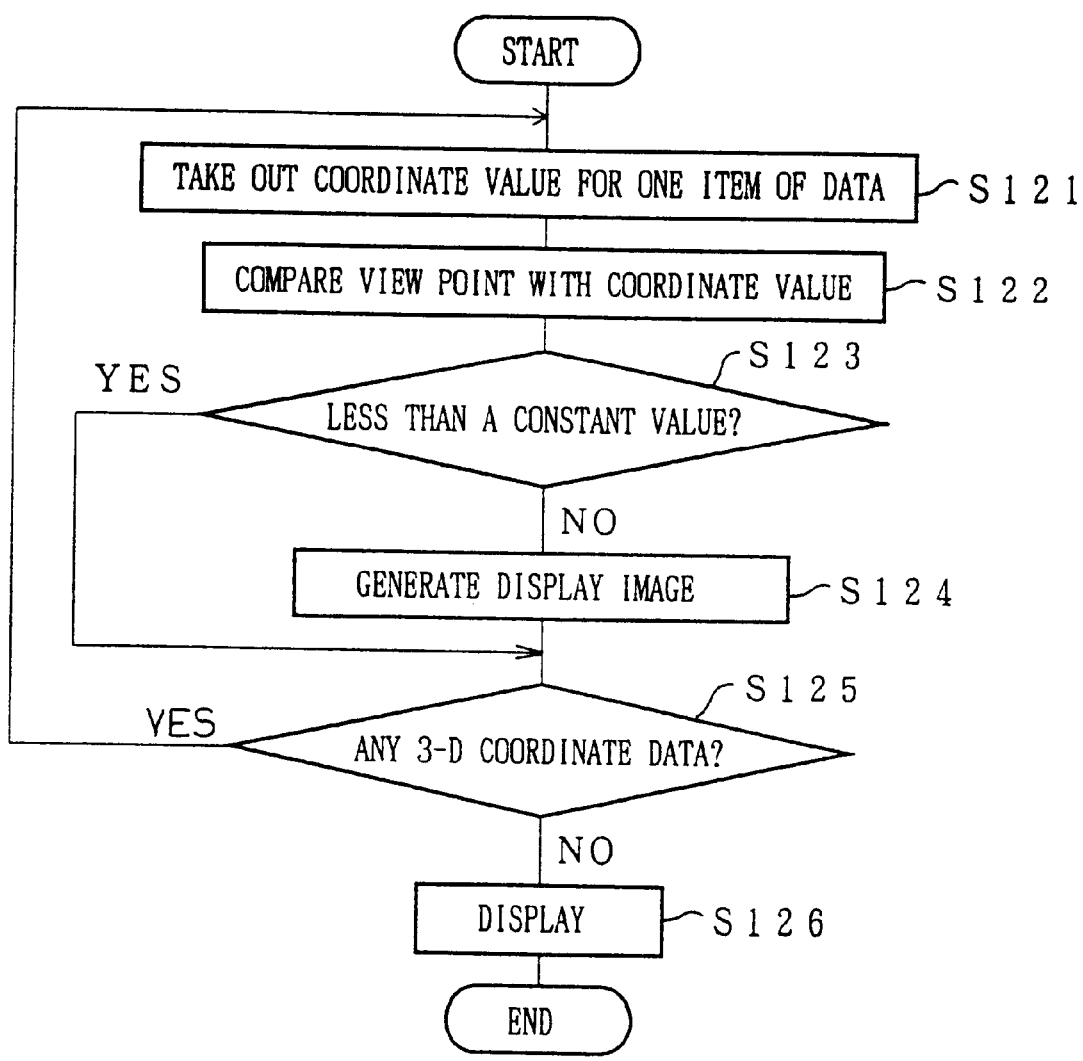
FIG. 32 is a flowchart detailing data display processing.
Figure 33:
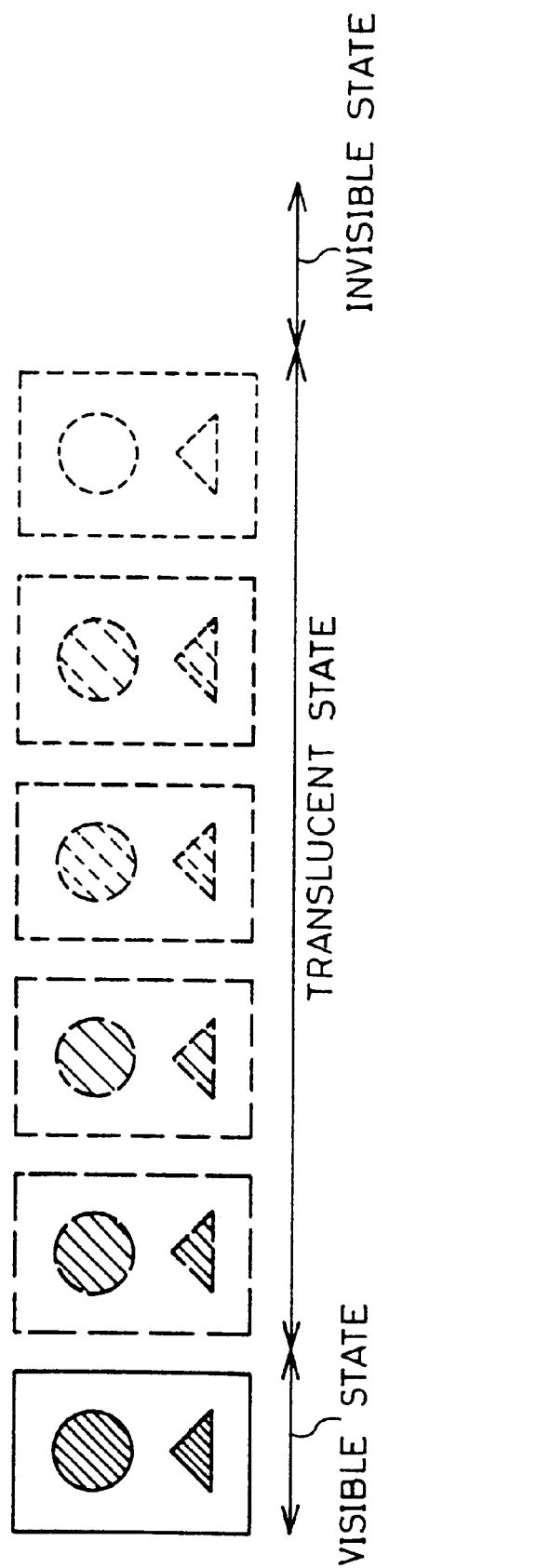
FIG. 33 is a view explaining how transparency of a data image is changed.

A display operation by the above arrangement will be explained with reference to FIG. 32.

To begin with, a 3-D coordinate of one item of the data is taken out from the 3-D coordinate memory 24 (S121). The visible/invisible determining section 38 compares the taken out 3-D coordinate value with the view point coordinate (S122). If the difference is equal to or greater than a predetermined distance Th, a display image is generated (S124). If the distance is not greater than the distance Th, the figure in question is turned into invisible to make the list easier to see, and for this reason, S124 is skipped. Whether there remain any other data to be processed in the 3-D coordinate memory 24 is checked (S125). If there remain such data, the flow returns to S121; otherwise, the display image is displayed (S126).

If the data content is still being displayed even after a distance to the view point becomes smaller than a certain value, characters or images represented by the display figure is zoomed up exceedingly, thereby making the display image incomprehensible. Moreover, the user can not see the figures behind. However, as has been explained, the data model which has come closer to the view point than a certain distance is turned invisible. Thus, not only the above inconvenience can be eliminated, but also an easy-to-see list can be provided.

In the above example, the data model which is turned invisible is not displayed from the start. However, alternatively, when a visible figure is changed to an invisible figure, the figure may be changed gradually from the visible state shown at the left side in FIG. 33 to the invisible state at the right side. Consequently, the displayed figure is turned invisible gradually. On the contrarily, when an invisible figure is changed to a visible figure, the figure is changed gradually from the invisible state at the right side of the drawing to the visible state at the left side.

Figure 34:
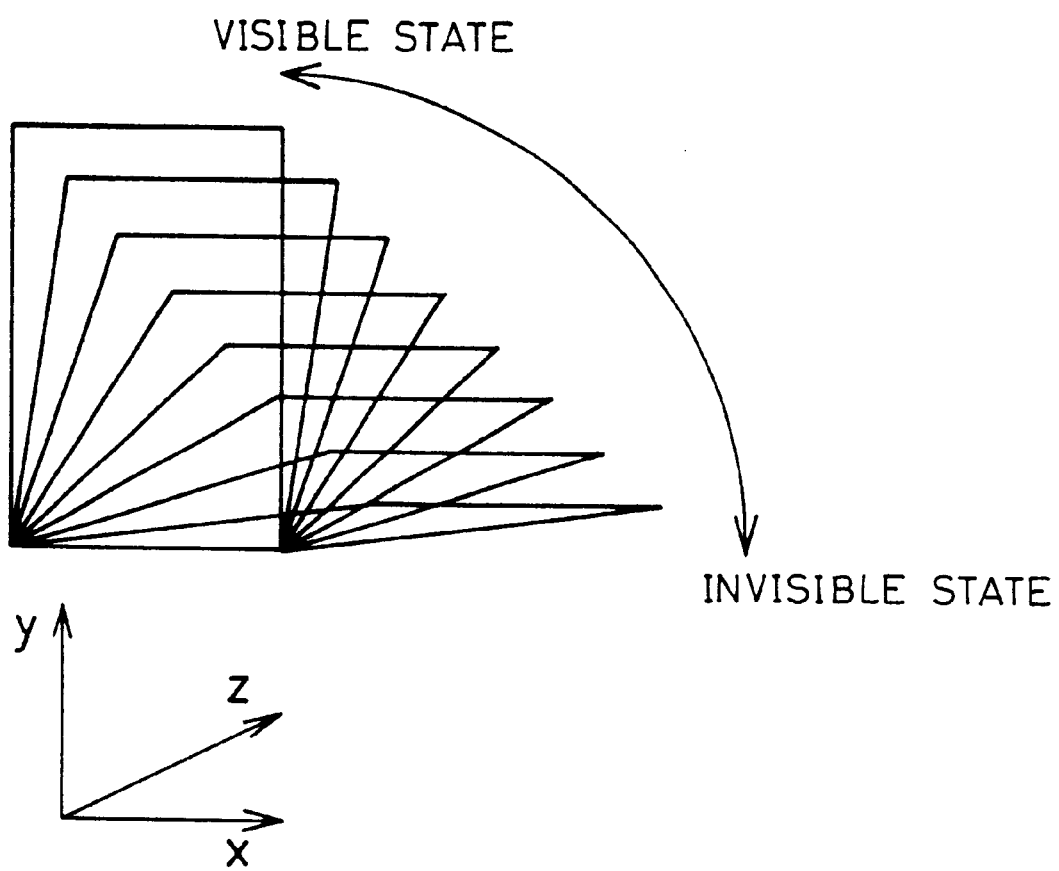
FIG. 34 is a view explaining an operation to turn a data image into visible/invisible.
Figure 35:
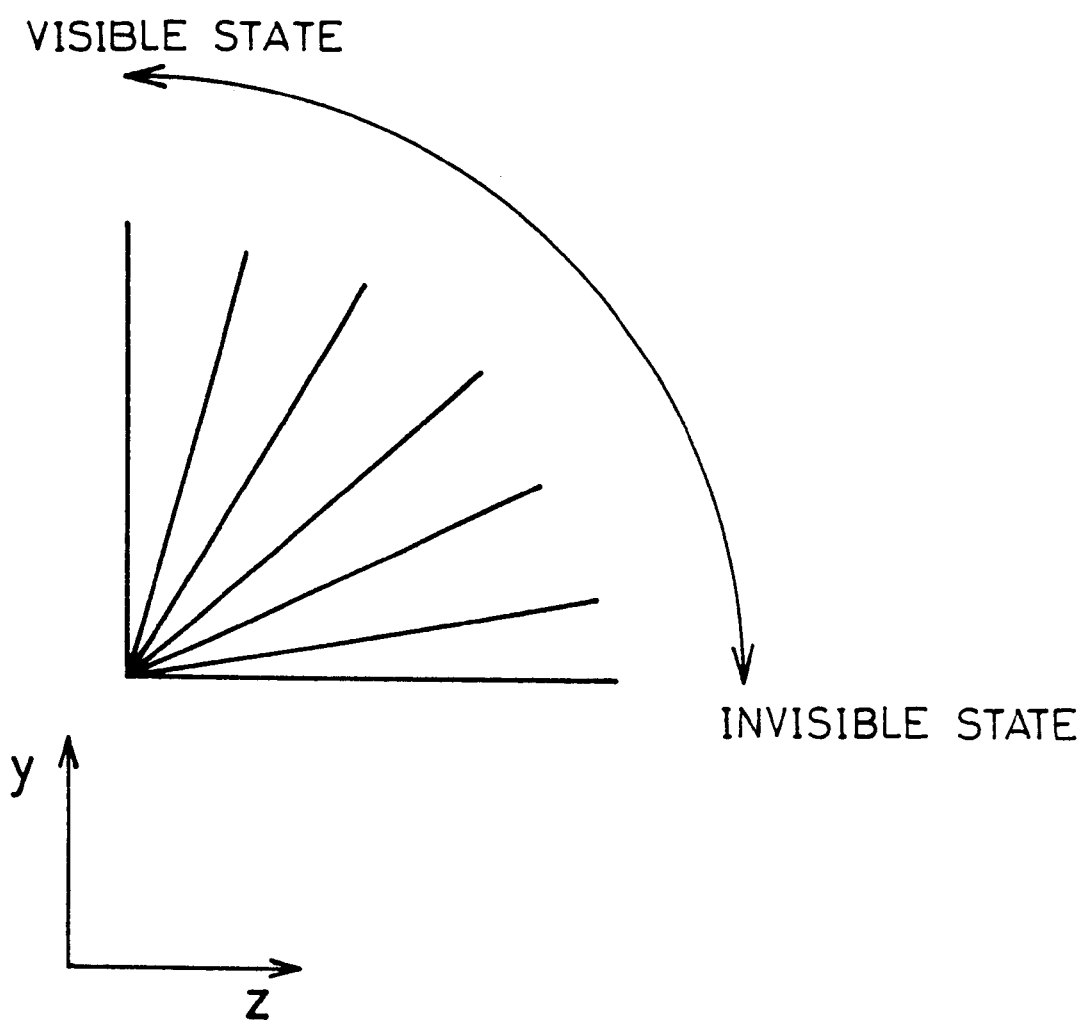
FIG. 35 is a view explaining an operation to turn a data image into visible/invisible.

As shown in FIGS. 34 and 35 as still another example, when a visible figure is changed to an invisible figure, the visible state displayed vertically with respect to the XZ plane is gradually changed to the invisible state where it is flipped (laid down) on the XZ plane. Consequently, the displayed figure is turned invisible gradually. On the contrarily, when an invisible figure is changed to a visible figure, the invisible state flipped on the XZ plane is changed gradually to the visible state displayed vertically with respect to the XZ plane. Consequently, the invisible figure becomes visible gradually. FIG. 34 shows a view seen diagonally to the front of the figure, and FIG. 35 is a view seen from the side with respect to the figure.

Figure 36:
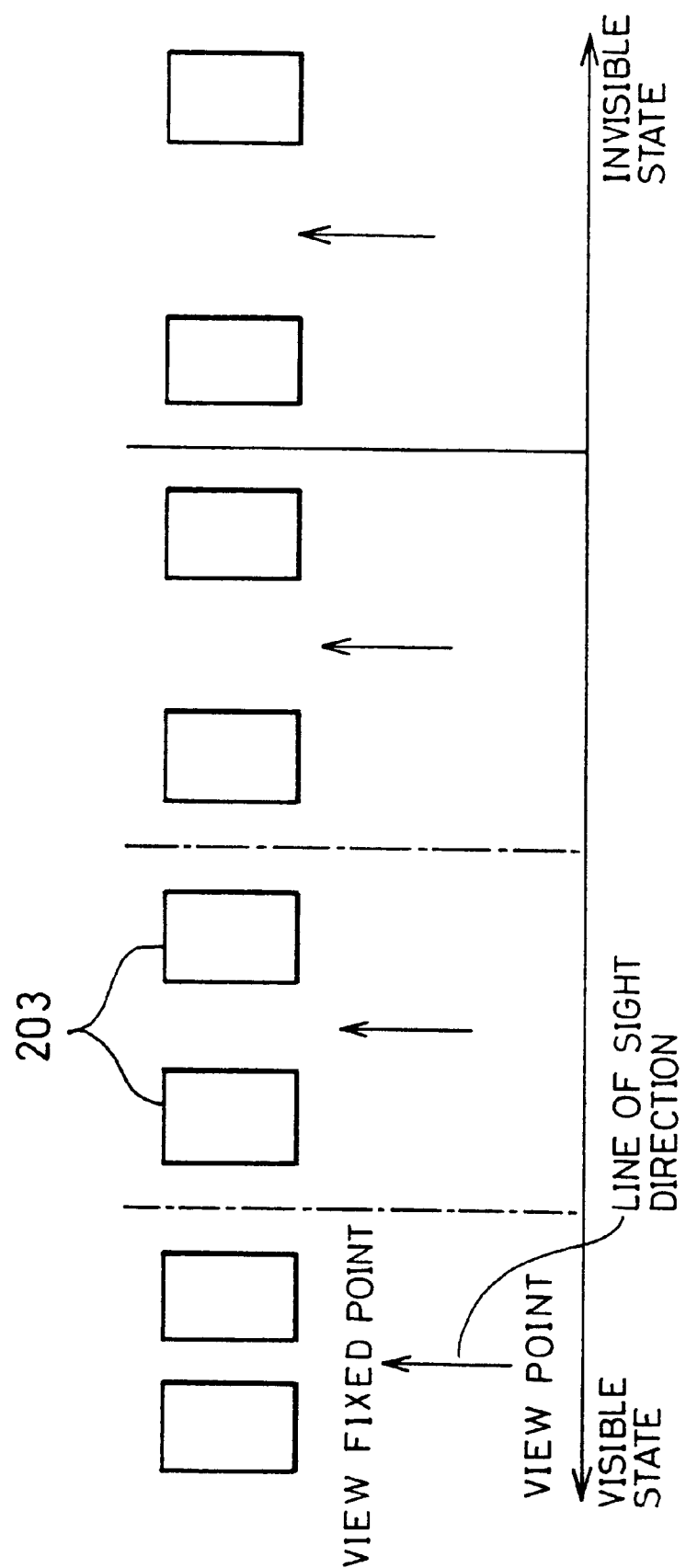
FIG. 36 is a view explaining an operation to turn a data image into visible/invisible.

As shown in FIG. 36 as still another example, when a visible figure is changed gradually to an invisible figure, the figure is slid along the X axis direction, that is, a visible state figure at the left side is changed to an invisible state figure at the right side, as the view point or view fixed point approaches to the visible figure, so that the visible figure is moved away from the view point or view fixed point. On the contrary, when an invisible figure is changed to a visible figure, the figure is slid along the X axis direction. That is, the invisible state figure at the right side is changed to the visible state figure at the left side, as the view point or view fixed point moves away from the invisible figure. Thus, the invisible figure approaches to the view point or view fixed point. The view fixed point referred herein means a point moved by a predetermined distance from the view point in the line of sight direction.

Embodiment 8

Figure 37:
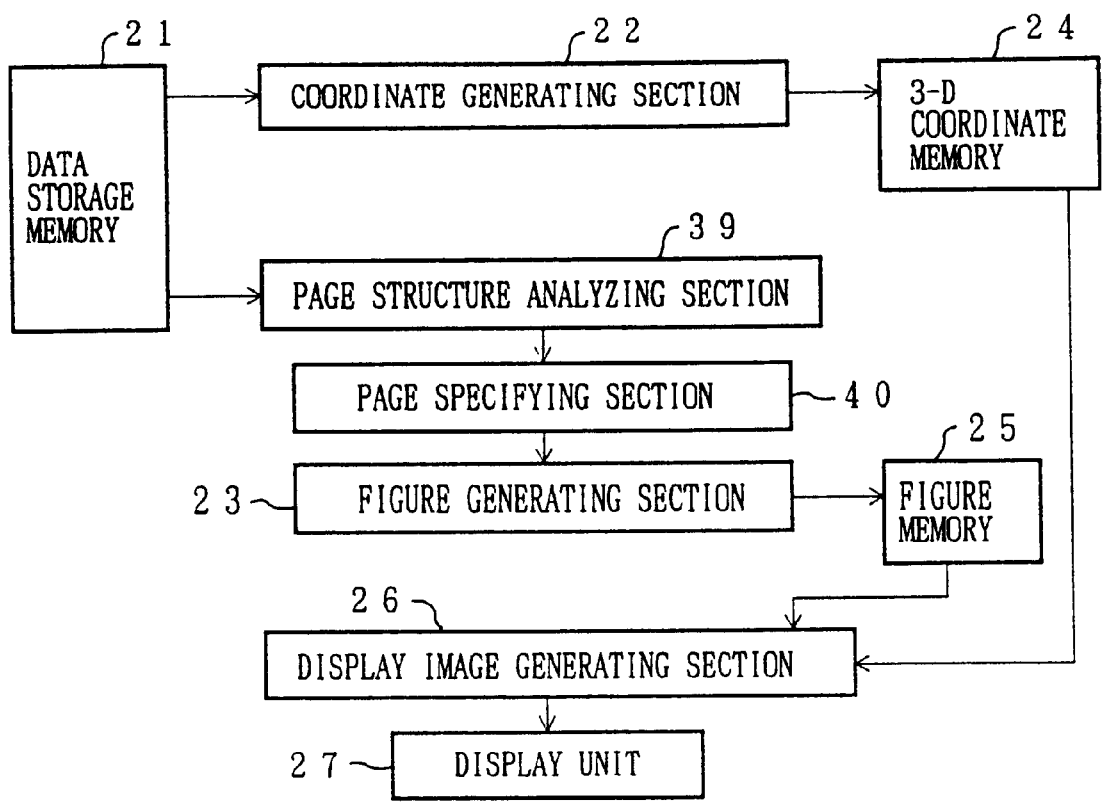
FIG. 37 is a block diagram schematically showing still another example arrangement of the display device for the data display method of the present invention.
Figure 38:
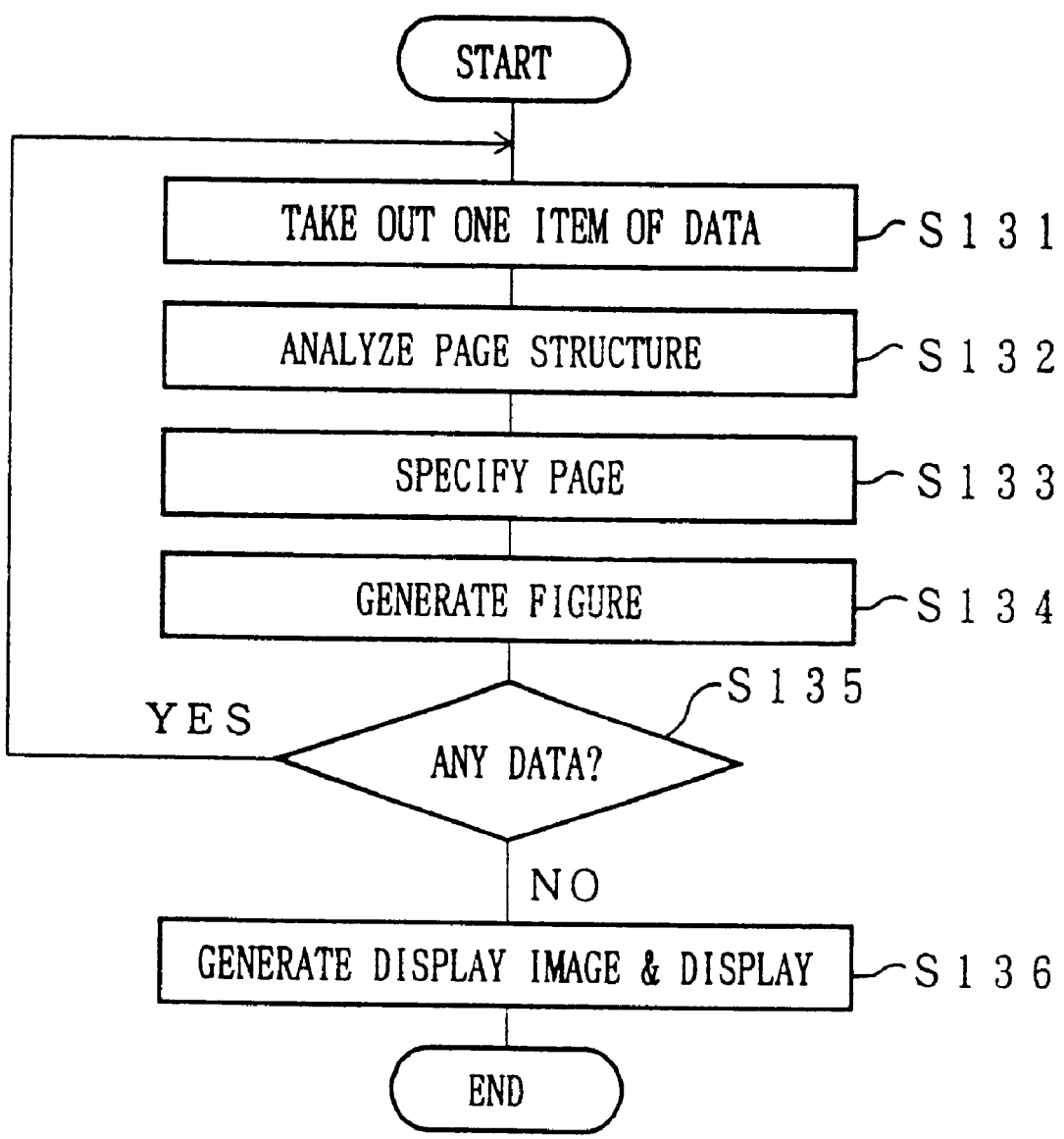
FIG. 38 is a flowchart detailing data display processing.

Referring to FIGS. 37 and 38, the following description will describe still another example embodiment of the present invention. Hereinafter, like components are labeled with like reference numerals with respect to above Embodiments, and the description of these components is not repeated for the explanation's convenience.

As shown in FIG. 37, a display device of the present embodiment includes a page structure analyzing section 39 and a page specifying section 40 in addition to the above-mentioned data storage memory 21, coordinate generating section 22, figure generating section 23, 3-D coordinate memory 24, figure memory 25, display image generating section 26, and display unit 27. The page structure analyzing section 39 reads out one item of the data from the data storage memory 21 and analyzes the page structure. The page specifying section 40 specifies a page to be displayed. The figure generating section 23 generates a page specified by the page specifying section 40 out of the data analyzed by the page structure analyzing section 39 as a display figure.

The page structure analyzing section 39 and page specifying section 40 are a function module realized by a CPU of an unillustrated computer, a computer program run on the CPU, a recording medium for storing the computer program, such as a hard disk, and a memory composed of semiconductor or the like for storing the computer program or subject data during the operation.

A display operation by the above arrangement will be explained with reference to FIG. 38.

To begin with, a 3-D coordinate of one item of the data is taken out from the 3-D coordinate memory 24 (S131). The page structure analyzing section 39 analyzes the structure of a page of the taken out data (S132). The page specifying section 40 specifies a page used as a display figure (S133). If any page is not specified, the first page is used. A figure representing the specified page of the taken out data is generated (S134). Whether there remain any other data to be processed in the 3-D coordinate memory 24 is checked (S135). If there remain such data, the flow returns to S131; otherwise, a display image is generated and displayed on the display unit 27 (S136).

Embodiment 9

Figure 39:
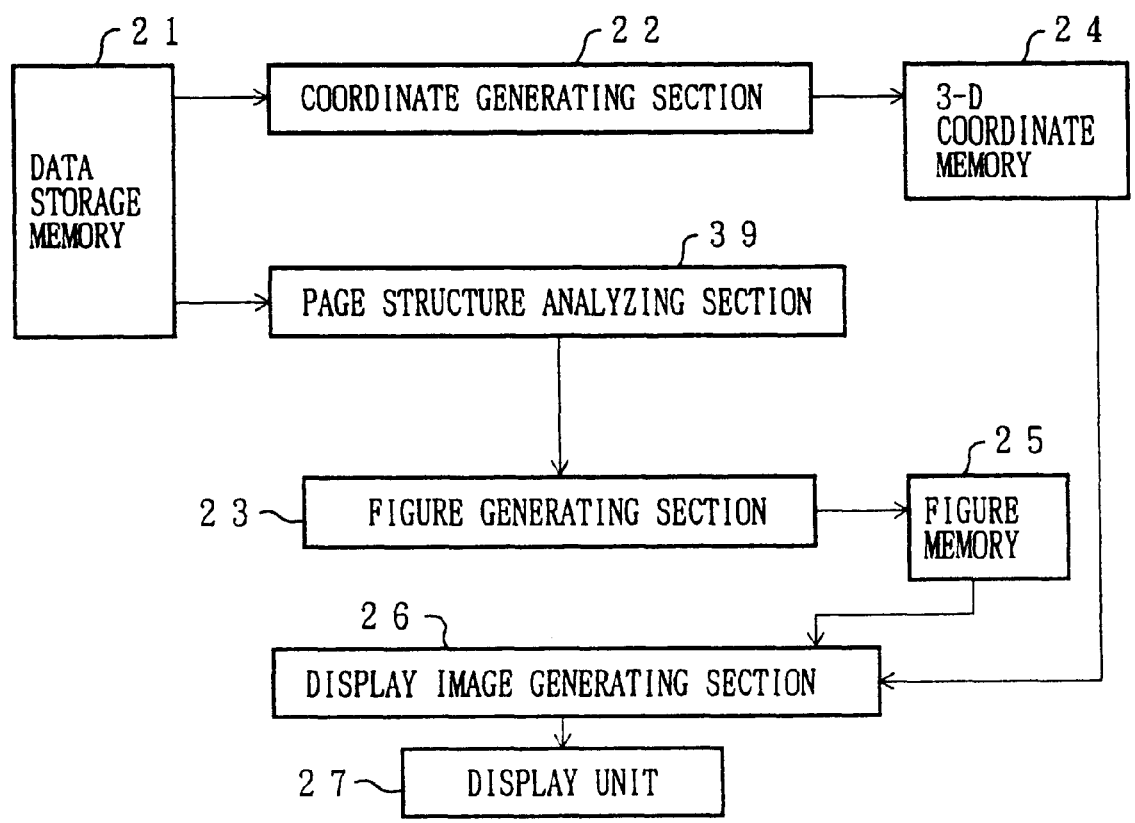
FIG. 39 is a block diagram schematically showing still another example arrangement of the display device for the data display method of the present invention.
Figure 40:
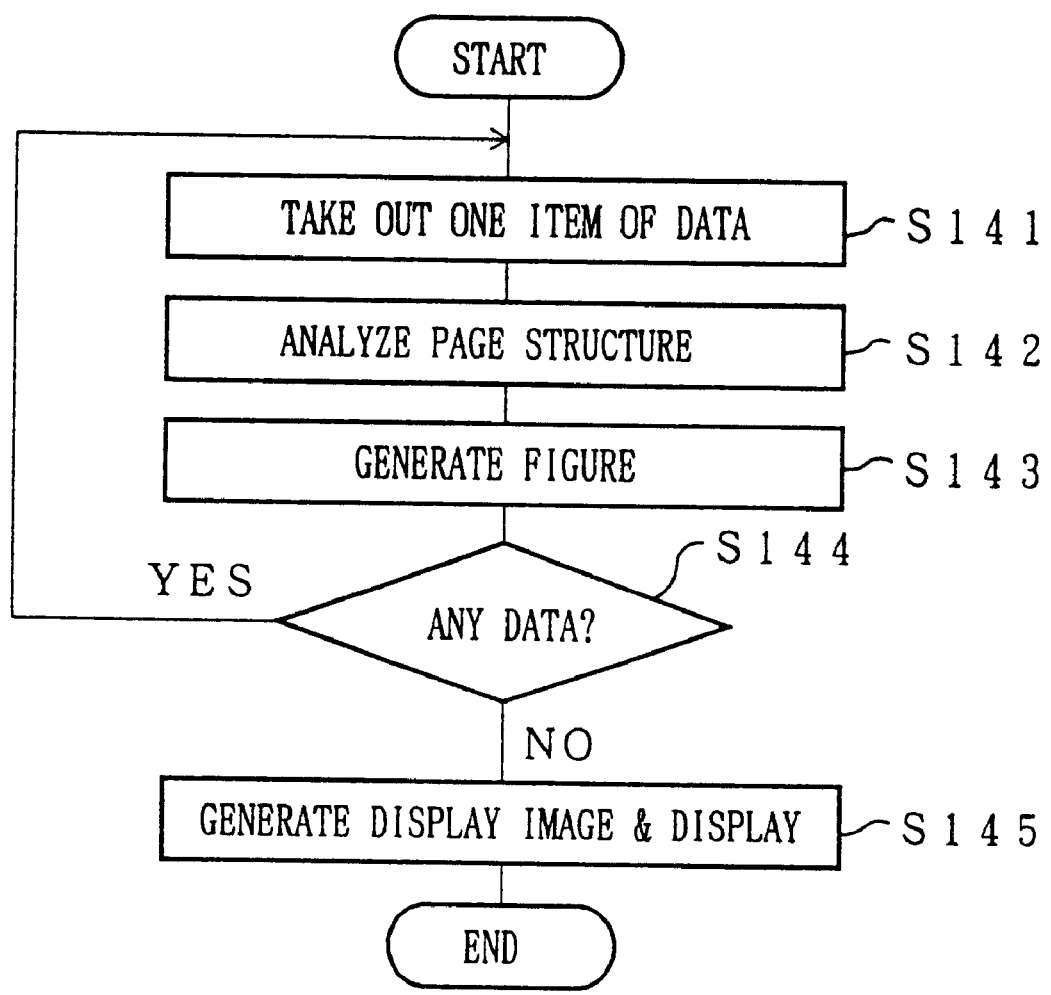
FIG. 40 is a flowchart detailing data display processing.

Referring to FIGS. 39 and 40, the following description will describe still another example embodiment of the present invention. Hereinafter, like components are labeled with like reference numerals with respect to above Embodiments, and the description of these components is not repeated for the explanation's convenience.

As shown in FIG. 39, a display device of the present embodiment is identical with its counterpart in Embodiment 8 except that the page specifying section 40 is omitted.

A display operation by the above arrangement will be explained with reference to FIG. 40.

To begin with, one item of the data is taken out from the data storage memory 21 (S141). The page structure analyzing section 39 analyzes the structure of the page of the taken out data (S142), and a figure representing the specified page of the taken out data is generated (S143). At this point, in the present embodiment, a figure representing each page is generated, which is converted into a format like Animation Gif, Progressive JPEG, or the like, so that more than one image is stored into the figure memory 25 as a single image. However, other formats are also applicable and each page can be stored as a separate image. Then, whether there remain any other data to be processed in the 3-D coordinate memory 24 is checked (S144). If there remain such data, the flow returns to S141; otherwise, a display image is generated and displayed on the display unit 27 (S145). Consequently, the data contents are displayed successively per page from the first page. Thus, the user does not have to turn the pages. The user can determine a speed at which the pages are turned arbitrarily.

Embodiment 10

Figure 41:
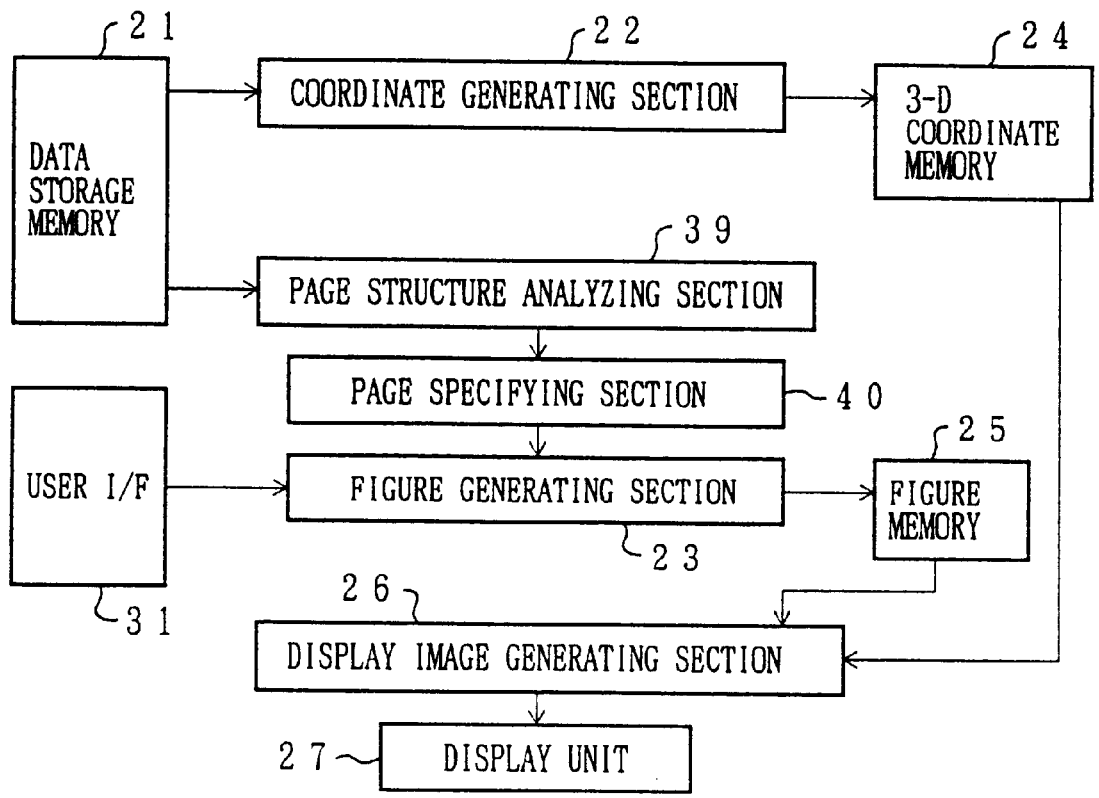
FIG. 41 is a block diagram schematically showing still another example arrangement of the display device for the data display method of the present invention.
Figure 42:
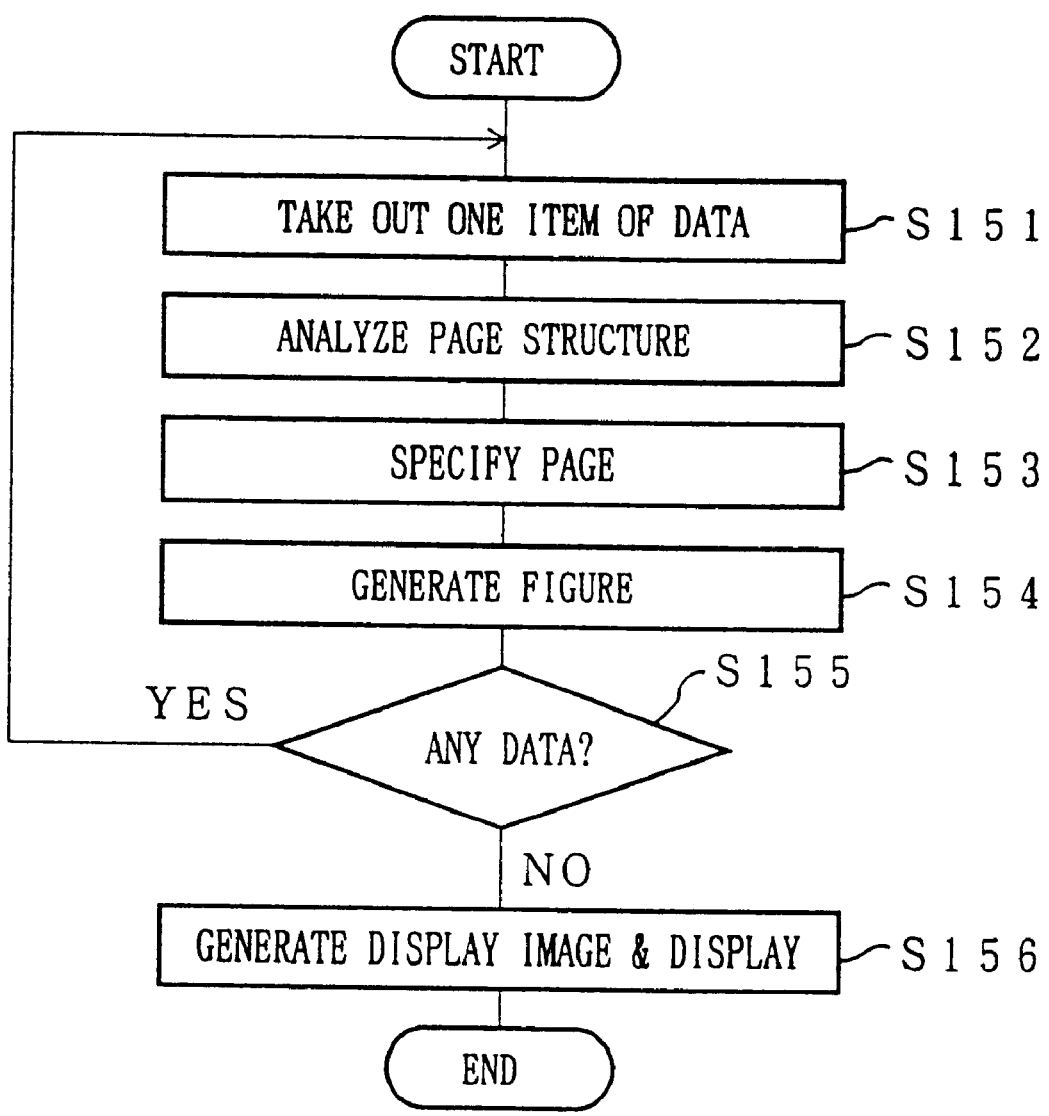
FIG. 42 is a flowchart detailing data display processing.
Figure 43:
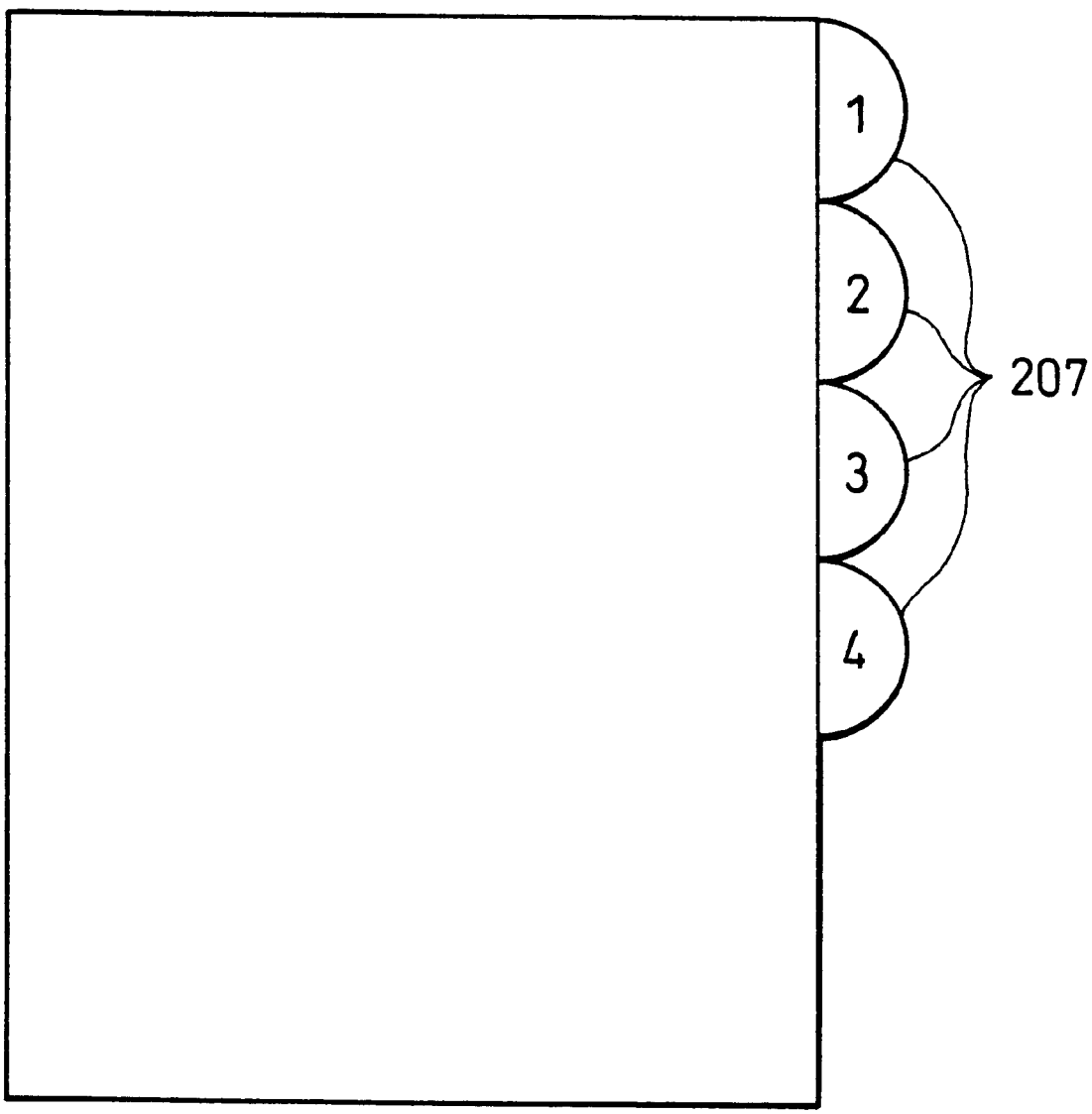
FIG. 43 is a view explaining an example display figure of multi-page data.

Referring to FIGS. 41 through 43, the following description will describe still another example embodiment of the present invention. Hereinafter, like components are labeled with like reference numerals with respect to above Embodiments, and the description of these components is not repeated for the explanation's convenience.

As shown in FIG. 41, a display device of the present embodiment is identical with its counterpart in Embodiment 8 except that it additionally includes the user I/F 31. The user I/F 31 conveys an input content from the user through an unillustrated external input device.

A display operation by the above arrangement will be explained with reference to FIG. 42.

To begin with, a 3-D coordinate of one item of the data is taken out from the 3-D coordinate memory 24 (S151). The page structure of the taken out data is analyzed (S152). A page used as the display figure is received from the user through the user I/F 31 (S153). For example, a page number may be inputted through the keyboard, or as shown in FIG. 43, page tags 207 may be attached to the display figure, so that the user can specify the page on the screen using the pointing device, or any other applicable method can be used. A figure representing the specified page of the taken out data is generated (S154). Whether there remain any other data to be processed in the 3-D coordinate memory 24 is checked (155). If there remain such data, the flow returns to S151; otherwise, a display image is generated and displayed on the display device 27 (S156).

Embodiment 11

Referring to FIGS. 44 through 47, the following description will describe still another example embodiment of the present invention. Hereinafter, like components are labeled with like reference numerals with respect to above Embodiments, and the description of these components is not repeated for the explanation's convenience.

Figure 44:
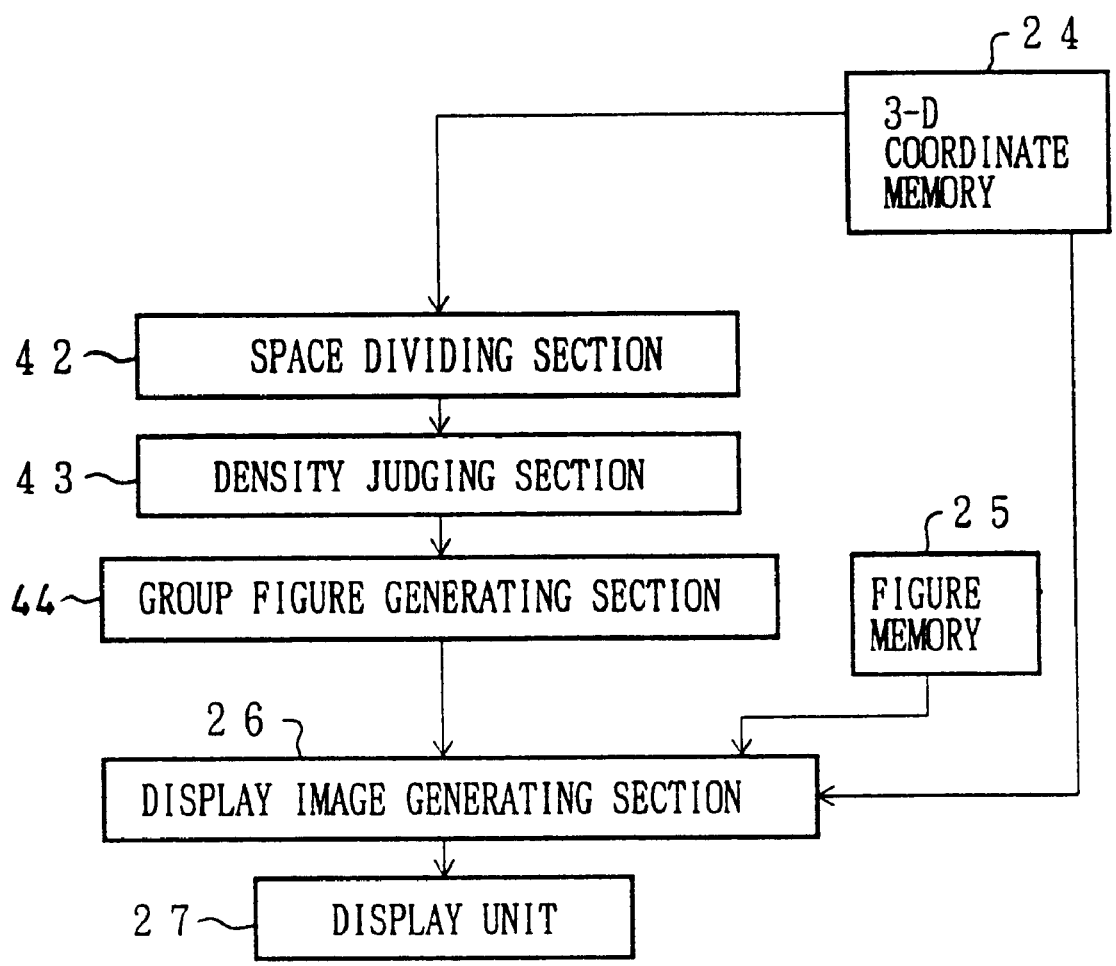
FIG. 44 is a block diagram schematically showing still another example arrangement of the display device for the data display method of the present invention.

As shown in FIG. 44, a display device of the present embodiment is of any arrangement of its counterpart in Embodiments 1 through 10 except that it additionally includes a space dividing section 42, a density judging section 43, and a group figure generating section 44. The space dividing section 42 divides a 3-D coordinate space composed of the coordinate values stored in the 3-D coordinate memory 24 into a plurality of sub-spaces. The density judging section 43 judges a data density in each of the sub-spaces obtained by the space dividing section 42. The group figure generating section 44 generates a figure representing a sub-space judged as being dense by the density judging section 43. Also, the display image generating section 26 places figures representing the corresponding data in the less dense sub-spaces and a group figure in the dense sub-spaces instead of the figures representing the data.

The space dividing section 42, density judging section 43, and group figure generating section 44 are a function module realized by a CPU of an unillustrated computer, a computer program run on the CPU, a recording medium for storing the computer program, such as a hard disk, and a memory composed of semiconductor or the like for storing the computer program or subject data during the operation.

Figure 45:
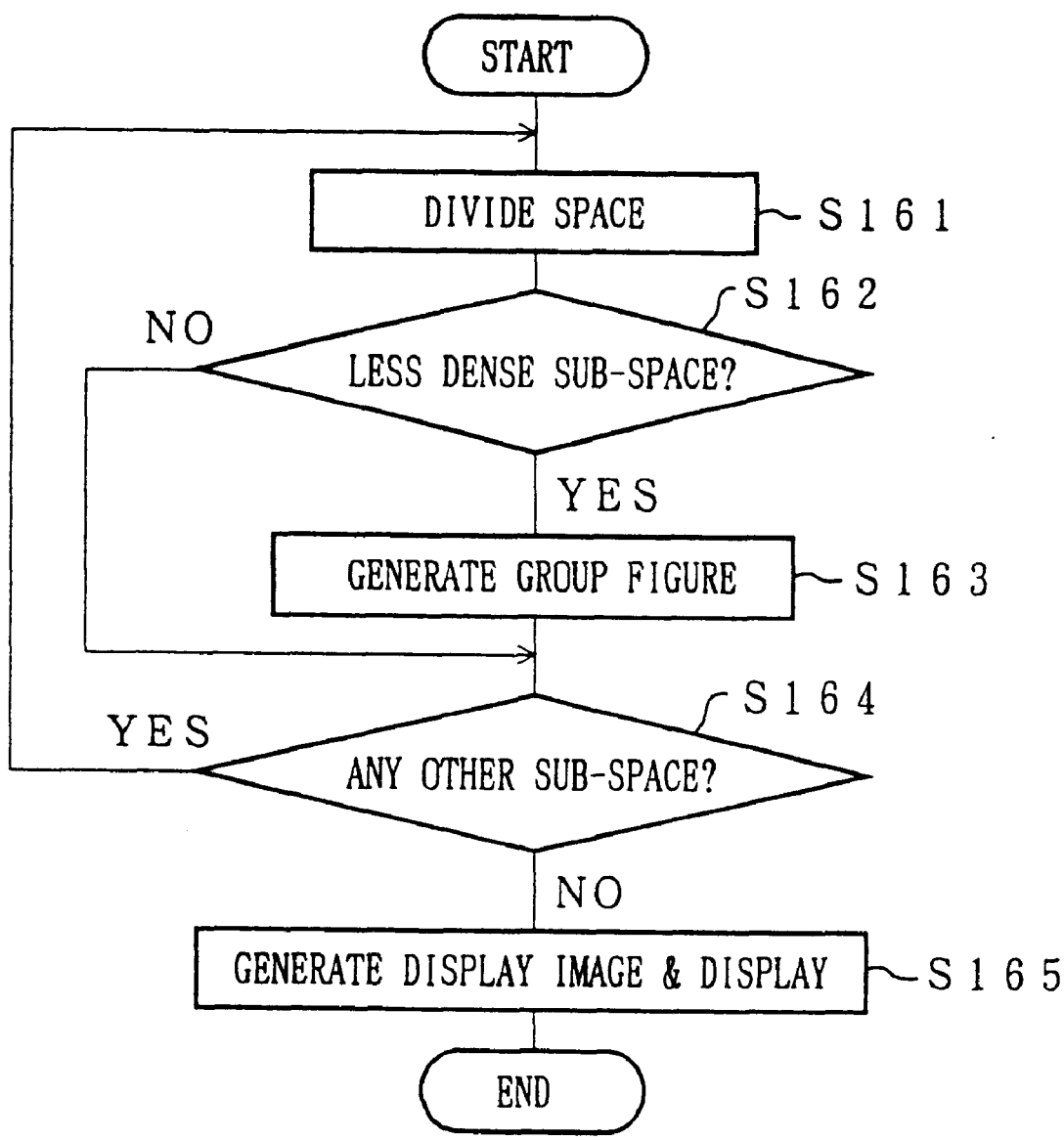
FIG. 45 is a flowchart detailing data display processing.

A display operation by the above arrangement will be explained with reference to FIG. 45.

To begin with, the 3-D coordinate space constructed by the data stored in the 3-D coordinate memory is divided into sub-spaces (S161). Then, whether the data in each sub-space are dense or not is judged (S162). For example, the number of figures in a unit length along the Z axis direction is counted, and if the counted number is equal to or greater than a predetermined value, the sub-space is judged as being dense. When judged as being dense, a group figure is generated (S163). When judged as being less dense, S163 is skipped. Whether there remains any other sub-space to be processed is judged (S164). If there remains such a sub-space, the flow returns to S162; otherwise the flow proceeds to S165. Figures representing their corresponding data are placed in the less dense sub-spaces, and a display image is generated and displayed on the display unit 27, whereas a group figure, which is different from the figures representing the data, is placed in the dense sub-space instead of the figures representing the data, and a display image is generated and displayed on the display unit 27 (S165).

Figure 46:
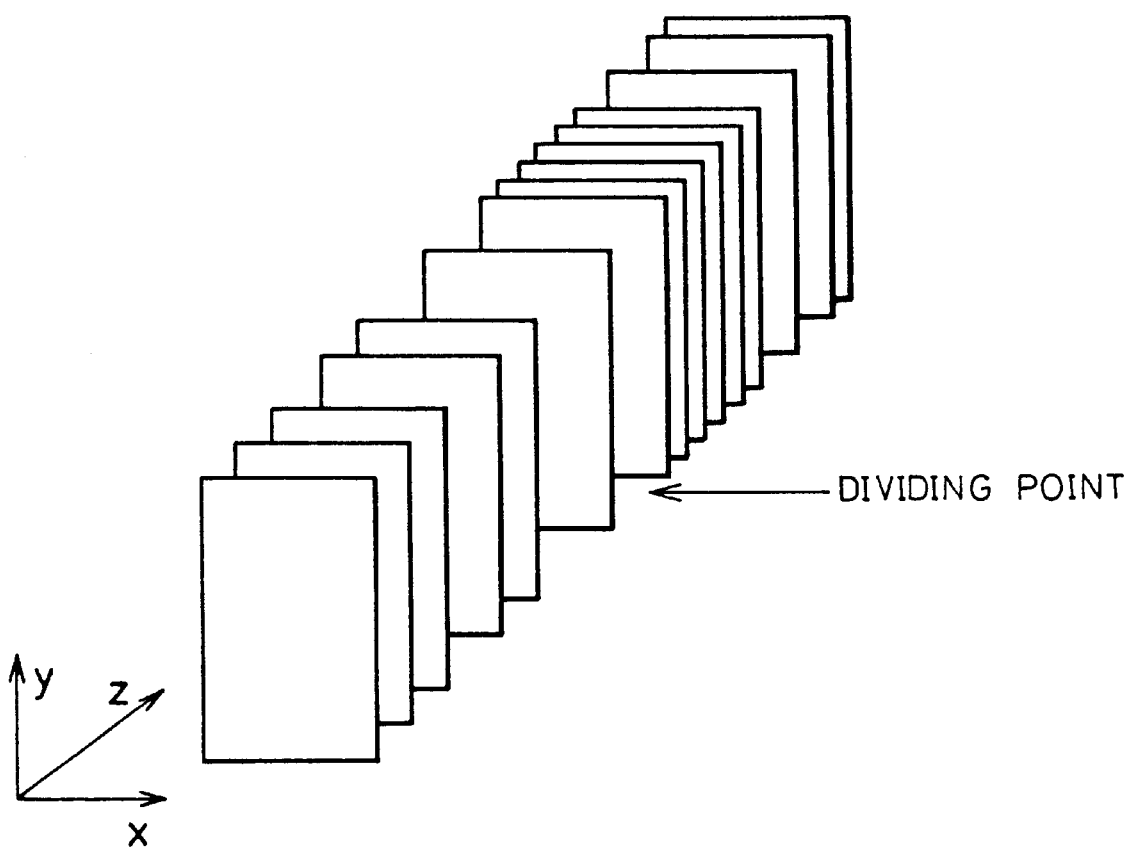
FIG. 46 is a view explaining a 3-D coordinate space displayed on the display device.
Figure 47:
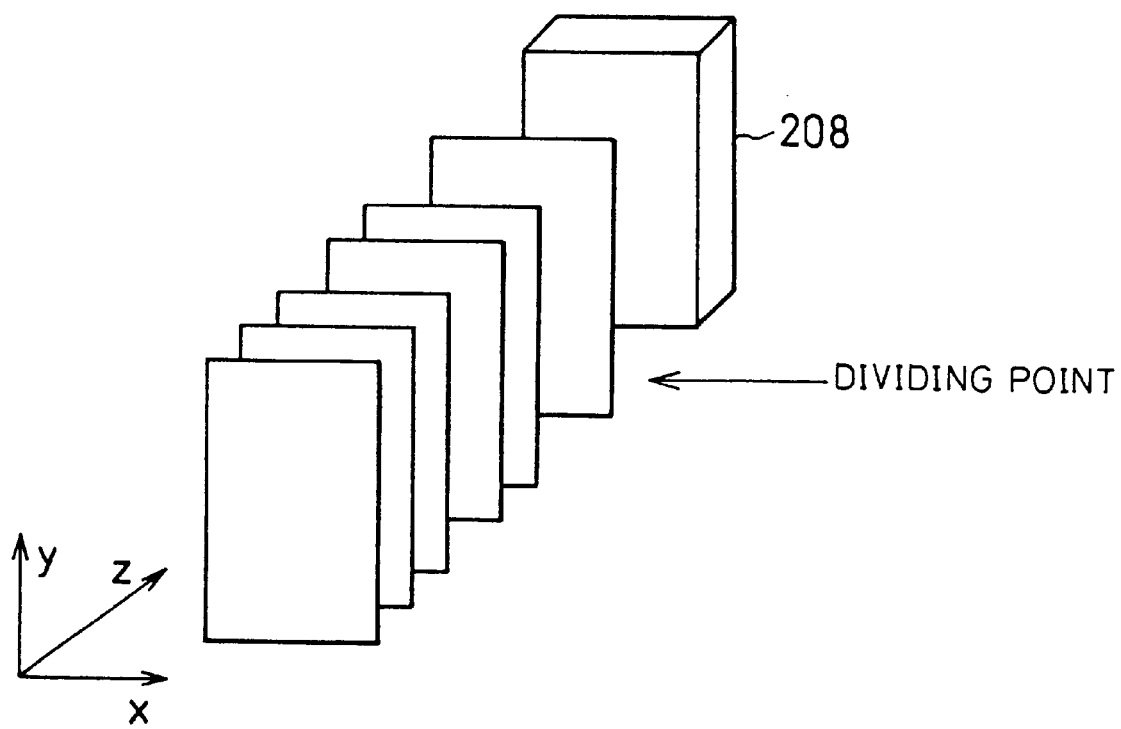
FIG. 47 is a view explaining a 3-D coordinate space displayed on the display device.

Example displays are illustrated in FIGS. 46 and 47. Assume that if all the figures stored in the 3-D coordinate memory 24 and figure memory 25 are displayed, then a display image is the one illustrated in FIG. 46. In this case, the data are dense in the deeper portion, and hard to see. Thus, assume that the space is divided into two sub-spaces at the dividing point in S161, and the front sub-space is referred to as a space A and the sub-space in the back is referred to as a space B. Then, the space A is judged as being less dense while the space B is judged as being dense in S162. A group figure is generated for the space B judged as being dense in S163, and the figure thus generated is displayed on the display unit 27. Thus, as shown in FIG. 47, a group figure 208 is displayed in the space B. In this example, the group figure 208 is illustrated thicker than the other normal data models so as to be distinguished easily.

Embodiment 12

Figure 48:
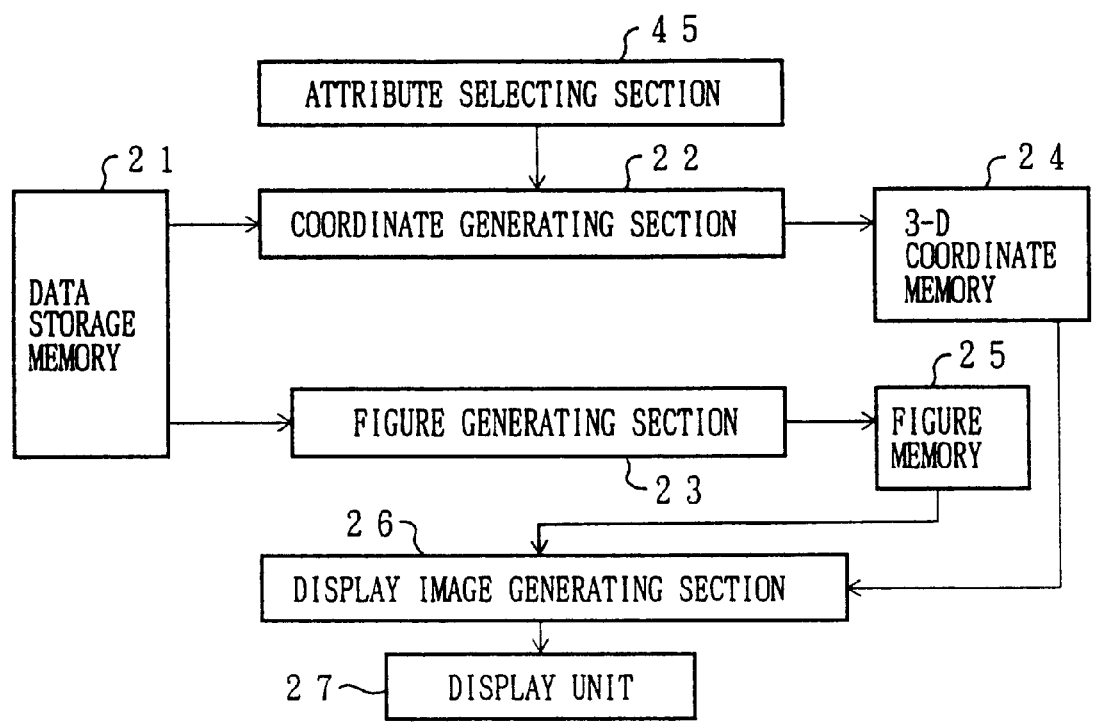
FIG. 48 is a block diagram schematically showing still another example arrangement of the display device for the data display method of the present invention.
Figure 49:
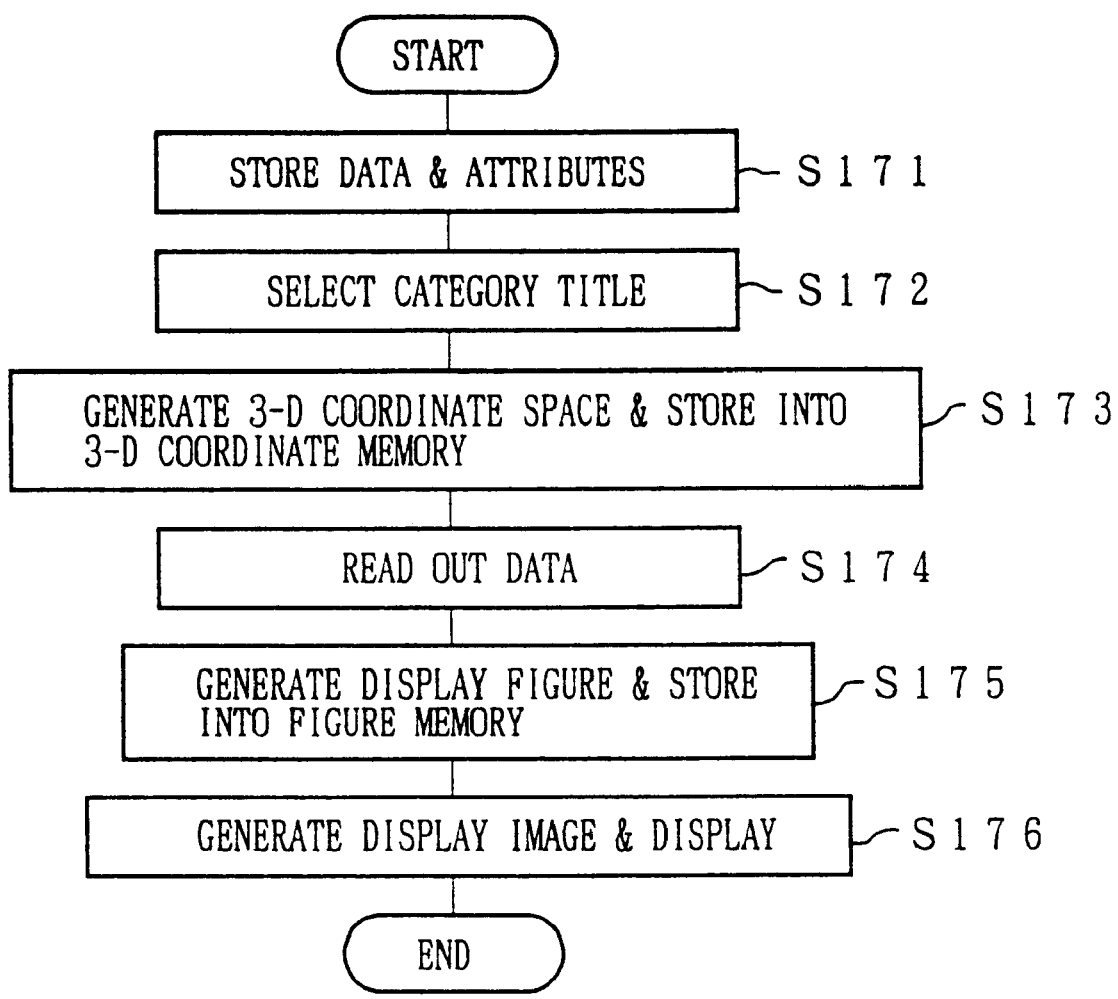
FIG. 49 is a flowchart detailing data display processing.

Referring to FIGS. 48 and 49, the following description will describe still another example embodiment of the present invention. Hereinafter, like components are labeled with like reference numerals with respect to above Embodiments, and the description of these components is not repeated for the explanation's convenience.

As shown in FIG. 48, a display device of the present embodiment is of any arrangement of its counterpart in Embodiments 1 through 11 except that it additionally includes an attribute selecting section 45. The attribute selecting section 45 selects the matching of the X axis and Z axis with the attributes of the data.

The attribute selecting section 45 is a function module realized by a CPU of an unillustrated computer, a computer program run on the CPU, a recording medium for storing the computer program, such as a hard disk, and a memory composed of semiconductor or the like for storing the computer program or subject data during the operation.

A display operation by the above arrangement will be explained with reference to FIG. 49.

To begin with, the data and attributes are stored into the data storage memory 21 (S171). Then, the attribute selecting section 45 selects the matching of the X axis and Z axis with the attributes of the data (S172). For example, the user can select the matching attribute or the system can select the optimal matching attribute, or the matching attribute can be selected by any other applicable method. The selected attribute is read out from the data storage memory 21 to generate a 3-D coordinate, which is stored into the 3-D coordinate memory 24 (S173). Then, the data stored in the data storage memory 21 are read out (S174) to generate a display figure representing the data, which is stored into the figure memory 25 (S175). Then, a display image is generated based on the data stored in the 3-D coordinate memory 24 and figure memory 25, and displayed on the display unit 27 (S176).

Embodiment 13

Referring to FIGS. 50 through 53, the following description will describe still another example embodiment of the present invention. Hereinafter, like components are labeled with like reference numerals with respect to above Embodiments, and the description of these components is not repeated for the explanation's convenience.

Figure 50:
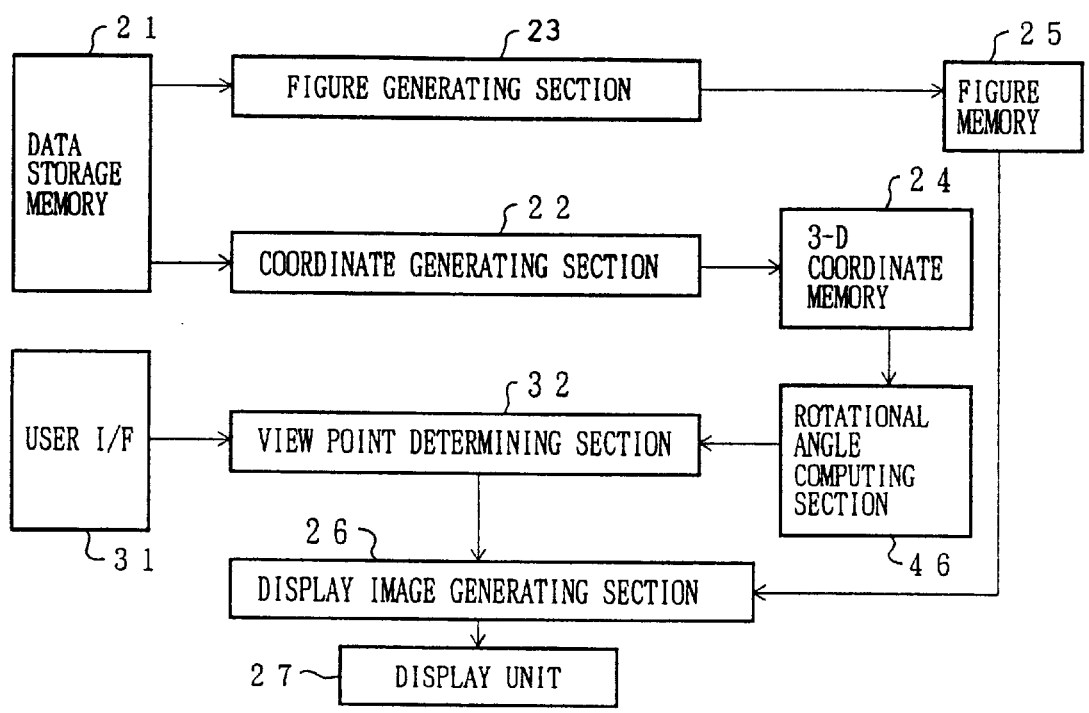
FIG. 50 is a block diagram schematically showing still another example arrangement of the display device for the data display method of the present invention.

As shown in FIG. 50, a display device of the present embodiment includes a rotational angle computing section 46 in addition to the above-mentioned data storage memory 21, coordinate generating section 22, figure generating section 23, 3-D coordinate memory 24, figure memory 25, display image generating section 26, display unit 27, user I/F 31, and view point determining section 32. The rotational angle computing section 46 computes a rotational angle of a figure using the coordinate of each figure and view point position.

The rotational angle computing section 46 is a function module realized by a CPU of an unillustrated computer, a computer program run on the CPU, a recording medium for storing the computer program, such as a hard disk, and a memory composed of semiconductor or the like for storing the computer program or subject data during the operation.

Figure 51:
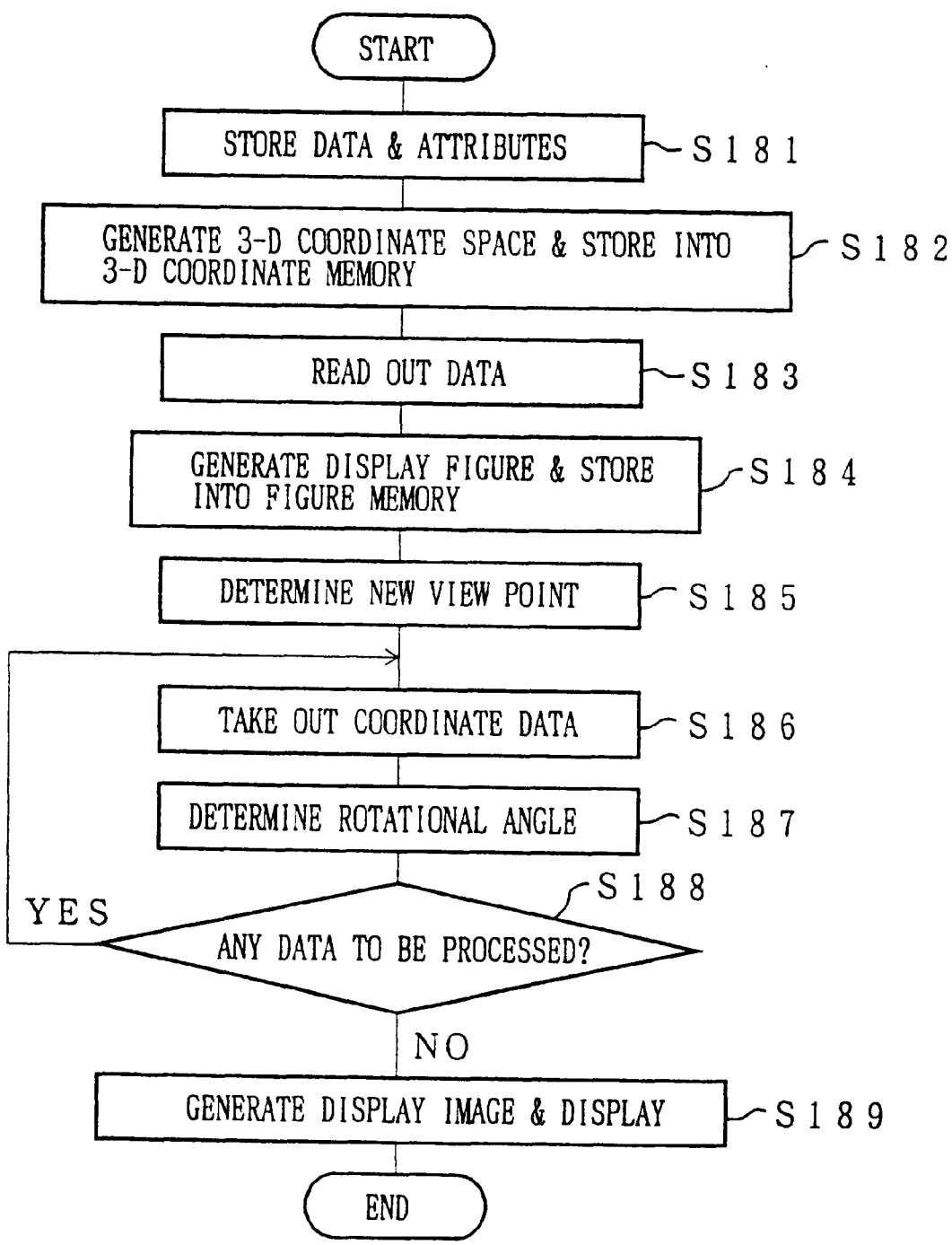
FIG. 51 is a flowchart detailing data display processing.

A display operation by the above arrangement will be explained with reference to FIG. 51.

To begin with, the data and attributes are stored into the data storage memory 21 (S181). Then, the attributes are read out from the data storage memory 21 to generate a 3-D coordinate, which is stored into the 3-D coordinate memory 24 (S182). Then, the data stored in the data storage memory 21 are read out (S183) to generate a display figure representing the data, which is stored into the figure memory 25 (S184).

Then, the user inputs a new view point using an unillustrated external input device, such as a keyboard and a pointing device, through the user I/F 31, and the input is analyzed and the new view point is determined (S185)

Then, the rotational angle computing section 46 takes out the coordinate value of one item of the data from the 3-D coordinate memory 24 (S186), and computes a rotational angle of each figure using the 3-D coordinate of the figure and the coordinate value of the view point (S187). For example, a rotational angle at which the front surface of the figure and the line of sight intersect at right angles is computed.

Figure 52:
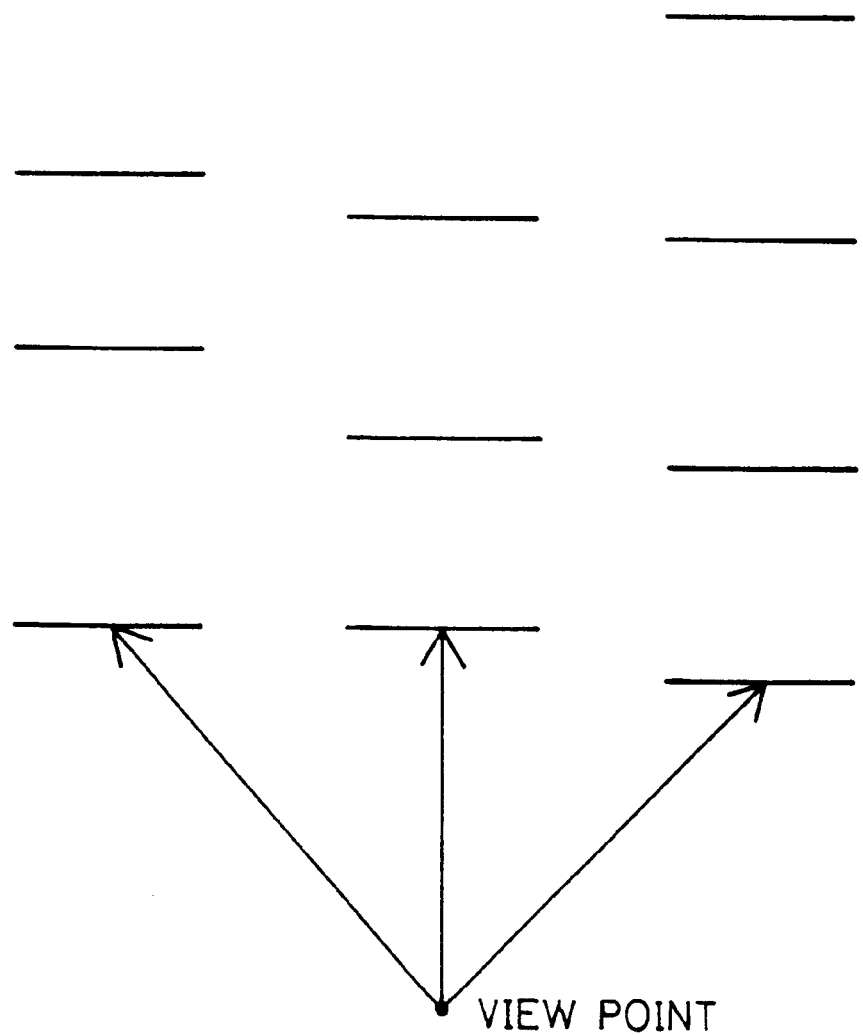
FIG. 52 is a view explaining the state of a data model before being rotated.
Figure 53:
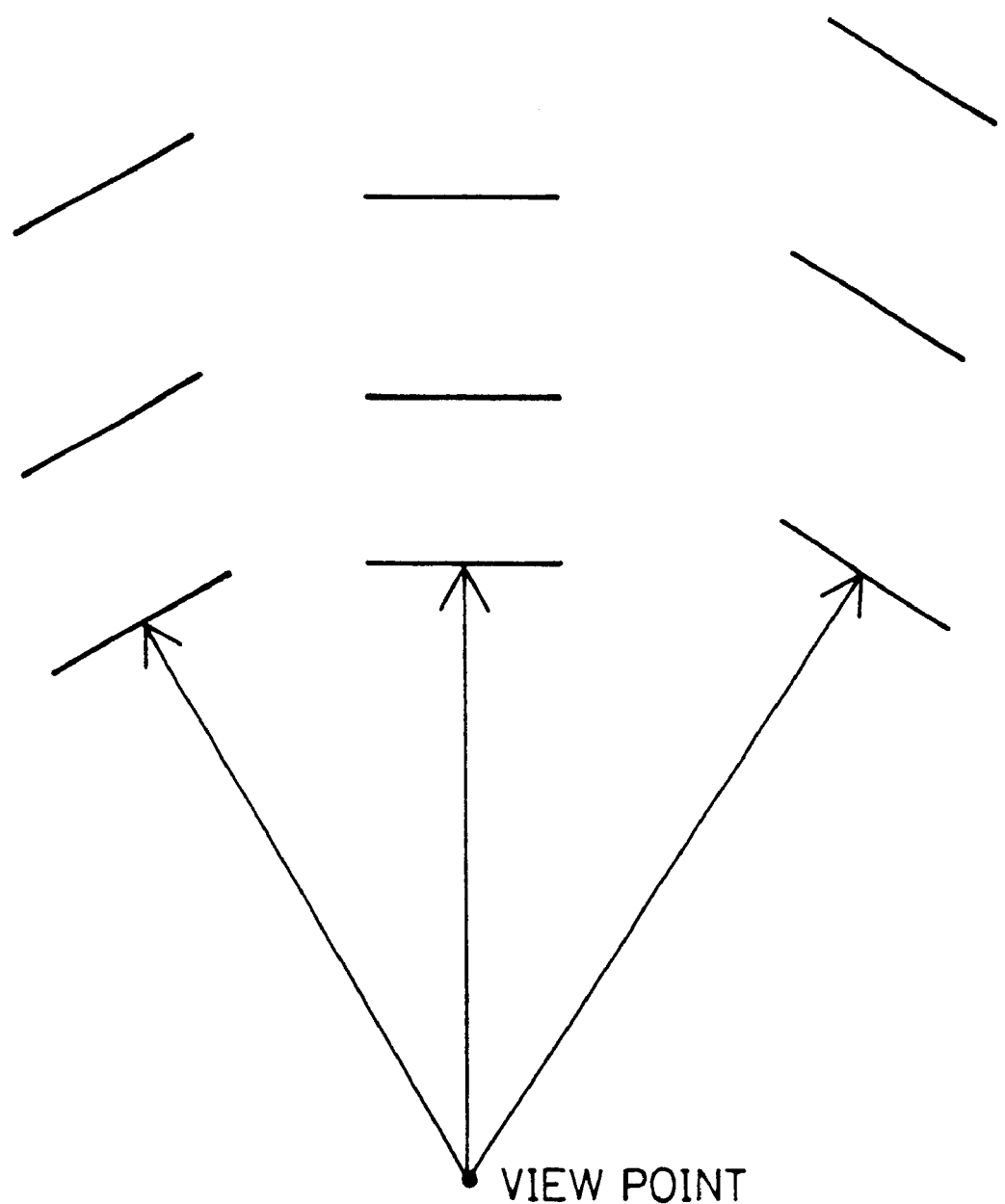
FIG. 53 is a view explaining the state of the data model after being rotated.

Whether there remain any other data to be processed in the 3-D coordinate memory 24 or not is checked (S188). If there remain such data, the flow returns to S186; otherwise, the flow proceeds to S189. A display image is generated based on the 3-D coordinate and the rotational angle stored in the 3-D coordinate memory 24, and the figure data stored in the figure memory 25, and displayed on the display device 27 (S189). FIGS. 52 and 53 show displays seen from above, namely in the Y axis direction, before and after the rotation, respectively.

Embodiment 14

Referring to FIGS. 54 through 66, the following description will describe still another example embodiment of the present invention. Hereinafter, like components are labeled with like reference numerals with respect to above Embodiments, and the description of these components is not repeated for the explanation's convenience.

Figure 54:
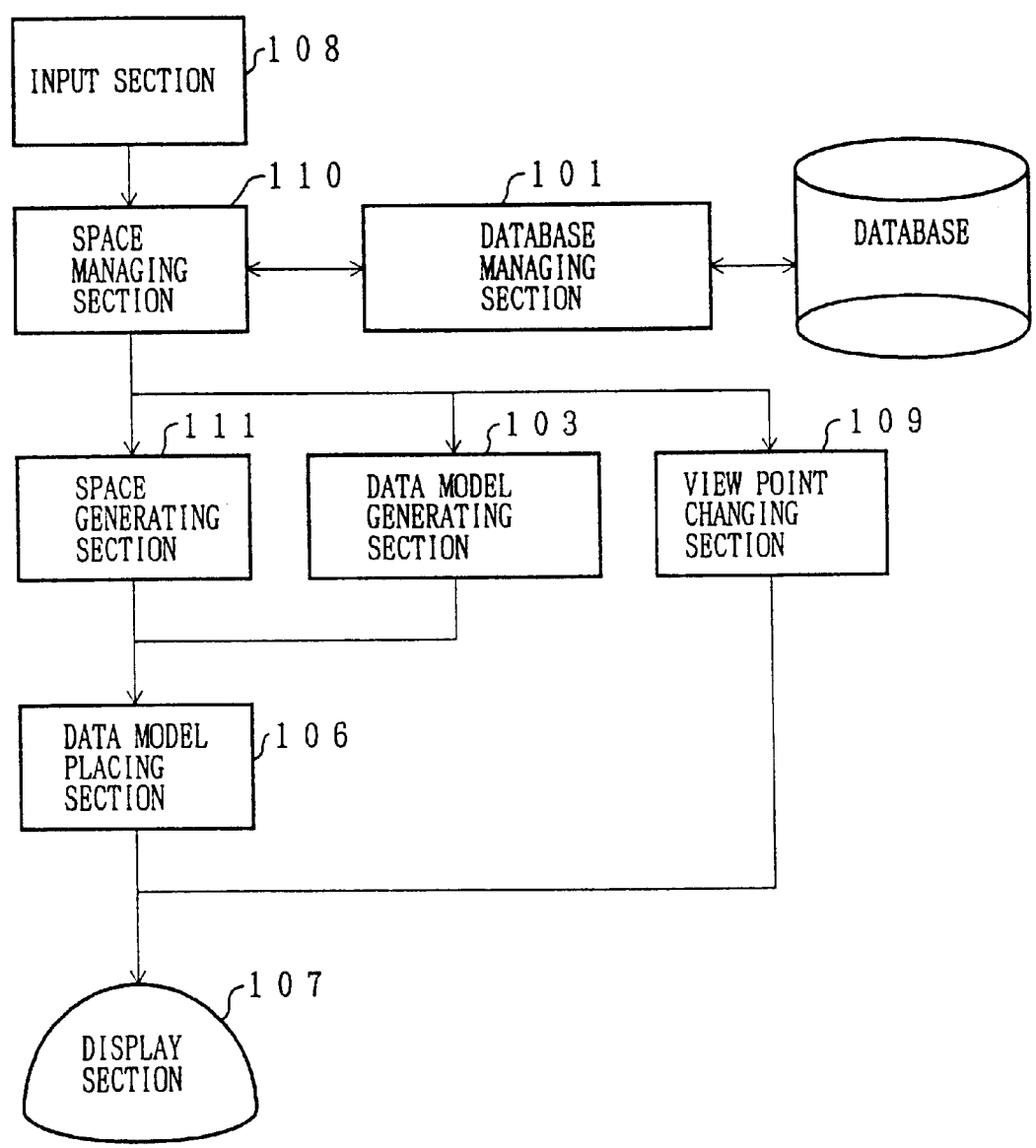
FIG. 54 is a block diagram schematically showing still another example arrangement of the display device for the data display method of the present invention.

FIG. 54 is a view depicting an arrangement of a data display device in accordance with the present embodiment. The present display device includes an input section 108, a space managing section 110, a database managing section 101, a space generating section 111, a data model generating section 103, a view point changing section 109, a data model placing section 106, and a display section 107. The input section 108 receives display information (display period, category, and view point) from the user. The display period is composed of a start date and an end date, and only the data that fall in the display period are displayed. The category referred herein means the attributes selected by the user arbitrarily among all the attributes of the data. The data are distributed according to the categories, and the reduced images are aligned laterally. For example, a data partition can be selected as one of the categories. There may be more than one data partition in one item of the data. For example, in case of a document for a plan meeting, there may be two data partitions in one item of the data: "PLAN MEETING" and "DOCUMENT". In case of an image of a plan meeting, there may be two data partitions in one item of the data: "PLAN MEETING" and "IMAGE". The database managing section 101 manages the databases. The space managing section 110 manages the 3-D coordinate space and the data to be displayed based on information obtained from the input section 108 and database managing section 101.

Information tables managed by the space managing section 110 will be explained.

FIG. 55 shows a space display information table, into which information used by the space generating section 111 is stored. The space display information table comprises a start date, an end date, and at least one category identifier.

Figures 56, 57:
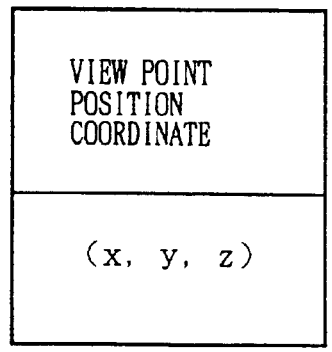
FIG. 56 is a view explaining a data display information table.
FIG. 57 is a view explaining a view point information table.

FIG. 56 shows a data display information table, into which information as to the data used by the data model generating section 103 and data model placing section 106 is stored. The data display information table comprises a data identifier, a date of creation, a data size, a data format indicating the format of data, such as a text and a picture, and at least one category identifier indicating the category to which the data in question belong.

FIG. 57 shows a view point information table used by the view point changing section 109, which comprises a view point position coordinate.

Next, processing by the space managing section 110 will be detailed with reference to the flowchart in FIG. 58.

To begin with, the input section 108 receives the display period (start date D1 and end date D2), the data partitions ($C_1$–$C_N$) selected as the categories herein, and the view point position (X,Y,Z) from the user, all of which are delivered to the space managing section 110 to start the processing (S201). Then, the validity of the input information is checked (S202). If an invalid value is inputted, a default value prepared in advance is used (S203). The view point information table is generated (S204). The number M of days in the period is computed using the display period (start date D1 and end date D2) (S205). Whether the number M of days is greater than a predetermined threshold $M_0$ or not is checked (S206). When M>$M_0$, $M_0$ is used as the number M of days (S207), and the end date D2 is set again using the start date D1 and the updated number M of days (S208). Then, the number N of categories is computed using the number of the data partitions ($C_1$–$C_N$) (S209), and whether the number N of categories is greater than a predetermined threshold $N_0$ or not is checked (S210). When N>$N_0$, $N_0$ is used as the number N of categories (S211). Then, the space display information table is generated. Here, the category identifiers as many as the number N of categories obtained in S211 are registered (S212).

Then, an access to the database managing section 101 is gained to obtain the data identifier(s), date of creation, data size, data format, category identifier(s) of all the data that fall in the display period and match with the categories contained in the space display information table generated in S212 to generate the data display information table (S213). Finally, the space display information table, data display information table, and view point information table are inputted into the space generating section 111, data model generating section 103, and view point changing section 109, respectively (S214).

Figure 59:
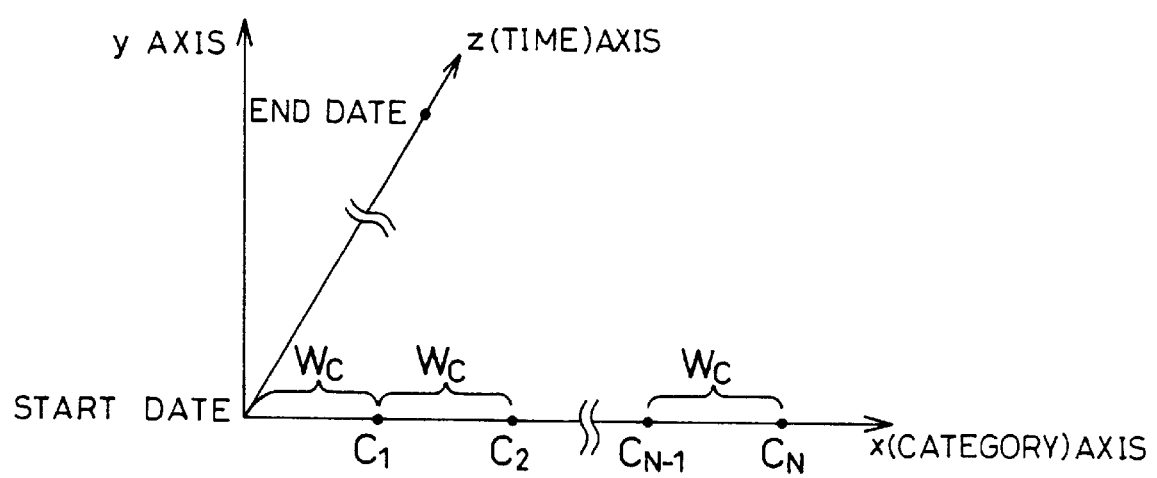
FIG. 59 is a view explaining a 3-D coordinate space displayed on the display device.

The space generating section 111 generates a 3-D coordinate space having the Z axis oriented in the depth direction and representing a time axis, the X axis oriented in the right direction and representing the category axis, and the Y axis oriented in the upward direction based on the space display information table inputted from the space managing section 110. On the Z axis (time axis), the start data is used as the origin and dates are used as the coordinate values. On the X axis (category axis), the $C_1$ is set at a predetermined position Wc(>0) from the origin, and $C_2$–$C_N$ are set sequentially at regular intervals of Wc. FIG. 59 shows the 3-D coordinate space generated by the space generating section 111.

The data model generating section 103 generates a data model based on the data display information table inputted from the space managing section 110.

Figure 60:
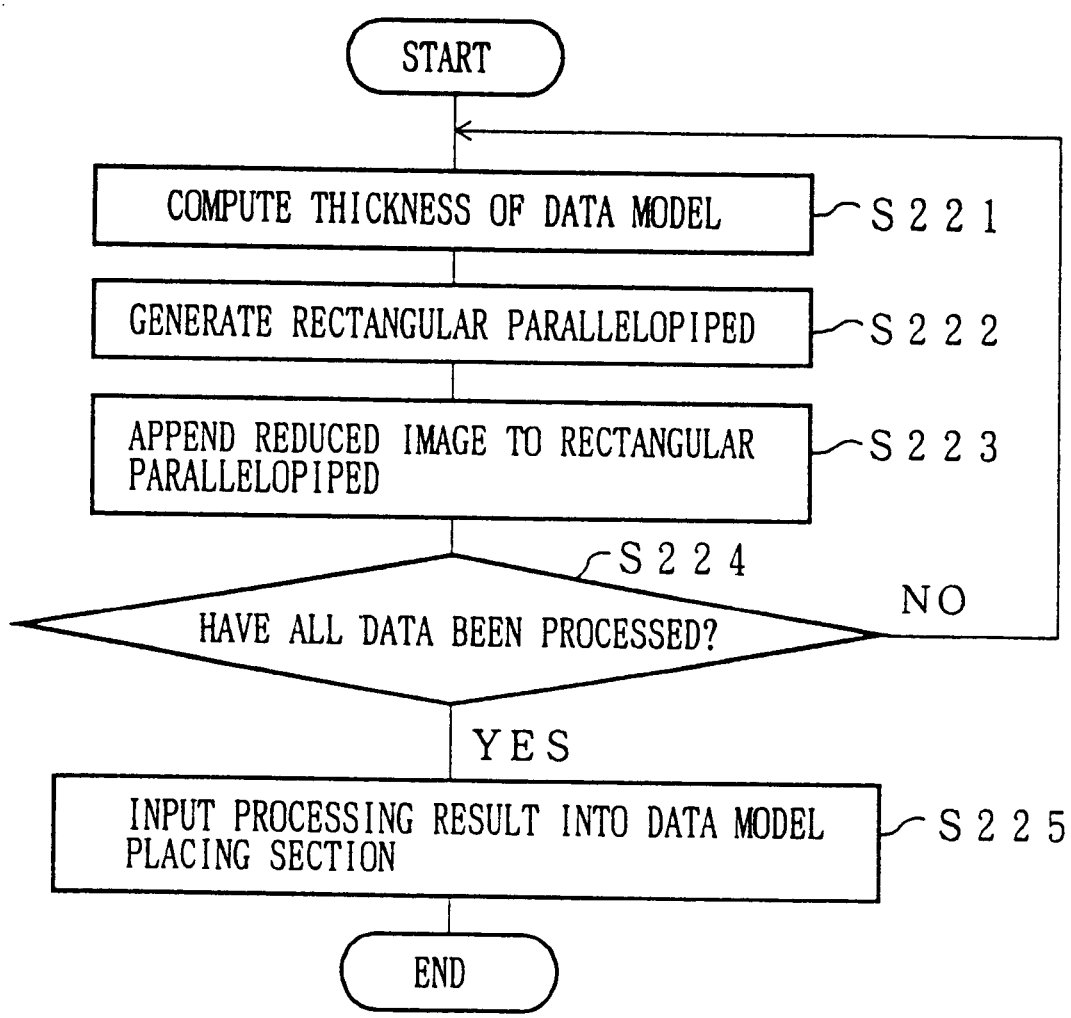
FIG. 60 is a flowchart detailing processing by a data model generating section.

Here, data model generation processing by the data model generating section 103 will be detailed with reference to the flowchart in FIG. 60.

Figure 61:
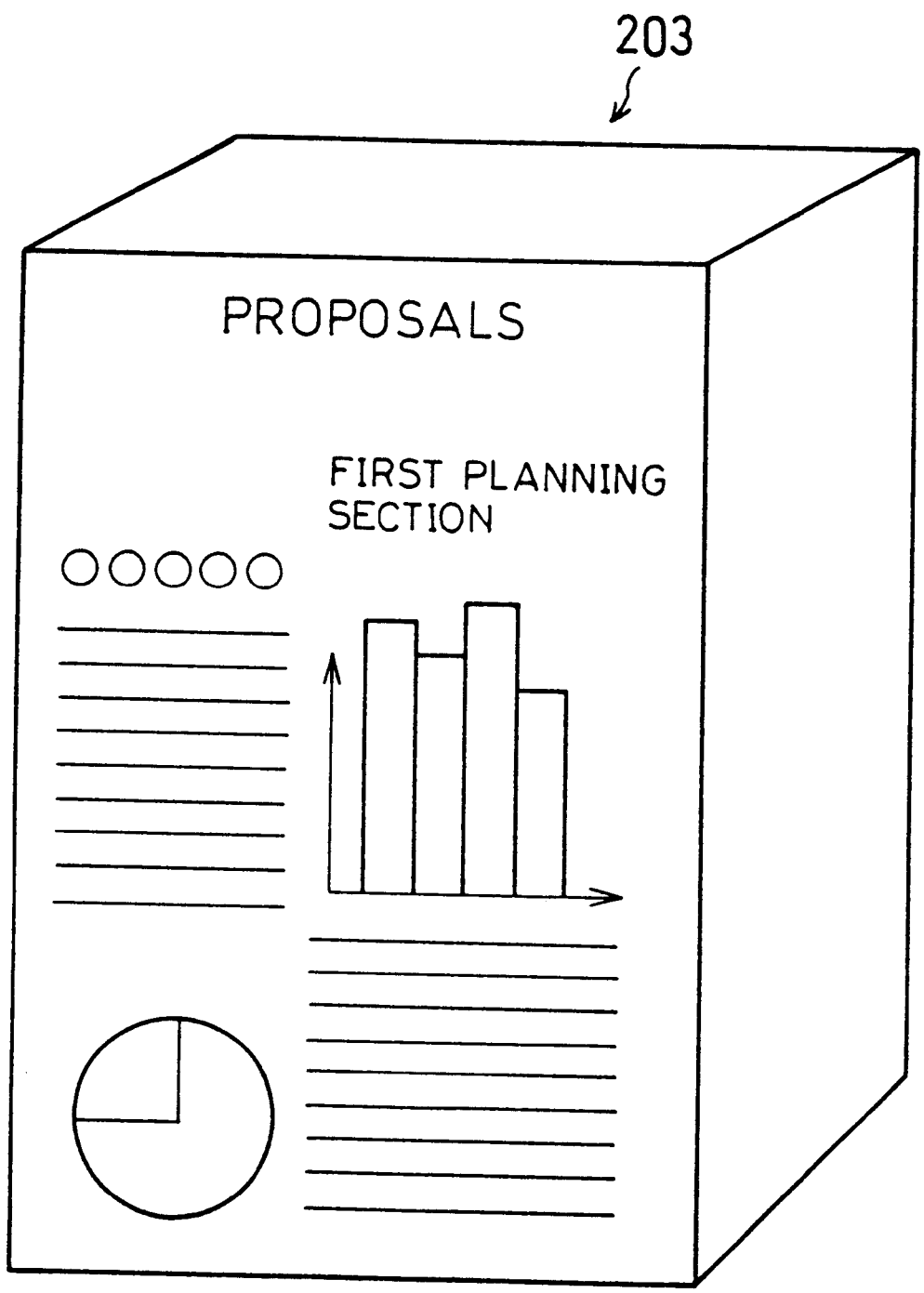
FIG. 61 is a perspective view showing an arrangement of a data model generated by the data model generating section.

To begin with, a thickness of the data model corresponding to the data size is computed for each data identifier in the data display information table inputted from the space managing section 110 (S221). Then, a rectangular parallelopiped having predetermined height and width, and the thickness computed in S221 is generated (S222). Here, the width is set smaller than Wc, which is the intervals among the categories in the space generating section 111. A reduced image of the corresponding data is appended to the front surface of the generated rectangular parallelopiped by the texture mapping technique or the like (S223). S221–S223 are repeated for all the data identifiers in the data display information table (S224). When all the data have been processed, the generated data model and data display information table are inputted into the data model placing section 106 (S225). FIG. 61 illustrates an example data model generated by the data model generating section 103.

The data model placing section 106 places the data model obtained by the data model generating section 103 on the 3-D coordinate space obtained by the space generating section 111.

Figure 62:
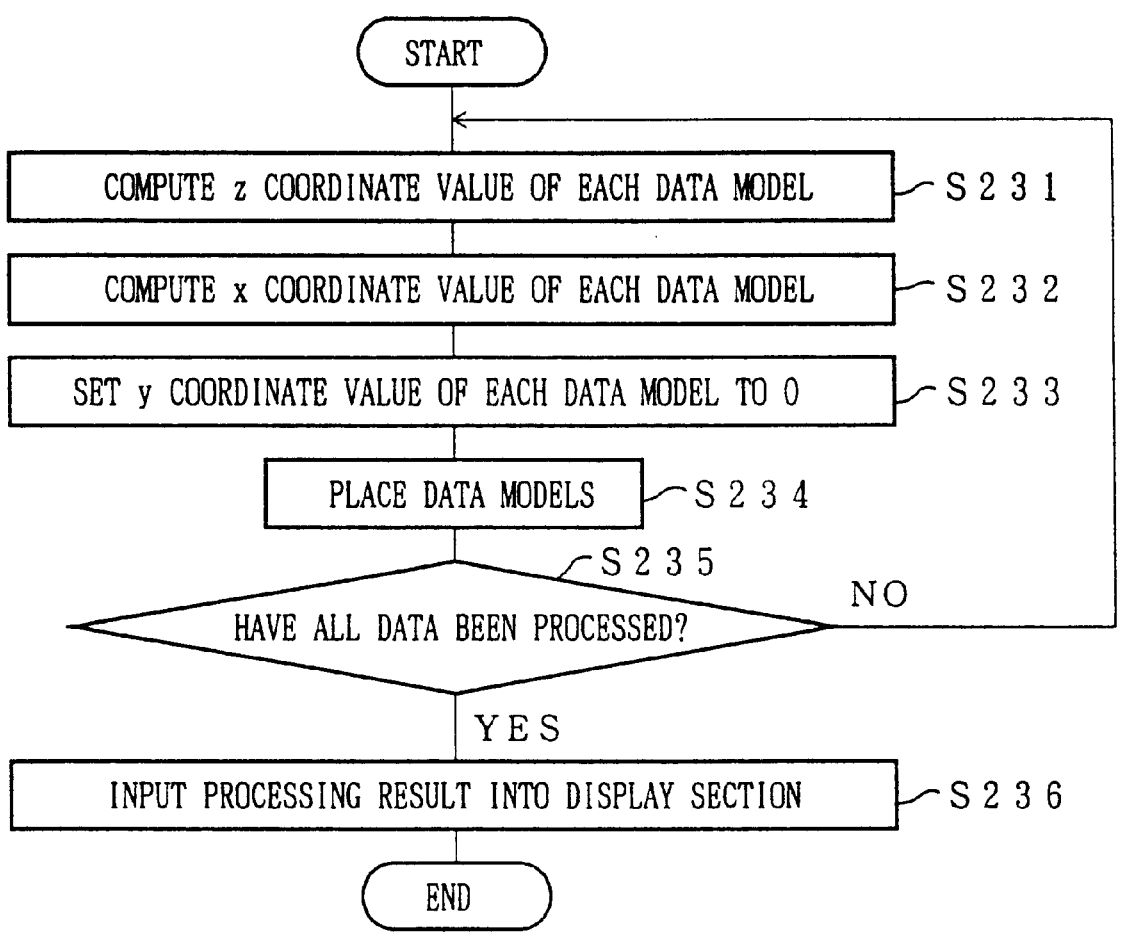
FIG. 62 is a flowchart detailing processing by a data model placing section.

Processing by the data model placing section 106 will be detailed with reference to the flowchart in FIG. 62.

To begin with, a coordinate value on the Z axis (time axis) is computed using the date of creation in the data display information table (S231). Then, a coordinate value on the X axis (category axis) is computed using the category identifier. When there is more than one category identifier, more than one X coordinate value is computed (S232). A coordinate value on the Y axis is set to 0 (S233). Based on the above coordinate values, the data model inputted from the data model generating section 103 is placed on the 3-D coordinate space generated by the space generating section 111. When there is more than one category identifier, the same data model is placed at more than one position (S234). S231–S234 are repeated for all the data (S235). When all the data have been placed, the result is inputted into the display section 107 (S236).

Figure 63:
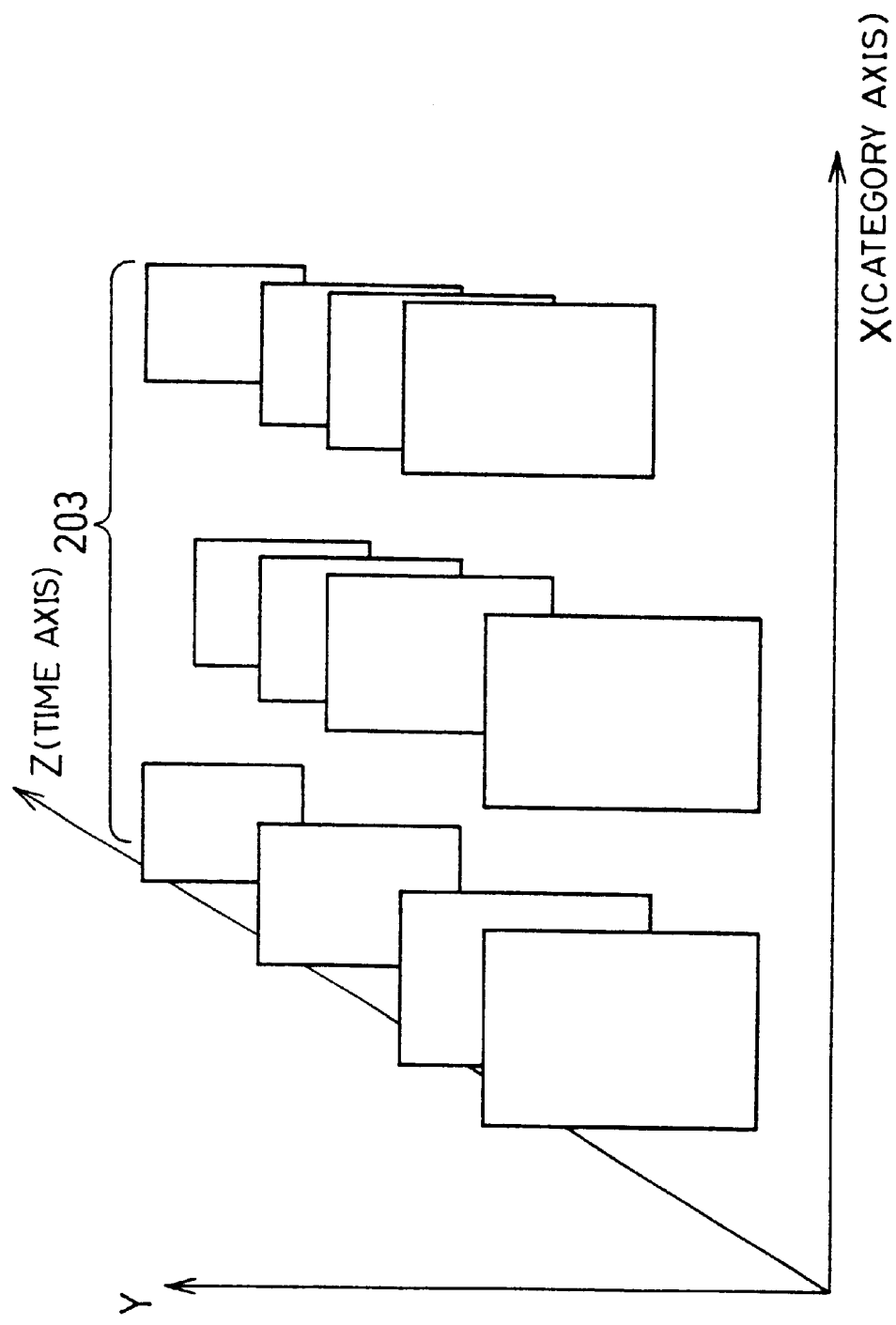
FIG. 63 is a view explaining a 3-D coordinate space displayed on the display device.

The view point changing section 109 sets a view point based on the view point information table inputted from the space managing section 110, and inputs the view point to the display section 107. The display section 107 displays the 3-D coordinate space on the screen based on the 3-D coordinate space inputted from the data model placing section 106 and the view point information inputted from the view point changing section 109. FIG. 63 is a view illustrating the 3-D coordinate space displayed on the display section 107 in the present embodiment, wherein the Z axis and X axis represent the time axis and category axis, respectively. These axes are not necessarily be displayed on the screen. Each data model 203 is placed on their respective positions in the matrix determined by the time axis and category axis in accordance with the time information and category information of the corresponding data. In other words, the data classified into the same category are aligned in parallel along the time axis.

When only the view point position is changed while leaving the display data intact at the input from the user, the space managing section 110 does not change the space display information table nor data display information table, and changes the view point information table alone, and inputs the updated view point information table into the view point changing section 109.

Next, example retrieval will be explained.

Assume that at least one keyword is appended to each item of the data and managed by the database.

As is shown in FIG. 64, the data display information table generated by the space managing section 110 includes at least one keyword assigned to each item of the data and a retrieval flag indicating whether the data in question are suitable for retrieval or not in addition to the data identifier, date of creation, data size, data format, category identifier(s), which are same as those included in the data display information table. The retrieval flag shows either "TRUE" or "FALSE". "TRUE" indicates that the data in question are suitable data for the retrieval, while "FALSE" indicates that the data in question are non-suitable data for the retrieval.

For example, the drawing shows the result when "KEY-WORD 1" is retrieved. Data A have "KEYWORD 1", and are suitable for the retrieval. Thus, the retrieval flag is set to "TRUE". Whereas data B do not have "KEYWORD 1", and are not suitable for the retrieval. Thus, the retrieval flag is set to "FALSE".

Besides the desired display information (display period, category, and view point), the user inputs retrieval information (keyword) through the input section 108.

Figure 58:
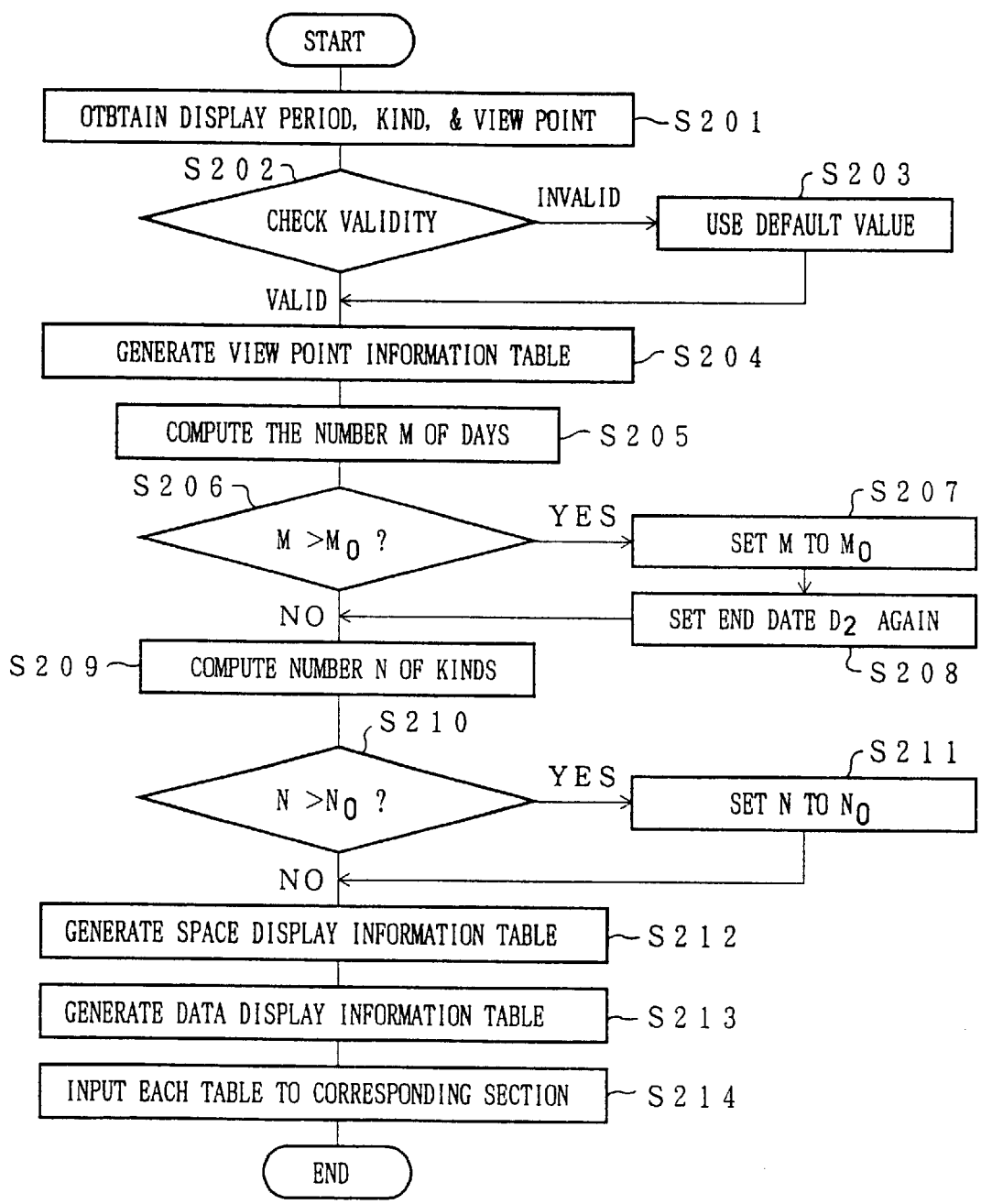
FIG. 58 is a flowchart detailing processing by a space managing section.

The space managing section 110 generates the space display information table and view point information table in accordance with the processing detailed by the flowchart in FIG. 58. Note that, however, in S213, the space managing section 110 accesses the database managing section 101 to obtain the data identifier, date of creation, data size, data format, category identifier of all the data that fall in the display period and match with the categories determined by the space display information table. Further, the space managing section 110 sets the retrieval flag of the data having the same keyword as the one inputted as the retrieval information to "TRUE", and sets the retrieval flag of the other kinds of data to "FALSE", whereby the data display information table as shown in FIG. 64 is generated.

The space generating section 111, data model generating section 103, and view point changing section 109 operate in the same manner as described above. The data model placing section 106 places the data models obtained by the data model generating section 103 on the 3-D coordinate space obtained by the space generating section 111.

Figure 65:
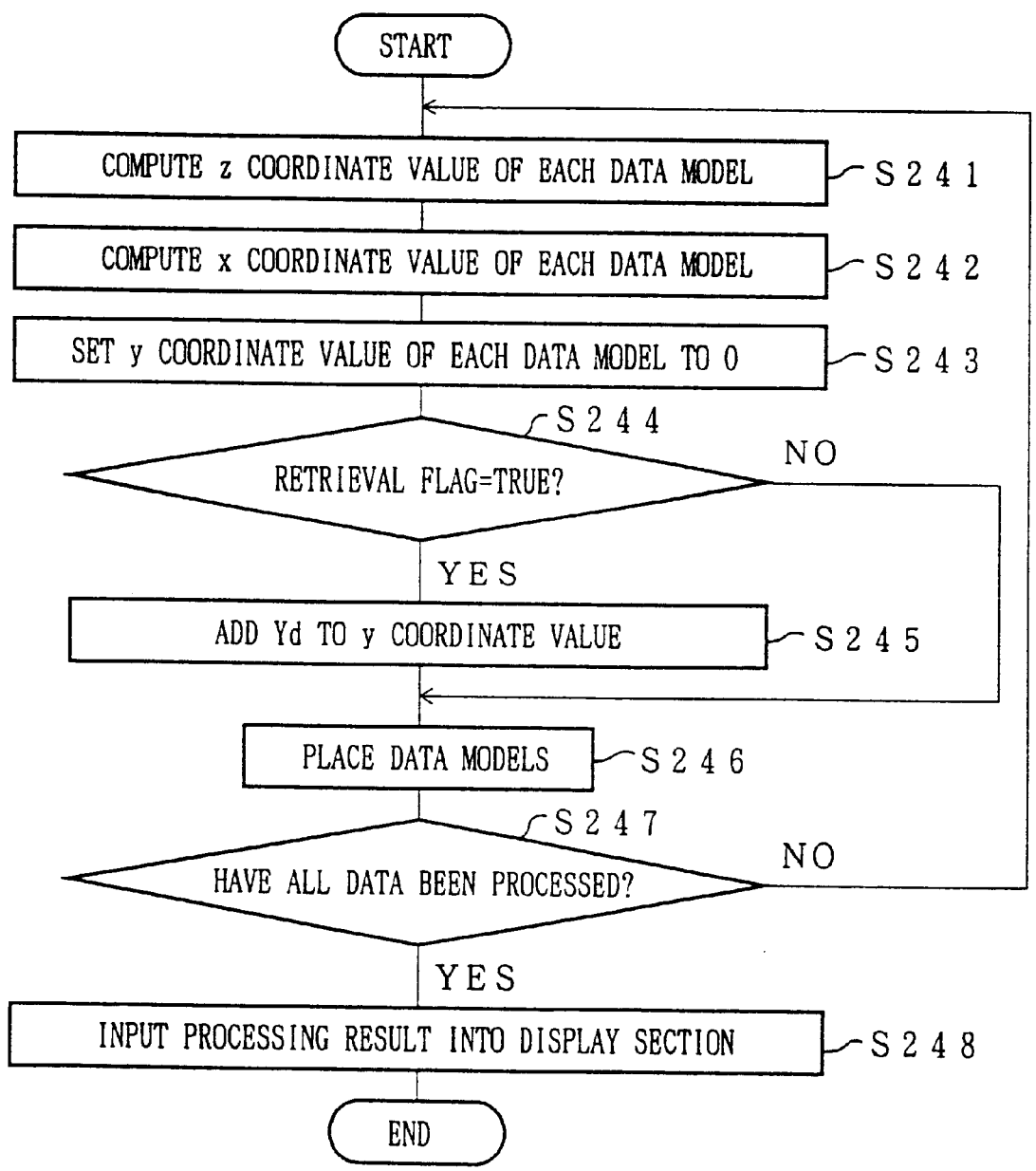
FIG. 65 is a flowchart detailing processing by the data model placing section.

Here, processing by the data model placing section 106 will be detailed with reference to the flowchart in FIG. 65.

To begin with, a coordinate value on the z axis (time axis) is computed from the date of creation in the data display information table in FIG. 64 (S241). Then, a coordinate value on the X axis is computed from the category identifier (S242). When there is more than one category identifier, more than one X coordinate value is computed. A coordinate value on the Y axis is set to 0 (S243). Whether the retrieval flag shows "TRUE" or not is checked (S244). In case of "TRUE", a predetermined value Yd is added to the Y coordinate value (S245). For example, given h as the longitudinal size of the data model, then Yd is 1.5×h. The data models inputted from the data model generating section 103 are placed on the 3-D coordinate space generated by the space generating section 111 based on the above coordinate values (S246). When there is more than one category identifier, the same data model is placed at more than one position. The data corresponding to the retrieval information are popped up by setting Yd. S241–S246 are repeated for all the data (S247). When all the data have been placed, the result is inputted into the display section 107 (S248). The view point changing section 109 and display section 107 operate in the same manner as described above.

Figure 66:
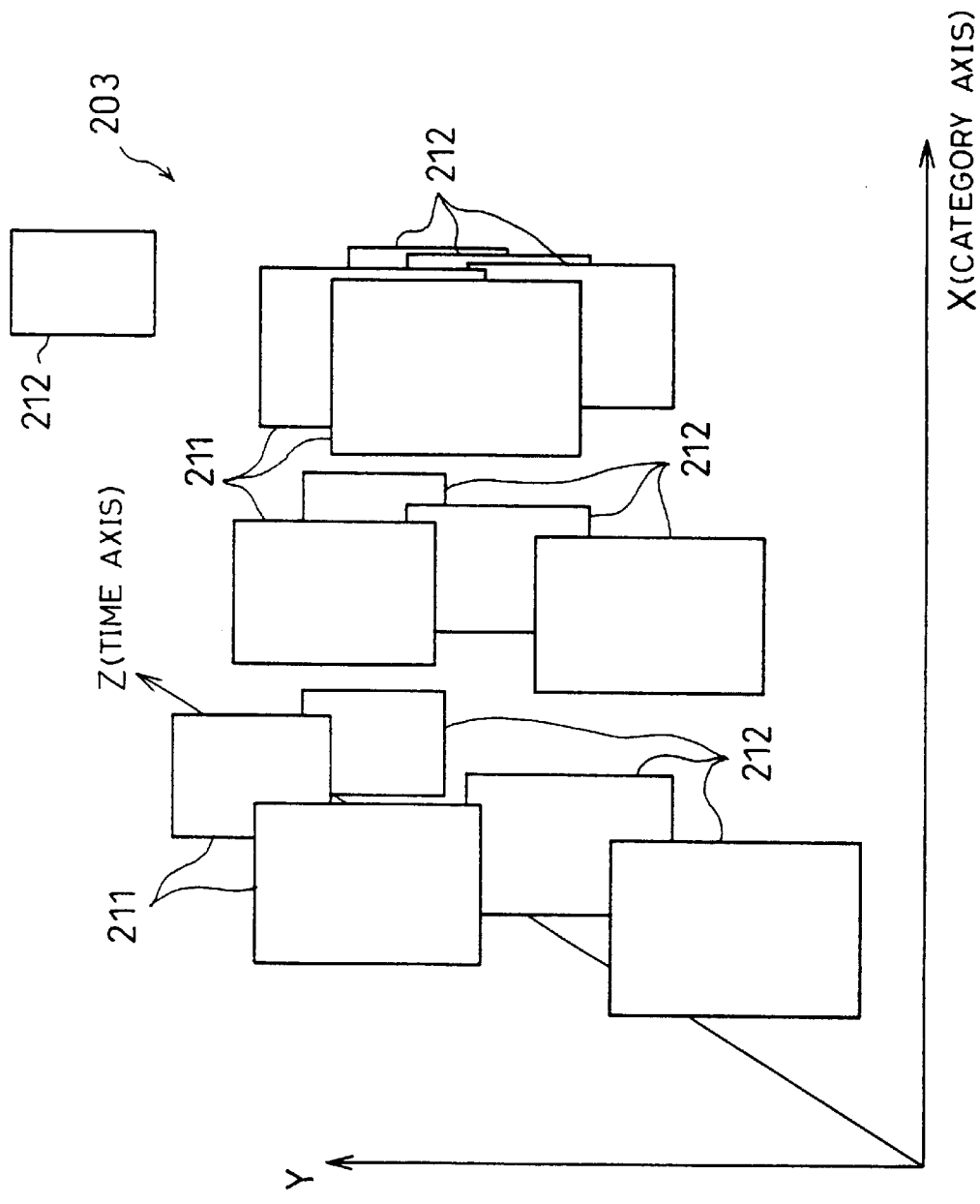
FIG. 66 is a view explaining a 3-D coordinate space displayed on the display device.

FIG. 66 is a view illustrating the 3-D coordinate space displayed on the display section 107 when the retrieval suitable data models are popped up. In other words, the Z axis and X axis represent the time axis and category axis, respectively, and retrieval suitable models 211 and retrieval non-suitable models 212 are shown. If a negative value is given to Yd in S245, the retrieval suitable data models are popped down. Also, if Yd is added when the retrieval flag shows "FALSE" instead of "TRUE" in S245, the retrieval non-suitable data models are popped up or down.

Embodiment 15

Figure 67:
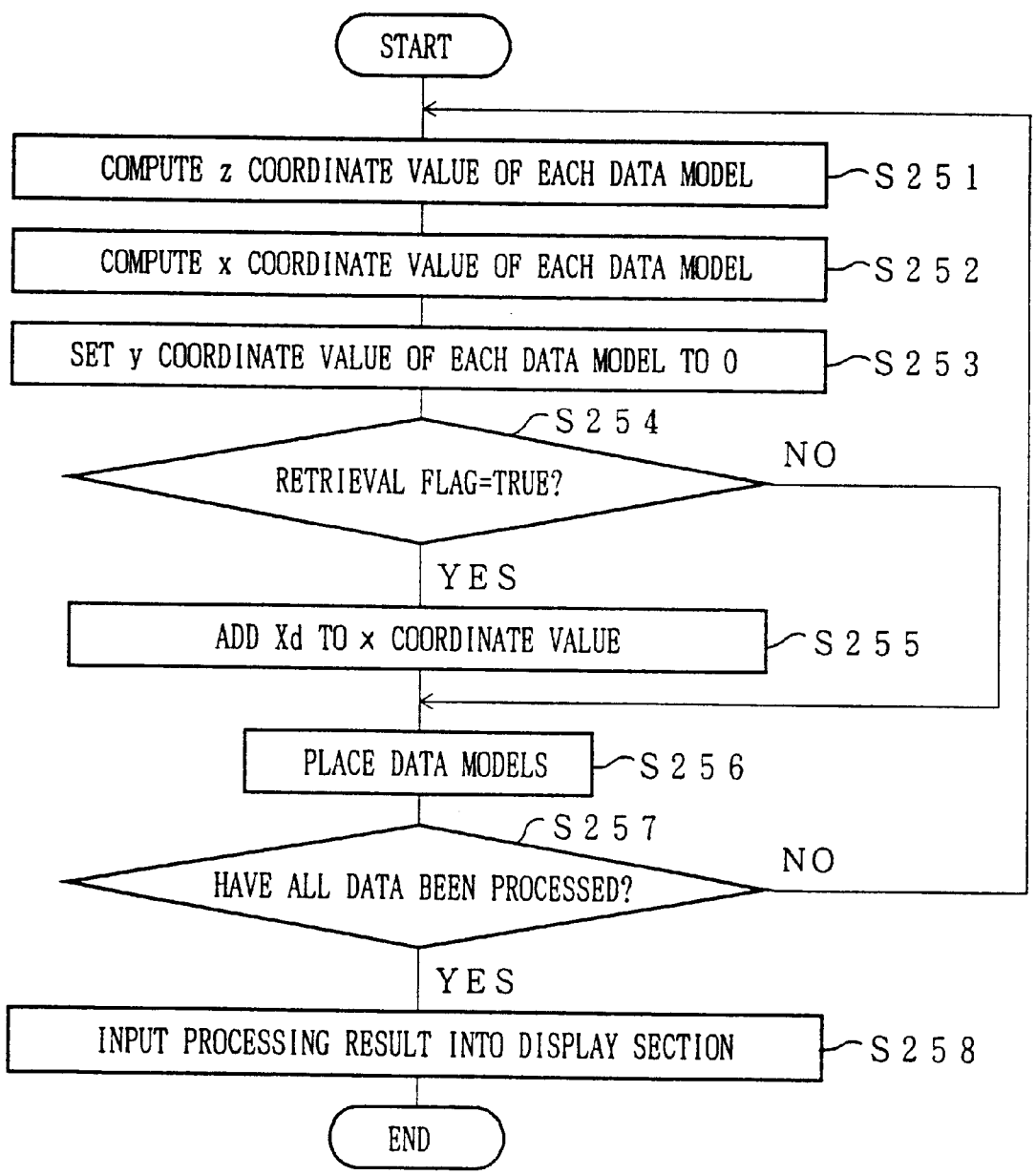
FIG. 67 is a flowchart detailing another processing of the data model placing section of the display device for the data display method of the present invention.
Figure 68:
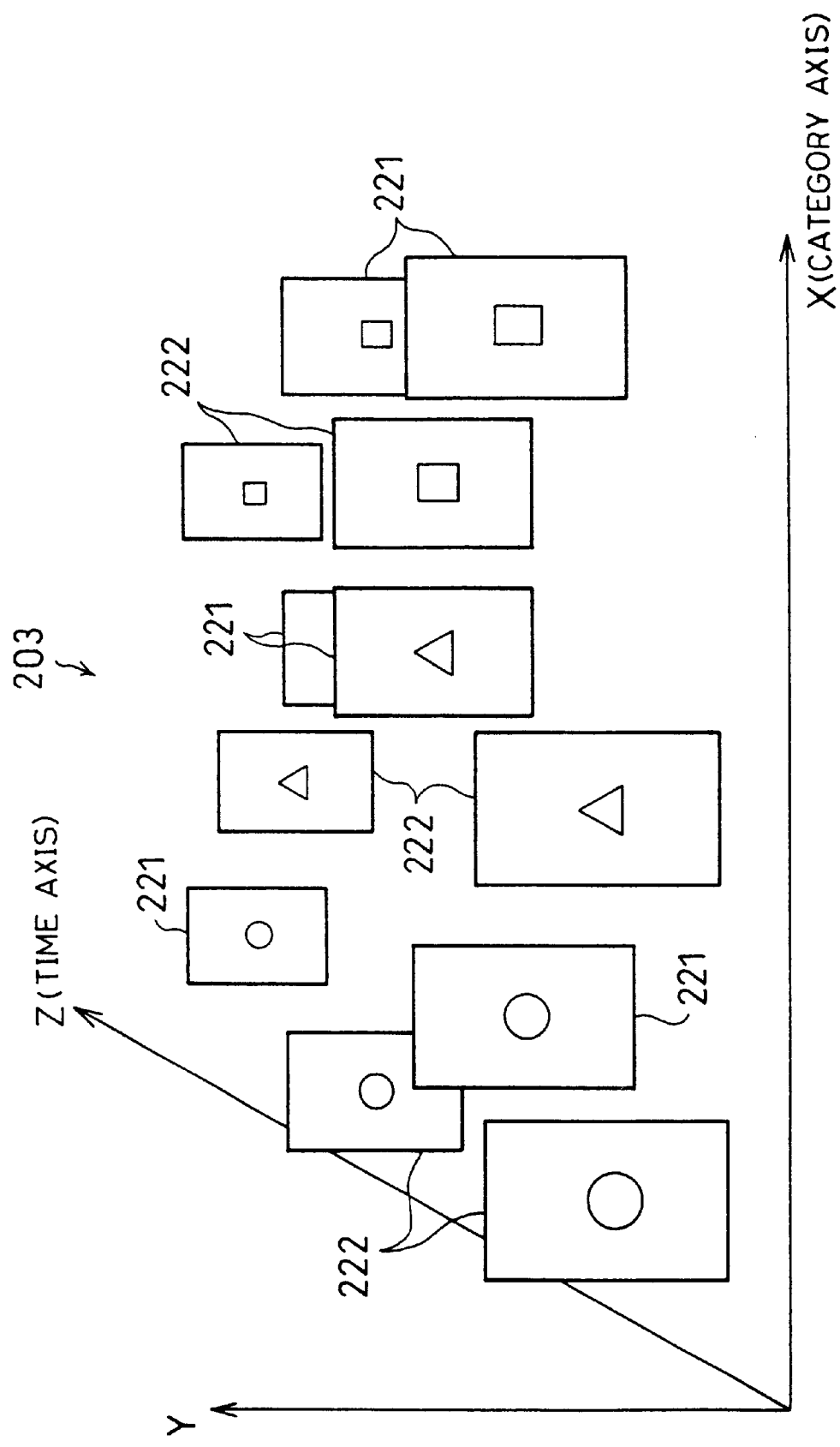
FIG. 68 is a view explaining a 3-D coordinate space displayed on the display device.

Referring to FIGS. 67 and 68, the following description will describe still another example embodiment of the present invention. Hereinafter, like components are labeled with like reference numerals with respect to above Embodiments, and the description of these components is not repeated for the explanation's convenience.

In the present embodiment, the operation is carried out in the same manner as Embodiment 14 except that the data model placing section 106 slides the retrieval suitable data models or retrieval non-suitable data models to the left or right instead of popping them up or down.

Processing of sliding the retrieval suitable data models will be detailed with reference to the flowchart in FIG. 67.

To begin with, a coordinate value on the Z axis (time axis) is computed from the date of creation in the data display information table (S251). Then, a coordinate value on the X axis is computed from the category identifier (S252). When there is more than one category identifier, more than one X coordinate value is computed. A coordinate value on the Y axis is set to 0 (S253). Whether a value of the retrieval flag is "TRUE" or not is checked (S254). In case of "TRUE", a predetermined value Xd (>0) is added to the X coordinate value (S255) The data models inputted from the data model generating section 103 are placed on the 3-D coordinate space generated by the space generating section 111 based on the above coordinate values. When there is more than one category identifier, the same data model is placed at more than one position. The data corresponding to the retrieval information are slid to the right by setting Xd (>0) (S256). S251–S256 are repeated for all the data (S257). When all the data have been placed, the result is inputted into the display section 107 (S258). The components other than the data model placing section 106 operate in the same manner as described above.

FIG. 68 shows the 3-D coordinate space displayed on the display section 107 in the present embodiment when the retrieval suitable data models are slid to the right. In other words, retrieval suitable data models 221 and retrieval non-suitable data models 222 are shown. If a negative value is given to Xd in S255, the retrieval suitable data models are slid to the left. If Xd is added when the retrieval flag shows "FALSE" in S255, the retrieval non-suitable data models are slid to the right or left.

Embodiment 16

Referring to FIGS. 69, 70, 128, and 129, the following description will describe still another example embodiment of the present invention. Hereinafter, like components are labeled with like reference numerals with respect to above Embodiments, and the description of these components is not repeated for the explanation's convenience.

In the present embodiment, the space generating section 111 generates a translucent space dividing plane (space dividing plate) between the pop-up retrieval suitable data models and the retrieval non-suitable data models obtained in Embodiment 14.

Figure 69:
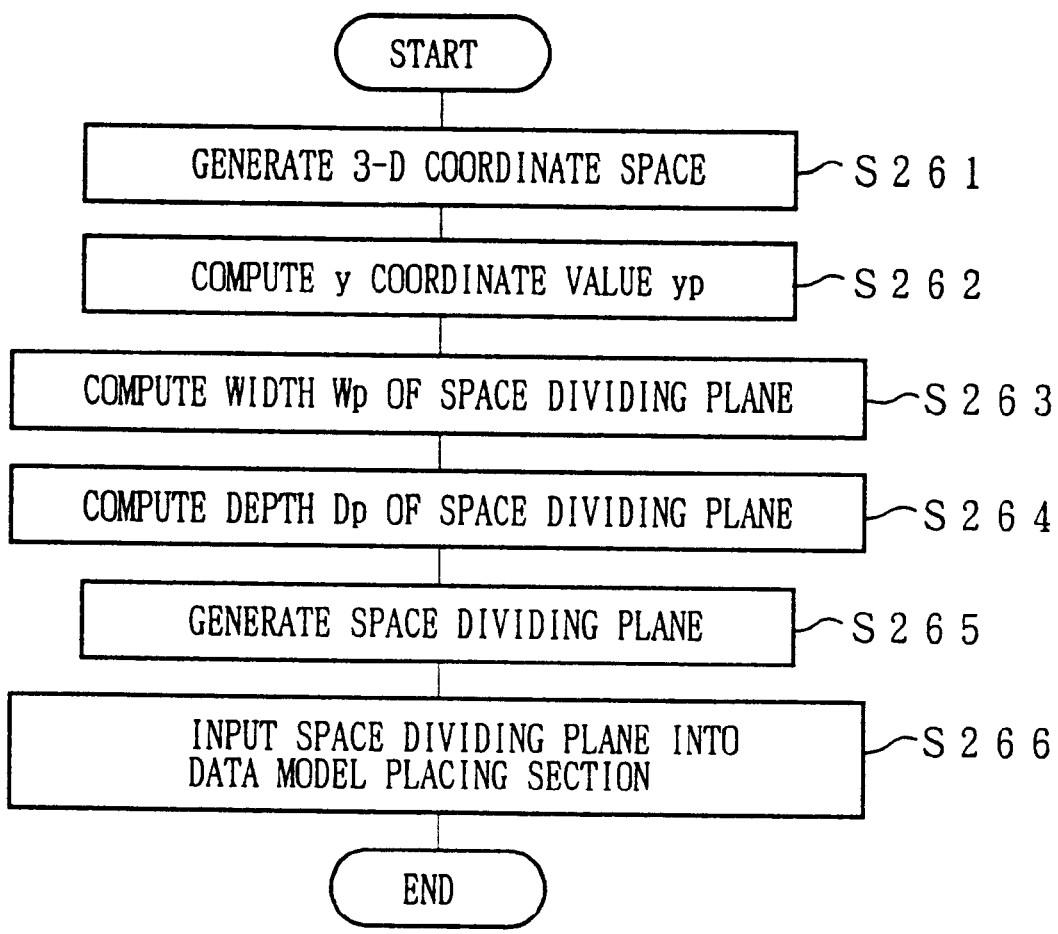
FIG. 69 is a flowchart detailing another processing by the space generating section of the display device for the data display method of the present invention.

The space dividing plane generation processing by the space generating section 111 will be detailed with reference to the flowchart in FIG. 69.

To begin with, a 3-D coordinate space is generated in the same manner as Embodiment 14 (S261). Then, a y coordinate value (yp) of the space dividing plane is computed. For example, yp=(Yd+h)/2, where h is a height of the data model generated by the data model generating section 103 and Yd is a height of the pop-up used by the data model placing section 106. Accordingly, the space dividing plane is provided in the middle between the pop-up data models and the data models which are not popped up (S262).

A width Wp of the space dividing plane is computed as Wp=$C_N$+Wc using $C_N$ and Wc used by the space generating section 111 (S263).

A depth Dp of the space dividing plane is computed as Dp=(end date)−(start date (origin)) (S264).

A translucent plane having four vertexes—(0, yp, 0), (Wp, yp, 0), (0, yp, Dp), (Wp, yp, Dp)—is generated by the α blending technique or the like (S265). Then, a 3-D coordinate space having provided therein the space dividing plane is inputted into the data model placing section 106 (S266).

Figure 70:
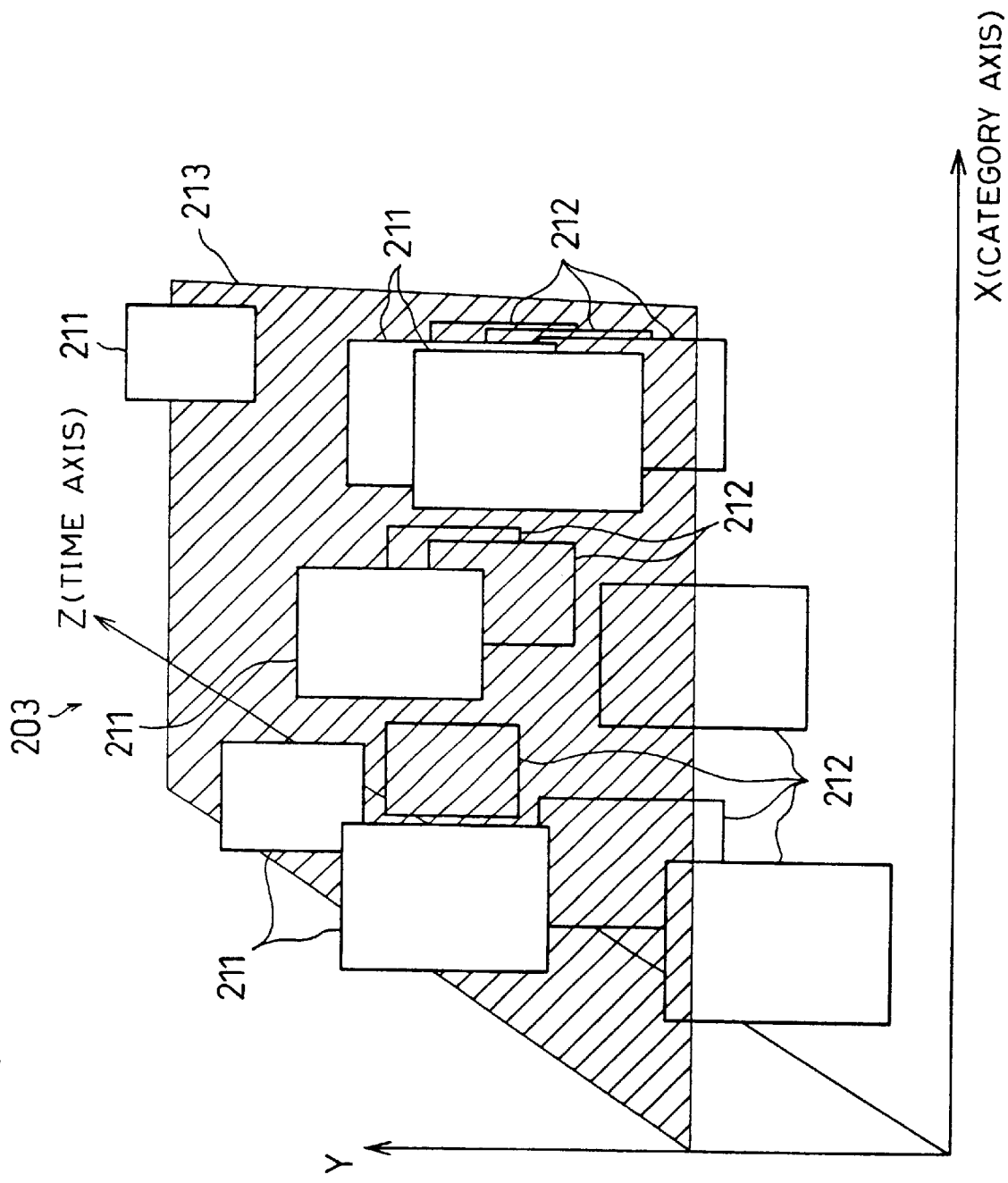
FIG. 70 is a view explaining a 3-D coordinate space displayed on the display device.

FIG. 70 is a view illustrating the 3-D coordinate space displayed on the display section 107 of the display device in the present embodiment when the retrieval suitable data models are popped up. In other words, the retrieval suitable data models 211, retrieval non-suitable data models 212, and a translucent space dividing plane 213 provided therebetween are shown.

Figure 128:
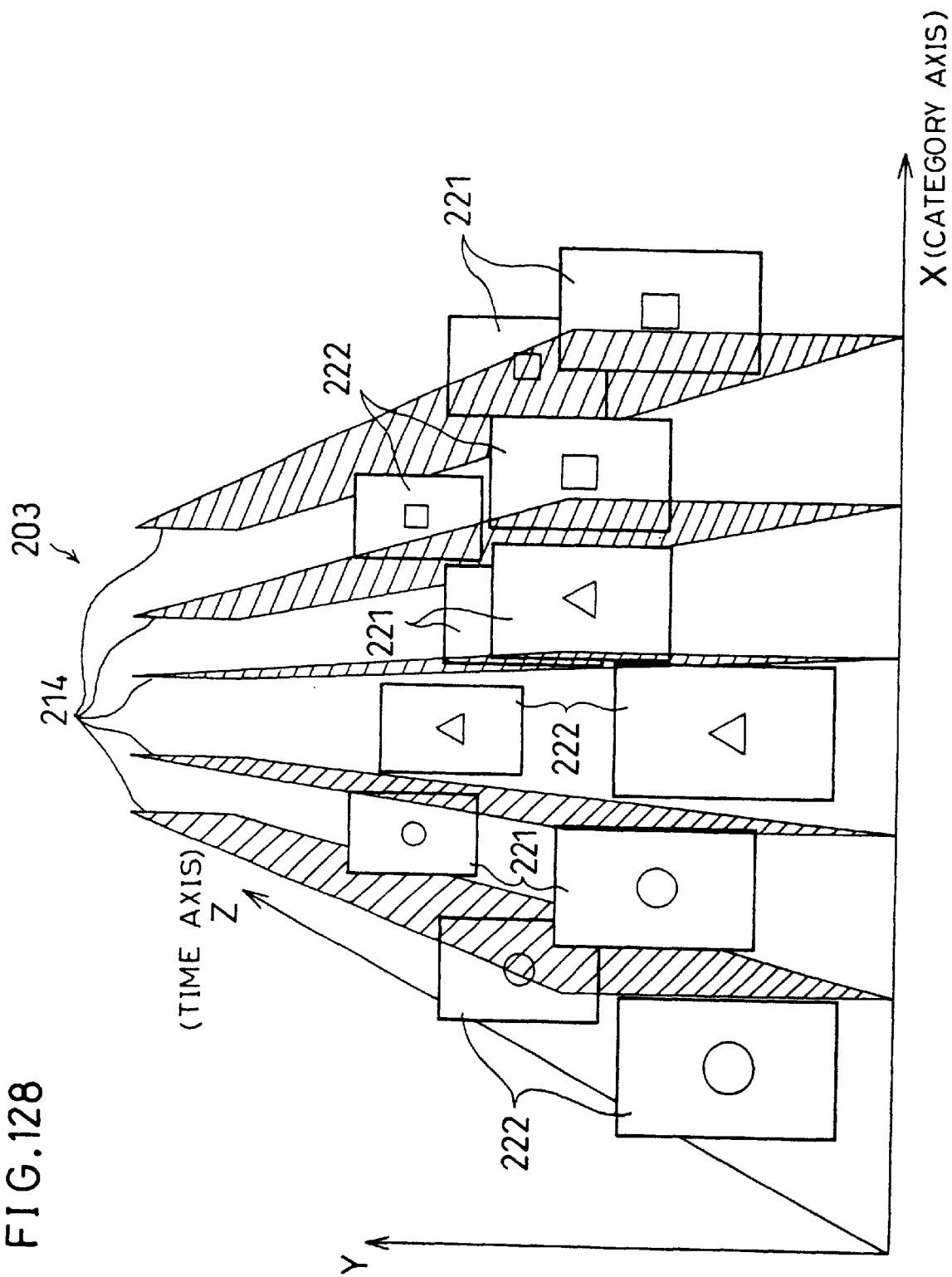
FIG. 128 is a view explaining a 3-D coordinate space displayed on the display device.

In Embodiment 15, a translucent space dividing plane (space dividing plate) 214 can be provided between the retrieval suitable data models 221 and retrieval non-suitable data models 222 slid to each other in the same manner as shown in FIG. 128. The position and width on the X axis of each of the retrieval non-suitable data models 222 and the retrieval suitable data models 221 shifted away from an array of the retrieval non-suitable data models 222 are computed, and a position on the X axis is determined in such a manner that the space dividing plane 214 do not intersect with an image of any data model, and the space dividing plane 214 is placed at the above position.

Figure 129:
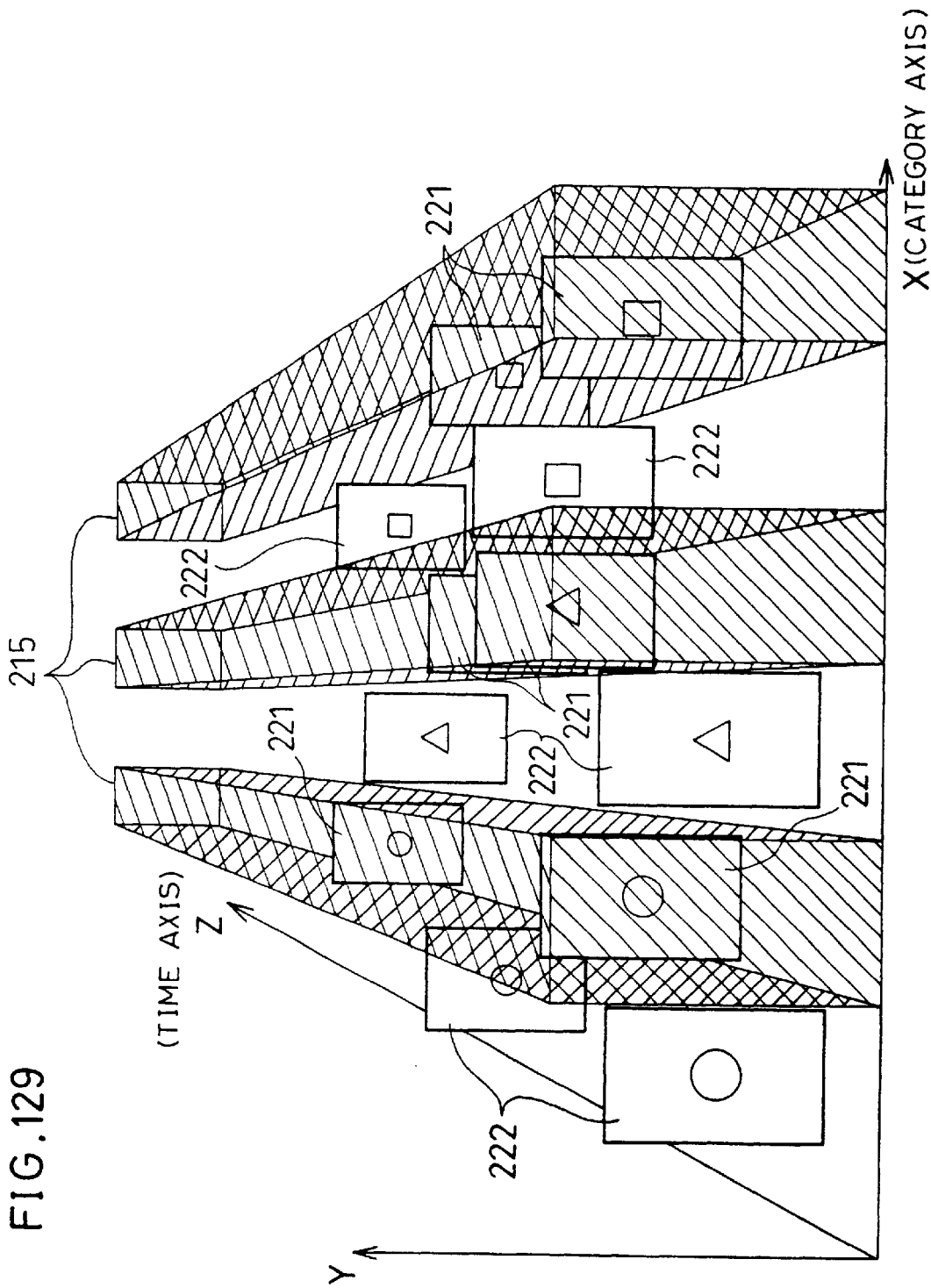
FIG. 129 is a view explaining a 3-D coordinate space displayed on the display device.

Also, as shown in FIG. 129, in Embodiments 14 and 15, a translucent cubic object 215 may be generated to enclose either the retrieval suitable data models 221 or retrieval non-suitable data models 222, whose array is shifted from the array of the others by being popped up/down or slid. In the drawing, an example where the data models are slid to each other is shown; however, the translucent cubic object 215 can be generated in the same manner when the data models are either popped up or down. Here, a rectangular parallelopiped is used as the cubic object 215, but the cubic object is not limited to the rectangular parallelopiped and other kinds of polyhedrons or spheres can be used as well. Also, in the drawing, all the retrieval suitable data models 221 are enclosed by a single cubic object 215; however, each retrieval suitable data model 221 can be enclosed in a similar cubic object separately.

Embodiment 17

Figure 71:
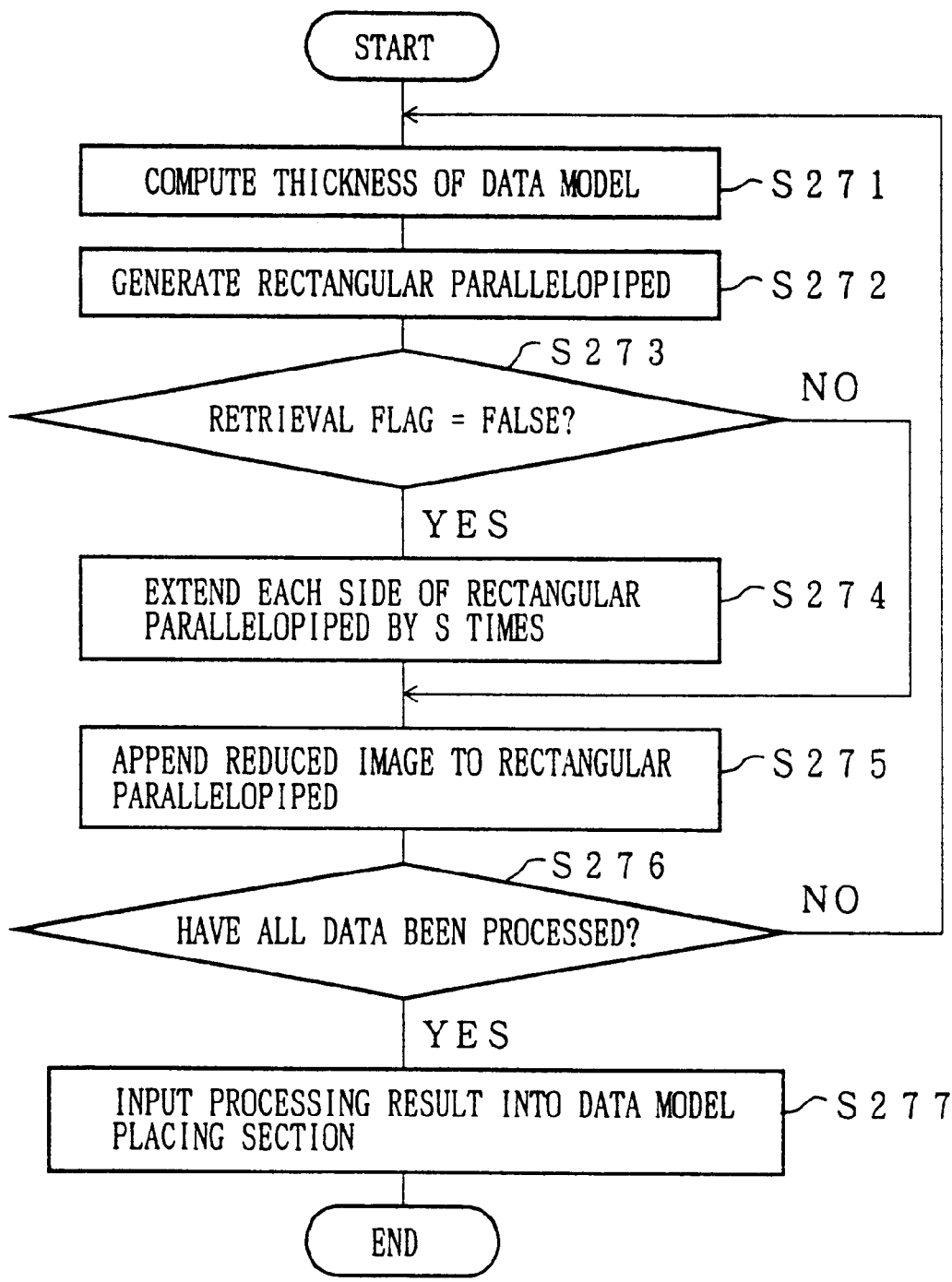
FIG. 71 is a flowchart detailing another processing by the data model generating section of the display device for the data display method of the present invention.
Figure 72:
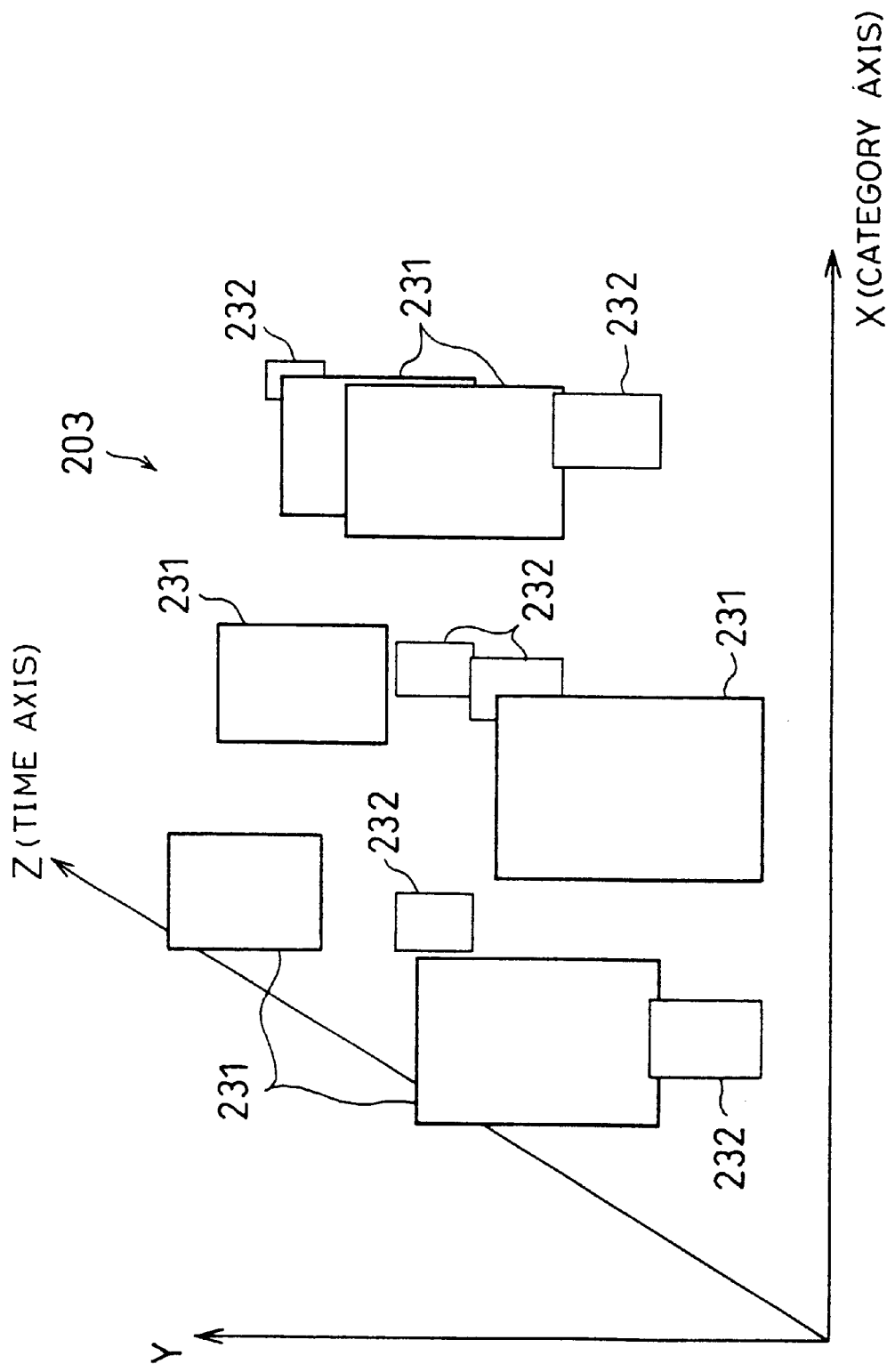
FIG. 72 is a view explaining a 3-D coordinate space displayed on the display device.

Referring to FIGS. 71 and 72, the following description will describe still another example embodiment of the present invention. Hereinafter, like components are labeled with like reference numerals with respect to above Embodiments, and the description of these components is not repeated for the explanation's convenience.

In the present embodiment, the operation is carried out in the same manner as Embodiment 14 except that the data model generating section 103 changes the size of the retrieval suitable data models or retrieval non-suitable data models instead of popping them up or down.

Processing by the data model generating section 103 to downsize the retrieval non-suitable data models will be detailed with reference to the flowchart in FIG. 71.

To begin with, a thickness of the data model corresponding to the data size of each item of the data in the data display information table inputted from the space managing section 110 is computed (S271). Then, a rectangular parallelopiped having predetermined height and width and the thickness computed in S271 is generated (S272). Then, whether the retrieval flag shows "FALSE" or not is checked (S273). In case of "FALSE", each side of the rectangular parallelopiped generated in S272 is extended by a predetermined factor of S (0<S<1) (S274). A reduced image of the corresponding data is appended to the front surface of the resulting rectangular parallelopiped by the texture mapping technique or the like (S275). S271–S275 are repeated for all the data identifiers in the data display information table (S276). When all the data have been processed, the generated data models are inputted into the data model placing section 106 (S277). The sections other than the data model generating section 103 operate in the same manner as described in Embodiment 14.

FIG. 72 shows a view illustrating the 3-D coordinate space displayed on the display section 107 in the present embodiment when the retrieval non-suitable data models are downsized. In other words, retrieval suitable data models 231 and retrieval non-suitable data models 232 are shown.

If S>1 in S274, the retrieval non-suitable data models are upsized. Also, if the rectangular parallelopiped is enlarged by S times when the retrieval flag shows "TRUE" in S274, the retrieval suitable data models are changed in size.

Embodiment 18

Figure 73:
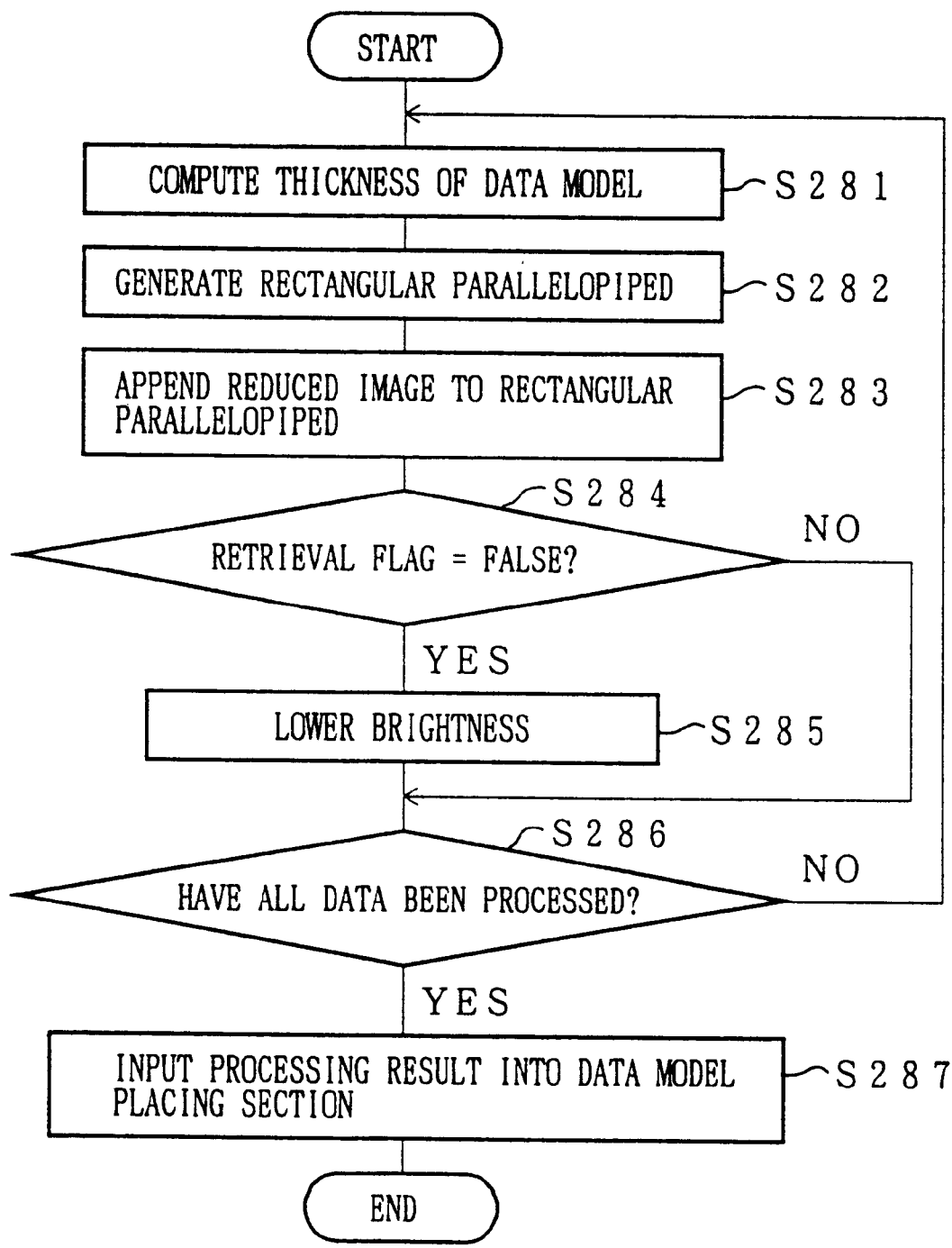
FIG. 73 is a flowchart detailing still another processing by the data model generating section of the display device for the data display method of the present invention.
Figure 74:
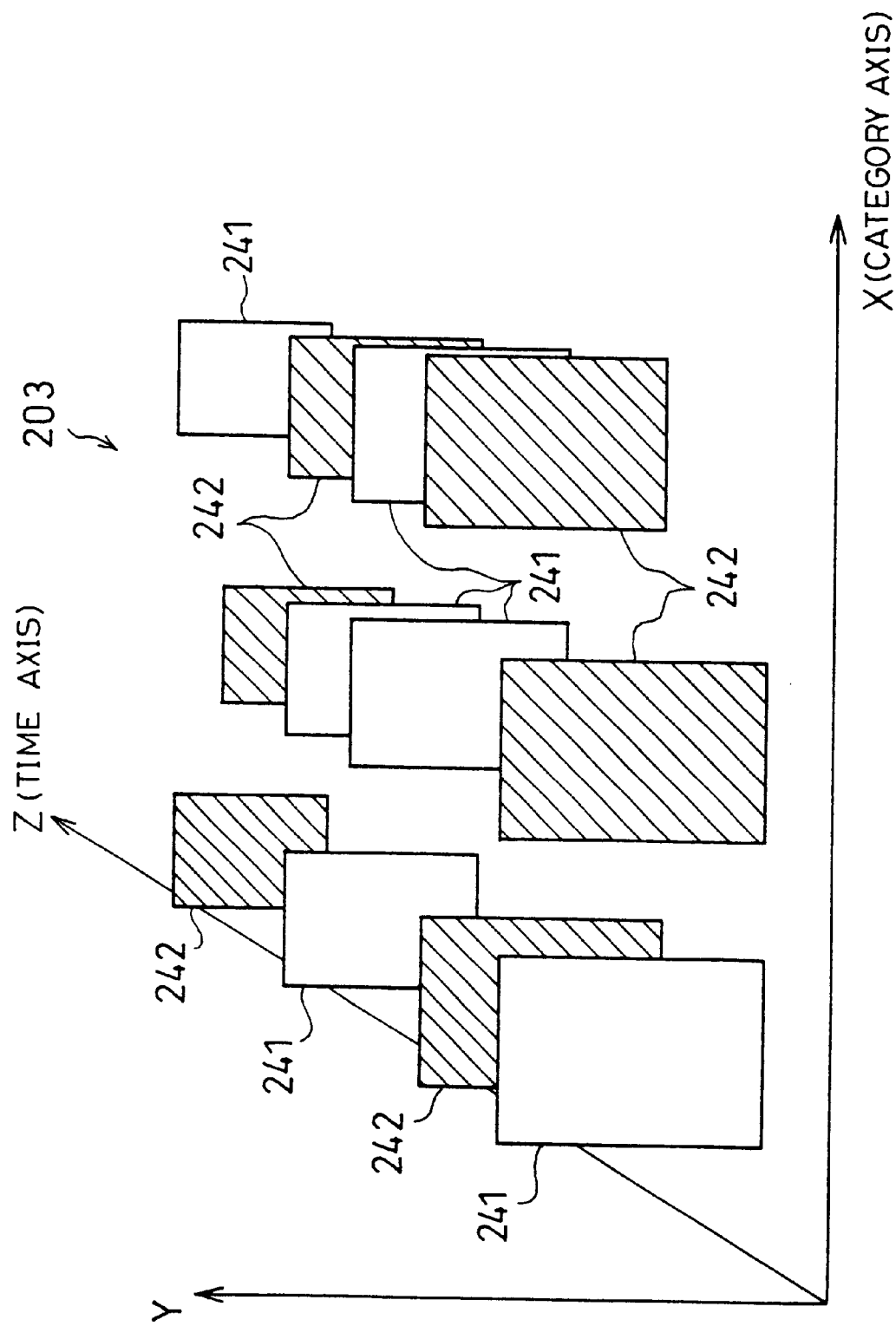
FIG. 74 is a view explaining a 3-D coordinate space displayed on the display device.

Referring to FIGS. 73 and 74, the following description will describe still another example embodiment of the present invention. Hereinafter, like components are labeled with like reference numerals with respect to above Embodiments, and the description of these components is not repeated for the explanation's convenience.

The operation is carried out in the same manner as Embodiment 14 except that the data model generating section 103 changes the brightness of the retrieval suitable data models or retrieval non-suitable data models instead of popping them up or down.

Processing by the data model generating section 103 to lower the brightness of the retrieval non-suitable data models will be detailed with reference to the flowchart in FIG. 73.

To begin with, a thickness of the data model corresponding to the data size of each item of the data in the data display information table inputted from the space managing section 110 is computed (S281). Then, a rectangular parallelopiped having predetermined height and width and the thickness computed in S281 is generated (S282). A reduced image of the corresponding data is appended to the front surface of the resulting rectangular parallelopiped by the texture mapping technique or the like (S283). Then, whether the retrieval flag shows "FALSE" or not is checked (S284). In case of "FALSE", the brightness of the rectangular parallelopiped generated in S282 and the texture appended to the same in S283 is lowered (S285). S281–S285 are repeated for all the data identifiers in the data display information table (S286). When all the data have been processed, the generated data models are inputted into the data model placing section 106 (S287). The sections other than the data model generating section 103 operate in the same manner as described in Embodiment 14.

FIG. 74 is a view illustrating the 3-D coordinate space displayed on the display section 107 in the present embodiment when the brightness of the retrieval non-suitable data models is lowered, and retrieval suitable data models 241 and retrieval non-suitable data models 242 are shown.

The brightness may be increased in S285. If the brightness is changed when the retrieval flag shows "TRUE" in S285, the brightness of the retrieval suitable data models is changed.

Embodiment 19

Figure 75:
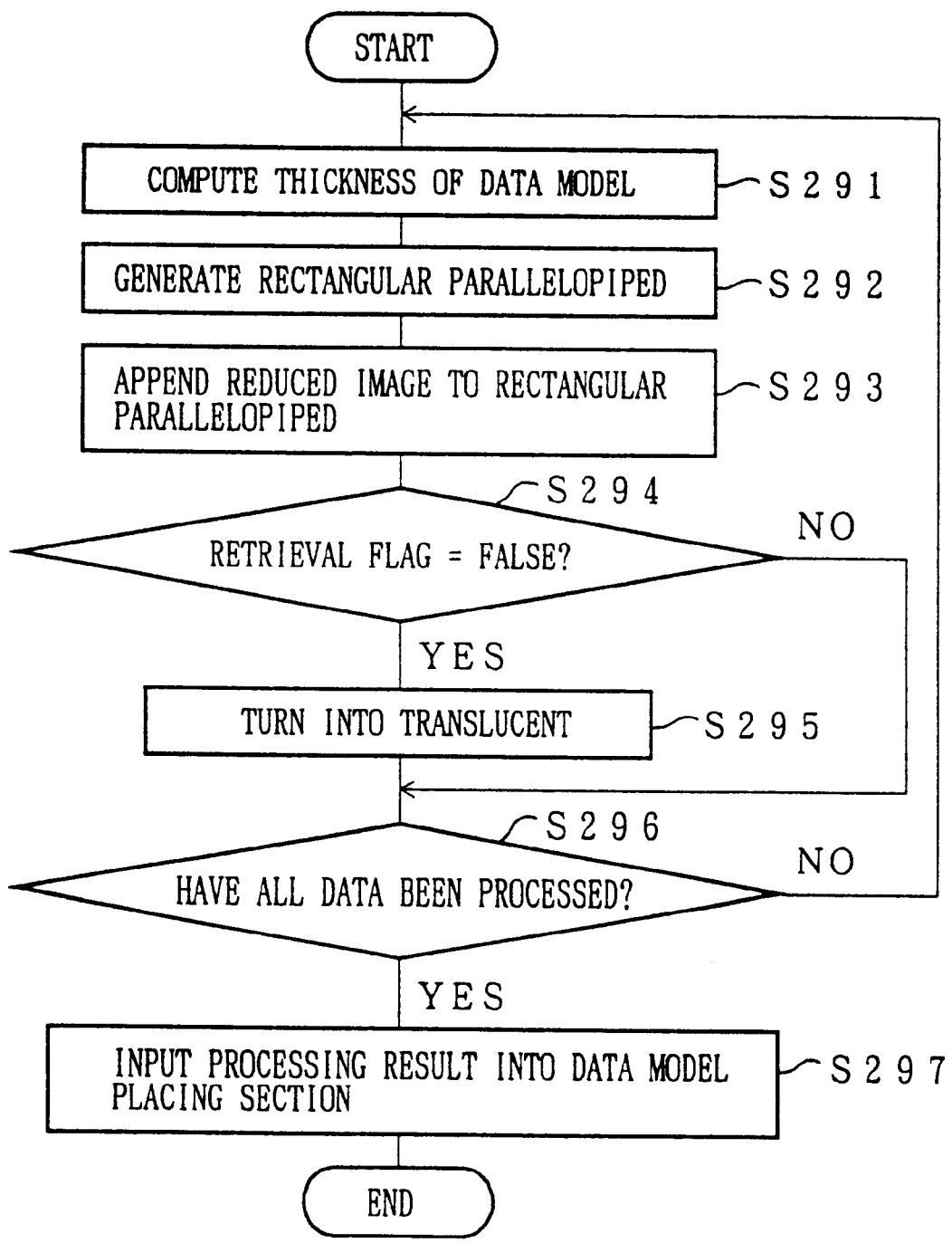
FIG. 75 is a flowchart detailing still another processing by the data model generating section of the display device for the data display method of the present invention.
Figure 76:
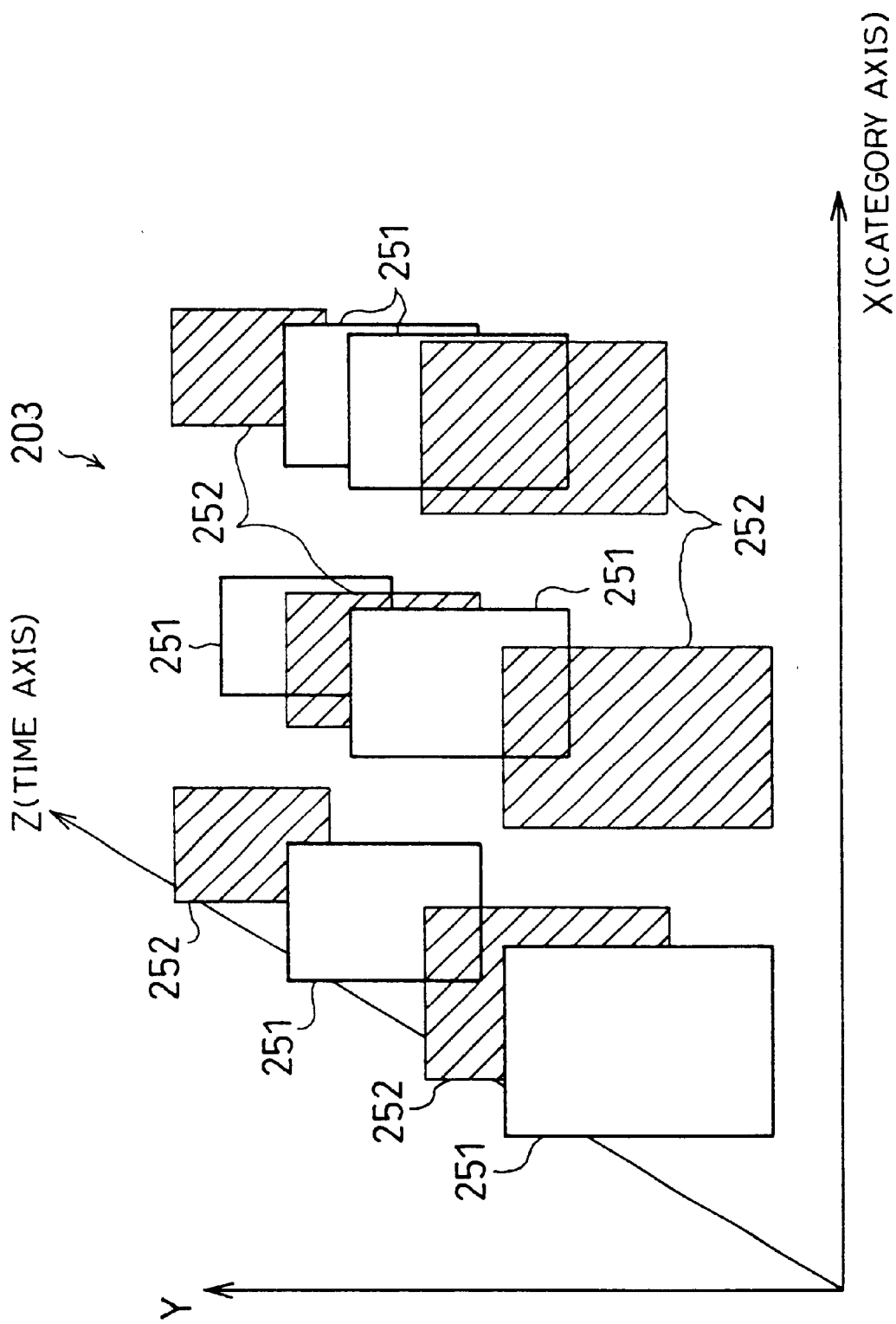
FIG. 76 is a view explaining a 3-D coordinate space displayed on the display device.

Referring to FIGS. 75 and 76, the following description will describe still another example embodiment of the present invention. Hereinafter, like components are labeled with like reference numerals with respect to above Embodiments, and the description of these components is not repeated for the explanation's convenience.

The operation is carried out in the same manner as Embodiment 14 except that the data model generating section 103 turns the retrieval suitable data models or retrieval non-suitable data models into translucent instead of popping them up or down.

Processing by the data model generating section 103 to turn the retrieval non-suitable data models into translucent will be detailed with reference to the flowchart in FIG. 75.

To begin with, a thickness of the data model corresponding to the data size of each item of the data in the data display information table inputted from the space managing section 110 is computed (S291). Then, a rectangular parallelopiped having predetermined height and width and the thickness computed in S291 is generated (S292). A reduced image of the corresponding data is appended to the front surface of the resulting rectangular parallelopiped by the texture mapping technique or the like (S293). Then, whether the retrieval flag shows "FALSE" or not is checked (S294). In case of "FALSE", the rectangular parallelopiped generated in S292 and the texture appended to the same in S293 are turned into translucent using the α blending technique or the like (S295). S291–S295 are repeated for all the data identifiers in the data display information table (S296). When all the data have been processed, the generated data models are inputted into the data model placing section 106 (S297). The sections other than the data model generating section 103 operate in the same manner as described in Embodiment 14.

FIG. 76 is a view illustrating the 3-D coordinate space displayed on the display section 107 in the present embodiment when the retrieval non-suitable data models are turned into translucent. Retrieval suitable data models 251 and retrieval non-suitable data models 252 are shown. If the data models are turned into translucent when the retrieval flag shows "TRUE" in S295, the retrieval suitable data models are turned into translucent.

Embodiment 20

Figure 77:
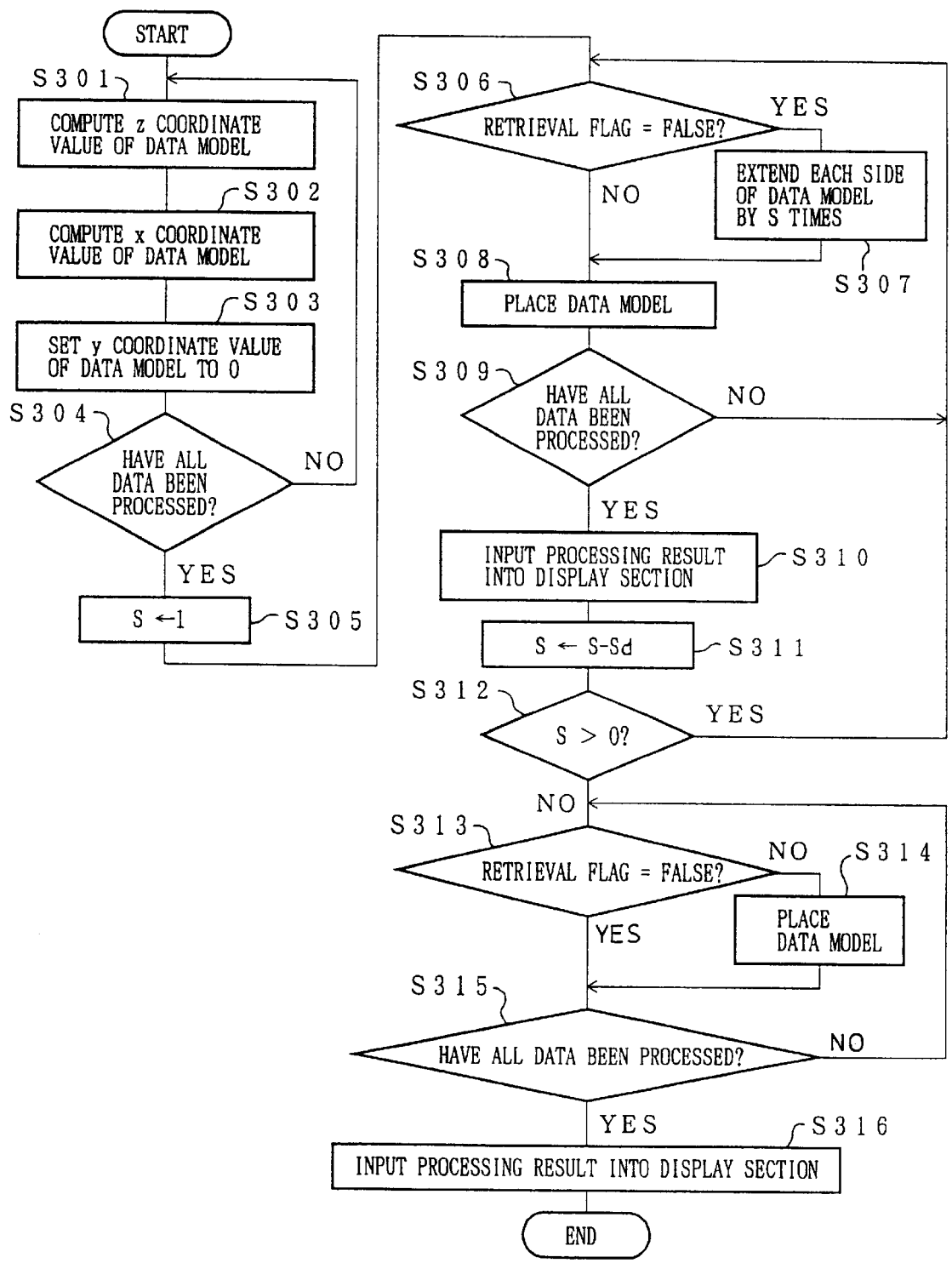
FIG. 77 is a flowchart detailing still another processing by the data model placing section and a display section of the display device for the data display method of the present invention.
Figure 78:
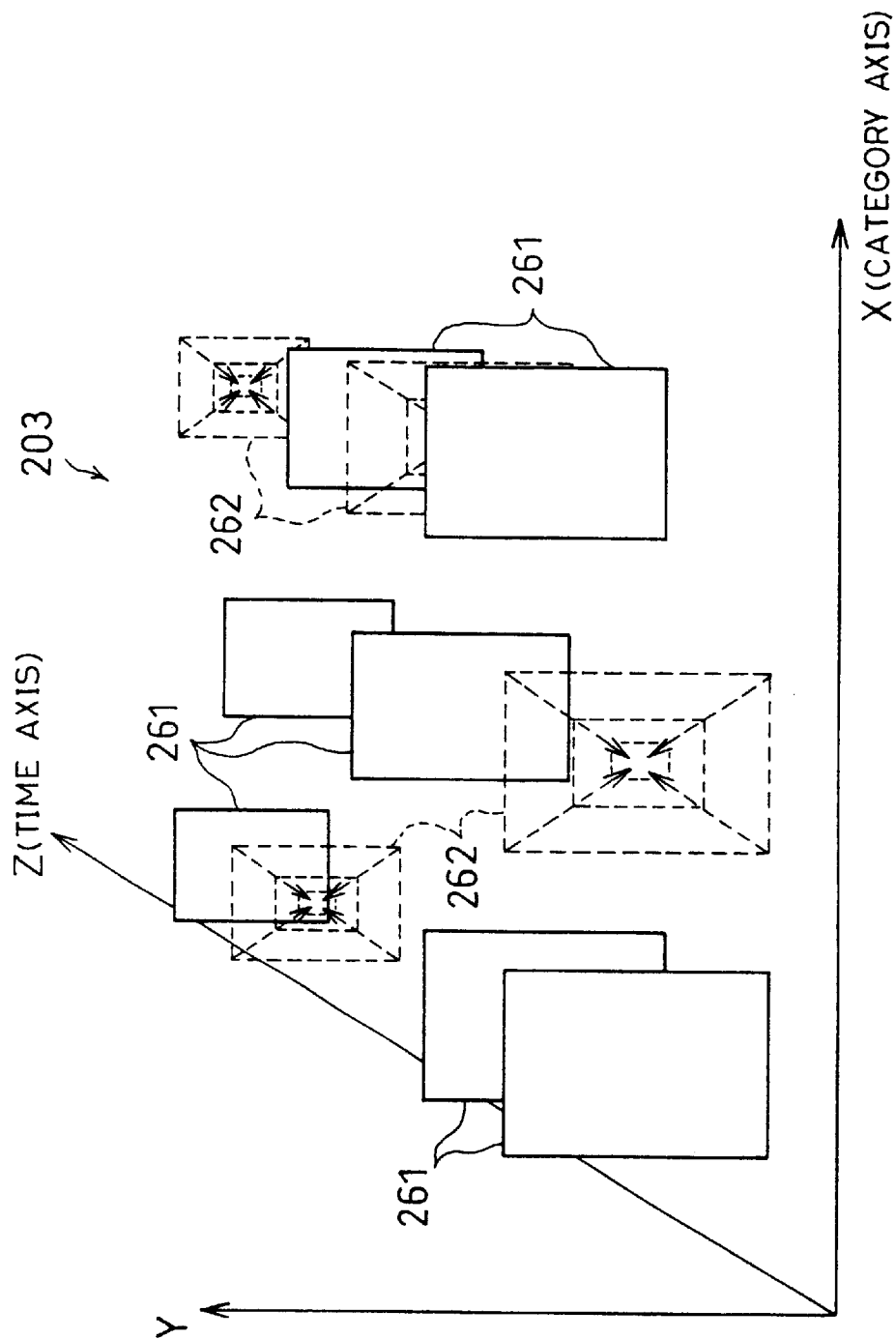
FIG. 78 is a view explaining a 3-D coordinate space displayed on the display device.

Referring to FIGS. 77 and 78, the following description will describe still another example embodiment of the present invention. Hereinafter, like components are labeled with like reference numerals with respect to above Embodiments, and the description of these components is not repeated for the explanation's convenience.

The operation is carried out in the same manner as Embodiment 14 except that the data model placing section 106 gradually downsizes the retrieval suitable data models or retrieval non-suitable data models until they become invisible instead of popping them up or down.

Processing by the data model placing section 106 and display section 107 will be detailed with reference to the flowchart in FIG. 77. The other sections operate in the same manner as described in Embodiment 14.

To begin with, a coordinate value on the Z axis (time axis) is computed using the date of creation in the data display information table (S301). Then, a coordinate value on the X axis (category axis) is computed using the category identifier (S302). A coordinate value on the Y axis is set to 0 (S303). S301–S303 are repeated for all the data (S304). S=1 is set (S305). Whether the retrieval flag shows "FALSE" or not is checked (S306). In case of "FALSE", each side of the data model of a rectangular parallelopiped generated by the data model generating section 103 is extended by S times (S307). The data models are placed on the 3-D coordinate space based on the coordinate values obtained in S301–S304 (S308). S306–S308 are repeated for all the data (5309). When all the data have been processed, the generated data models are inputted into the display section 107 (S310). The display section 107 operates in the same manner as described in Embodiment 14.

S is set to S-Sd (0<Sd<1) (S311). When S is greater than 0, S306–S311 are repeated (S312). Whether the retrieval flag shows "FALSE" or not is checked (S313).

When S is 0 or smaller and the retrieval flag does not show "FALSE", the data models are placed on the 3-D space based on the coordinate values obtained in S301–S304. In other words, the retrieval non-suitable data models are not placed (S314). S313 and S314 are repeated for all the data (S315). When all the data have been processed, the result is inputted into the display section 107 (S316). The display section 107 displays the received data in the same manner as described in Embodiment 14.

FIG. 78 is a view illustrating the 3-D coordinate space displayed on the display section 107 in the present embodiment when the retrieval non-suitable data models are gradually downsized until they become invisible. Retrieval suitable data models 261 and retrieval non-suitable data models 262 are shown.

If "FALSE" is replaced with "TRUE" in S306 and S313, the retrieval suitable data models are downsized gradually until they become invisible.

Embodiment 21

Referring to FIG. 77, the following description will describe still another example embodiment of the present invention. Hereinafter, like components are labeled with like reference numerals with respect to above Embodiments, and the description of these components is not repeated for the explanation's convenience.

Assume that S used in Embodiment 20 represents transparency: S=0 means transparent, 0<S<1 means translucent, and S=1 means opaque. Then, if S is used as the transparency of the data models processed in S307 in the flowchart in FIG. 77, the retrieval non-suitable data models are gradually turned into transparent until they become invisible.

Like in Embodiment 20, if "FALSE" is replaced with "TRUE" in S306 and S313, the retrieval suitable data models are gradually turned into transparent until they become invisible.

Embodiment 22

Referring to FIG. 77, the following description will describe still another example embodiment of the present invention. Hereinafter, like components are labeled with like reference numerals with respect to above Embodiments, and the description of these components is not repeated for the explanation's convenience.

Assume that S used in Embodiment 20 represents brightness: S=0 means that the data models are displayed in black, 0 <S<1 means that the data models are displayed in a darker color, and S=1 means the data models are displayed in an original color. Then, if S is used as the brightness of the data models processed by the α blending technique or the like in S307 in the flowchart in FIG. 77, the retrieval non-suitable data models become gradually darker until they become invisible.

Like in Embodiment 20, if "FALSE" is replaced with "TRUE" in S306 and S313, the retrieval suitable data models become darker until they become invisible.

Embodiment 23

Figure 79:
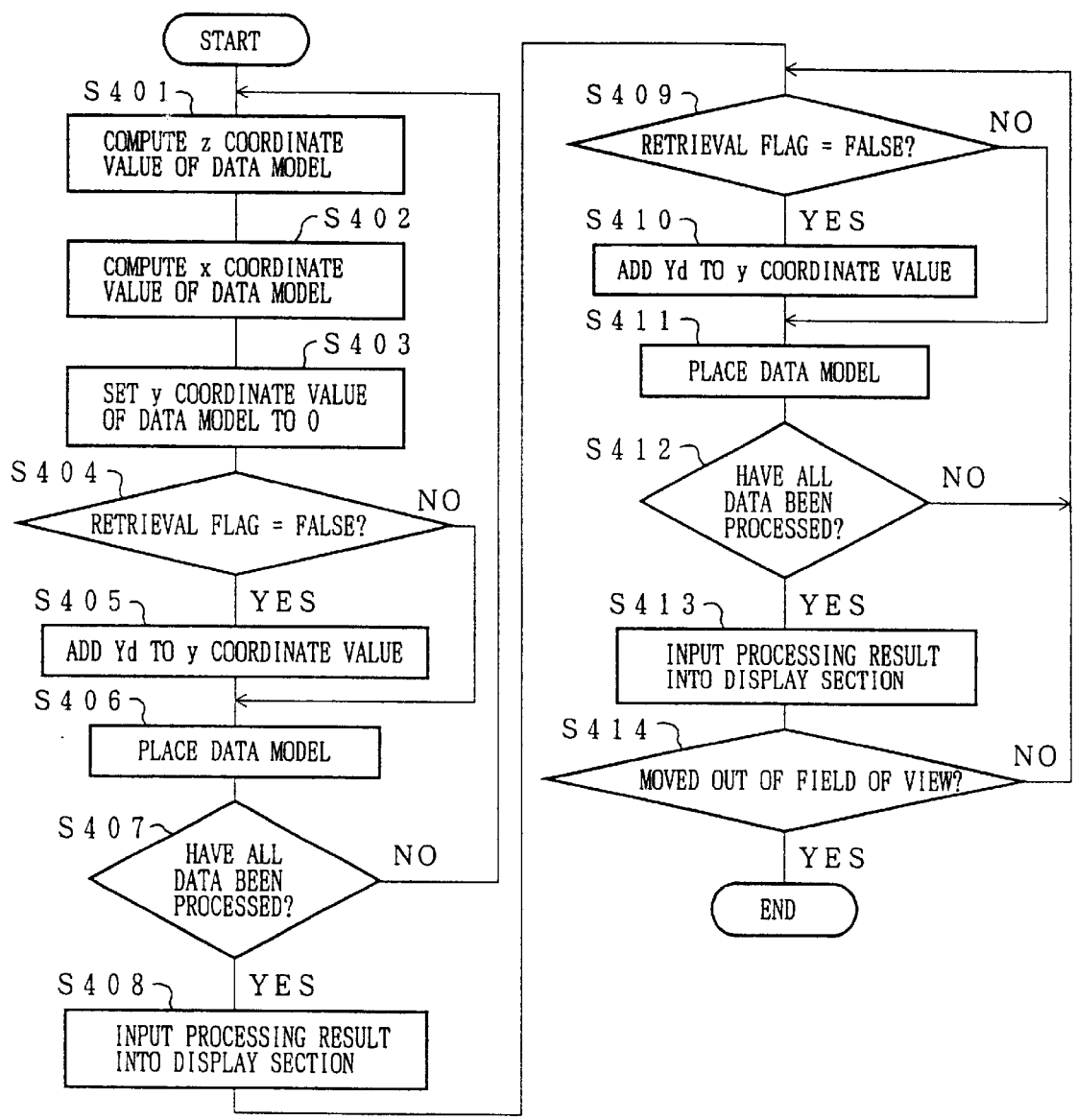
FIG. 79 is a flowchart detailing still another processing by the data model placing section and display section of the display device for the data display method of the present invention.
Figure 80:
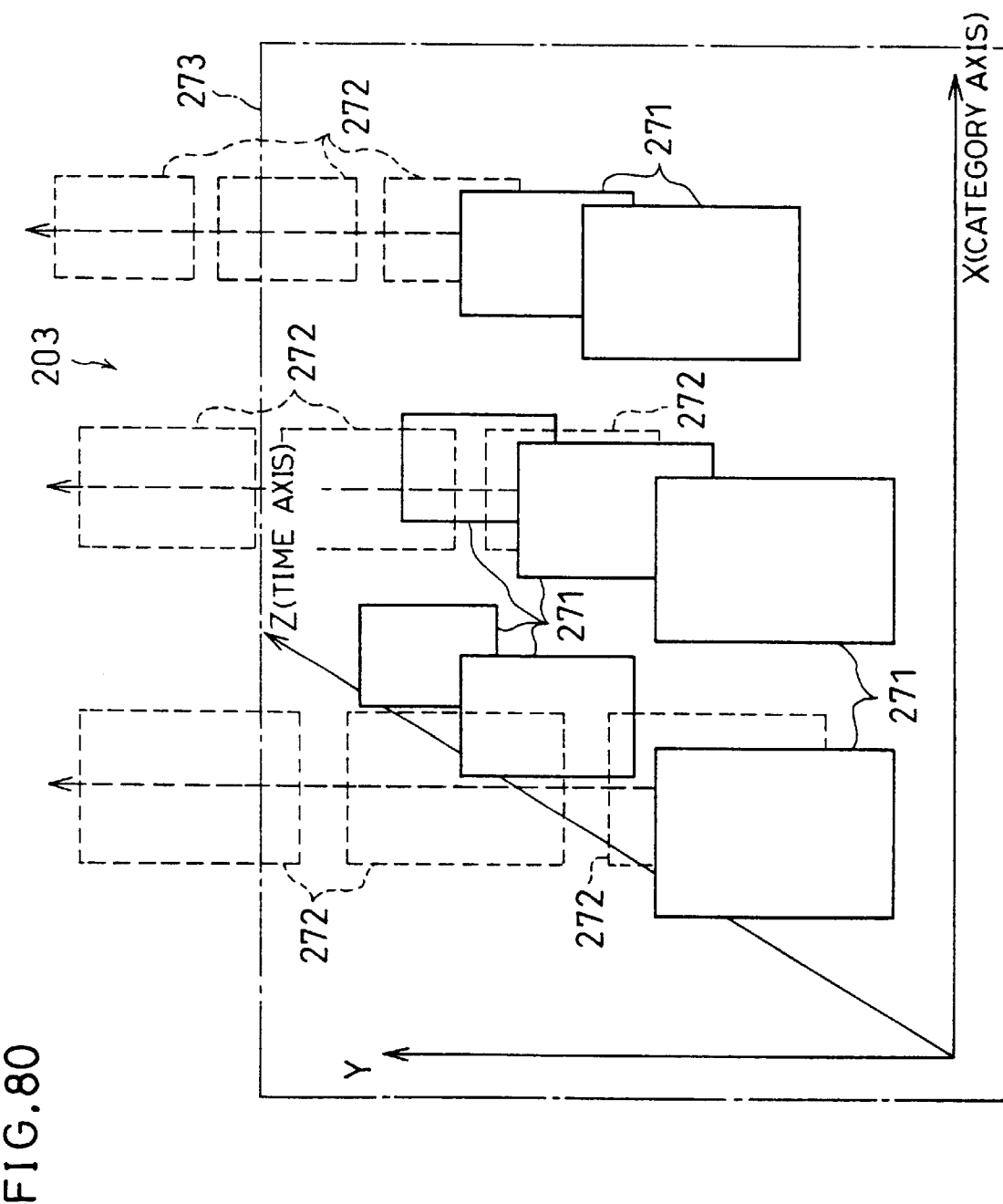
FIG. 80 is a view explaining a 3-D coordinate space displayed on the display device.

Referring to FIGS. 79 and 80, the following description will describe still another example embodiment of the present invention. Hereinafter, like components are labeled with like reference numerals with respect to above Embodiments, and the description of these components is not repeated for the explanation's convenience.

The operation is carried out in the same manner as Embodiment 14 except that the data model placing section 106 gradually moves the retrieval suitable data models or retrieval non-suitable data models out of the field of view until they become invisible instead of popping them up or down.

Processing by the data model placing section 106 and display section 107 will be detailed with reference to the flowchart in FIG. 79. The other sections operate in the same manner as described in Embodiment 14.

To begin with, a coordinate value on the Z axis (time axis) is computed using the date of creation in the data display information table (S401). A coordinate value on the X axis (category axis) is computed using the category identifier (S402). A coordinate value on the Y axis is set to 0 (S403). Whether the retrieval flag shows "FALSE" or not is checked (S404). In case of "FALSE", Yd (>0) is added to the Y coordinate value (S405). The data models are placed based on the coordinate values obtained in the above manner (S406). S401–S406 are repeated for all the data (S407). When all the data have been placed, the result is inputted into the display section 107 (S408). The display section 107 displays the 3-D coordinate space.

Whether the retrieval flag shows "FALSE" or not is checked (S409). In case of "FALSE", Yd is further added to the Y coordinate value (S410). The data models are placed based on the coordinate values obtained in S401–S403 and S410 (S411). S410 and S411 are repeated for all the data (S412). When all the data have been placed, the result is inputted into the display section 107 (S413). The display section 107 displays the 3-D coordinate space. S409–S413 are repeated until all the retrieval non-suitable data models are moved out of the field of view (S414).

FIG. 80 is a view illustrating the 3-D coordinate space displayed on the display section 107 in the present embodiment. In other words, retrieval suitable data models 271, retrieval non-suitable data models 272, and a field of view 273 are shown.

If "FALSE" is replaced with "TRUE" in S404 and S409, the retrieval suitable data models are moved out of the field of view.

Embodiment 24

Figure 81:
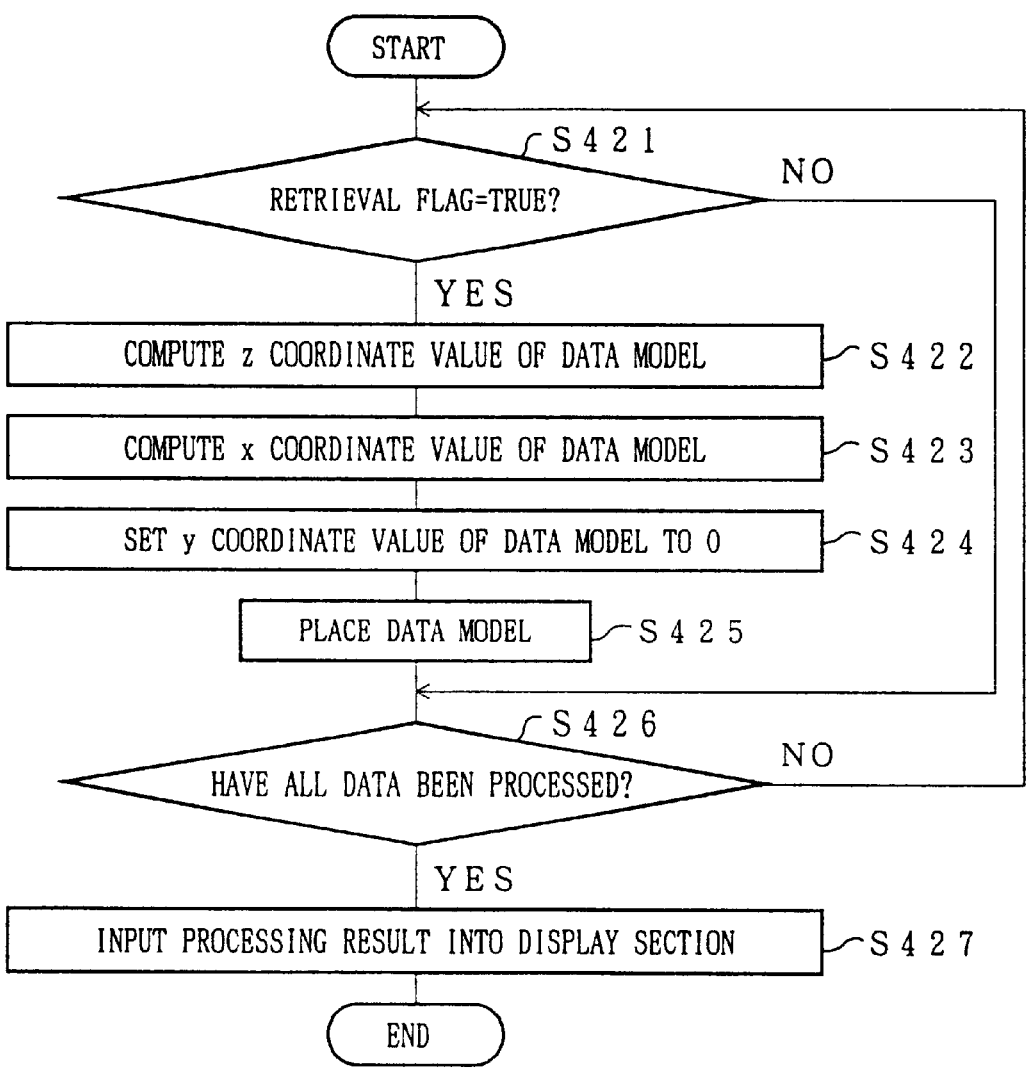
FIG. 81 is a flowchart detailing still another processing by the data model placing section and display section of the display device for the data display method of the present invention.

Referring to FIG. 81, the following description will describe still another example embodiment of the present invention. Hereinafter, like components are labeled with like reference numerals with respect to above Embodiments, and the description of these components is not repeated for the explanation's convenience.

The operation is carried out in the same manner as Embodiment 14 except that the data model placing section 106 processes either the retrieval suitable data models or retrieval non-suitable data models alone instead of popping them up or down, so that either the retrieval suitable data models or retrieval non-suitable data models whichever remain unprocessed are not displayed on the 3-D coordinate space.

The flowchart detailing processing by the data model placing section 106 is set forth in FIG. 81.

To begin with, whether the retrieval flag shows "TRUE" or not is checked (S421). In case of "TRUE", following S422–S425 are carried out. A coordinate value on the Z axis (time axis) is computed using the date of creation in the data display information table (S422). A coordinate value on the X axis (category axis) is computed using the category identifier (S423). A coordinate value on the Y axis is set to 0 (S424). The data models are placed based on the coordinate values obtained in the above manner (S425). S421–S425 are repeated for all the data (S426). When all the data have been placed, the result is inputted into the display section 107 (S427). The sections other than the data model placing section 106 operate in the same manner as described in Embodiment 14.

If the data model placing section 106 is arranged to carry out S422–S425 when the retrieval flag shows "FALSE" in S421, the retrieval non-suitable data models alone are displayed.

As has been explained, according to the data display methods of above Embodiments, the data models are generated using the data stored in the database, and displayed after being placed on the 3-D coordinate space composed of the time axis representing the date of creation or the like and the category axis of the data, so that the user can understand the position of the data in terms of time and categories in a straightforward manner. In addition, when the data are retrieved, the retrieval suitable data and retrieval non-suitable data are displayed in a distinguished manner while the above-mentioned advantages are maintained. Consequently, the user can readily check the relationship between the retrieval suitable data and retrieval non-suitable data.

Embodiment 25

Referring to FIGS. 7, 8, 10, 11, and 82 through 88, the following description will describe still another example embodiment of the present invention. Hereinafter, like components are labeled with like reference numerals with respect to above Embodiments, and the description of these components is not repeated for the explanation's convenience.

The present embodiment is any of above Embodiments further arranged that the user selects a creator of the data as the attribute information used to generate the X axis of the 3-D coordinate space, based on which the data models are replaced. Here, of all the attributes of each item of the data, those having continuous values are referred to as a sequence scale attribute and those having discrete values are referred to as a category attribute.

Figure 82:
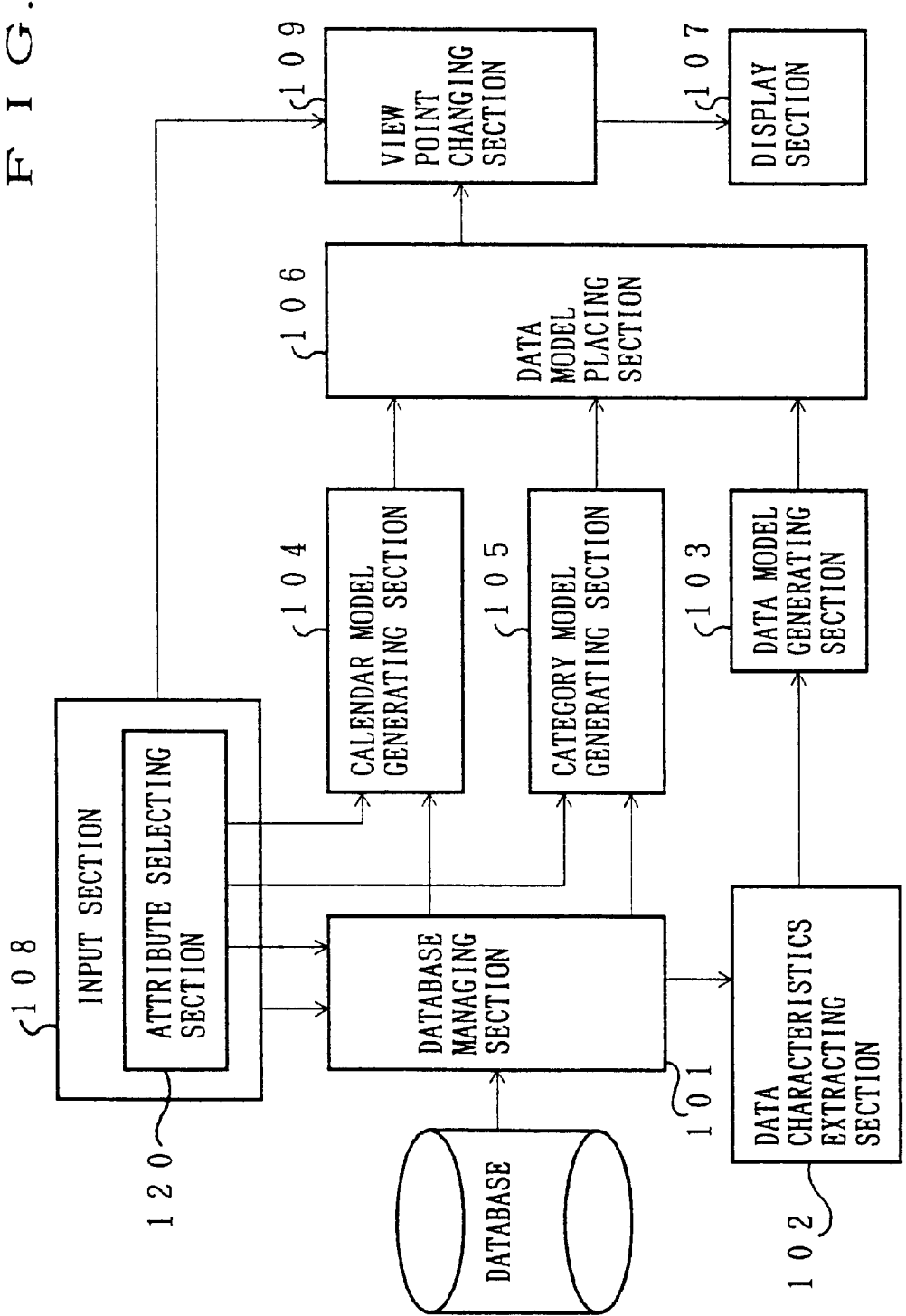
FIG. 82 is a block diagram schematically showing still another arrangement of the display device for the data display method of the present invention.

As shown in FIG. 82, a display device to carry out the data display method of the present embodiment additionally includes an attribute selecting section 120 in the input section 108.

Figure 83:
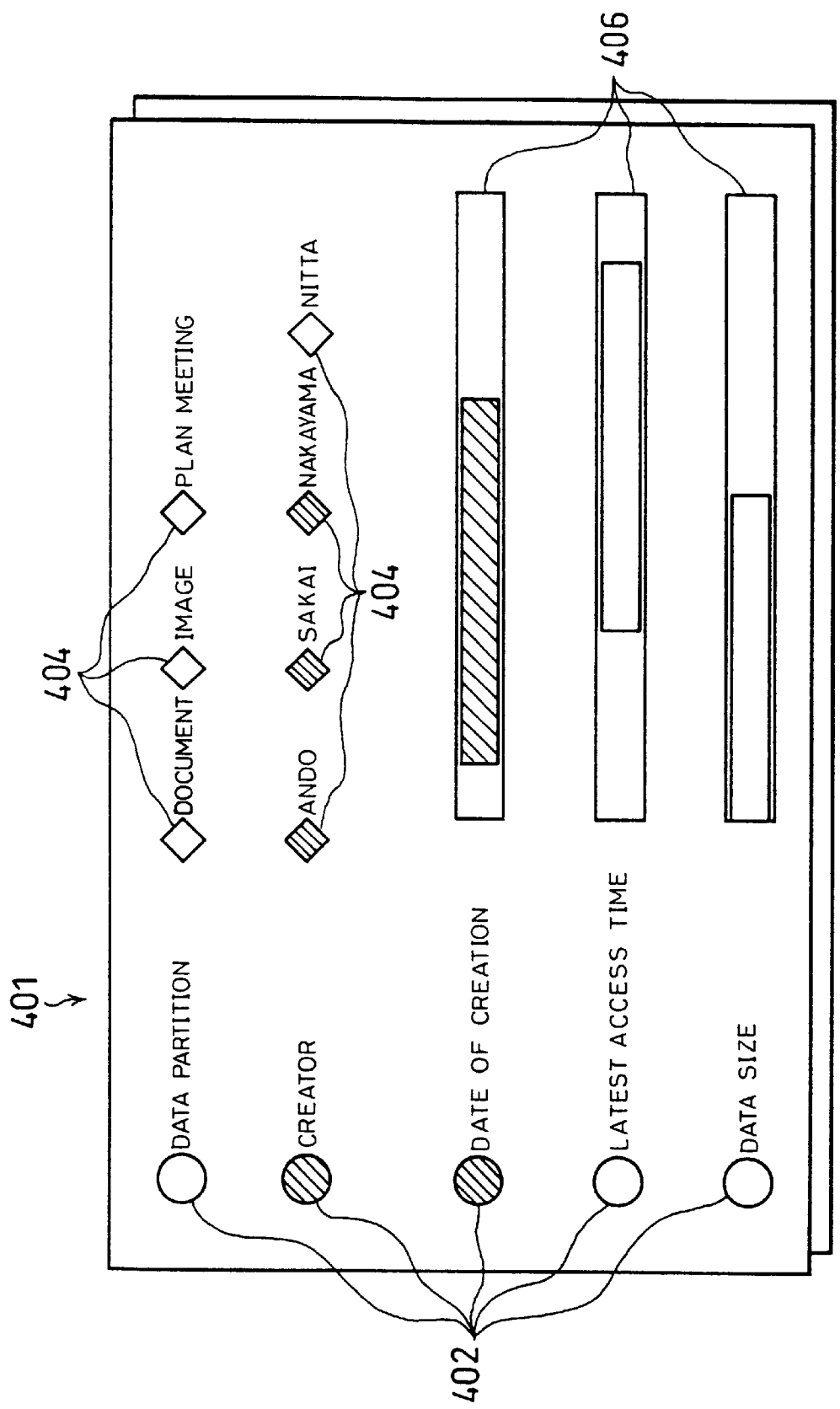
FIG. 83 is a view explaining an arrangement of a dialog window for attribute selection.

As shown in FIG. 83, the attribute selecting section 120 displays, for example, a dialogue window 401, which displays radio buttons 402 at the left of each attribute and check buttons 404. The radio buttons referred herein are groups of buttons, and only one button in a single group can be selected at a time: when one button is selected in a group, the rest of the buttons in the group are automatically reset to the non-selected state. Here, the data partition and creator form one group, and the date of creation, latest access time, and data size form another group. The check buttons referred herein mean buttons whose selected state and non-selected state can be switched independently without being influenced by the other buttons.

The user selects the category attribute using the radio buttons 402. For example, as shown in FIG. 83, the user changes the category attribute from the information as to the data partition to the information as to the creator of the data while leaving the sequence scale attribute to the date of creation. Also, the user inputs whether each category element need be displayed or not using the check buttons 404. The category elements referred herein mean the content of the attribute selected as the category attribute in each item of the data. For example, as shown in FIG. 83, assume that ANDO, SAKAI, NAKAYAMA, are checked as the category elements which need be displayed, while NITTA is not checked.

When the user directs the change of the attribute using the attribute selecting section 120 in the above manner, the attribute changing information is delivered to the database managing section 101, data characteristics extracting section 102, data model generating section 103, calendar model generating section 104, and category model generating section 105, whereby the models that need be changed among the calendar model, category models, and data models are generated and placed. Consequently, the category models and data models are regenerated and replaced while the calendar model remains the same. The structures of information to display the category models and data models are changed from the ones shown in FIGS. 7 and 8 of Embodiment 1 to the ones shown in FIGS. 84 and 85, respectively.

The contents of the example data structure necessary to display the category models shown in FIG. 7 are "DOCUMENT", "IMAGE", and "PLAN MEETING", whereas in the present embodiment, the contents are changed to the creators of the data, "ANDO", "SAKAI", and "NAKAYAMA" as shown in FIG. 84. In addition to the names of the creators, a face image of each creator can be displayed as the category models. In this case, the table further includes a pointer to the face image.

The values of the category identifiers in the example data structure necessary to display the data models shown in FIG. 8 are "CATEGORY A CATEGORY D" and "CATEGORY C CATEGORY D", whereas in the present embodiment, the values are changed to "CATEGORY A" and "CATEGORY C" as shown in FIG. 85.

Figure 86:
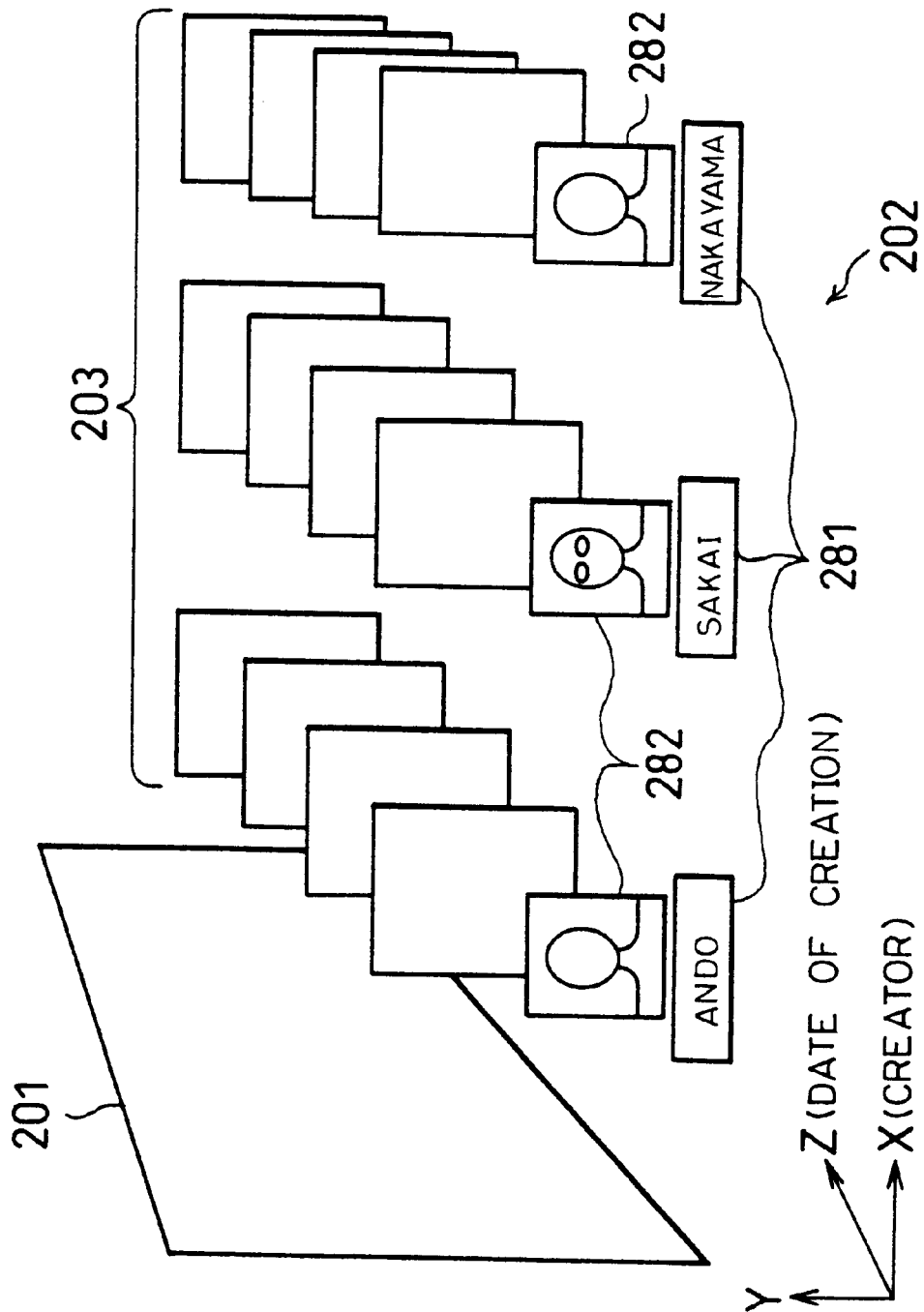
FIG. 86 is a view explaining a 3-D coordinate space displayed on the display device when the user has selected a creator of the data as a category attribute.

FIG. 86 shows an example display screen when the user has selected the creator of the data as the category attribute. Herein, each category model 202 displays both a name 281 and a face image 282 of the creator as previously mentioned.

In the present embodiment, to enable the user to select the attributes used for the placement, a display pattern is changed depending on the used attribute. Thus, the system includes a model generation processing table as shown in FIG. 87. The above table stores the kinds of models (category models, calendar model, and data models) and pointers to predetermined processing routines for each attribute. The data model generating section 103, calendar model generating section 104, category model generating section 105, and database managing section 101 refer to the above table when switching the model generation processing.

Figure 88:
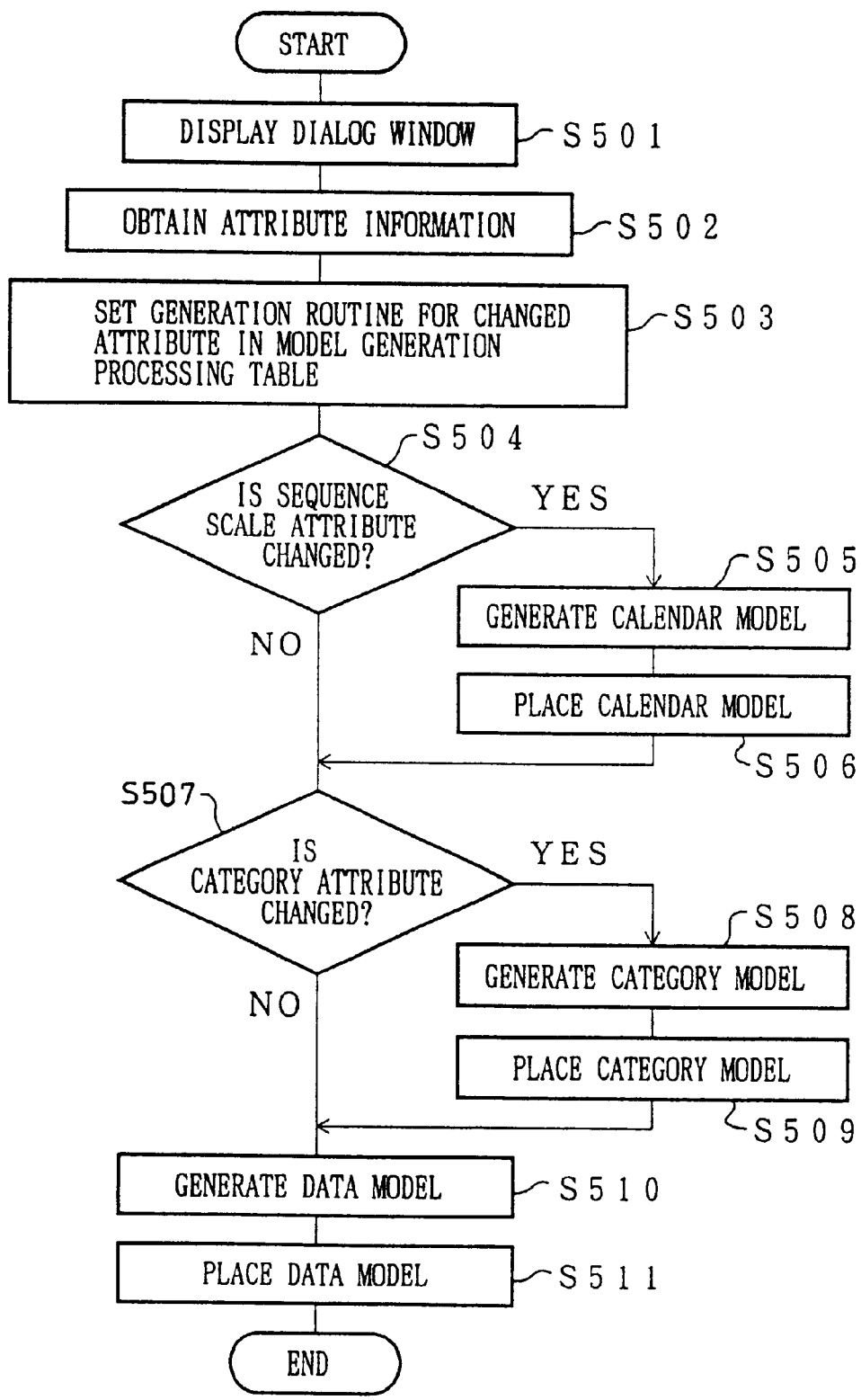
FIG. 88 is a flowchart detailing processing of generating and placing each model.

Next, processing to generate and place the calendar model, category models, and data models at the user's attribute selection command will be detailed with reference to the flowchart in FIG. 88.

Upon receipt of an activating command of the attribute selection processing from the input section 108, the dialog window 401 of FIG. 83 is displayed (S501). After the user has selected the attribute, the information of the selected attribute is obtained (S502), and the pointer to the processing routine to generate the model representing the changed attribute in the model generation processing table of FIG. 87 is updated (S503). The calendar model is updated if necessary (S504, S505, S506). Also, the category models are updated if necessary (S507, S508, S509) and the data models are updated (S510, S511).

Figure 10:
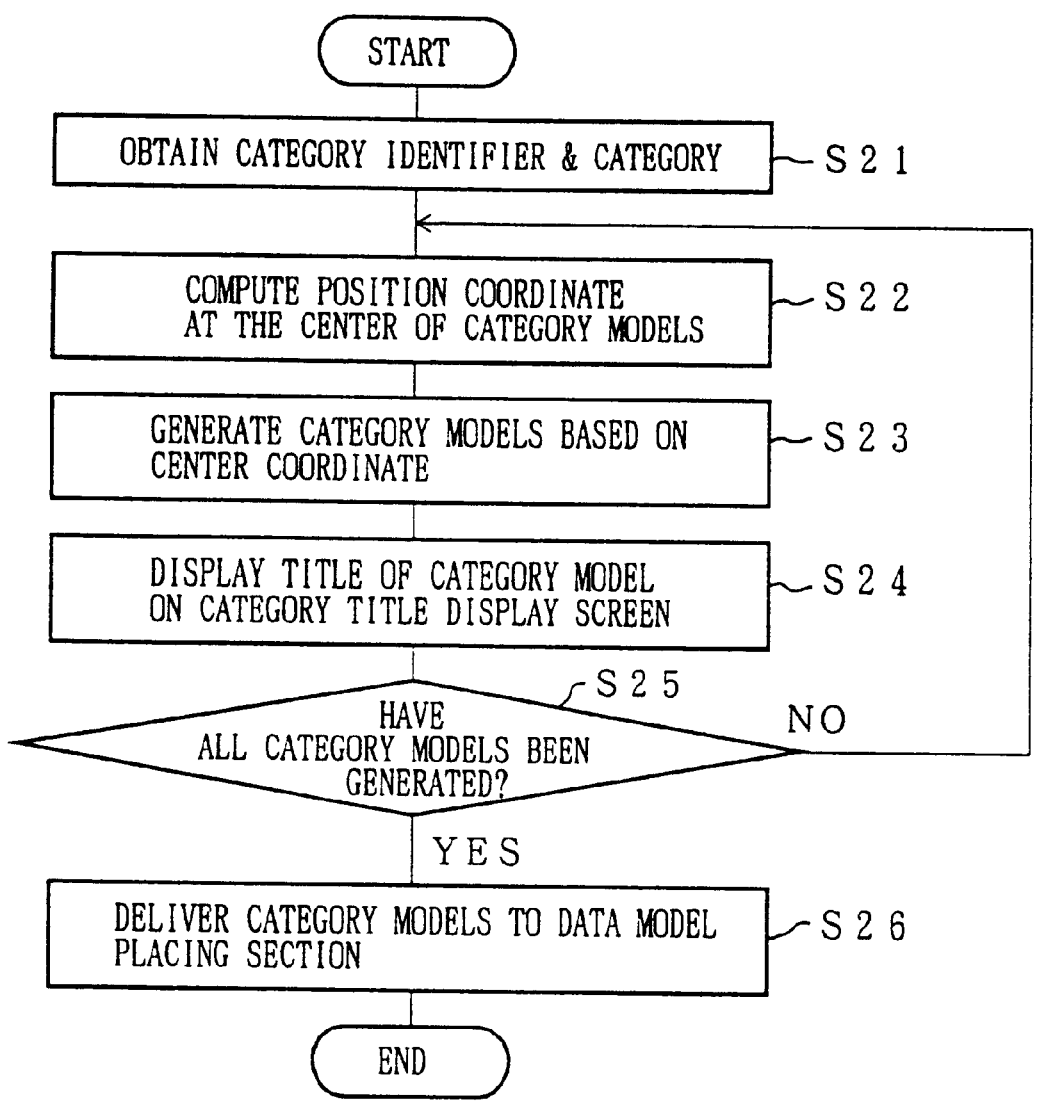
FIG. 10 is a flowchart detailing generation processing of category models.

The category model generation processing when the category attribute is changed to the creators of the data can be carried out in accordance with the flowchart in FIG. 10 except that: in S23, a screen for drawing face images are generated in addition to the screen drawing the names of the creators, and in S24, the face images are drawn in addition to the names. The data model generation processing can be carried out in accordance with the flowchart in FIG. 11. The category models and data models thus generated are placed in the same manner as Embodiment 1, after which the view point is changed and the models are displayed as shown in FIG. 86.

In this manner, since the category attributes and the necessity of each category element can be selected, when there are too many data models to be displayed, the number of the data models to be displayed can be reduced by not displaying the data models corresponding to the unnecessary category elements. Also, the data to be displayed can be limited by replacing only the data models in accordance with a specific category which have been already placed in accordance with another specific category attribute and subsequently by selecting the necessity of each category element of the replaced data models.

In the present embodiment, a method that the user selects the category attribute information used to generate the X axis was explained. However, the method is not limited to the above disclosure, and the user may select the sequence scale attribute information used to generate the Z axis. For example, the user may select the latest access time to each item of the data as the sequence scale attribute instead of the date of creation using the radio buttons 402 in FIG. 83. Also, the data size may be indicated as the sequence scale attribute instead of the thickness of the data model.

Further, the range of the sequence scale attribute may be specified using a slider 406 shown in FIG. 83. The slider specifies an amount or a range by adjusting the bar length or the position of the knob. The range is not necessarily specified in the dialog window 401. The range can be specified by making the calendar model 201 extendable in the Z axis direction on the screen displaying the calendar model, and by extending or shortening the calendar model 201 using the pointing device, or moving an arbitrary position on the Z axis.

As has been explained, the user can more readily find the desired data by being able to select the information used to generate the space and the range thereof to replace the models.

Embodiment 26

Referring to FIGS. 1, 89 through 93, the following description will describe still another example embodiment of the present invention. Hereinafter, like components are labeled with like reference numerals with respect to above Embodiments, and the description of these components is not repeated for the explanation's convenience.

In the present embodiment, when more than one item of the data is positioned at the same coordinate position, the order is changed in accordance with another attribute and the models are placed in the corresponding order.

A display device of the present embodiment is of the same arrangement as its counterpart in FIG. 1.

FIG. 89 shows a data structure necessary to judge whether more than one model is placed at the same coordinate or not.

FIG. 89 shows a data structure of a data node forming a data model list having all the data models placed within the coordinate space as a quad tree. Each node has a pointer Pd to a corresponding data model and four branching pointers P00, P01, P10, and P11. When a new node is added to the data model list, from which branching pointer Pij (i=0,1, j=0,1) the new node should be specified is determined in the following manner. When the X coordinate of a data model to be placed is greater than the X coordinate of a data model in the data model list corresponding to the current node to be compared with the subject data model to be placed, i=1 is set, and when the X coordinate of the data model to be placed is equal to or smaller than the X coordinate of the data model corresponding to the current node, i=0 is set. Likewise, when the Z coordinate of a data model to be placed is greater than the Z coordinate of a data model in the data model list corresponding to the current node to be compared with the subject data model to be placed, j=1 is set, and when the Z coordinate of the data model to be placed is equal to or smaller than the Z coordinate of the data model corresponding to the current node, j=0 is set. Pij thus determined is added to specify the new node.

When a node is retrieved, a correct pointer can be specified by comparing the largeness of the reference X coordinate and Z coordinate and the X coordinate and Z coordinate of the current node in the data model list. Thus, whether any other data model has been already placed at the X coordinate and Z coordinate in question can be judged at a high speed. Note that each item of the data having the same X coordinate and Z coordinate is compared with one another in a separate comparison processing routine, aligned sequentially, and linked to one another.

Figure 90:
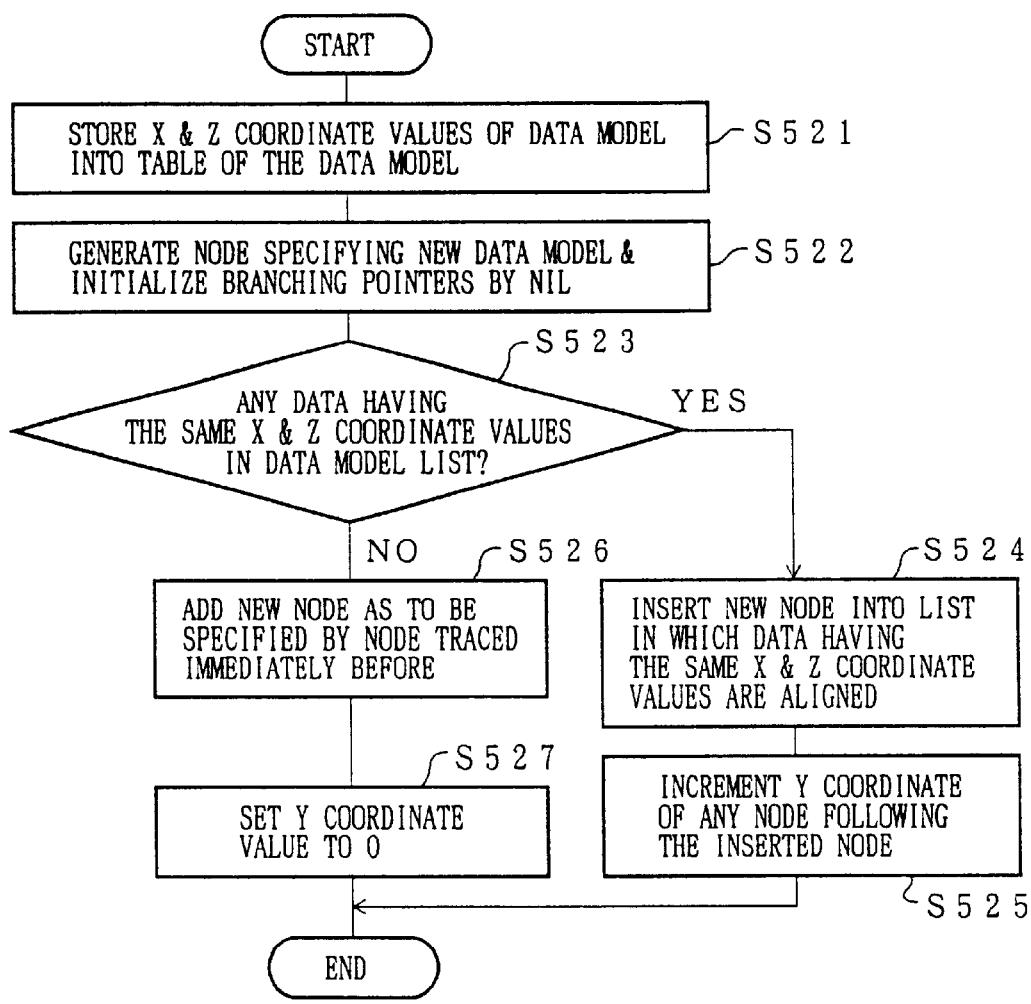
FIG. 90 is a flowchart detailing data model placement processing.

Processing to place the data models will be detailed with reference to the flowchart in FIG. 90.

To begin with, the X coordinate value and Z coordinate value of the data model are computed based on the attribute values or the like read and taken out from the database managing section, and written into the table of the data model (S521). Then, a new data node specifying the above data model is generated, and the branching pointers P00, P01, P10, and P11 are initialized by a value NIL specifying nothing (S522).

Then, the data model list is retrieved using the X coordinate value and Z coordinate value as a key, and whether there is any other node corresponding to the data having the same X coordinate value and Z coordinate value as those of the key is checked (S523). If there is at least one node corresponding to the data having the same X coordinate value and Z coordinate value, the order of the data specified by such a node and the data to be placed are successively compared, and the data to be placed are inserted at a position to maintain the alignment (S524).

The Y coordinate value of the data model(s) following the inserted data is incremented by an amount which is a sum of the height (length in the Y axis direction) of the data model and a predetermined margin (S525). The margin referred herein means a distance between two adjacent data models aligned in the Y axis direction.

If there is no other node having the same X coordinate value and Z coordinate value, the new node is added to be specified by one of the four branching pointers of the node traced immediately before depending on the relationship as to the largeness of the X coordinate value and Z coordinate value (S526), and the Y coordinate value of the data model is initialized to 0 (S527).

The comparison processing routine for judging the order of the data models in the above processing may be defined as processing for comparing each attribute in accordance with the order predetermined for the attributes used to generate the Y axis.

Figure 91:
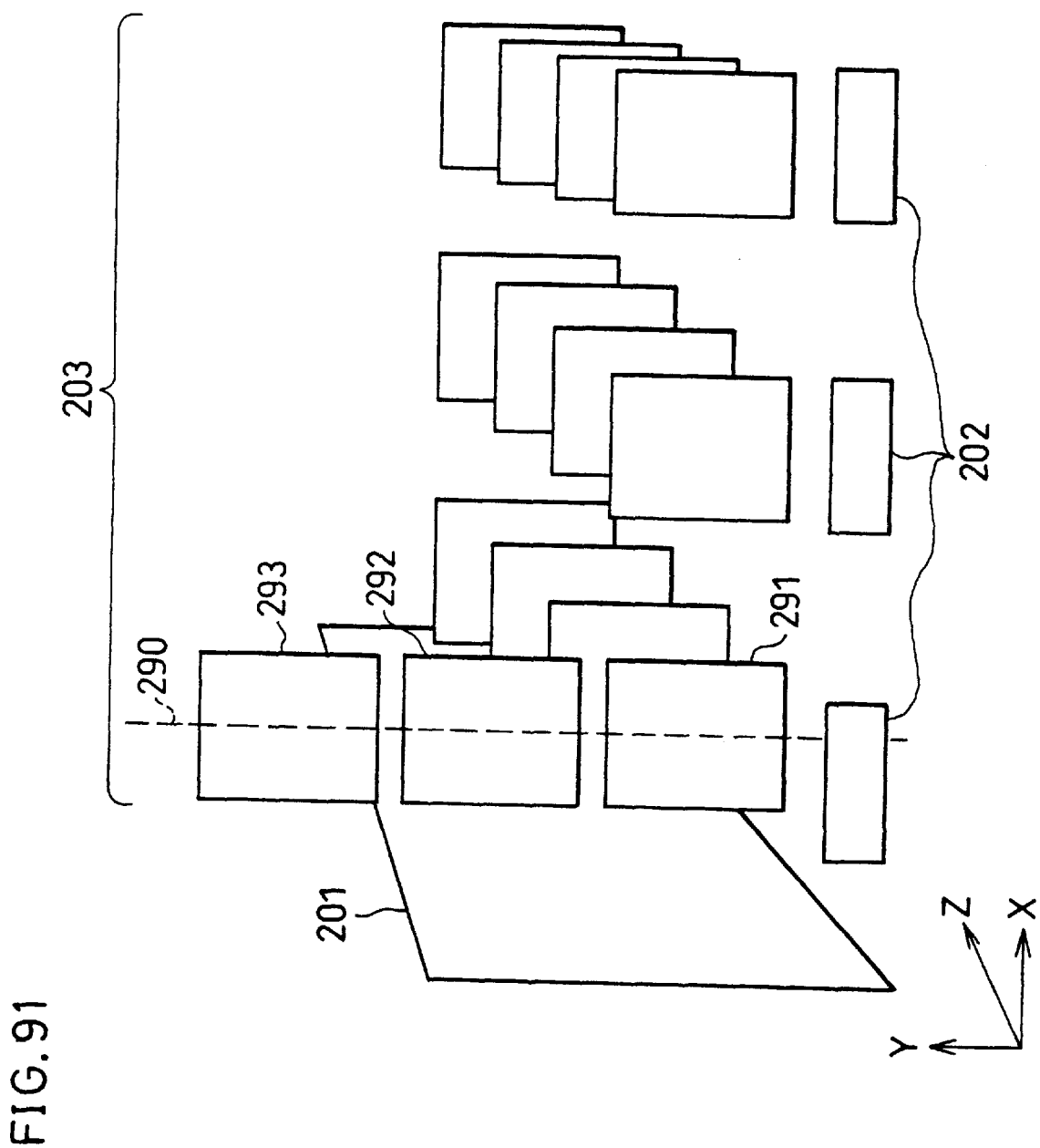
FIG. 91 is a view explaining still another example 3-D coordinate space displayed on the display device of the data display method of the present invention.

FIG. 91 shows an example display screen. When there is more than one item of the data at the coordinate position having the same X coordinate value and Z coordinate value when placing the data models, data models 291, 292, and 293 are placed, as shown in the drawing, linearly in the positive Y axis direction from the origin along a straight line 290 which is parallel to the Y axis at the coordinate position on a plane perpendicular to the Z axis with their respective main surfaces on the front.

Figure 92:
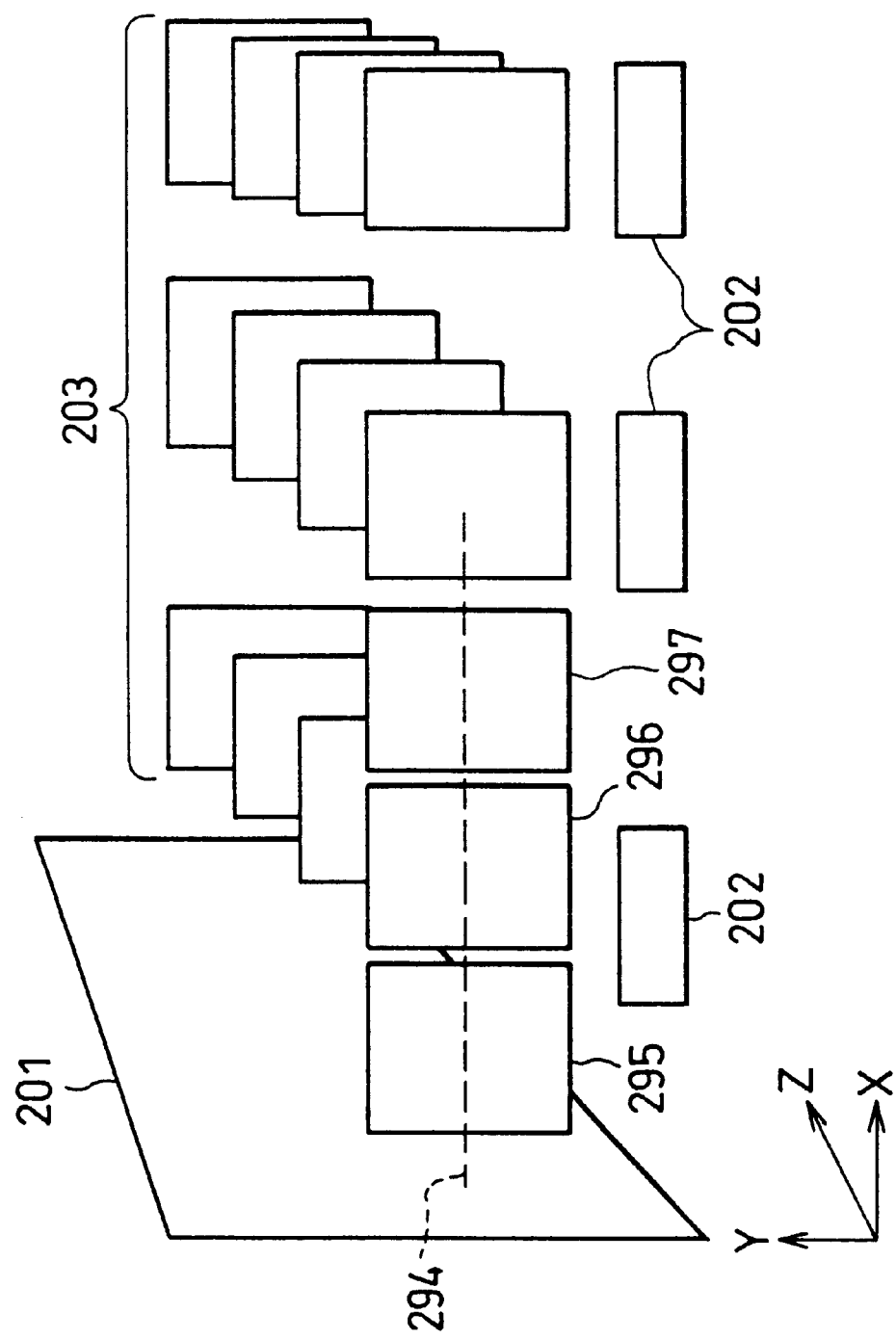
FIG. 92 is a view explaining a 3-D coordinate space displayed on the display device.

Alternatively, as shown in FIG. 92, the data models (295, 296, 297) may be sequentially placed linearly in the positive X axis direction from the origin along a straight line 294 which is not parallel to the Y axis but to the X axis with their respective main surfaces on the front.

Figure 93:
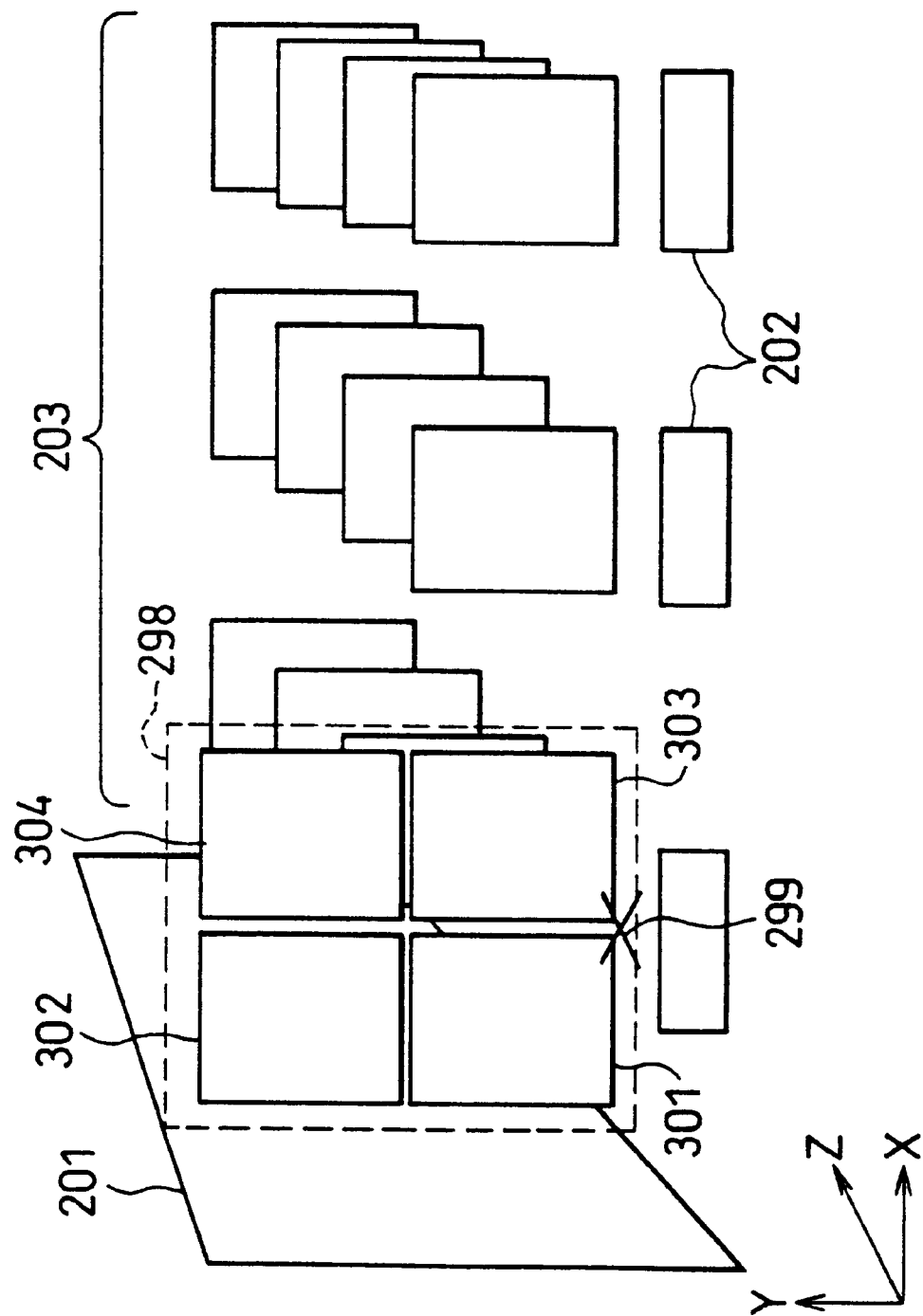
FIG. 93 is a view explaining a 3-D coordinate space displayed on the display device.

Further, as shown in FIG. 93, the data models (301, 302, 303, and 304) may be aligned in column and row with a coordinate 299 being as the reference point on a plane 298 passing the coordinate position and being perpendicular to the Z axis. In this case, the alignment may be an increasing order of the X coordinate values first and thence in the Y coordinate values: 301, 302, 303, 304, or an increasing order of the Y coordinate values first and thence in the X coordinate values: 301, 303, 302, 304.

In this manner, more than one item of the data having the same date of creation can be placed without being overlapped, and can be displayed separately in a list.

Embodiment 27

Figure 94:
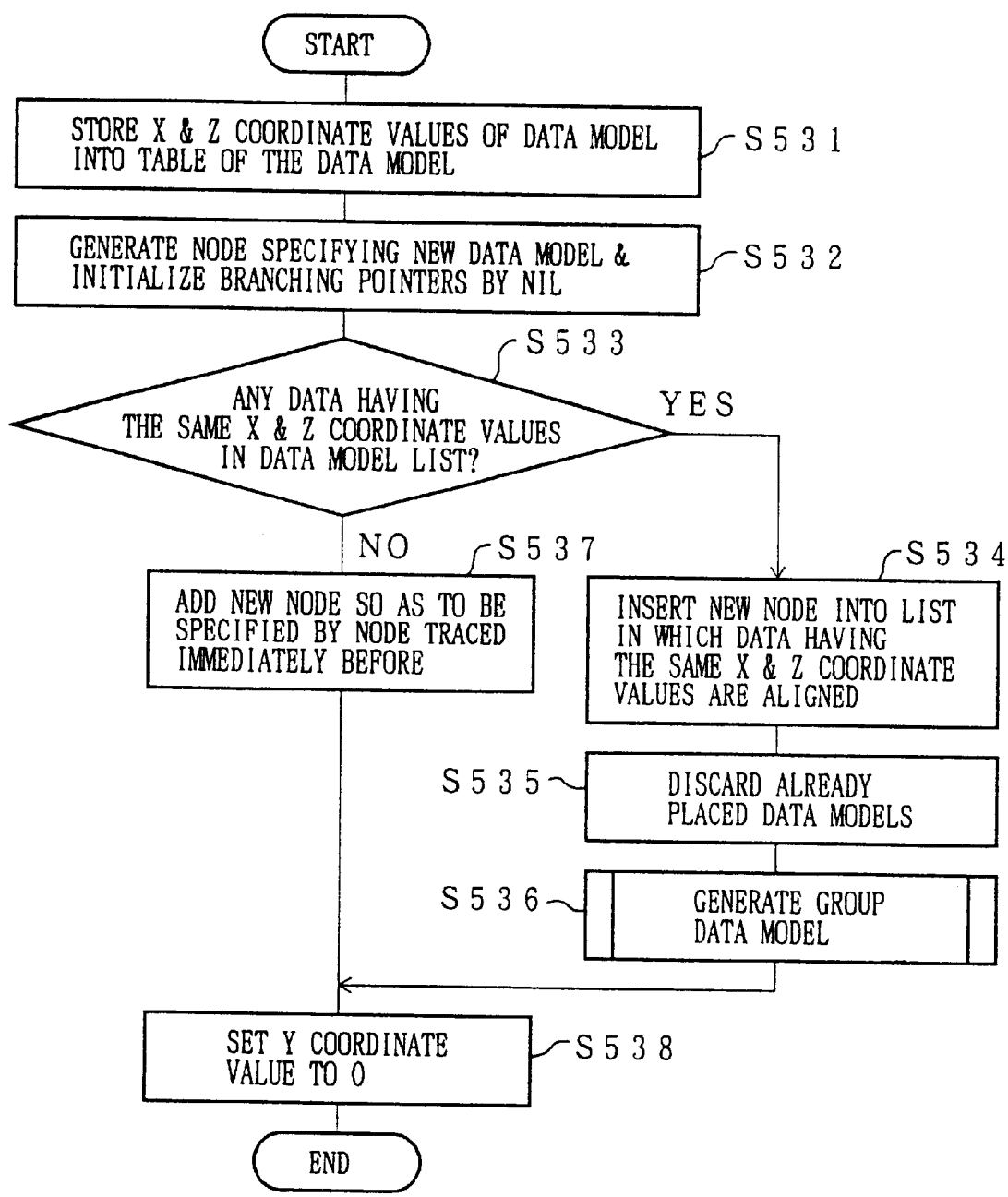
FIG. 94 is a flowchart detailing data model placement processing.
Figure 95:
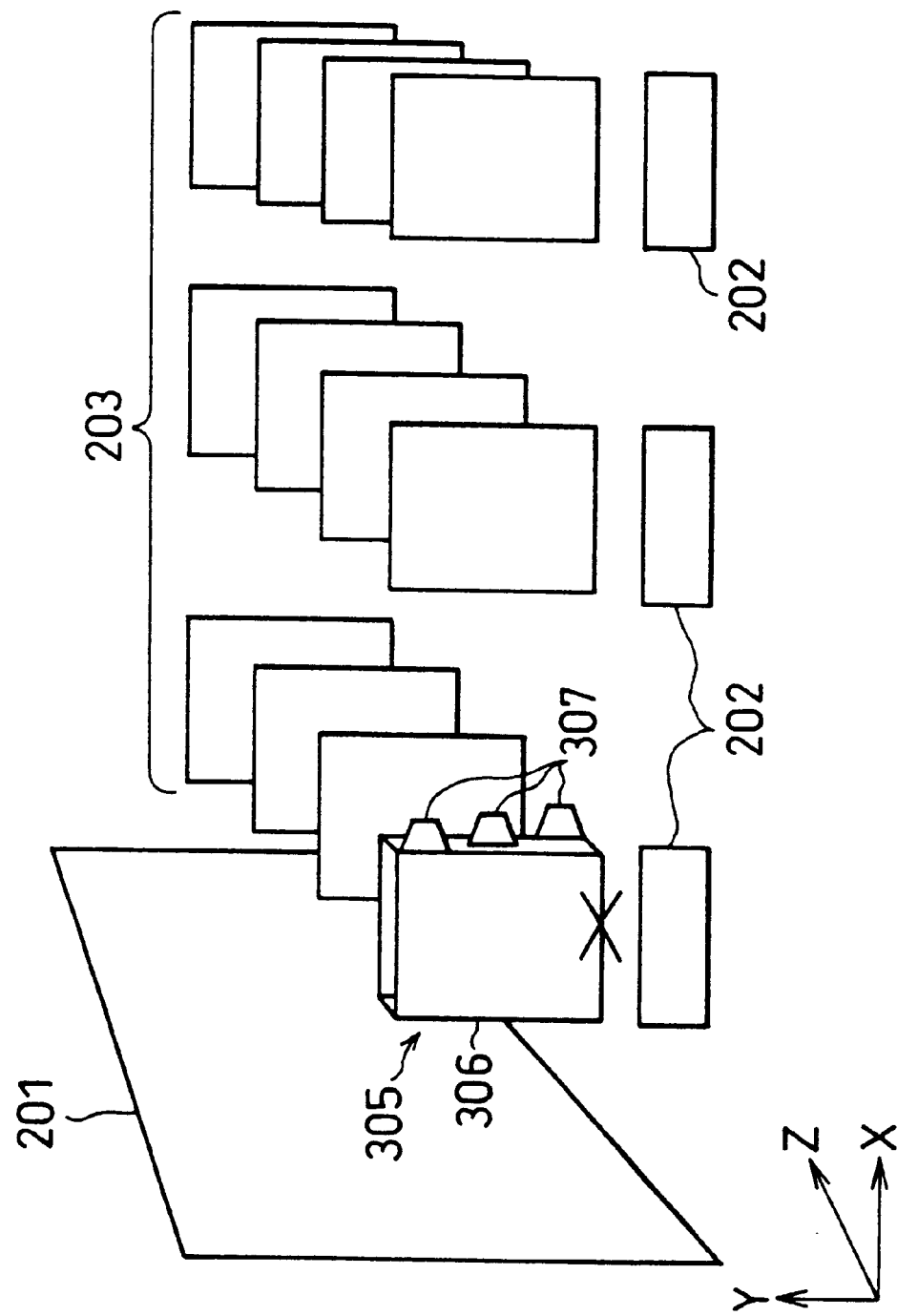
FIG. 95 is a view explaining still another example 3-D coordinate space displayed on the display device of the data display method of the present invention.
Figure 96:
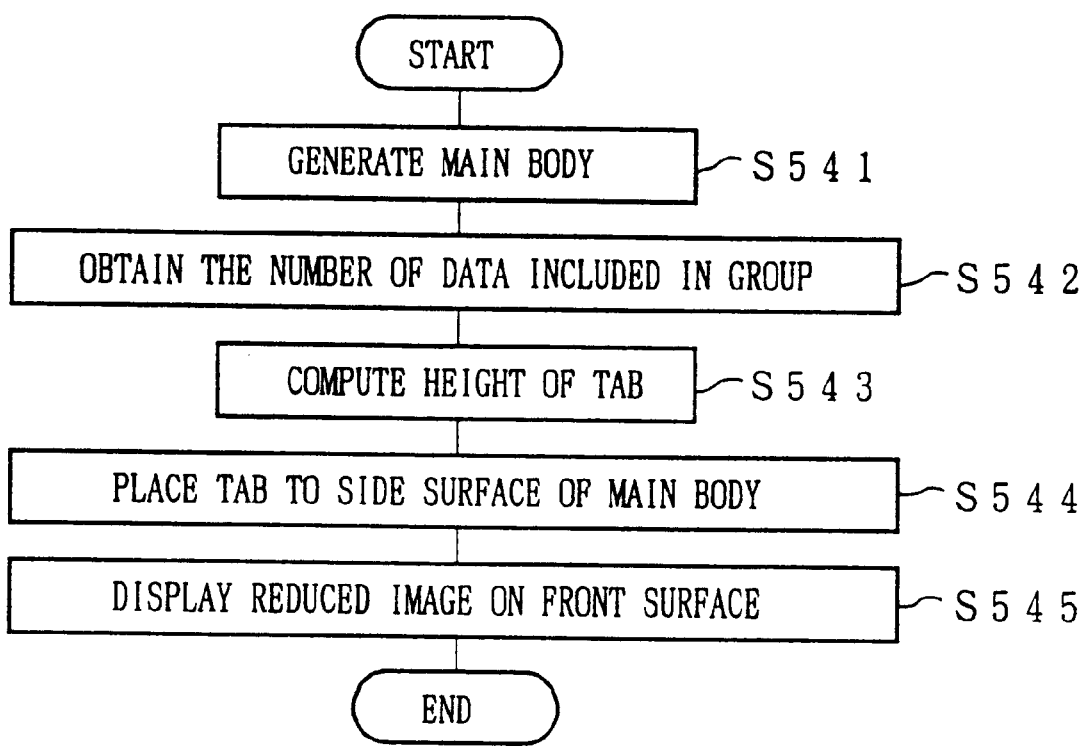
FIG. 96 is a flowchart detailing generation processing of a group data model.

Referring to FIGS. 94 through 96, the following description will describe still another example embodiment of the present invention. Hereinafter, like components are labeled with like reference numerals with respect to above Embodiments, and the description of these components is not repeated for the explanation's convenience.

In the present embodiment, when there is more than one item of the data at the same coordinate position as was explained in Embodiment 26, a group data model having a different shape from those of normal data models is generated and placed.

A display device of the present embodiment is of the same arrangement as its counterpart in Embodiment 26.

Data model placement processing of the present embodiment will be explained with reference to FIG. 94.

To begin with, the X coordinate value and Z coordinate value of the data model are computed based on the attribute values or the like read and taken out from the database managing section, and written into the table of the data model (S531). Then, a new data node specifying the above data model is generated, and the branching pointers P00, P01, P10, and P11 are initialized by a value NIL specifying nothing (S532).

Then, the data model list is retrieved using the X coordinate value and Z coordinate value as a key, and whether there is any other node corresponding to the data having the same X coordinate value and Z coordinate value as those of the key is checked (S533). If there is at least one node corresponding to the data having the same X coordinate value and Z coordinate value, the order of the data specified by such a node and the data to be placed are successively compared, and the data to be placed are inserted at a position to maintain the alignment (S534).

The data models which have been already positioned at this specific coordinate position are discarded (S535), and a group data model including the inserted data is generated (S536), and placed while the Y coordinate value is set to 0 (S538). If a group data model has been already placed in S534, the existing group data model is discarded and a new group data model including the inserted data is generated.

If there is not any other node having the same X coordinate value and Z coordinate value, the new node is added to be specified by one of the four branching pointers of the node traced immediately before depending on the relationship as to the largeness of the X coordinate value and Z coordinate value (S537), and the Y coordinate value of the data model is initialized to 0 to place the normal data models (S538).

As shown in FIG. 95, a group data model 305 comprises a main body 306 represented by a rectangular parallelopiped thicker than a normal data model, and three tabs 307 provided at the side surfaces of the main body 306, namely, in the positive side of the X axis herein. A reduced image representing one of the data included in the group data model 305 is drawn on the front surface of the main body 306. Each tab indicates one item of the data included in the group. Having three tabs means three items of the data are included in one group.

A displayed reduced image may be switched to the one representing the corresponding item of the data when the user selects one of the tabs 307 using the pointing device or the like.

FIG. 96 is a flowchart detailing the processing to generate a group data model. To begin with, the main body 306 is generated (S541), and the number of the data included in a group is obtained using the data model list (S542). A height of the tab is set to a value obtained by dividing the height of the main body by the number of the data included in the group (S543), and the tabs are placed at the side surface of the main body (S544). A reduced image indicating one item of the data included in the group data model is displayed on the front surface of the main body (S545).

In the present embodiment, the data models are replaced with the group data model when the data models have exactly the same X coordinate value and Z coordinate value. However, if the data models have the same X coordinate value and their Z coordinate values are closer than a predetermined threshold, the data models may be replaced with a figure having a shape different from the shape of the normal data models.

As has been explained, when there is more than one item of the data at the same coordinate position, the data models are displayed as a group data model having a shape different from the shape of the normal data models to indicate that there is more than one item of the data at the same coordinate position. This arrangement can prevent the data from being superimposed one on the other at the same coordinate position, so that the user will not fail to notice the existence of more than one item of the data.

Embodiment 28

Referring to FIGS. 97 through 127, the following description will describe still another example embodiment of the present invention. Hereinafter, like components are labeled with like reference numerals with respect to above Embodiments, and the description of these components is not repeated for the explanation's convenience.

Compared with its counterpart in Embodiment 1, a display device of the present embodiment is different as specified in the following.

Figure 97:
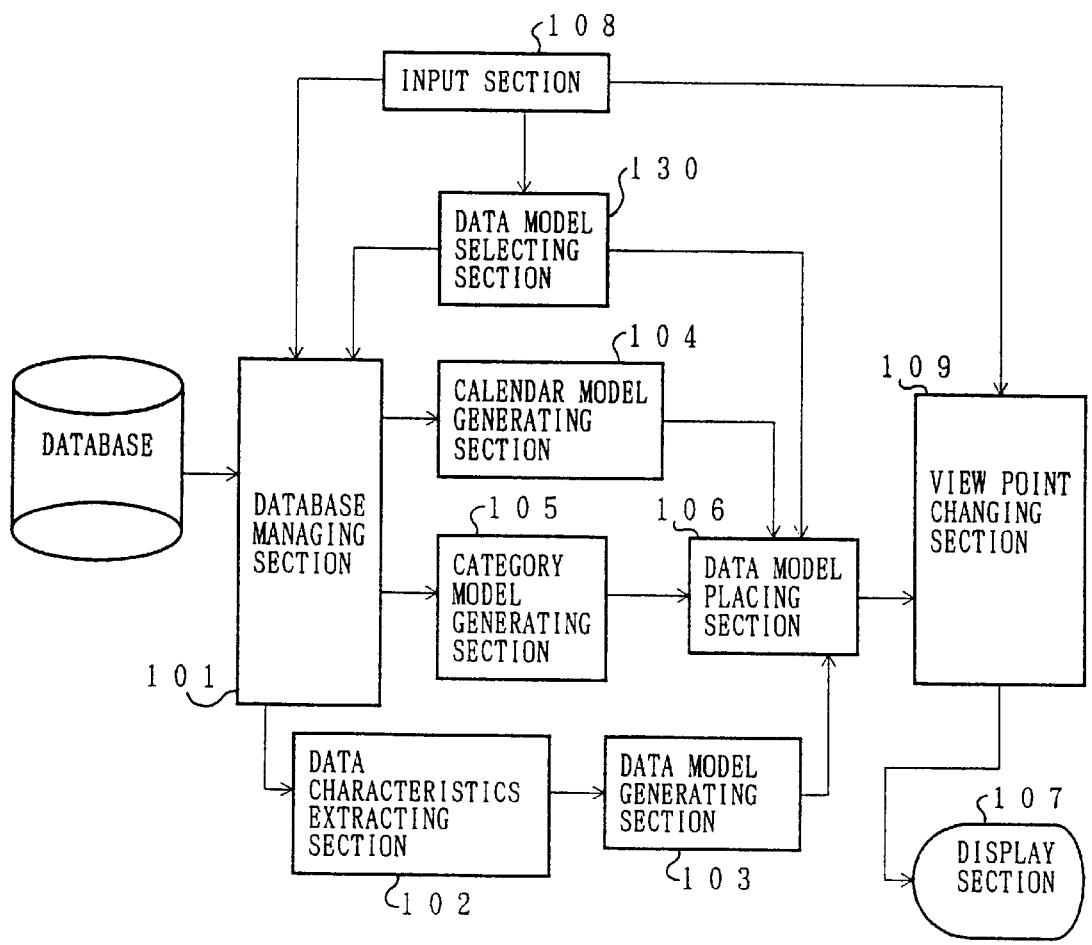
FIG. 97 is a block diagram schematically showing still another arrangement of the display device of the data display method of the present invention.

As shown in FIG. 97, the display device includes a data model selecting section 130 in addition to the arrangement of Embodiment 1. When the user inputs a selection of the data model using the input section 108, the selection command is sent to the data model selecting section 130, so that the corresponding data model is selected. The data identifier of the corresponding data model is inputted into the data model placing section 106. The data model having the corresponding data identifier is displayed again with highlight.

Also, the display section 107 includes a display panel realized by, for example, a liquid crystal display panel, and a tablet input surface is layered over the display screen of the panel. The input surface transmits light, and hand-written data thereon are inputted into the input section 108 at a command through directing means, such as an input stylus.

Further, the hand-written data can be inputted into the input section 108 by specifying a memo related to the selected data model by directing means, such as the input stylus. The memo related to the selected data is sent to the data model selecting section 130, and inputted into the database managing section 101 as additional information to the data having the above data identifier and registered in the database. Alternatively, the memo related to the selected data may be inputted through, for example, a keyboard to input a cord character string, so that the code character string related to the selected data is inputted into the database managing section 101 as additional information to the data having the above data identifier and registered in the database.

In the present embodiment, both the calendar model and category models are displayed in the same pattern as Embodiment 1. On the other hand, unlike Embodiment 1, the data models are displayed in a display pattern which will be explained in the following.

Figure 98:
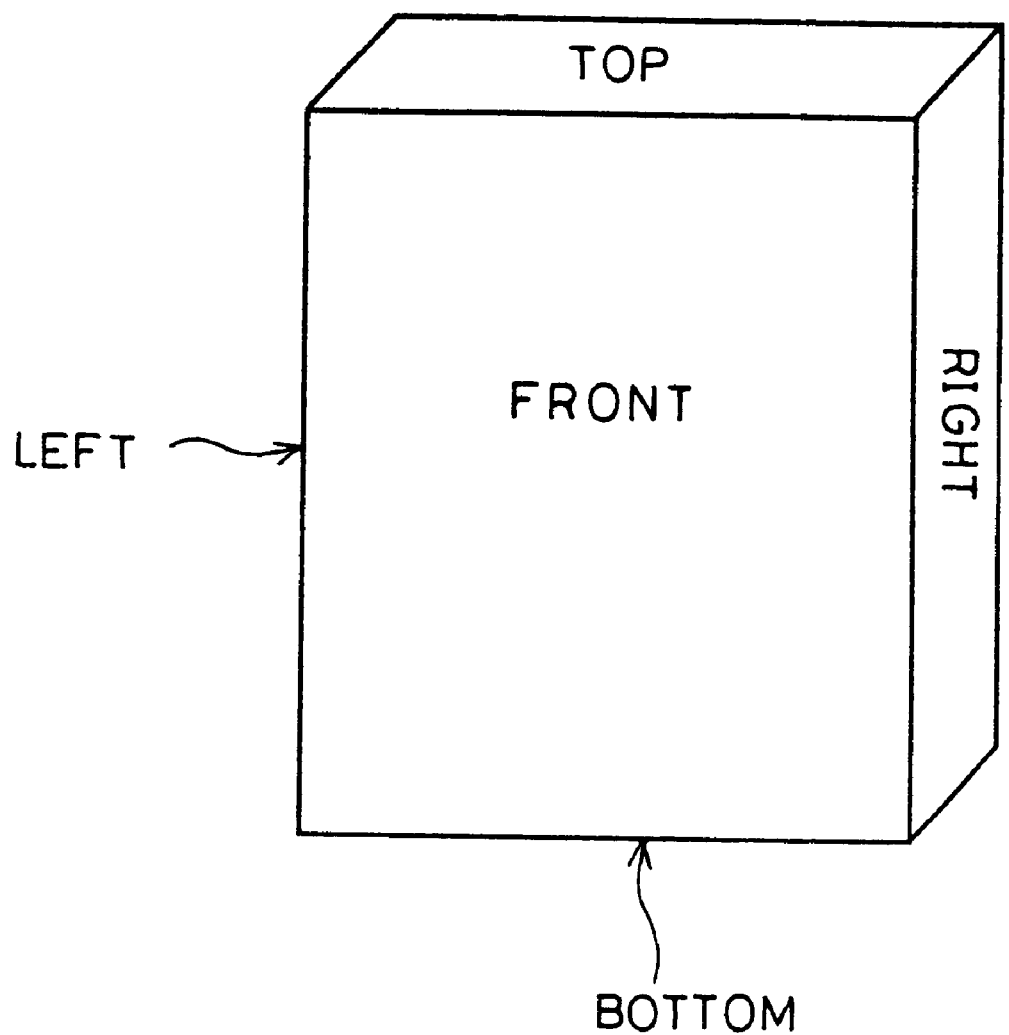
FIG. 98 is a view explaining an example data model.
Figure 99:
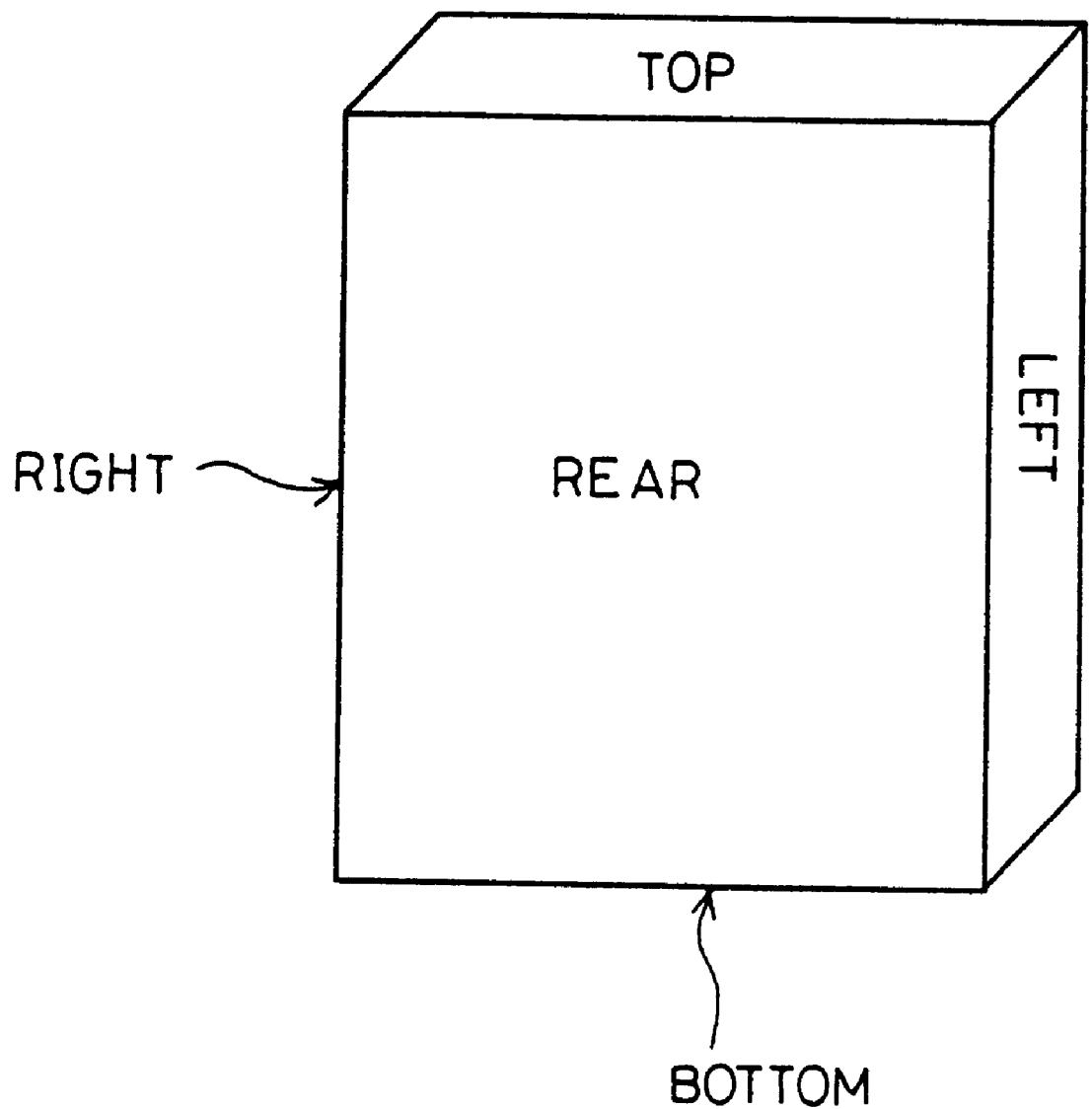
FIG. 99 is a view explaining an example data model.
Figure 100:
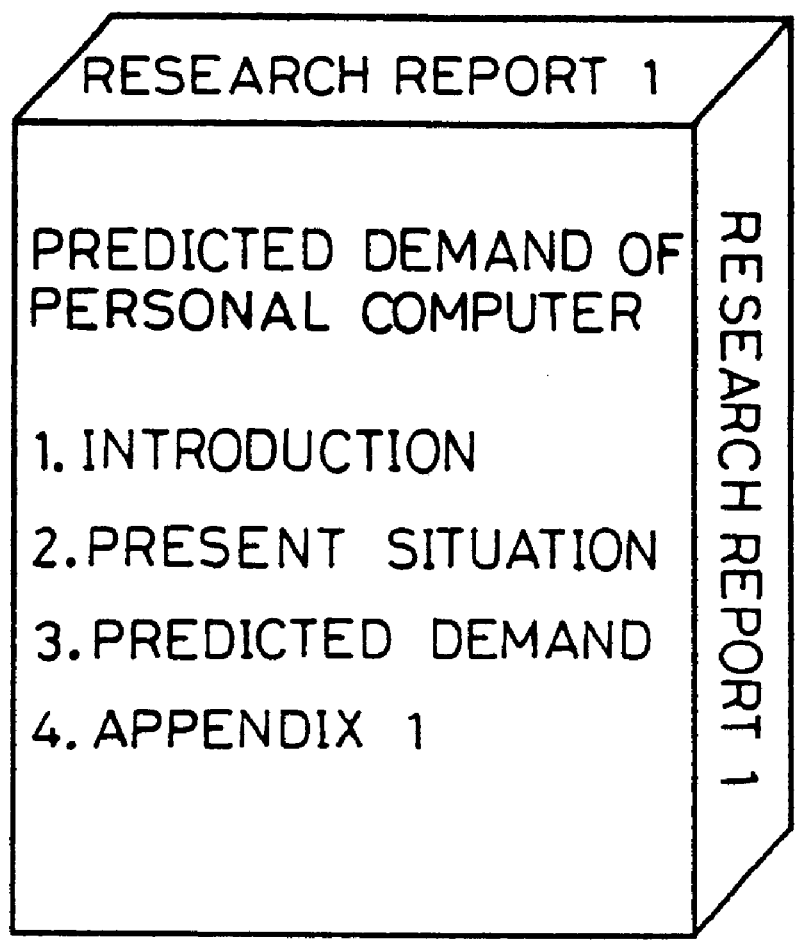
FIG. 100 is a view explaining an example data model.
Figure 101:
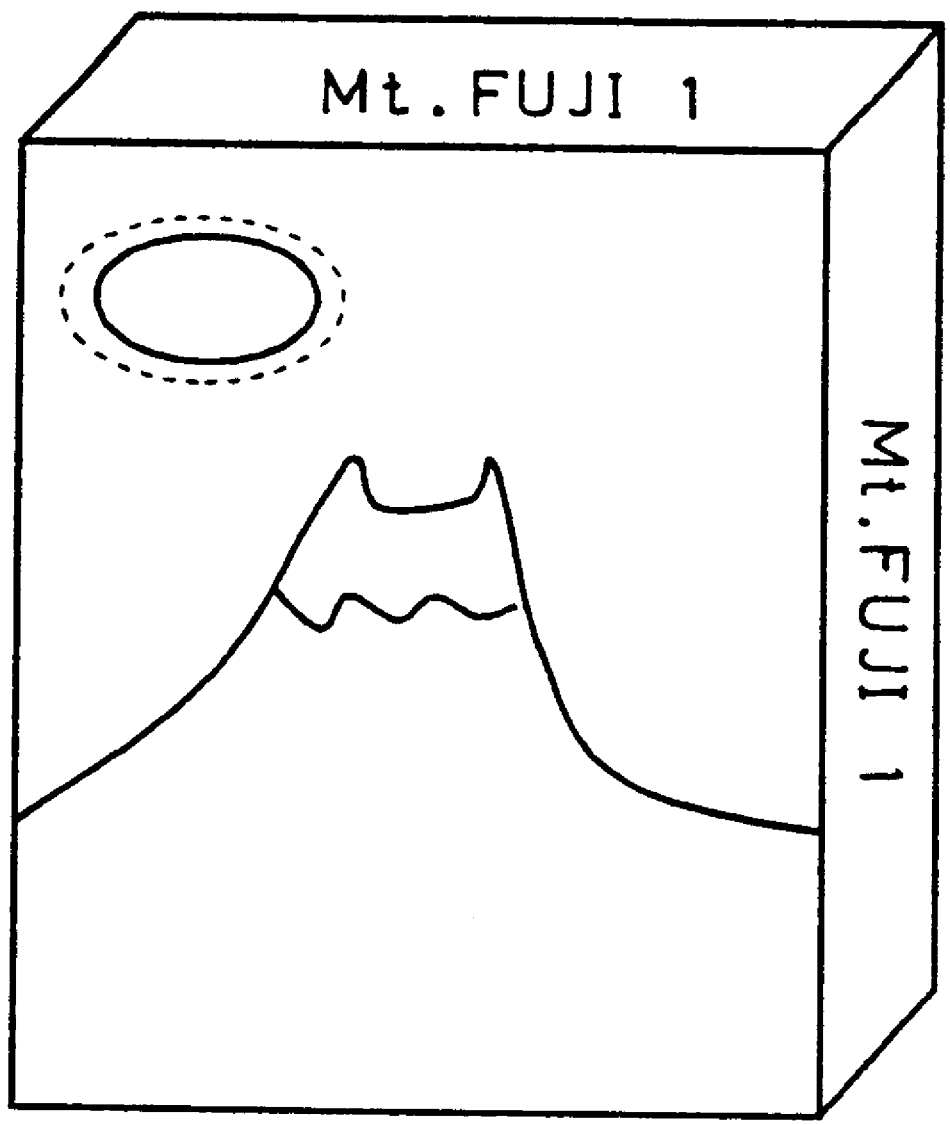
FIG. 101 is a view explaining an example data model.

In other words, for example, as shown in FIGS. 98 through 101, the data model 203 is a cubic object having six surfaces, which is a basic figure in the present embodiment. FIG. 98 is a front view and FIG. 99 is a rear view of the cubic object. As shown in FIGS. 98 and 99, each of the six surface of the cubic object is referred to as a front surface, a rear surface, a top surface, a bottom surface, a left surface, and a right surface, respectively. In FIG. 100, a reduced image of the text data is displayed on the front surface, and a text title "RESEARCH REPORT 1" is displayed on the top surface, right surface, and, although it is not shown in the drawing, the left surface. In FIG. 101, a reduced image of the image data is displayed on the front surface, and an image title "Mt. FUJI" is displayed on the top surface, right surface, and, although it is not shown in the drawing, the left surface. In this manner, the attribute of the data is displayed effectively using the thickness composed of the top surface, bottom surface, left surface, and right surface, which indicate the data size.

Figure 102:
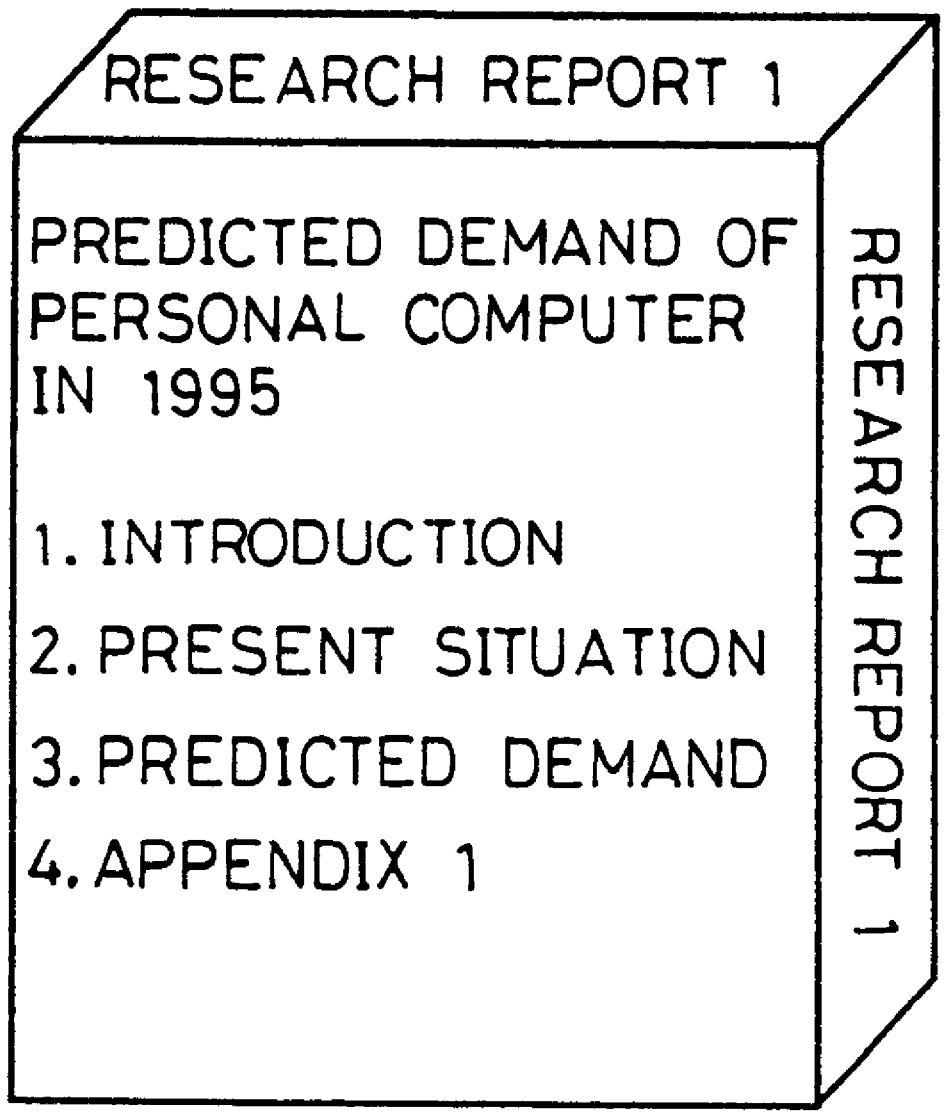
FIG. 102 is a view explaining an example data model.
Figure 103:
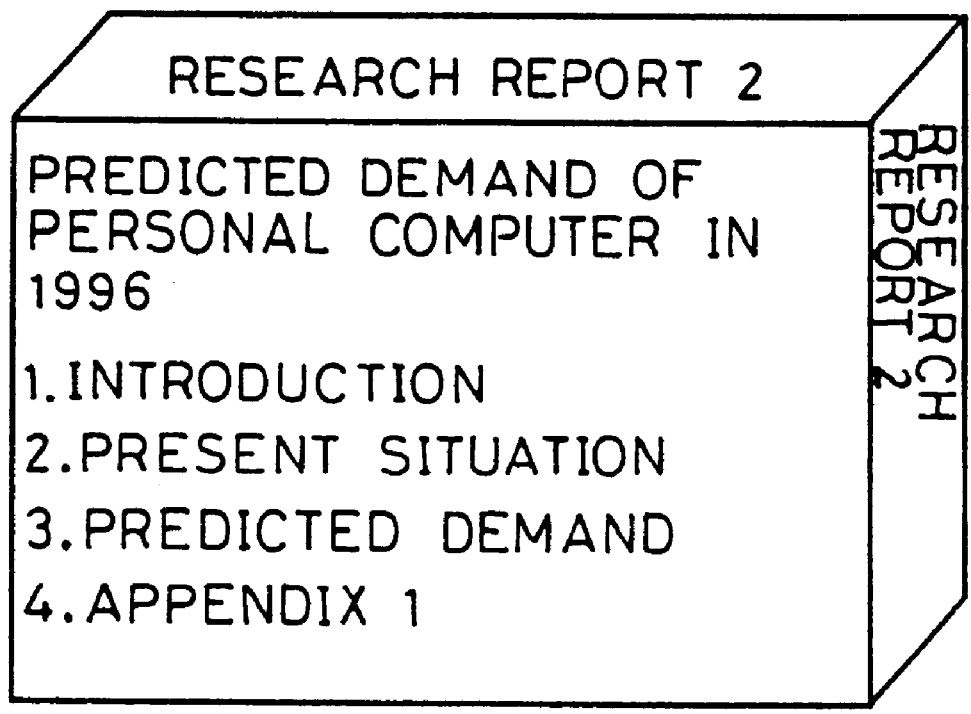
FIG. 103 is a view explaining an example data model.

Alternatively, as shown in FIGS. 102 and 103, a shape of the data model is determined depending on page print information. The page print information referred herein means information indicating a shape after the printing, for example, whether the data are printed out on a sheet in a portrait direction or landscape direction. FIG. 102 shows a data model of text data having the portrait page print information, and a portrait reduced image is displayed on the front surface. FIG. 103 shows a data model of text data having the landscape page print information and a landscape reduced image is displayed on the front surface. In this manner, the shape of the data model is determined in accordance with the page print information of the data. Thus, information as to the use of page contained in the data can be presented to the user, so that the user can use such information as a key when retrieving data from the 3-D coordinate space having displayed thereon more than one item of the data as shown in FIG. 2.

Figure 104:
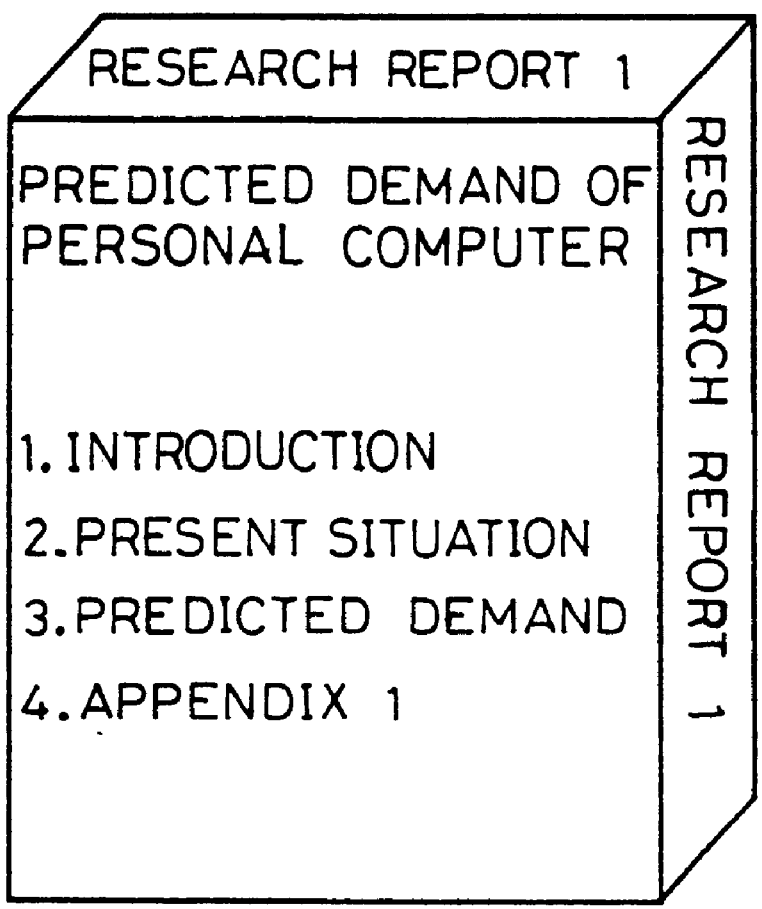
FIG. 104 is a view explaining an example data model.
Figure 106:
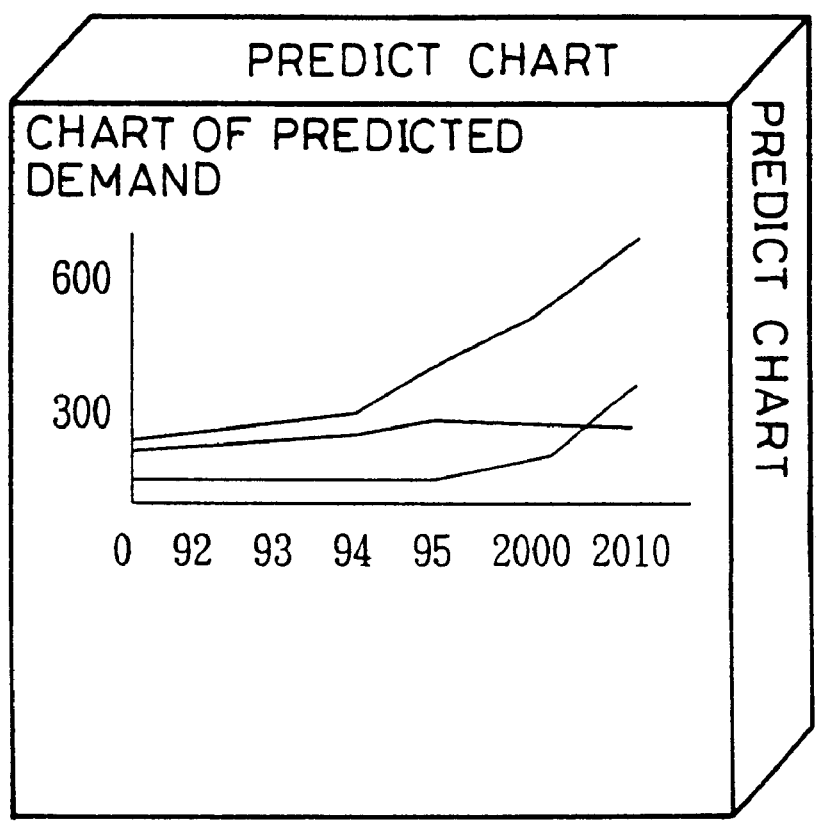
FIG. 106 is a view explaining an example data model.

Alternatively, as shown in FIGS. 104 through 106, a shape of the data model may be determined in accordance with the data kind information. The data kind information referred herein means information indicating different kinds of data, such as data of the text edit software program, data of the spreadsheet program, and data of the figure edit software program, in other words, the kinds of computer programs (application programs) handling the data. FIG. 104 shows a data model of the text data, which has a portrait front surface with a display of a reduced image of the text data. FIG. 105 shows a data model representing the spreadsheet program data, which has a landscape front surface with a display of a reduced image of the spreadsheet program data. FIG. 106 shows a data model of the figure edit software program data, which has a square front surface with a display of a reduced image of the image editing software program data. In this manner, the kinds of data can be indicated differently by determining the shape of the data model in accordance with the data kind information, so that the user can use such a difference as a key when retrieving the data from the 3-D coordinate space having displayed thereon more than one item of the data as shown in FIG. 2.

Figure 107:
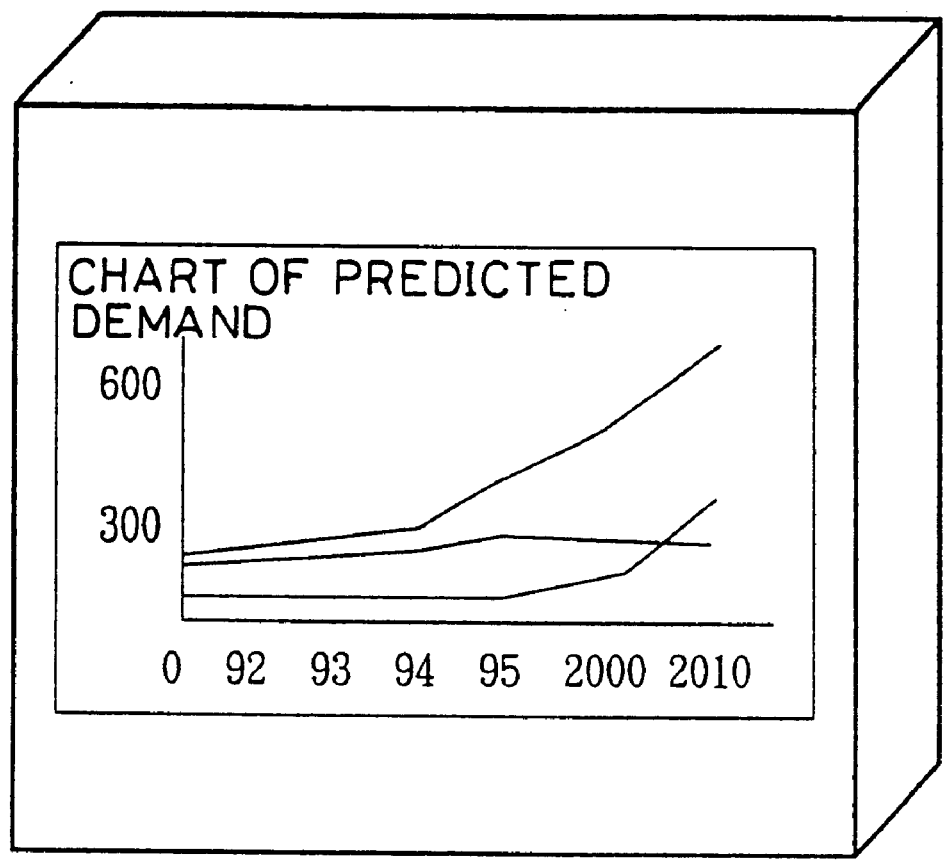
FIG. 107 is a view explaining an example data model.
Figure 108:
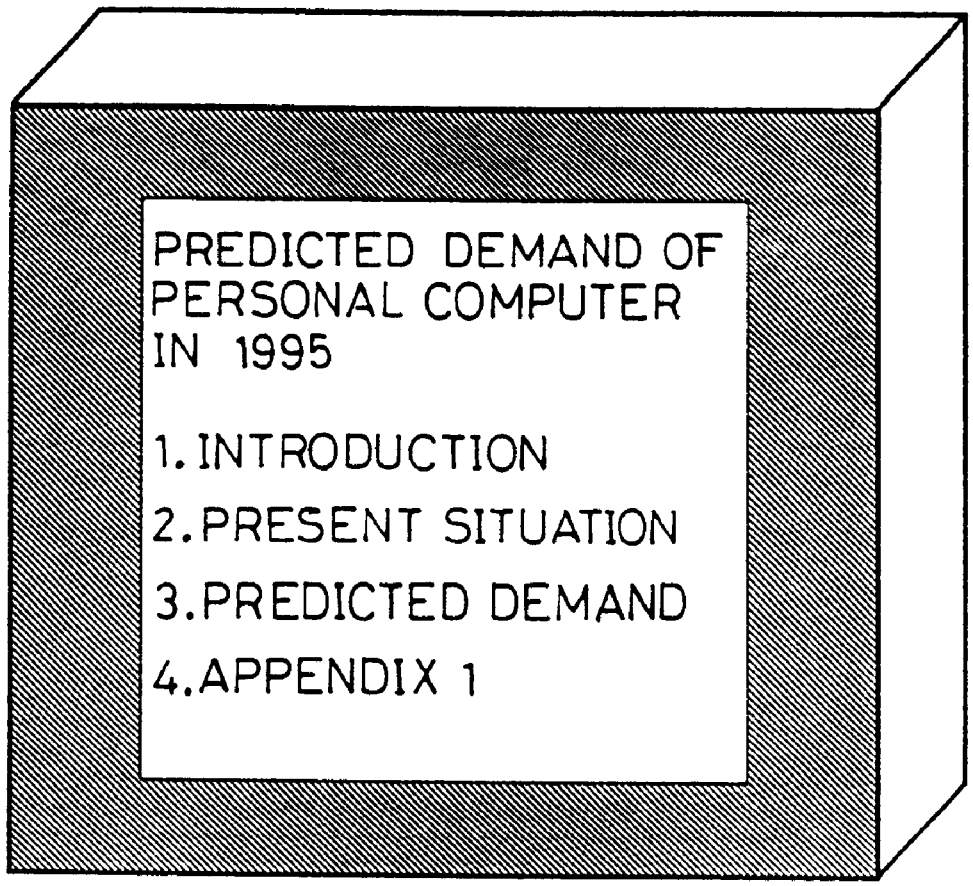
FIG. 108 is a view explaining an example data model.
Figure 109:
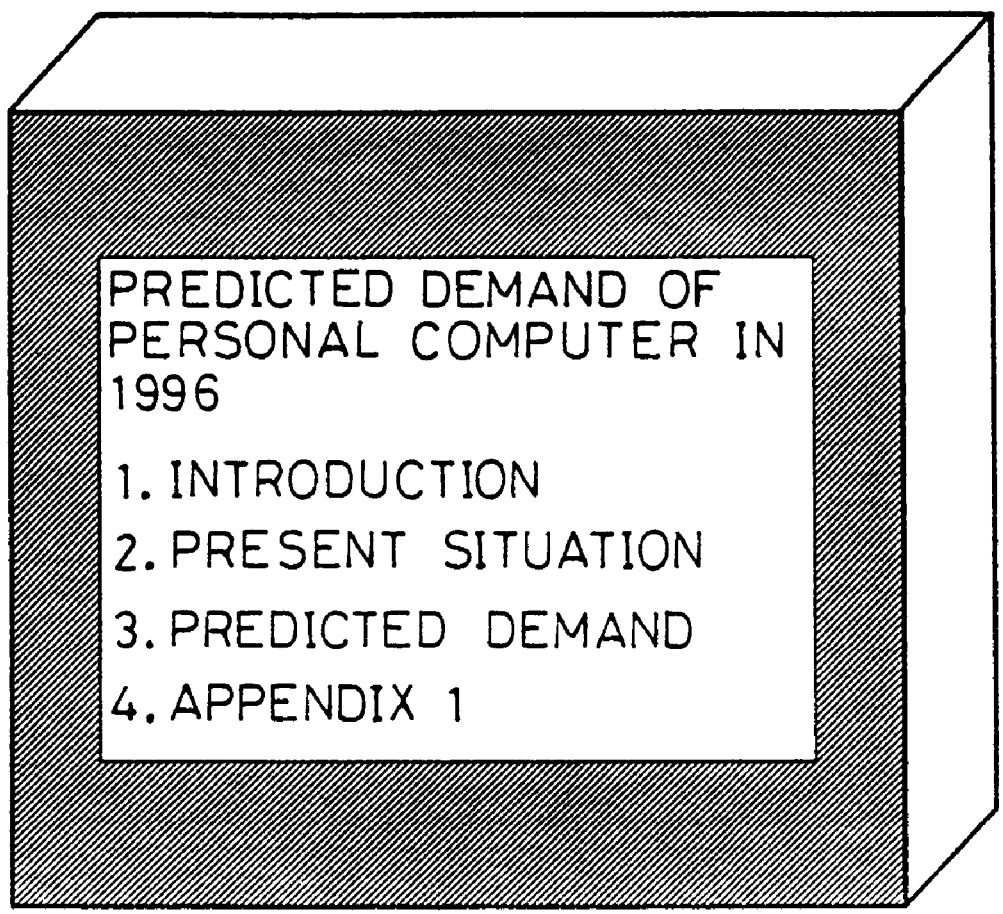
FIG. 109 is a view explaining an example data model.
Figure 110:
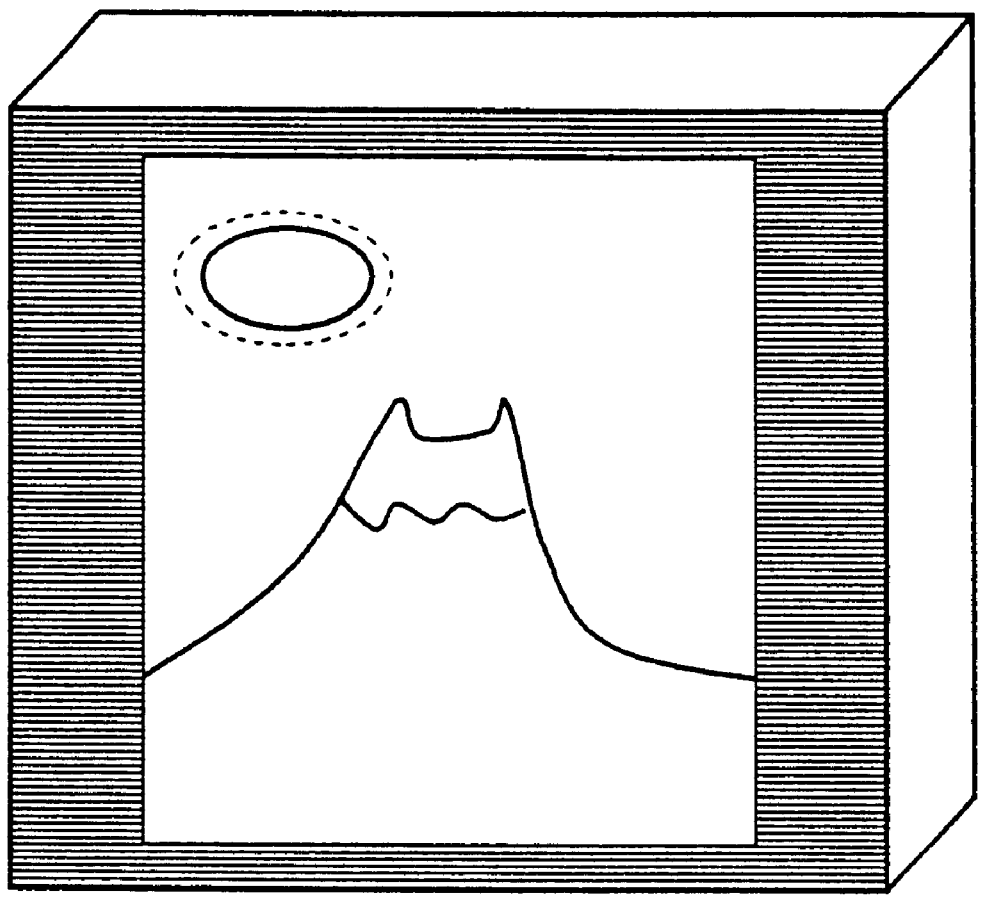
FIG. 110 is a view explaining an example data model.
Figure 111:
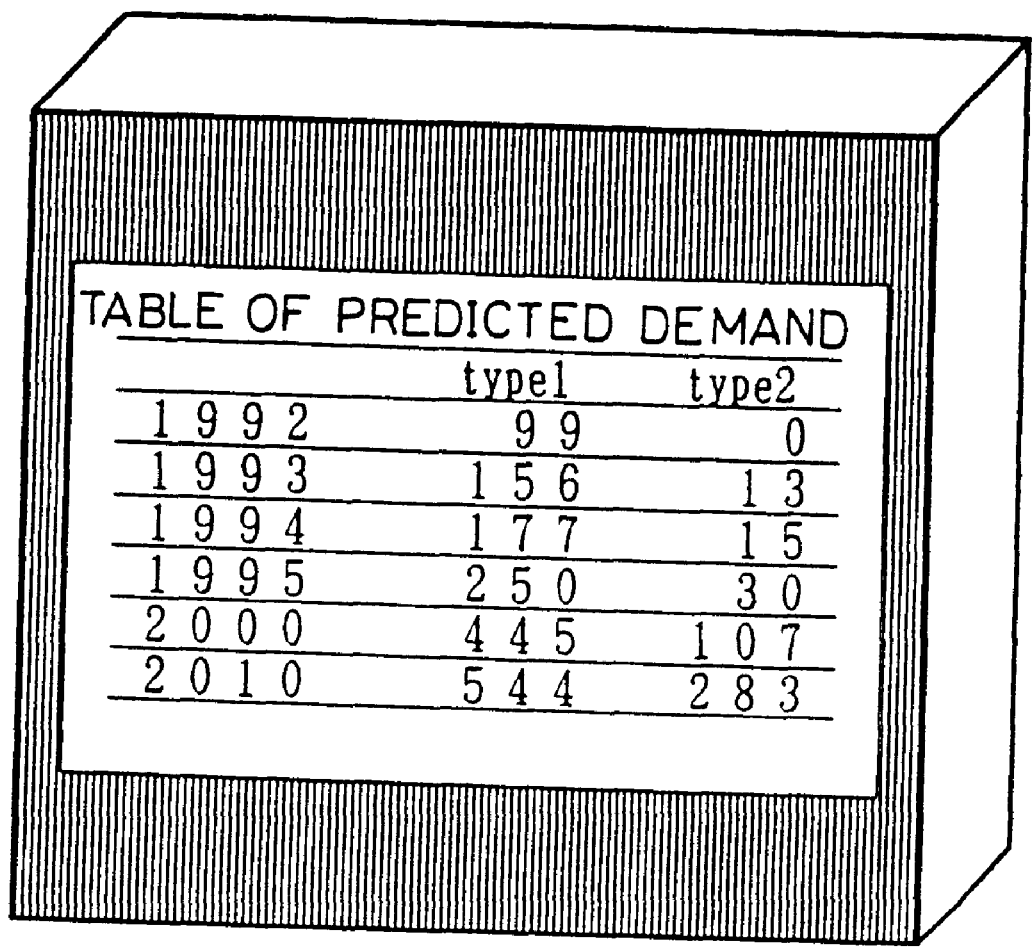
FIG. 111 is a view explaining an example data model.

Further, as shown in FIGS. 107 through 111, a shape of the reduced image of the data model may be determined in accordance with the above page print information, and the shape of the data model is fit into a predetermined shape by surrounding the reduced image with an area. FIG. 107 shows a data model of figure data having the landscape page print information, which displays a landscape reduced image on the front surface made into a constant size by adding an area around the landscape reduced image. FIG. 108 shows a data model of text data having the portrait page print information, which displays a portrait reduced image on the front surface made into the constant size by adding an area around the portrait reduced image. FIG. 109 shows a data model of text data having the landscape page print information, which displays a landscape reduced image on the front surface made into the constant size by adding an area around the landscape reduced image. FIG. 110 shows a data model of image data having portrait page print information, which displays a portrait reduced image on the front surface made into the constant size by adding an area around the portrait reduced image. FIG. 111 shows a data model of spreadsheet data having the landscape page print information, which displays a landscape reduced image on the front surface made into the constant size by adding an area around the landscape reduced image. As shown in FIGS. 107 through 111, the size of the front surface of each data model can be made constant, or normalized, while various kinds of additional information being displayed.

Figure 113:
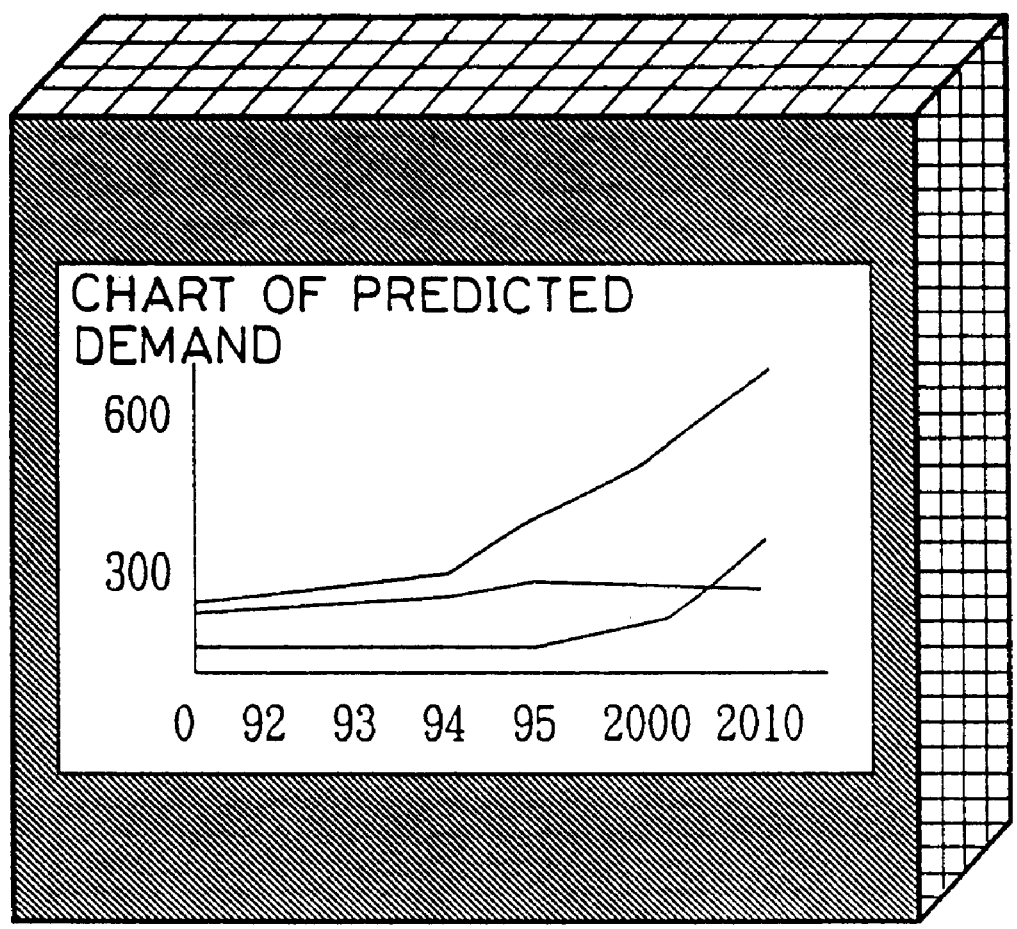
FIG. 113 is a view explaining an example data model.

Further, the area added to the reduced image on each data model shown in FIGS. 107 through 111 displays a decorative motif assigned to each data attribute. The decorative motifs are assigned to one of the data attributes, that is, the creators of the data, by a display table shown in FIG. 112. The added areas may display different colors assigned to each data attribute instead of the decorative motifs. Also, as shown in FIG. 113, the top surface or side surfaces of the data model, which are not used in FIGS. 107 through 111, may display the decorative motifs assigned to the data attributes other than the creators using a combination of the decorative motifs and colors other than those displayed on the front surface.

In this manner, the information as to the use of pages of the data can be displayed by determining the shape of the reduced image in accordance with the data's page print information. Further, the creators of the data can be readily distinguished by displaying the decorative motifs or colors assigned to the creators in the areas around the reduced images, and this arrangement can be used as a key when retrieving the data from the 3-D coordinate space having displayed thereon more than one item of the data as shown in FIG. 2. Furthermore, the data models can be readily placed on the 3-D coordinate space by normalizing the shape of the front surface of each data model.

Also, as shown in FIGS. 114 and 115 as still another example, each data attribute is displayed on the rear surface of the data model. FIG. 114 shows a data model which displays a reduced image of text data on the front surface. FIG. 115 shows the same data model seen from the back side, and the data model displays information of each attribute of the text data on the rear surface. In this manner, the attributes of the data are displayed in detail using the rear surface effectively. The user can see the information on the rear surface by moving the view point to a position from which he can see the rear surfaces of all the data models. Also, it may be arranged in such a manner that the data model in question alone is turned over when the user specifies the desired data using the pointing device.

Figure 116:
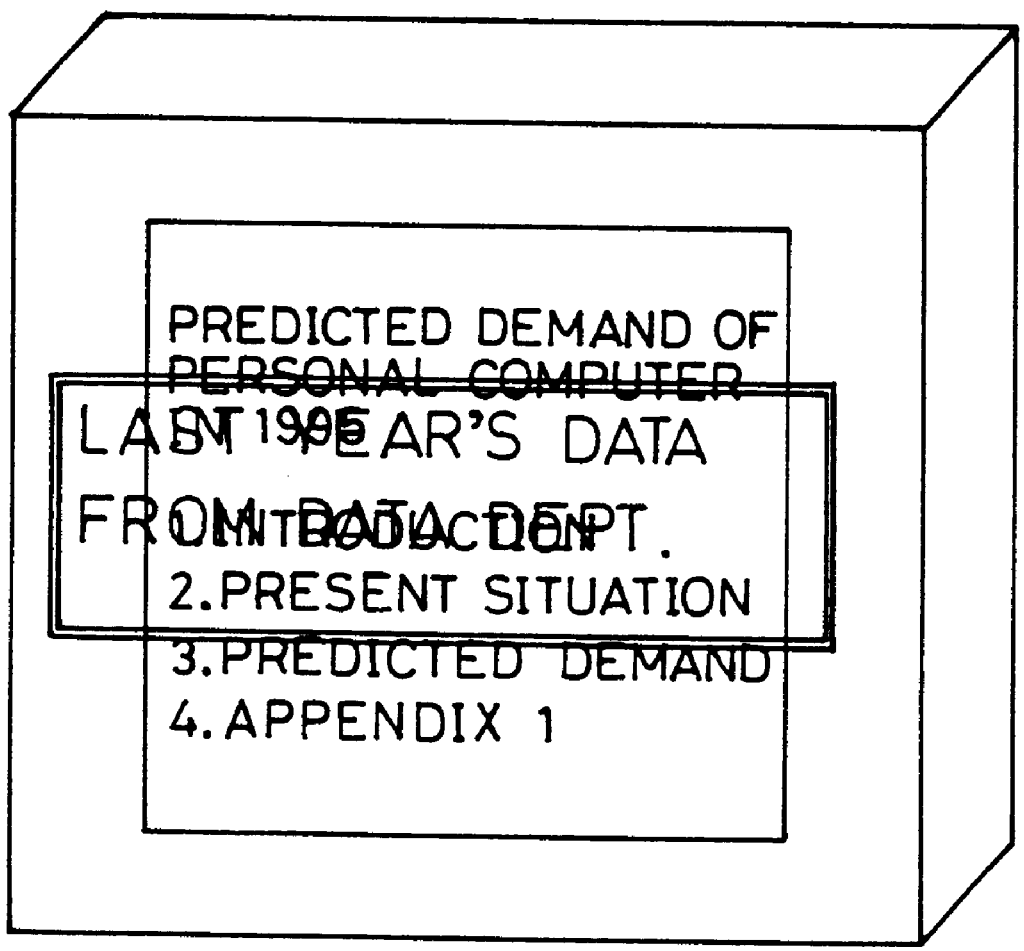
FIG. 116 is a view explaining an example data model.
Figure 117:
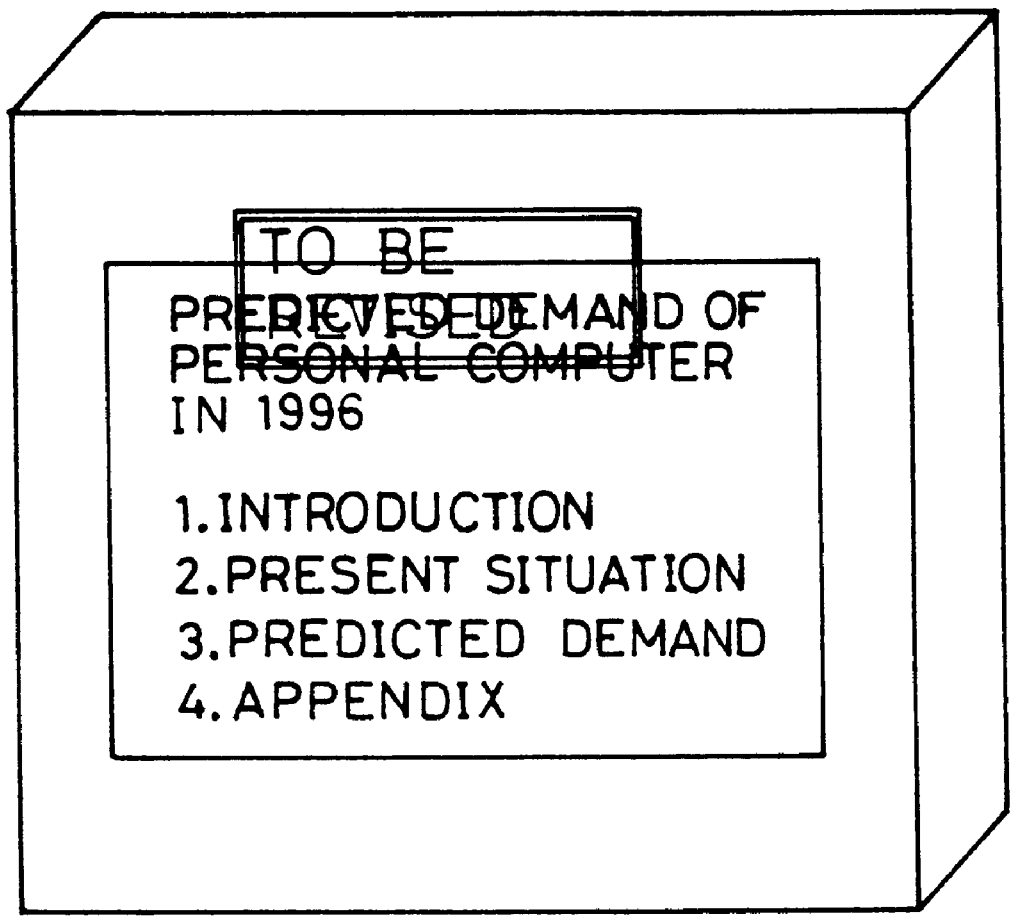
FIG. 117 is a view explaining an example data model.
Figure 118:
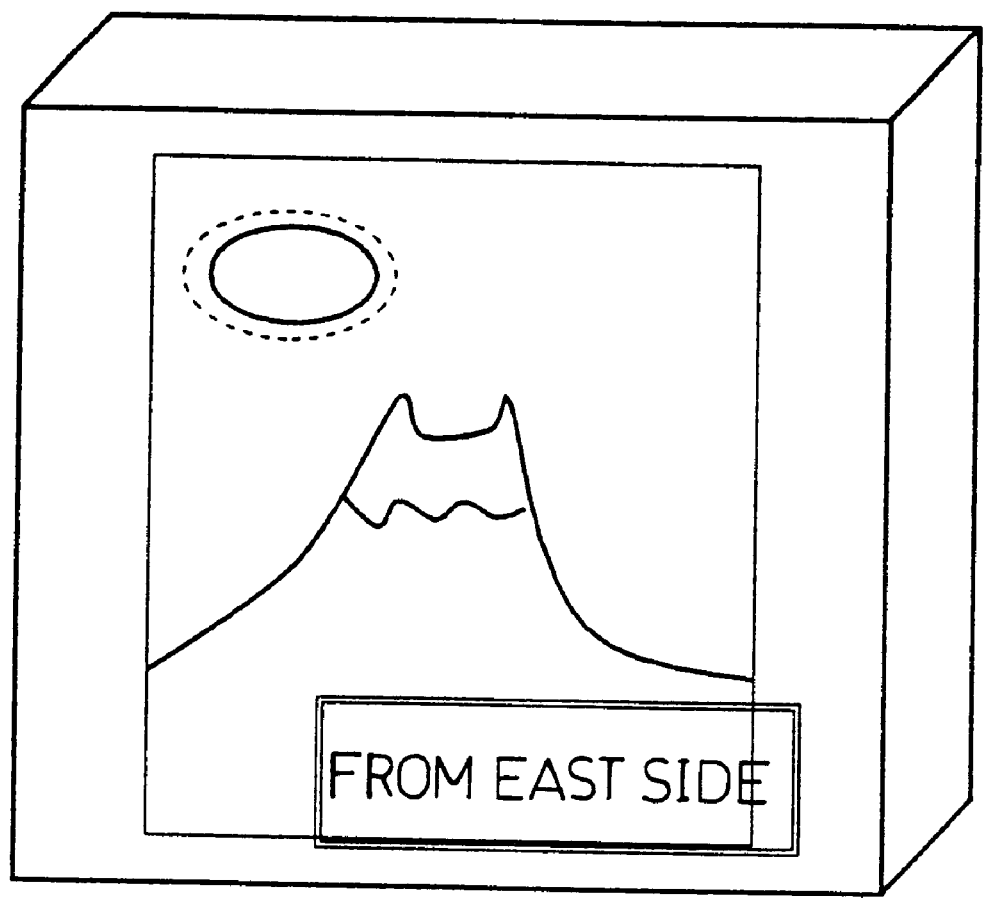
FIG. 118 is a view explaining an example data model.

Also, as shown in FIGS. 116 and 118 as still another example, the user inputs a memo or comments into the front surface of the data model. FIG. 116 shows a data model which displays a reduced image of text data on the front surface with a superimposed input memo, "SOURCE: LAST YEAR'S DATA COLLECTING DEPT". FIG. 117 shows a data model which displays a reduced image of text data on the front surface, and a superimposed input memo, "TO BE REVISED". FIG. 118 shows a data model which shows a reduced image of image data, and a superimposed input memo, "FROM EAST SIDE".

Figure 119:
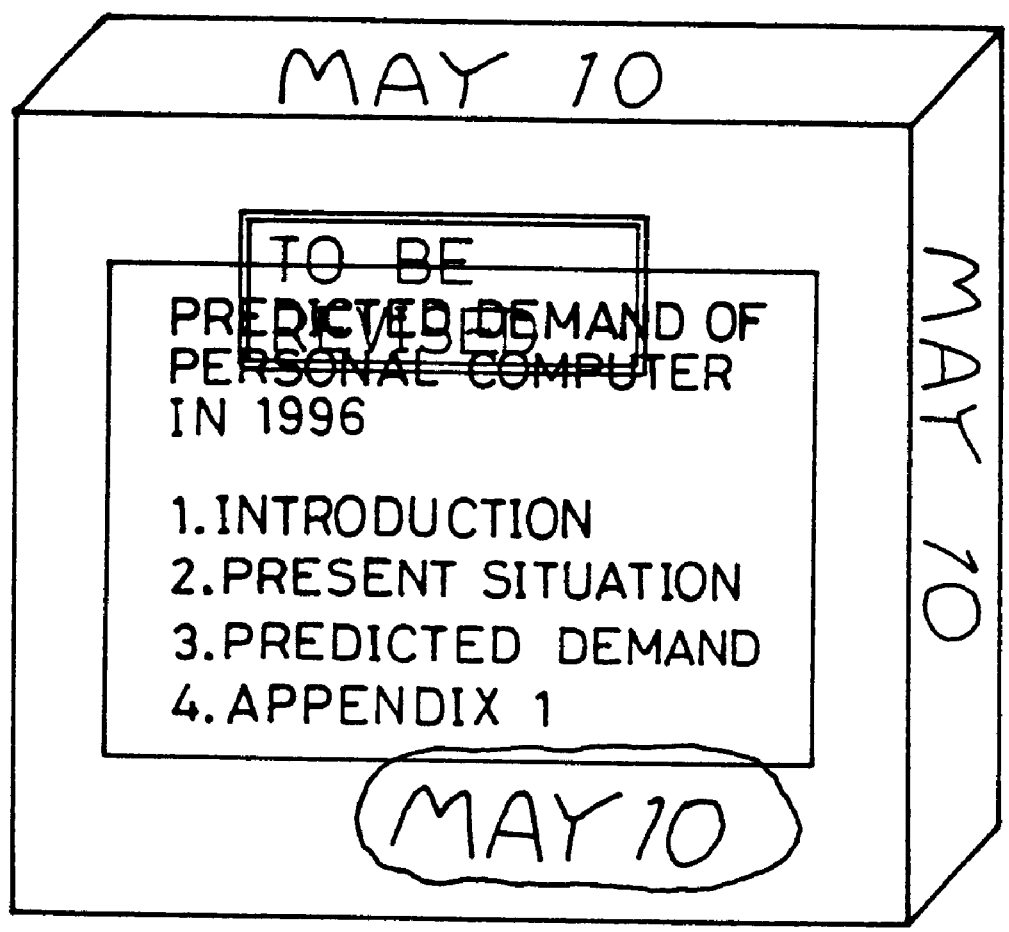
FIG. 119 is a view explaining an example data model.

Also, as shown in FIG. 119 as still another example, the hand-written input data on each surface of the data model are displayed directly as the way they are. Thus, the data model displays a reduced image of text data with superimposed input memos, "TO BE REVISED" and "MAY 10". "MAY 10" is hand-written data and inputted not only on the front surface, but also on the top and side surfaces by the user, and displayed directly as the way they are. In this manner, the user inputs the memo or comments, and the input memo is displayed on the data model simultaneously. This arrangement can be used as a key when retrieving data from the 3-D coordinate space having displayed thereon more than one item of the data as shown in FIG. 2. The memo or comments can be readily added during the data retrieval or user's reviewing by writing the hand-written data over the data model using manual input means serving both as a display device and an input device.

When the user inputs the hand-written data over the surfaces other than the front surface, an information volume of the data can be increased by adding the desired data readily by hand-written input which enables highly flexible and fast input, thereby making it easier to obtain the necessary information, while enabling the user to understand the data content entirely from the front surface without any superimposed display by his input.

In the present embodiment, to carry out the above display, the calendar model and category models have their respective tables of the same structures as described in Embodiment 1. On the other hand, the data models of the present embodiment are different from those in Embodiment 1 in having a table shown in FIG. 120.

To be more specific, as shown in FIG. 120, the information as to each item of the data (data A and data B) used by the data model generating section 103 is stored in the data display table to display the data models. In addition, the selection judgement of the data models and the selection state of the data models used by the data model selecting section 130 are stored in the data display table. Also, the data display table includes the data identifier, date of creation of the data, thickness magnification of the model indicating the data size, data format, pointer to a reduced image data indicating the data content, at least one identifier as to the category the data belong to, coordinate of the center position of the data models in the 3-D coordinate space, pointer to the application processing section for displaying and editing the data, titles, page print information, name of the creator of the data, additional information the user can add, and selection flag of the data model. The hand-written information input over the data model by the user is also stored in the above table.

In the present embodiment, to carry out the above display, both the calendar model and category models are generated in the same manner as described in Embodiment 1. On the other hand, the data models are generated in accordance with the flowchart in FIG. 121.

In other words, the identifiers of all the data that fall in the period and match with the categories specified by the database managing section 101 are taken in to be inputted into the data characteristics detecting section 102 (S601). The data characteristics detecting section 102 detects the date of creation of the data, size, data format, pointer to the reduced image, data partition, pointer to the application processing section, title, page print information, name of the creator, additional information, and selection flag using the obtained data identifier (S602), and the detecting result is inputted into the data model generating section 103. The data model generating section 103 computes a thickness magnification corresponding to the attribute based on the data size (S603). For example, in case of text data, the thickness magnification is computed in accordance with the number of pages.

Next, the data model of a rectangular parallelopiped is generated (S604). Then, an image to be drawn on the front surface of the data model is generated using the reduced image, page print information, name of the creator, and additional information (S605), and the image is drawn on the front surface of the data model by the texture mapping technique (S606). When the selection flag is in the selection state, the image is highlighted by, for example, being displayed in reverse. The highlight display can also be displayed on the other surfaces. Then, an image to be drawn on the top surface of the data model is generated using the title (S607), and the image is drawn on the top surface of the data model by the texture mapping technique (S608). Then, images to be drawn on the left and right surfaces are generated using the title (S609), and the images are drawn on the left and right surfaces, respectively, by the texture mapping technique (S610). Then, an image to be drawn on the rear surface of the data model is generated using, for example, data partition, creator, date of creation, update date, version number, size, and number of pages as the attributes (S611), and the image is drawn on the rear surface of the data model by the texture mapping technique (S612).

Whether the data models are generated from all the obtained data model identifiers or not is checked (S613), and the data of the generated data models for 3-D display are inputted into the data model placing section 106 (S614).

Next, generation processing of an image for each surface of the data model will be explained.

Figure 122:
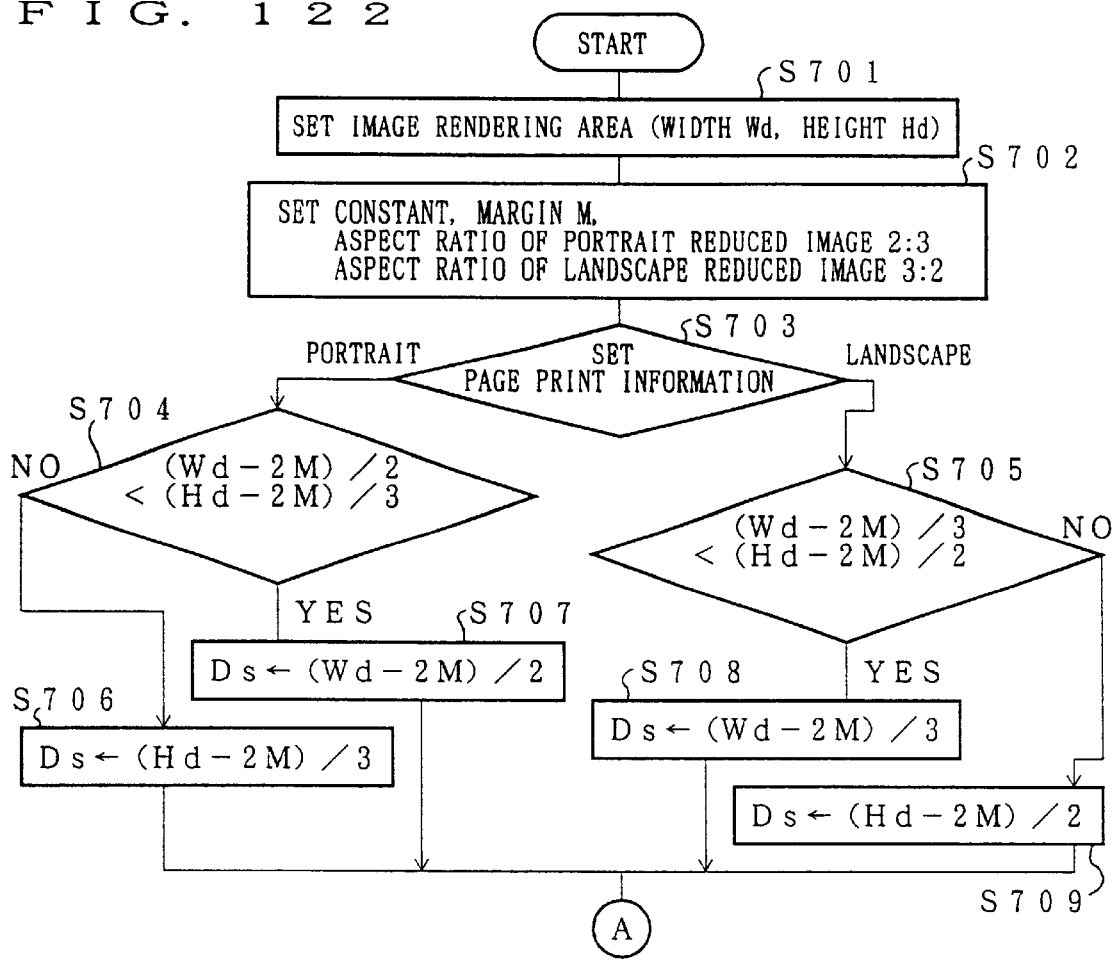
FIG. 122 is a flowchart detailing generation processing of an image on the front surface of the data model.
Figure 123:
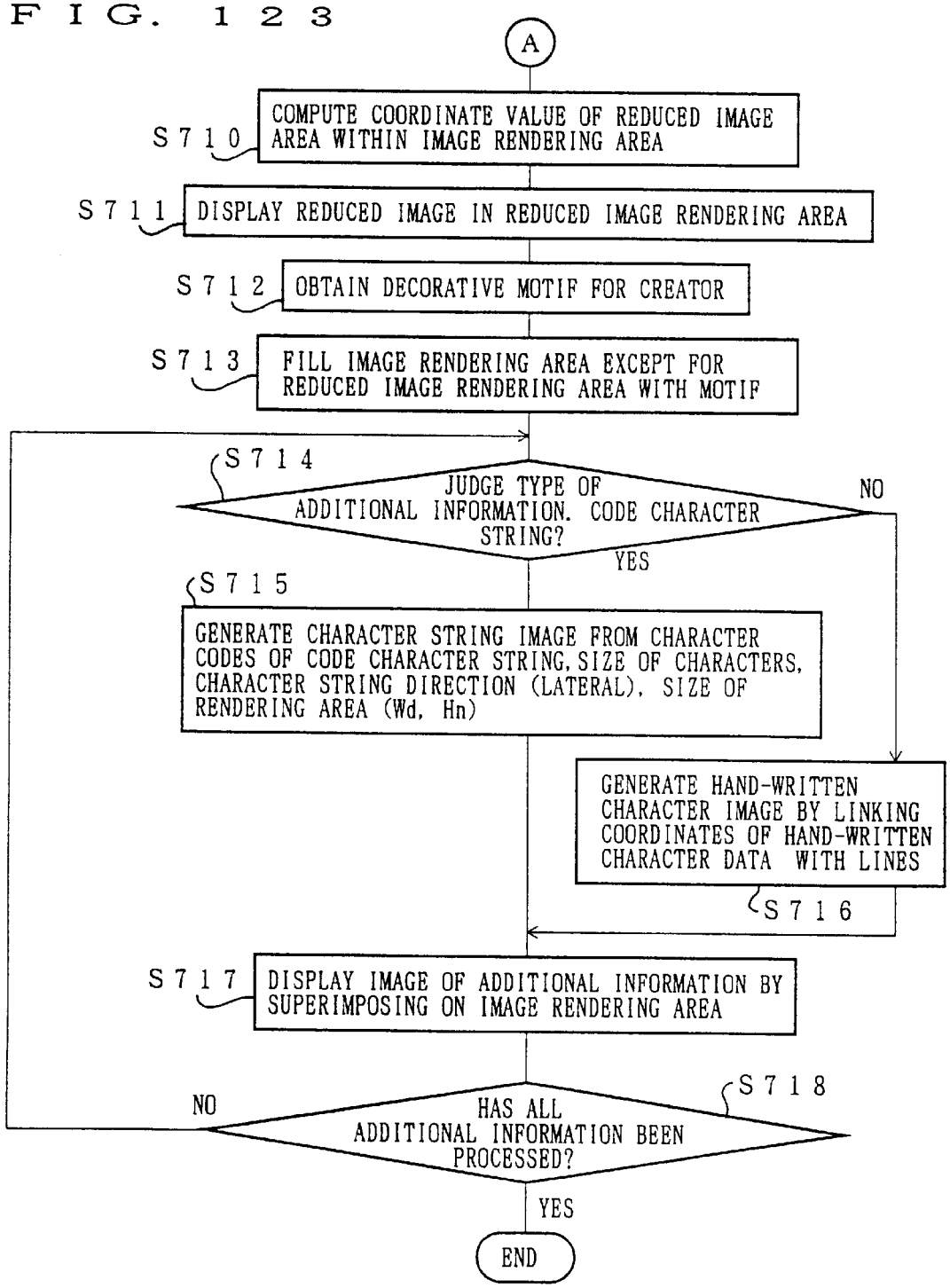
FIG. 123 is a flowchart detailing generation processing of an image on the front surface of the data model.

FIGS. 122 and 123 are views explaining the generation processing of an image on the front surface of the data model. To begin with, an image rendering area having the same width Wd and height Hd of those of the front surface of the data model is set, and a 2-D coordinate system having the origin at the lower left of the front surface of the data model is set (S701). Then, constants are set (S702). For example, the minimum margin from the image rendering area is set to M, an aspect ratio of the portrait reduced image area is set to 3:2, and an aspect ratio of the landscape reduced image is set to 2:3. Then, whether the subject data model has the portrait or landscape page print information is judged (S703).

Next, a unit length of the reduced image rendering area is computed using the aspect ratio predetermined in accordance with the page print information.

For example, in case of the subject data model having the landscape page print information, let Ds be a unit length, then the width and height of the reduced image rendering area are 3Ds and 2Ds, respectively. Since the unit length Ds takes either (Wd-2M)/3 or (Hd-2M)/2 whichever smaller, the reduced image rendering area can be set with at least a space of the margin M. Thus, whether (Wd-2M)/3<(Hd-2M)/2 is judged (S705), and when the inequality is established, Ds=(Wd-2M)/3 is set (S708). When the inequality is not established, Ds=(Hd-2M)/2 is set (S709). Then, the coordinate values of the reduced image rendering area having the vertexes (Wd/2−3Ds/2, Hd/2−Ds), (Wd/2+3Ds/2, Hd/2−Ds), (Wd/2−3Ds/2, Hd/2+Ds), (Wd/2+3Ds/2, Hd/2+Ds) in the 2-D coordinate system having the origin at the lower left of the front surface of the data model are computed (S710).

In contrast, in case of the subject data model having the portrait page print information, the width and the height of the reduced image area are 2Ds and 3Ds, respectively. Since the unit length Ds takes either (Wd-2M)/2 or (Hd-2M)/3 whichever smaller, the reduced image rendering area can be set with at least a space of the margin M. Thus, whether (Wd-2M)/2<(Hd-2M)/3 is judged (S704), and when the inequality is established, Ds=(Wd-2M)/2 is set (S707). When the inequality is not established, Ds=(Hd-2M)/3 is set (S706). Then, the coordinate values of the reduced image rendering area having the vertexes, (Wd/2−Ds, Hd/2−3Ds/2), (Wd/2+Ds, Hd/2−3Ds/2), (Wd/2−Ds, Hd/2+3Ds/2), (Wd/2+Ds, Hd/2+3Ds/2) are computed (S710).

Then, a display image is generated by drawing the reduced image on the computed reduced image rendering area (S711).

Then, the decorative motif assigned to the name of the creator is obtained from the table of FIG. 112 (S712), and the rendering area except for the reduced image rendering area is filled with the decorative motif (S713).

Then, whether the additional information is the code character string or hand-written characters is judged (S714).

Herein, the hand-written characters are interpreted broadly to include both the characters and line images for the explanation's convenience. In case of the code character string, a character string image which fits into the rendering area is generated by developing vector font data prepared in advance using the subject character codes, size of the characters, lateral direction as the character string direction, the width Wd and height Hd of the rendering area (S715) In case of the hand-written characters, a hand-written character image is generated by linking the coordinate values of each stroke with predetermined lines (S716). Then, an image on the front surface of the data model is generated by superimposing the resulting image on the reduced image and decorative motif which have been already drawn on the rendering area (S717). Whether S714–S717 are carried out for all the additional information or not is judged (S718). If all the additional information has been processed, the generation of an image on the front surface of the data model ends.

Figure 124:
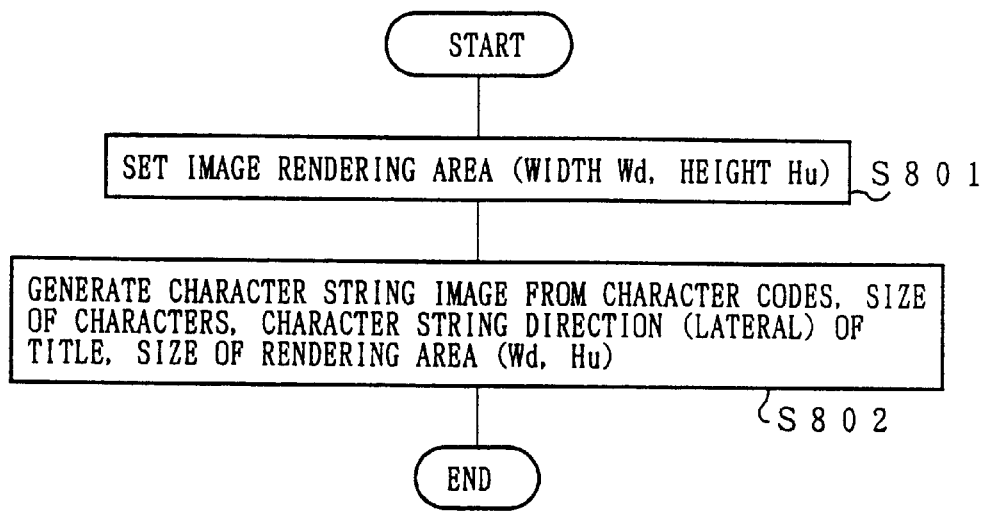
FIG. 124 is a flowchart detailing generation processing of an image on the top surface of the data model.

FIG. 124 is a view explaining the generation processing of an image on the top surface of the data model. To begin with, an image rendering area having the same width Wd and height Hu as those of the top surface of the data model is set (S801). Then, a character string image which fits into the top surface image rendering area is generated by developing vector font data prepared in advance using the character code, size of the characters, lateral direction as the character string direction, the width Wd and height Hu of the top surface image rendering area from the title (S802), after which the processing ends.

Figure 125:
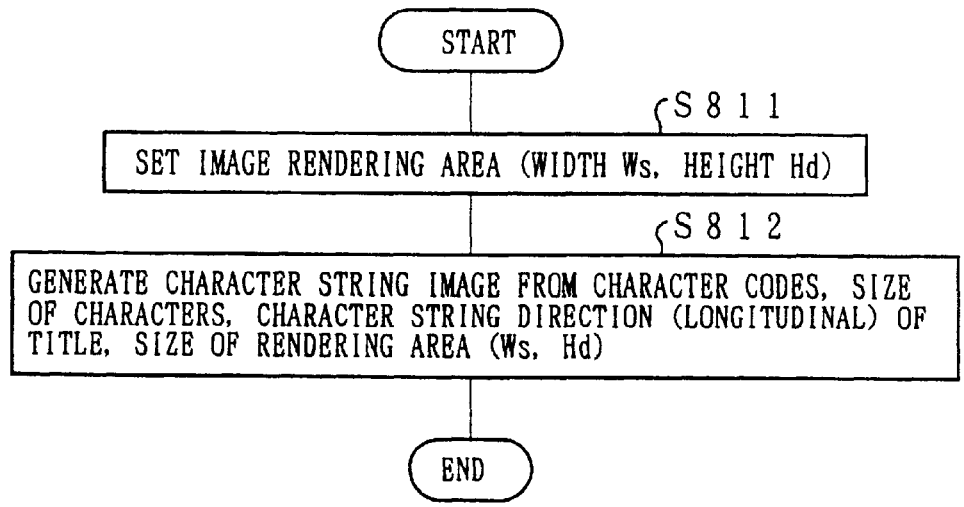
FIG. 125 is a flowchart detailing generation processing of an image on the side surface of the data model.

FIG. 125 is a view explaining generation processing of an image on the side surfaces (right and left surfaces) of the data model. To begin with, an image rendering area having the same width Ws and height Hd as those of the side surfaces of the data model is set (S811). Then, a character string image which fits into each side surface image rendering area is generated by developing vector font data prepared in advance using the character code, size of the characters, longitudinal direction as the character string direction, the width Ws and height Hd of the side surface image rendering area from the title (S812), after which the processing ends.

Figure 126:
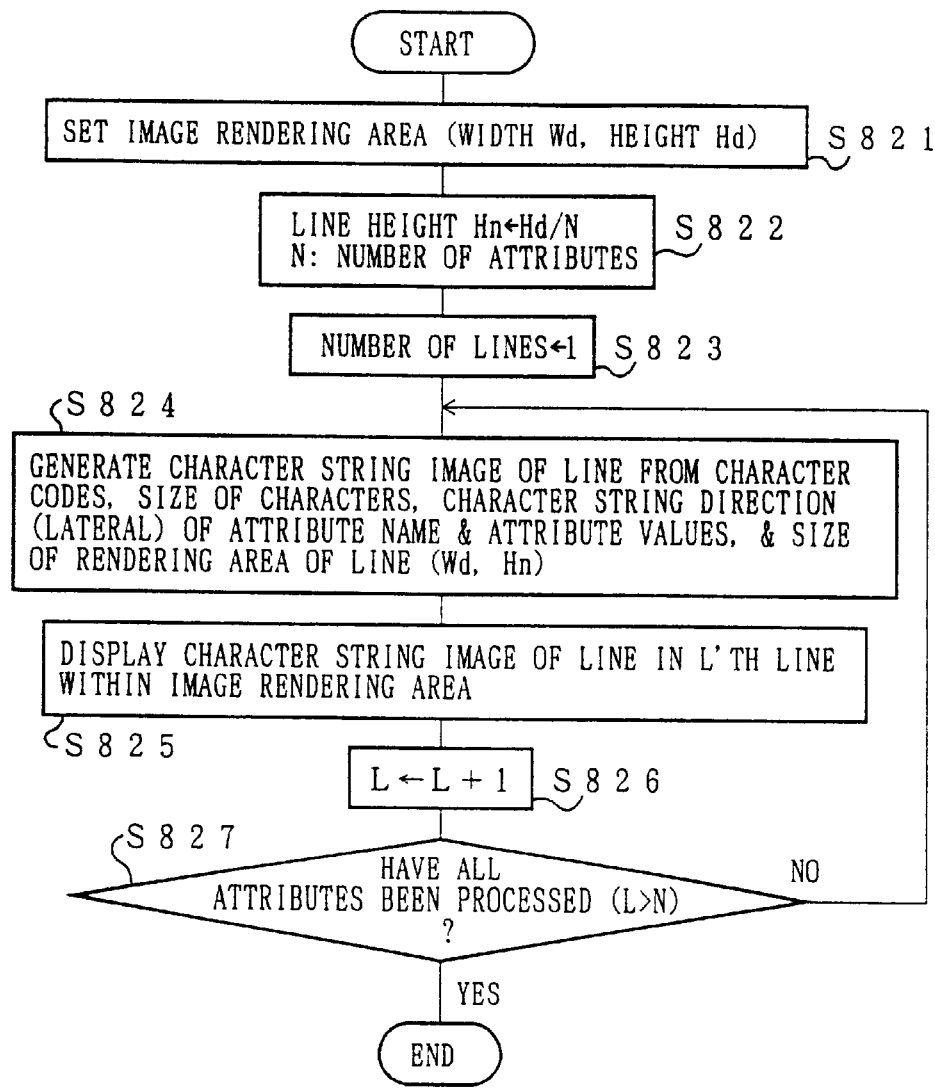
FIG. 126 is a flowchart detailing generation processing of an image on the rear surface of the data model.

FIG. 126 is a view explaining generation processing of an image on the rear surface of the data model. To begin with, an image rendering area having the same width Wd and height Hd as those of the rear surface of the data model is set (S821). Then, a line height Hn is set to a value obtained by, for example, dividing the height Hd of the rear surface image rendering area by the number N of attribute items (S822). Then, the number L of lines is set to 1 (S823). Then, a character string image which fits into one line is generated by developing vector font data prepared in advance using the character codes, size of the characters, lateral direction as the character string direction, the width Wd of the rear surface image rendering area and line height Hn from the attribute name and attribute value (S824). Then, the character string image for one line is drawn in the area corresponding to the L'th line in the image rendering area (S825). Then, the number L of lines is incremented (S826). Whether all the attributes have been processed or not is judged (S827), and when all the attributes have been processed, the generation of the image on the rear surface of the data model ends.

The data models are placed and the view point is moved in the same manner as described in Embodiment 1, and the description of which is omitted herein.

Figure 127:
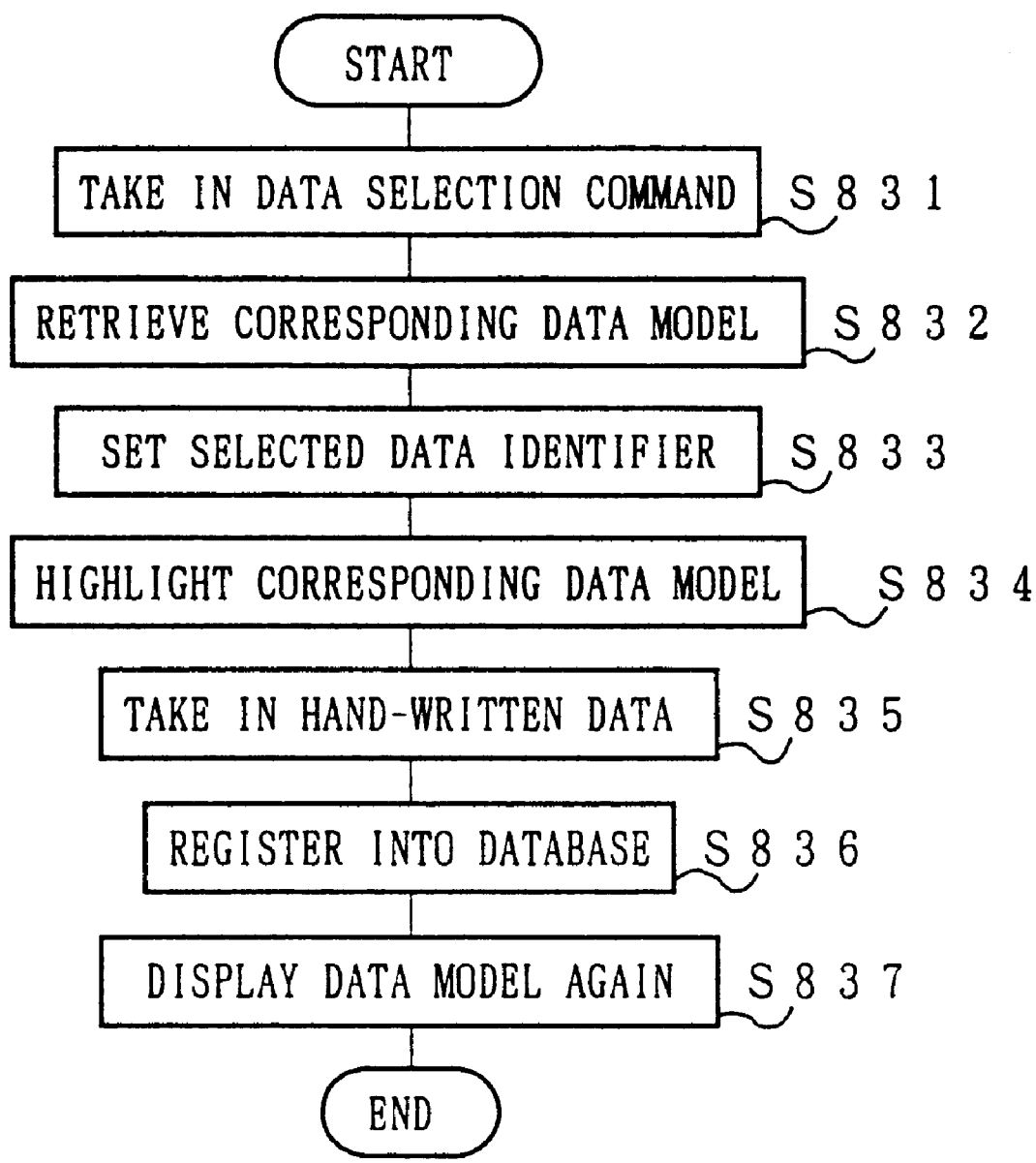
FIG. 127 is a flowchart detailing information addition processing.

Next, an operation for processing to add information, for example, hand-written data, by the user in the present embodiment will be explained with reference to FIG. 127.

To begin with, a command of data selection from the user is inputted into the input section 108, and the command of data selection is inputted into the data model selecting section 130. The data model selecting section 130 takes in the data selection command (S831), and retrieves the data model corresponding to the taken data selection command using the position coordinate in the data model display table and determines the selected data model (S832). The data model selecting section 130 sets the selection flag in the data model display table, which corresponds to the data identifier of the selected data model, to the selected state (S833), and highlights the corresponding data model by, for example, displaying each surface of the data model in reverse (S834).

Then, a memo of the hand-written data is input into the input section 108 by the user, and the hand-written data are inputted into the data selecting section 130 and taken in the same (S835). The hand-written data are inputted into the database managing section 101 as the additional information of the data identifier, and registered both in the database and data model display table (S836). After the registration into the database, the data model is displayed again (S837) and the processing ends.

Note that the input memo is not limited to the hand-written characters, and can be code character strings.

As has been explained, according to the data display method of the present embodiment, the data stored in the database are displayed after being placed on the 3-D coordinate space composed of an axis representing the date of creation of the data and another axis representing the category of the data. Moreover, since the content is displayed in the form of a reduced image and the shape of each item of the data is determined and displayed in accordance with the attribute, the user can understand each item of the data at a glance while understanding the relationship among each item of the data in terms of time in a straightforward manner.

As has been explained, a first display method of the present invention is characterized by comprising:

storage means for storing more than one item of data each having both time information and category information;

coordinate space generating means for generating a time axis on a wall plane in a depth direction with respect to a screen and a category coordinate on a floor plane in a width direction with respect to the screen; and figure generating means for generating a figure representing a content of the data, wherein the above figure is displayed on a coordinate space composed of the wall plane and floor plane based on the time information and category information of the data.

According to the above method, a figure representing the data content is displayed on the coordinate space composed of the wall plane and floor plane based on the time information and category information of the data. Thus, the user can understand individual data files three-dimensionally at a glance, while understanding the position of the data files in terms of time and categories directly.

Therefore, when the user retrieves the data as occasion demands, he can understand the content of each item of the data at a glance while understanding the position of the data in terms of time, categories, etc. in a straightforward manner. Consequently, the user can readily manage the data and retrieve the information he needs.

A second data display method is the first data display method further characterized in that the figure generating means includes reduced image generating means for displaying a reduced content of the data, so that a reduced image is displayed on the coordinate space composed of the wall plane and floor plane based on the time information and category information of the data.

According to the above method, a reduced content of the data is displayed as the figure representing the content of the data in the first method. Thus, the user can roughly understand the content of the data without opening the data, and readily manipulate and retrieve the data visually.

Therefore, in addition to the effect realized by the first method, the user can manage the data and retrieve the information he needs more readily.

A third data display method is the first or second method further characterized by additionally comprising:

link means for correlating the data to the figure generated by the figure generating means; and figure selecting means for selecting a figure from the figures displayed on the coordinate space, wherein a content of the data correlated by the linking means is displayed by selecting an arbitrary figure by the figure selecting means.

According to the above method, the data and figure are liked to each other, and a content of the data linked to the figure is displayed by selecting an arbitrary figure in the first or second method. Thus, the user can open the data in a simple manner and a content of the necessary data can be displayed at high speeds.

Therefore, in addition to the effect realized by the first method, the user can manage the data and retrieve the information he needs more readily.

A fourth data display method is any of the first through third methods further characterized in that the data includes page information and the figure is displayed with a predetermined thickness in accordance with the page information.

According to the above method, the data includes the page information and the figure is displayed with a predetermined thickness in accordance with the page information in any of the first through third methods. Thus, the user does not have to confirm the number of pages by opening the data or by a numerical value. Instead, the user can understand an approximate number of pages of the data directly when he sees the thickness of the figure.

Therefore, in addition to the effect realized by the first method, the user can manage the data and retrieve the information he needs more readily.

A fifth data display method is any of the first through fourth methods further characterized in that calendar information is used as the time coordinate, and a calendar is displayed on the wall plane in the depth direction with respect to the screen.

According to the above method, the calendar is displayed on the wall plane in the depth direction with respect to the screen using the calendar information as the time coordinate in any of the first through fourth methods. Thus, the user can directly understand the position of the data in terms of time and categories using the calendar, in other words, in association with schedules or the like.

Therefore, in addition to the effect realized by the first method, the user can manage the data and retrieve the information he needs more readily.

A sixth data display method is any of the first through fifth methods further characterized by additionally comprising:

coordinate specifying means for specifying a coordinate range of each of the time coordinate and category coordinate, so that a display range of the time coordinate displayed on the wall plane of the coordinate space and a display range of the category coordinate displayed on the floor plane of the coordinate space are specified by the coordinate specifying means.

According to the above method, the display range of the time coordinate displayed on the wall plane of the coordinate space and the display range of the category coordinate displayed on the floor plane of the coordinate space are specified in any of the first through fifth methods. Thus, the position of the data in terms of time or categories is displayed in a necessary range limited by the user. Consequently, the user can readily confirm the data he needs and other data positioned all around the data in question at high speeds.

Therefore, in addition to the effect realized by the first method, the user can manage the data and retrieve the information he needs more readily.

A seventh data information is any of the first through sixth methods further characterized by additionally comprising:

initial setting means for setting initial values of the time coordinate and category coordinate, so that the time coordinate and category coordinate are displayed by their respective initial values set by the initial setting means on the wall plane and floor plane of the coordinate space, respectively.

According to the above method, the display initial values of the time coordinate displayed on the wall plane of the coordinate space and the category coordinate displayed on the floor plane of the coordinate space are set in advance in any of the first through sixth methods. Thus, a coordinate space having the user's intended time or categories can be displayed any time. Consequently, the user's visual position is never lost in the coordinate space.

Therefore, in addition to the effect realized by the first method, the user can manage the data and retrieve the information he needs more readily.

An eighth data display method is characterized in that:

data having both time information and category information are shown as a figure;

the figure is placed on a coordinate space having a time coordinate on a wall plane in a depth direction with respect to the screen and a category coordinate on a floor plane in a width direction based on time information and category information of the data; and the placed figure is displayed through a particular position set as a view point within the coordinate space.

According to the above method, the data having both the time information and category information are shown as a figure, and the figure is placed on the coordinate space having the time coordinate on the wall plane in the depth direction with respect to the screen and the category coordinate on the floor plane in the width direction based on the time information and category information of the data, after which the placed figure is displayed through a particular position set as the view point within the coordinate space. Thus, the user can understand the individual data files three-dimensionally at a glance, while understanding the position of the data files in terms of time and categories directly.

Therefore, in addition to the effect realized by the first method, the user can manage the data and retrieve the information he needs more readily.

A ninth data display method is the eighth method further characterized in that the view point position is moved arbitrarily within the coordinate space.

According to the above method, the user's view point position is moved arbitrarily within the coordinate space in the eighth method. Thus, the user can manipulate the data while seeing the relationship among the data in terms of time and categories. Also, the user can manipulate the data as if he were walking through the coordinate space.

Therefore, in addition to the effect realized by the eighth method, the user can manage the data and retrieve the information he needs more readily.

A tenth data display method is a data display method in a virtual 3-D coordinate space having an X axis in a lateral direction of a 2-D screen, a Y axis in a longitudinal direction of the 2-D screen, and a Z axis in a virtual depth direction with respect to the 2-D screen, characterized in that:

a content of data is generated as a reduced image;

an attribute of each item of the data is set to each of the X axis and Z axis within the space;

a list of the content of each item of the data is displayed on the screen by displaying the reduced image at a position having an X coordinate and a Z coordinate corresponding to the value of the attribute of each item of the data; and a trace of view points inputted in the space successively, each of which indicating of which part of the space should be displayed at which angle as an image, is superimposed on the reduced image within the screen.

According to the above method, a list of the content of each item of the data is displayed as a reduced image at a position corresponding to the attribute of each item of the data set respectively on the X axis and Z axis within the virtual 3-D coordinate space.

The user directs to move the view point by successively inputting the view points moving in an arbitrary line of sight direction within the virtual 3-D coordinate space.

Then, the above image is displayed with being changed over time, namely, being moved parallel or upsized/downsized, in the line of sight direction, so that the user can obtain a view as if he were walking through the space along the movement of the view point. For example, if the user directs to move the view point along the Z axis direction, he can understand readily and visually how the data are changed with the variance of the value of the attribute represented by the Z axis through the movement of the image representing the content of each item of the data. The same can be said when the view point is moved along the X axis direction. If the user directs to move the view point somewhere between the X axis and Z axis, he can readily understand how the data are changed with the variance of the values of both the attributes.

Consequently, the user can see a list of the data made of reduced images arranged and correlated to one another by the two attributes in an arbitrary direction within the 3-D coordinate space based on these attributes. In particular, unlike an instantaneous switching from an original display of a list of all the data to a display of the target image data alone, the image is displayed while changing its display position or shape over time along the movement and moving direction of the view point as if the user were walking through the virtual 3-D coordinate space. Thus, the user can readily and visually understand overall sequence and tendency, such as the alignment of the data as to the user's intended retrieval, thereby making the data retrieval easier.

Here, according to the above method, a trace of the movement of the view point is displayed within the screen.

Consequently, the user can readily confirm the history of the list of the data. In other words, the user can know retrieval history revealing in what order the data were reviewed and retrieved in the past at a glance. Thus, even the user does not remember in what manner he did the retrieval, the same retrieval is not repeated. Moreover, the user can easily plan in what manner he should do the next retrieval.

Therefore, when the user retrieves the data as occasion demands, he can understand the content of each item of the data at a glance, while understanding the position of the data in terms of time, categories, or the like in a straightforward manner. Consequently, the user can readily manage the data and retrieve the information he needs.

An eleventh data display method is the tenth method further characterized in that the screen switches successively from a display through the latest view point to those through the older view points along the trace of the movement of the view point.

According to the above method, the screen switches successively from a display through the latest view point to those through the older view points along the trace of the movement of the view point, in other words, the screen switches backward in time series.

Thus, the user can understand the retrieval history revealing in what order the data were reviewed and retrieved in the past and the retrieval result at a glance. Therefore, if the user does not remember in what manner he did the retrieval, he can readily reconfirm the content of the retrieval and change in the past, so that he can easily plan in what manner he should to the next retrieval.

Therefore, in addition to the effect realized by the tenth method, the user can manage the data and retrieve the information he needs more readily.

A twelfth data display method is the tenth method further characterized in that the specified data are displayed at the front position within the screen.

According to the above method, the data specified by the user are displayed at the front position within the screen.

Thus, the user can display the data he wishes to see at an optimal position.

Therefore, in addition to the effect realized by the tenth method, the user can manage the data and retrieve the information he needs more readily.

A thirteenth data display method is the tenth method further characterized in that an image whose distance to the view point is not greater than a predetermined value is turned into invisible so as not to be displayed on the screen.

According to the above method, an image whose distance to the view point becomes equal to or smaller than the predetermined value is turned into invisible and erased from the screen.

Thus, an image to which the view point approaches too close while the view point is being moved is erased from the screen, and images of the data behind the erased images are displayed entirely without being hidden partially by the image which is now erased. Consequently, a more easy-to-see list of the data can be provided.

Therefore, in addition to the effect realized by the tenth method, the user can manage the data and retrieve the information he needs more readily.

A fourteenth data display method is the thirteenth method further characterized in that an image is turned into translucent while the image is turned into visible/invisible.

According to the above method, each data image is turned into translucent before being turned into visible/invisible, so that the image is erased or appears not instantaneously but gradually.

Thus, the user knows which data will be erased or appear next and when, and the screen switches naturally by eliminating unnatural impression given by abrupt erasure or appearance of the image, so that the user will not be puzzled what to do for abrupt switching of the screen.

Therefore, in addition to the effect realized by the thirteenth method, the user can manage the data and retrieve the information he needs more readily.

A fifteenth data display method is the thirteenth method further characterized in that, when an image is erased, a display of the image flipped down within the screen is shown, and when an image is to appear, a display of the image flipped up within the screen is shown.

According to the above method, each data image is displayed as being flipped up/down before being turned into a visible state or an invisible state, so that the image is erased or appears not instantaneously but gradually.

Thus, the user knows which data will be erased or appear next and when, and the screen switches naturally by eliminating unnatural impression given by abrupt erasure or appearance of the image, so that the user will not be puzzled what to do for abrupt switching of the screen.

Therefore, in addition to the effect realized by the thirteenth method, the user can manage the data and retrieve the information he needs more readily.

A sixteenth data display method is the thirteenth method further characterized in that, when an image is erased, a display of the image being moved in a horizontal direction from inside to outside of the screen is displayed, and when an image is to appear, the image is moved in the horizontal direction from outside to inside of the screen.

According to the above method, each data image is displayed as being moved horizontally within the screen before being turned into visible/invisible, so that the image is erased or appears not instantaneously but gradually. In other words, when the image is turned into invisible, the image is moved away from the center to the edge of the screen in the horizontal direction, and when the image is turned into visible, the image is moved closer to the center from the edge of the screen in the horizontal direction.

Thus, the user knows which data will be erased or appear next and when, and the screen switches naturally by eliminating unnatural impression given by abrupt erasure or appearance of the image, so that the user will not be puzzled what to do for abrupt switching of the screen.

Therefore, in addition to the effect realized by the thirteenth method, the user can manage the data and retrieve the information he needs more readily.

A seventeenth data display method is the tenth method further characterized in that whether a distance between multi-page data and the view point is greater than a predetermined value or not is checked, and when the distance is equal to or smaller than the predetermined value, all the pages are displayed on the screen.

According to the above method, when the distance between the multi-page data and the view point is equal to or smaller than the predetermined value, all the pages are displayed on the screen.

Thus, in case of an image having a certain data volume or more, if the image is composed of a plurality of pages, the user can confirm or understand the summary of the target data by reviewing a content of an arbitrary page among the plurality of pages when he sees a list screen. Thus, when the user wishes to review each page, namely the content of the data in question, the user can skip a step of switching the list screen to another screen for reading out the data in question alone to display and edit the same.

Therefore, in addition to the effect realized by the tenth method, the user can manage the data and retrieve the information he needs more readily.

An eighteenth data display method is the seventeenth method further characterized in that all the pages are displayed successively per page.

According to the above method, the plurality of pages are automatically turned successively without the user's command.

Thus, the user can readily review the contents of the plurality of pages without taking any action.

Therefore, in addition to the effect realized by the seventeenth method, the user can manage the data and retrieve the information he needs more readily.

A nineteenth data display method is the seventeenth method further characterized in that a specified page among the plurality of pages is displayed when the user specifies that particular page.

According to the above method, an arbitrary page among the plurality of pages is displayed as per user's specification.

Thus, the user can readily review the content of the particular page he wishes to confirm among the plurality of pages.

Therefore, in addition to the effect realized by the seventeenth method, the user can manage the data and retrieve the information he needs more readily.

A twentieth data display method is the tenth method further characterized in that density of the data in a partial space within the space is measured to judge whether the data are dense or not, and if the data in the partial space are dense, a group figure is displayed as an image indicating that the data are dense instead of displaying all the images of the data in the partial space.

According to the above method, when there is a small area where the data are dense within the display screen, a group figure is displayed in that area as an image indicating that the data are dense instead of displaying all the data.

Thus, when there are a large volume of data, a display used to become complicated, but the display can remain simple herein. Thus, the user can understand the summary of the entire data, thereby making it possible to provide a more easy-to-see list.

Therefore, in addition to the effect realized by the tenth method, the user can manage the data and retrieve the information he needs more readily.

A twenty-first data display method is the tenth method further characterized in that a display surface of each image is rotated toward the view point within the space, so that each image is displayed with its display surface facing towards the view point.

According to the above method, the display surface of each image is rotated toward the view point within the space, so that each image is displayed with its display surface facing towards the view point.

Thus, since each image is displayed to face the view point, the image is displayed without being distorted. Consequently, the visual recognition of the image is improved and the user can readily understand the image correctly.

Therefore, in addition to the effect realized by the tenth method, the user can manage the data and retrieve the information he needs more readily.

A twenty-second data display method is a data display method in a virtual 3-D coordinate space having an X axis in a lateral direction of a 2-D screen, a Y axis in a longitudinal direction of the 2-D screen, and a Z axis in a virtual depth direction with respect to the 2-D screen, characterized in that:

a content of data is generated as a reduced image;

an attribute of each item of the data is set to each of the X axis and Z axis within the space;

a list of the content of each item of the data is displayed on a screen by displaying the reduced image at a position having an X coordinate and a Z coordinate corresponding to the value of the attribute of each item of the data; and a display pattern of each item of the data is changed depending whether being suitable for retrieval or not so as to be visually distinguished in a clear manner.

According to the above method, the content of each item of the data is displayed as a reduced image at a position corresponding to the attribute of each item of the data set respectively on the X axis and Z axis within the virtual 3-D coordinate space. Here, the display pattern of each item of the data is made different depending whether being suitable for the user's intended retrieval or not so as to be visually distinguished in a clear manner within the space.

Thus, since retrieval suitable data and retrieval non-suitable data are readily distinguished form each other while being displayed as a list, the user can readily understand the result when he retrieves the data.

Therefore, when the user retrieves the data as occasion demands, he can understand the content of each item of the data at a glance, while understanding the position of the data in terms of time, categories, or the like in a straightforward manner. Consequently, the user can readily manage the data and retrieve the information he needs.

A twenty-third data display method is the twenty-second method further characterized in that either the retrieval suitable data or retrieval non-suitable data alone are displayed within the space.

According to the above method, either the retrieval suitable data or retrieval non-suitable data alone are displayed within the space. For example, only the retrieval suitable data are displayed while the retrieval non-suitable data are not.

Thus, for example, when only the retrieval suitable data are displayed while the retrieval non-suitable data are not, images of the retrieval suitable data are not hidden by the images of the retrieval non-suitable data partially nor entirely. Consequently, the visual recognition of the images is improved and the user can readily understand the content of the retrieval suitable data.

Therefore, in addition to the effect realized by the twenty-second method, the user can manage the data and retrieve the information he needs more readily.

A twenty-fourth data display method is the twenty-second method further characterized in that either the retrieval suitable data or retrieval non-suitable data are moved parallel to a longitudinal direction with respect to the space.

According to the above method, only the retrieval suitable data or retrieval non-suitable data are moved parallel to the longitudinal direction with respect to the space.

For example, either the retrieval suitable data or retrieval non-suitable data are displayed as being popped up, namely, being moved upward parallel to the longitudinal direction with respect to the space. Also, for example, either the retrieval suitable data or retrieval non-suitable data are displayed as being popped down, namely, being moved downward parallel to the longitudinal direction with respect to the space.

Thus, either the retrieval suitable data or retrieval non-suitable data are displayed at a position shifted from an array of the data images, thereby being more noticeable than the images in the array. In addition, the images of the retrieval suitable data which were hidden by the images of the retrieval non-suitable data are now exposed partially or entirely. Thus, the user can readily distinguish the retrieval suitable data from the retrieval non-suitable data, and readily understand the suitability/non-suitability state of the data.

Therefore, in addition to the effect realized by the twenty-second method, the user can manage the data and retrieve the information he needs more readily.

A twenty-fifth data display method is the twenty-second method further characterized in that either the retrieval suitable data or retrieval non-suitable data alone are moved parallel to the lateral direction with respect to the space.

According to the above method, either the retrieval suitable data or retrieval non-suitable data alone are moved parallel to the lateral direction with respect to the space.

For example, either the retrieval suitable data or retrieval non-suitable data alone are displayed as being slid to the right in the lateral direction with respect to the space. Also, for example, either the retrieval suitable data or retrieval non-suitable data alone are displayed as being slid to the left in the lateral direction with respect to the space.

Thus, since either the retrieval suitable data or retrieval non-suitable data alone are displayed at a position shifted from an array of the data images, thereby being more noticeable than the images in the array. In addition, the images of either kind of data which were hidden by the images of the other kind of the data are now exposed partially or entirely. Thus, thus user can readily distinguish the retrieval suitable data from the retrieval non-suitable data, and readily understand the content of the retrieval suitable data or retrieval non-suitable data.

Therefore, in addition to the effect realized by the twenty-second method, the user can manage the data and retrieve the information he needs more readily.

A twenty-sixth data display method is the twenty-fourth or twenty-fifth method further characterized in that a translucent space dividing plate is displayed at the boundary of the images of the retrieval suitable data and images of the retrieval non-suitable data.

According to the above method, the translucent space dividing plate is displayed at the boundary of the images of the retrieval suitable data and the images of the retrieval non-suitable data.

Thus, in case of the twenty-fourth method, if the space is seen from the view point set above, the space dividing plate overlaps the images placed below the space dividing plate partially or entirely, and since the space dividing plate is translucent, these images are displayed less clear than the images placed above the space dividing plate. Consequently, only the images which have been moved upward parallel to the longitudinal direction with respect to the space become noticeable. This makes it easy for the user to recognize the content of either the retrieval suitable data or retrieval non-suitable data alone whichever moved upward. Thus, the user can readily distinguish the retrieval suitable data and retrieval non-suitable data from each other, and readily understand which are the suitable data.

In case of the twenty-fifth method, when the space is seen from the view point set at the right or left, the space dividing plate overlaps the images placed behind the space dividing plate partially or entirely, and since the space dividing plate is translucent, these image are displayed less clear than the images placed before the space dividing plate. This makes it easy for the user to recognize the content of either the retrieval suitable data or retrieval non-suitable data alone whichever slid. Thus, the user can readily distinguish the retrieval suitable data and retrieval non-suitable data from each other, and readily understand which are the suitable data.

Therefore, in addition to the effect realized by the twenty-fourth or twenty-fifth method, the user can manage the data and retrieve the information he needs more readily.

A twenty-seventh data display method is the twenty-fourth or twenty-fifth method further characterized in that a translucent cubic object that encloses the images of either the retrieval suitable data or retrieval non-suitable data is displayed.

According to the above method, a translucent cubic object that encloses the images either the retrieval suitable data or retrieval non-suitable data is displayed.

Thus, when the space is seen from a view point, the translucent cubic object overlaps the images enclosed by the same partially or entirely, and since the cubic object is translucent, these images are displayed less clear than the images which are not enclosed by the translucent cubic object. Consequently, only the images which are not enclosed by the translucent cubic object become noticeable. This makes it easy for the user to recognize the content of either the retrieval suitable data or retrieval non-suitable data alone whichever not enclosed by the translucent cubic object. Thus, the user can readily distinguish the retrieval suitable data and retrieval non-suitable data from each other, and readily understand which are the suitable data.

Therefore, in addition to the effect realized by the twenty-fourth or twenty-fifth method, the user can manage the data and retrieve the information he needs more readily.

A twenty-eighth data display method is the twenty-second method further characterized in that either the retrieval suitable data or retrieval non-suitable data are changed in size.

According to the above method, either the retrieval suitable data or retrieval non-suitable data are changed in size.

For example, either the retrieval suitable data or retrieval non-suitable data are displayed smaller than the other.

Thus, either the retrieval suitable data or retrieval non-suitable data become larger than the other, and hence, more noticeable. Also, the images of either kind of data which were hidden by the images of the other kind of data are now exposed partially or entirely. Thus, the user can readily distinguish the retrieval suitable data and retrieval non-suitable data from each other, and readily understand the content of the retrieval suitable data or retrieval non-suitable data.

Therefore, in addition to the effect realized by the twenty-second method, the user can manage the data and retrieve the information he needs more readily.

A twenty-ninth data display method is the twenty-second method further characterized in that either the retrieval suitable data or retrieval non-suitable data are changed in brightness.

According to the above method, the brightness of either the retrieval suitable data or retrieval non-suitable data is changed.

For example, either the retrieval suitable data or retrieval non-suitable data are displayed darker than the other, thereby being hard to see.

Thus, either the retrieval suitable data or retrieval non-suitable data are displayed brighter than the other, and hence, become more noticeable. Thus, the user can readily distinguish the retrieval suitable data and retrieval non-suitable data from each other, and readily understand the content of the retrieval suitable data or retrieval non-suitable data.

Therefore, in addition to the effect realized by the twenty-second method, the user can manage the data and retrieve the information he needs more readily.

A thirtieth data display method is the twenty-second method further characterized in that either the retrieval suitable data or retrieval non-suitable data are changed in transparency.

According to the above method, the transparency of either the retrieval suitable data or retrieval non-suitable data is changed.

For example, either the retrieval suitable data or retrieval non-suitable data are displayed more transparent (higher transparency) than the other, thereby being hard to see.

Thus, either the retrieval suitable data or retrieval non-suitable data are displayed less transparent than the other, and hence, become more noticeable. In addition, the images of either kind of the data which were hidden by the images of the other kind of the data now become more easy to see partially or entirely. The, the user can readily distinguish the retrieval suitable data and the retrieval non-suitable data from each other, and readily understand the content of the retrieval suitable data or retrieval non-suitable data.

Therefore, in addition to the effect realized by the twenty-second method, the user can manage the data and retrieve the information he needs more readily.

A thirty-first data display method is any of the twenty-fourth through thirtieth methods further characterized in that a changing rate of a display state of either the retrieval suitable data or retrieval non-suitable data is gradually increased until an image is no longer displayed.

According to the above method, the changing rate of the transparency, size, brightness, etc. or moving rate within the space is increased gradually until an image is no longer displayed.

Thus, unlike the case where the image vanishes instantaneously, there is a time margin until the image becomes invisible, so that the user can recognize which data are suitable or non-suitable during such a time margin. Thus, the user can readily recognize that either the retrieval suitable data or retrieval non-suitable data are removed from the 3-D coordinate space.

Since either the retrieval suitable data or retrieval non-suitable data alone become noticeable in the final display, the user can readily understand the data of either kind entirely as a consequence.

Therefore, in addition to the effect realized by any of the twenty-second through thirtieth methods, the user can manage the data and retrieve the information he needs more readily.

A thirty-second data display method is a data display method in a virtual 3-D coordinate space having an X axis in a lateral direction of a 2-D screen, a Y axis in a longitudinal direction of the 2-D screen, and a Z axis in a virtual depth direction with respect to the 2-D screen, characterized in that:

a content of data is generated as a reduced image;

an attribute of each item of the data is set to each of the X axis and Z axis within the space;

when there is not more than one item of the data having the same values of two attributes represented by the X axis and Z axis, the reduced image is displayed at a position having the X axis and Z axis corresponding to the values of the above attributes of the data; and when there is more than one item of the data having the same values of the two attributes represented by the X axis and Z axis, a figure indicating that there is more than one item of the data is displayed at a position having the X axis and Z axis corresponding to the values of the above attributes of the data.

According to the above method, the content of each item of the data is placed within the virtual 3-D coordinate space as a reduced image at a position corresponding to the attribute of each item of the data set on the X axis and Z axis and displayed as a list.

Here, the data whose two attributes have different values are placed at different positions within a plane defined by two virtual axes of the virtual 3-D coordinate space and displayed. Thus, the user knows the difference of the data contents at a glance. On the other hand, if the data whose two attributes have the same values are placed and displayed in a normal manner to superimpose one on the other at the same position within the plane, the user can hardly judge whether there is more than one corresponding item of the data or not.

However, according to the above method, when there is more than one item of the data having the same values of the two attributes, an image indicating that there is more than one item of the data is displayed within the space at a predetermined position of the data.

For example, an image of each item of the data is not displayed. Instead, an image different from any of these images is displayed. In this manner, the data are displayed in a different pattern from the one assigned to each item of the data.

Thus, the user can readily understand that there is more than one item of the data at the same coordinate position.

Therefore, when the user retrieves the data as occasion demands, he can understand the content of each item of the data at a glance, while understanding the position of the data in terms of time, categories, or the like in a straightforward manner. Consequently, the user can readily manage the data and retrieve the information he needs.

A thirty-third data display method is the thirty-second method further characterized in that more than one item of the data having the same values of the two attributes is displayed separately by being aligned at a nearby position to the predetermined position within the space.

According to the above method, more than one item of the data having the same values of the two attributes is displayed separately by being aligned at a nearby position to the predetermined position within the space, without being overlapped.

Thus, not only the fact that there is more than one item of the data having the same values of the two attributes is indicated, but also an image of each item of the data can be displayed as a list on the screen. Thus, the user can understand the content of each item of the data at a glance.

Therefore, in addition to the effect realized by the thirty-second method, the user can manage the data and retrieve the information he needs more readily.

A thirty-fourth data display method is the thirty-third method further characterized in that more than one item of the data having the same values of the two attributes is displayed separately by being aligned at a nearby position to the predetermined position within the space in an order based on a specified attributed which is different from the above two attributes.

According to the above method, more than one item of the data having the same values of the two attributes is displayed separately by being aligned at a nearby position to the predetermined position within the space in an order based on an attributed, for example, specified by the user, which is different from the above two attributes.

Thus, the user can understand the data having the same values of the two attributes in an order based on another attribute at a glance.

Therefore, in addition to the effect realized by the thirty-third method, the user can manage the data and retrieve the information he needs more readily.

A thirty-fifth data display method is a data display method in a virtual 3-D coordinate space having an X axis in a lateral direction of a 2-D screen, a Y axis in a longitudinal direction of the 2-D screen, and a Z axis in a virtual depth direction with respect to the 2-D screen, characterized in that:

an attribute of each item of the data is set to each of the X axis and Z axis within the space;

polyhedrons each having a front surface parallel to an XY plane and an attribute information display surface which is different from the front surface are generated within the space;

a content of each item of the data is displayed as a reduced image on the front surface of each polyhedron;

a corresponding polyhedron is placed at a position having an X coordinate and a Z coordinate corresponding to a value of the attribute of each item of the data to display a list of a content of each item of the data on the screen; and a value of an attribute, which is different from the above two attributes, is displayed on the attribute information display surface of each polyhedron as attribute information of each kind related to the data According to the above method, a list of the content of each item of the data in the form of the reduced images is displayed within the virtual 3-D coordinate space at a position corresponding to the attribute of each item of the data set on the X axis and Z axis, respectively.

Here, the polyhedrons each having the front surface facing toward the XY plane, that is, toward the view point and another attribute information display surface are displayed, and an image of the data is displayed on the front surface of each polyhedron, while a value of another attribute different from the above two attributes is displayed on the attribute information display surface as attribute information of each kind.

Thus, the user can readily understand the content of each item of the data, position of the data in terms of the above two attributes directly. Moreover, the user can readily and visually understand the attribute information, such as date of creation of the data, title, owner, size, data format, in a precise manner.

Therefore, when the user retrieves the data as occasion demands, he can understand the content of each item of the data at a glance, while understanding the position of the data in terms of time, categories, or the like in a straightforward manner. Consequently, the user can readily manage the data and retrieve the information he needs.

A thirty-sixth data display method is the thirty-fifth method further characterized in that the polyhedron has the attribute information display surface facing toward the corner direction of the screen and having a predetermined thickness as a side surface, and the thickness of the side surface is set in accordance with the page information of the data while the attribute information of each kind is displayed on the side surface.

According to the above method, the polyhedron has the front surface and the side surface serving as an attribute display area having a predetermined thickness and facing toward the corner direction of the screen, and the thickness of the side surface is set in accordance with the page information of the data while the attribute information of each kind is displayed on the side surface.

Thus, the user can understand the content of each item of the data and an approximate number of pages of the data as the attribute information directly, while readily understanding the other attribute information visually in a precise manner.

Therefore, in addition to the effect realized by the thirty-fifth method, the user can manage the data and retrieve the information he needs more readily.

A thirty-seventh data display method is the thirty-fifth method further characterized in that the a shape of the polyhedron is set in accordance with page print information indicating the shape of the data when being printed out.

According to the above method, the shape of the polyhedron is set in accordance with the page print information, such as portrait and landscape directions.

Thus, the user can roughly understand the content of each item of the data directly, while readily understanding a shape of the data when being printed out as attribute information visually in a precise manner.

Consequently, the user can easily understand the attribute information of each item of the data in a precise manner.

Therefore, in addition to the effect realized by the thirty-fifth method, the user can manage the data and retrieve the information he needs more readily.

A thirty-eighth data display method is the thirty-fifth method further characterized in that a shape of the polyhedron is set in accordance with the kinds of computer programs handling the data.

According to the above method, the shape of the polyhedron is set in accordance with the kinds of computer programs handling the data.

Thus, the user can roughly understand the content of each item of the data directly, while readily understanding the kinds of the computer programs handling the data as attribute information visually in a precise manner.

Therefore, in addition to the effect realized by the thirty-fifth method, the user can manage the data and retrieve the information he needs more readily.

A thirty-ninth data display method is the thirty-fifth method further characterized in that:

the front surface of the polyhedron is shown by a figure of a predetermined shape unrelated to the data content;

inside the figure of the predetermined shape is divided into a first area displaying a data image and a second area other than the first area; and a shape of the first area is set in accordance with page print information indicating a shape of the data when being printed out.

According to the above method, the front surface of the polyhedron is shown by a figure of a predetermined shape unrelated to the data content, and inside the figure of the predetermined shape is divided into the first area displaying a data image and the second area other than the first area, and a shape of the first area is set in accordance with the page print information indicating a shape of the data when being printed out. For example, a data image is drawn on the front surface of the polyhedron and the image is enclosed with a frame.

Thus, the figure on the front surface of the polyhedron is normalized before being displayed. For this reason, the user can readily understand the content of each item of the data in the first area and the exact shape of the data when being printed out as the attribute information, while making it possible to provide an easy-to-see list in which more than one item of the data is aligned in a normalized, specific, and constant shape.

Therefore, in addition to the effect realized by the thirty-fifth method, the user can manage the data and retrieve the information he needs more readily.

A fortieth data display method is the thirty-ninth method further characterized in that the attribute information of each kind is displayed in the second area.

According to the above method, the shape of the first area is set in accordance with the page print information of the data, while the attribute information of each kind is displayed in the second area.

Thus, the user can roughly understand the content of the data and the shape of the data when being printed out in the first area, while understanding the attribute information in the second area readily and directly.

Therefore, in addition to the effect realized by the thirty-ninth method, the user can manage the data and retrieve the information he needs more readily.

A forty-first data display method is the thirty-fifth method further characterized in that the attribute information of each kind is displayed on the rear surface of the polyhedron.

According to the above method, the attribute information of each kind is displayed on the rear surface of the polyhedron.

Thus, the user can readily understand the content of each item of the data and precise attribute information in detail through a simple manipulation, that is, to see the rear surface after roughly understanding the content of the data directly. If different kinds of attribute information are displayed on the side and rear surfaces, respectively, the user can confirm and understand many kinds of attribute information through a simple manipulation at high speeds.

Therefore, in addition to the effect realized by the thirty-fifth method, the user can manage the data and retrieve the information he needs more readily.

A forty-second data display method is the thirty-fifth method further characterized in that the data content is displayed on the front surface of the polyhedron, on which arbitrary information inputted on the front surface without any definition is superimposed.

Conventionally, the data displayed as information must have a specific definition, and arbitrary information which is not defined in advance, such as a memo or comments, can not be appended to each item of the data. Or, if it could be appended, the user can not understand the list of the data which has been defined and the information like the added memo or comments simultaneously.

However, according to the above method, the data content is displayed on the front surface of the polyhedron, and arbitrary information which is not pre-defined and inputted from the user is superimposed in the form of a memo or comments.

Thus, since the user can readily add desired data and increase an amount of information, he can obtain the necessary information more easily. Also, the user can use a memo or comments through visual data retrieval. In addition, since the memo or comments are superimposed on the front surface, the user can understand the memo or comments in the data list display without extra manipulation. Also, since the memo or comments are superimposed on the front surface, a large amount of information can be written into the front surface in accordance with the area of the front surface.

Therefore, in addition to the effect realized by the thirty-fifth method, the user can manage the data and retrieve the information he needs more readily.

A forty-third data display method is the thirty-fifth method further characterized in that the data content is displayed on the front surface of the polyhedron, and handwritten input information is superimposed on an arbitrary surface of the polyhedron.

According to the above method, the data content is displayed on the front surface of the polyhedron, and handwritten input information from the user is superimposed on an arbitrary surface of the polyhedron, that is, at least one of the front, side, and rear surfaces.

Thus, since the user can readily add desired data and increase an amount of information, he can more easily obtain the necessary information. Also, the user can use a memo or comments through visual data retrieval. Also, hand-written input makes a highly flexible and fast input possible. When the memo or comments are superimposed on the front surface, the user can readily add or understand a great amount of memos or comments. When the memo or comments are superimposed on the side surfaces, the user can add and understand the memo or comments while roughly understanding the data content. When the memo or comments are superimposed on the rear surface, the user can add and understand many memos and comments by a simple manipulation while roughly understanding the data content.

Therefore, in addition to the effect realized by the thirty-fifth method, the user can more readily manage the data and retrieve the information he needs.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A data display method in a virtual 3-D coordinate space having an X axis along a first direction of a 2-D screen, a Y axis along a second direction of said 2-D screen, and a Z axis along a virtual depth direction with respect to said 2-D screen, comprising the steps of:

generating a content of data as a reduced image;

setting an attribute of each item of said data to each of said X axis and said Z axis within a space;

displaying a list of the content of each item of said data on said screen by displaying said reduced image at a position having an X coordinate and a Z coordinate corresponding to a value of the attribute of each item of said data; and superimposing a trace of a view point within said space on said reduced image within said screen based on the view point inputted successively in said space, said view point being indicative of which part of said space should be displayed at which angle as an image, each view point which is inputted from a pointing device is stored as history in time series and a trace indicative of the past movement path of the view points is drawn on the screen based on the stored data of the view points, wherein, a dark portion and a bright portion are provided in the trace and the bight portion moves within the trace of the view points in a direction in which the view point moves from the latest one to the older ones.

2. The data display method of claim 1, further comprising the step of:

displaying a screen in such a manner to successively change from a display seen from a new view point to a display seen from an older view point along trace of movement of said view point.

3. The data display method of claim 1, wherein said list displaying step includes the sub-step of:

displaying specified data at a front position within said screen.

4. The data display method of claim 1, wherein said list displaying step includes the sub-step of:

turning an image invisible when a distance to said view point is not greater than a predetermined value so as not to be displayed on said screen.

5. The data display method of claim 4, further comprising the step of:

turning an image into translucent while said image is being turned into visible/invisible.

6. The data display method of claim 4, further comprising the step of:

displaying an image being flipped down within said screen when said image is erased, and displaying an image being flipped up within said screen when said image is to appear.

7. The data display method of claim 4, further comprising the step of:

displaying an image which is moving in a direction from inside to outside of said screen when said image is erased, and displaying an image which is moving in a direction from outside to inside of said screen when said image is to appear.

8. The data display method of claim 1, wherein said list displaying step includes the sub-steps of:

computing density of the data in a partial space within said space;

judging whether the data in said partial space are dense or not;

displaying a group figure if the data in said partial space are dense instead of displaying images of all the data residing in said partial space, said group figure indicating that the data are dense in said partial space.

9. A data display method in a virtual 3-D coordinate space having a X axis along a first direction of a 2-D screen, a Y axis along a second direction of said 2-D screen, and a Z axis along a virtual depth direction with respect to said 2-D screen, comprising the steps of:

setting an attribute of each item of data to each of said X axis and said Z axis within a space;

generating polyhedrons each having a front surface parallel to an XY plane and an attribute information display surface within said space, said front surface and said attribute information display surface being different from each other;

displaying a content of each item of said data as a reduced image on the front surface of said each polyhedron;

displaying a list of the content of each item of said data on said screen by placing a corresponding polyhedron at a position having an X coordinate and a Z coordinate corresponding to a value of the attribute of each item of said data; and displaying a value of an attribute as attribute information of each kind of said data on said attribute information display surface of said each polyhedron, said attribute being different from said two attributes, wherein said attribute information displaying step includes the sub-step of:

displaying said attribute information of each kind of a rear surface of said each polyhedron, wherein the rear surface is a surface which is not visible when the polyhedron is virtually displayed in 3-D space, and the rear surface is displayed when the polyhedron is virtually reversed upon rotation of the polyhedron upon an axis.

* * * * *